US012767890B2

(12) United States Patent
Hirschmann et al.

(10) Patent No.: US 12,767,890 B2
(45) Date of Patent: Oct. 20, 2026

(54) LIQUID-CRYSTAL MEDIUM

(71) Applicant: MERCK PATENT GmbH, Darmstadt (DE)

(72) Inventors: Harald Hirschmann, Darmstadt (DE); Sabine Schoen, Darmstadt (DE)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 19/009,245

(22) Filed: Jan. 3, 2025

(65) Prior Publication Data

US 2025/0223496 A1 Jul. 10, 2025

(30) Foreign Application Priority Data

Jan. 5, 2024 (EP) .................................... 24150560

(51) Int. Cl.
*C09K 19/34* (2006.01)
*C09K 19/54* (2006.01)

(52) U.S. Cl.
CPC .......... *C09K 19/3491* (2013.01); *C09K 19/54* (2013.01)

(58) Field of Classification Search
CPC ...................................................... C09K 19/34
See application file for complete search history.

(56) References Cited

U.S. PATENT DOCUMENTS

| | | | | |
|---|---|---|---|---|
| 3,814,700 | A | 6/1974 | Aviram et al. | |
| 3,953,491 | A | 4/1976 | Steinstrasser et al. | |
| 4,001,137 | A | 1/1977 | Steinstrasser | |
| 4,065,489 | A | 12/1977 | Steinstrasser et al. | |
| 4,077,900 | A | 3/1978 | Pohl et al. | |
| 4,130,502 | A | 12/1978 | Eidenschink et al. | |
| 4,237,026 | A | 12/1980 | Eidenschink et al. | |
| 4,868,341 | A | 9/1989 | Eidenschink et al. | |
| 11,168,255 | B2 * | 11/2021 | Manabe | C09K 19/586 |
| 2018/0216006 | A1 | 8/2018 | Engel et al. | |
| 2024/0002728 | A1 * | 1/2024 | Huang | C09K 19/542 |

FOREIGN PATENT DOCUMENTS

| | | | | |
|---|---|---|---|---|
| DE | 2209127 | A1 | 9/1973 | |
| DE | 2240864 | A1 | 2/1974 | |
| DE | 2338281 | A1 | 2/1974 | |
| DE | 2321632 | A1 | 11/1974 | |
| DE | 2450088 | A1 | 4/1976 | |
| DE | 2636684 | A1 | 2/1978 | |
| DE | 2637430 | A1 | 2/1978 | |
| DE | 2853728 | A1 | 7/1980 | |
| DE | 3321373 | A1 | 12/1984 | |
| EP | 0364538 | A1 | 4/1990 | |
| EP | 3354709 | A1 | 8/2018 | |
| EP | 3354710 | A1 | 8/2018 | |
| EP | 4015599 | A1 * | 6/2022 | G02F 1/1333 |
| EP | 4 296 334 | A1 | 12/2023 | |
| GB | 1376115 | A | 12/1974 | |

OTHER PUBLICATIONS

Extended European Search Report issued May 16, 2025, by the European Patent Office in corresponding European Patent Application No. 24219143.5-1014. (6 pages).
Haller et al., "Molecular Crystals and Liquid Crystals", Taylor & Francis Group, vol. 24, Jan. 12, 1973, pp. 249-258. (11 pages).
Jung et al., "Analysis of Optimal Phase Retardation of a Fringe Field-Driven Homogeneously Aligned Nematic Liquid Crystal Cell", Japanese Journal of Applied Physics, (Mar. 10, 2004), vol. 43, No. 3, pp. 1028-1031. (5 pages).
Tschierske et al., "Definitionen von Grundbegriffen mit Bezug zu nieder-molekularen und polymeren Flüssigkristallen", Angewandte Chemie, (Nov. 19, 2004), vol. 116, Issue 45, pp. 6340-6368. (29 pages).
Yun et al., "Achieving High Light Efficiency and Fast Response Time in Fringe Field Switching Mode using a Liquid Crystal with Negative Dielectric Anisotropy", Liquid Crystals, (Sep. 2012), vol. 39, No. 9, pp. 1141-1148. (10 pages).
Barón, M., "Definitions of Basic Terms Relating to Low-Molar-Mass and Polymer Liquid Crystals", Pure Appl. Chem., 2001 (month unknown), vol. 73, No. 5, pp. 845-895. (51 pages).
Lee et al., "Electro-optic characteristics and switching principle of a nematic liquid crystal cell controlled by fringe-field switching", Applied Physics Letter, vol. 73, 2881, Nov. 11, 1998. (4 pages).

* cited by examiner

*Primary Examiner* — Chanceity N Robinson
(74) *Attorney, Agent, or Firm* — Buchanan Ingersoll & Rooney PC

(57) ABSTRACT

A liquid-crystal (LC) medium or LC material based on a mixture of polar compounds, its use for optical, electro-optical and electronic purposes, in particular in LC displays, especially in LC displays of the vertically aligned mode and/or the fringe-field switching mode, an LC display of the vertically aligned mode and/or the fringe-field switching mode comprising the LC medium, especially an energy-saving LC display, and a process of manufacturing the LC display.

15 Claims, No Drawings

LIQUID-CRYSTAL MEDIUM

CROSS-REFERENCE TO RELATED APPLICATIONS

This application filed under 35 U.S.C. § 111(a) claims priority benefit under 35 U.S.C. § 119(a) of and to EP Patent Application No. 24150560.1, filed Jan. 5, 2024, the entire contents of which are incorporated herein by reference in their entirety and for all purposes.

BACKGROUND OF THE INVENTION

The present invention relates to a liquid-crystal (LC) medium or LC material based on a mixture of polar compounds, to its use for optical, electro-optical and electronic purposes, in particular in LC displays, especially in LC displays of the vertically aligned mode and/or the fringe-field switching mode, to an LC display of the vertically aligned mode and/or the fringe-field switching mode comprising the LC medium, especially an energy-saving LC display, to a process of preparing the LC medium, and to a process of manufacturing the LC display.

So-called VA ("vertically aligned") displays are known which have a broad viewing angle and fast response times. The LC cell of a VA display contains a layer of an LC medium between two transparent electrodes, where the LC medium usually has a negative value of the dielectric anisotropy (Δε). In the switched-off state, the molecules of the LC layer are aligned perpendicular to the electrode surfaces (homeotropically) or have a tilted homeotropic alignment. On application of a voltage to the two electrodes, a realignment of the LC molecules parallel to the electrode surfaces takes place.

Furthermore, VA displays have been disclosed which use an alignment layer that is prepared by photoalignment, also known as $UV^2A$ mode (see e.g. Q. Tang et al., SID Symposium Digest of Technical Papers 2018, 414-417). These displays utilize an alignment layer prepared from crosslinkable and photoorientable monomers or prepolymers, e.g. cinnamate chromophores which are irradiated obliquely with linearly polarized UV light. As a result, a crosslinked alignment layer is formed which induces uniaxial alignment with a pretilt angle in the LC molecules close to its surface. By changing the irradiation direction, a multidomain configuration with different pretilt directions can be obtained.

With a special polymer stabilised process step, the PS-VA ("polymer stabilised-vertically aligned") technology ensures that the liquid crystal in its black state is not completely vertical but has a slight inclination. This is called a 'tilt' and ensures that the direction in which the LC molecules switch is prescribed locally.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays but comprise a layer of an LC medium with negative dielectric anisotropy instead of an LC medium with positive dielectric anisotropy. The LC medium with negative dielectric anisotropy shows a more favourable director orientation that has less tilt and more twist orientation compared to the LC medium with positive dielectric anisotropy, as a result of which these displays have a higher transmission.

UB-FFS ("ultra-brightness fringe field switching") technology or UBplus technology are based on FFS technology using negative dielectric singles in order to increase total transmittance of the panel. UB—FFS is mainly used for smaller devices and UBplus is mainly for large screen displays. In detail, the specially arranged liquid crystals allow brighter transmittance of the backlight that illuminates the UB-FFS display, and the optimized use of light cuts the energy demand of the UB-FFS display at least by a third and simultaneously improves image quality. This results in longer runtime and/or brighter displays.

Also known are so-called IPS ("in-plane switching") displays, which contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

However, the use of LC media with negative dielectric anisotropy in VA or FFS displays has also several drawbacks. For example, they have a significantly lower reliability compared to LC media with positive dielectric anisotropy.

The term "reliability" as used hereinafter means the quality of the performance of the display during time and with different stress loads, such as light load, temperature, humidity, or voltage which cause display defects such as image sticking (area and line image sticking), mura, yogore etc. and which are known to the skilled person in the field of LC displays. As a standard parameter for categorising the reliability usually the voltage holding ration (VHR) value is used, which is a measure for maintaining a constant electrical voltage in a test display. The higher the VHR value, the better the reliability of the LC medium.

The reduced reliability of an LC medium with negative dielectric anisotropy in a VA or FFS display can be explained by an interaction of the LC molecules with the polyimide of the alignment layer, as a result of which ions are extracted from the polyimide alignment layer, and wherein LC molecules with negative dielectric anisotropy do more effectively extract such ions.

This results in new requirements for LC media to be used in VA or FFS displays. In particular, the LC medium has to show a high reliability and a high VHR value after UV exposure. Further requirements are a high specific resistance, a large working-temperature range, short response times even at low temperatures, a low threshold voltage, a multiplicity of grey levels, high contrast and a broad viewing angle, and reduced image sticking.

Thus, in displays known from prior art often the undesired effect of so-called "image sticking" or "image burn" is observed, wherein the image produced in the LC display by temporary addressing of individual pixels still remains visible even after the electric field in these pixels has been switched off, or after other pixels have been addressed.

This "image sticking" can occur on the one hand if LC media having a low VHR are used. The UV component of daylight or the backlight can cause undesired decomposition reactions of the LC molecules therein and thus initiate the production of ionic or free-radical impurities. These may accumulate, in particular, at the electrodes or the alignment layers, where they may reduce the effective applied voltage.

Another problem observed in prior art is that LC media for use in displays, including but not limited to VA and FFS displays, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation but also to visible light from the backlight of a display, that usually does not emit UV light.

It is therefore an object of the present invention to provide improved LC media for use in VA-, PS-VA-, FFS-, polymer stabilised PS-FFS, UB-FFS-, UBplus and/or IPS-displays, which do not exhibit the disadvantages described above or only do so to a small extent and have improved properties. A further object of the invention is to provide VA-, PS-VA-, FFS-, UB-FFS-, UBplus and/or IPS- displays with good transmission, high reliability, a VHR value especially after backlight exposure, a high specific resistance, a large working-temperature range, short response times even at low temperatures, a low threshold voltage, a multiplicity of grey levels, high contrast and a broad viewing angle, and reduced image sticking.

For VA-, PS-VA-, FFS-, UB-FFS-, UBplus and/or IPS-displays, fast switching mixtures exhibiting superior reliability are required. In order to achieve fast switching property, low cell gaps, e.g., cell gaps between 2.2 and 3.3 μm are considered. Meanwhile, high polar singles, which have the dielectric anisotropy values $\Delta\varepsilon$ in the range from −15 to −10, are used for realizing fast switching property. However, the intrinsic solubility limitation of these high polar singles may influence the achievable switching time. This can be solved by combining the high polar singles with high birefringence singles, which are characterized by their birefringence values $\Delta n$ in the range from 0.22 to 0.30 independent of their polarity. It is therefore a further object of the present invention to provide improved LC mixtures which contain high polar singles and high birefringency singles, wherein the high birefringency singles exhibit a favourably low ratio of rotational viscosity to the clearing point $\gamma_1$/cl.p., and exhibit an excellent solubility in the LC mixtures so that the mixtures can keep excellent low temperature stability.

It was found that one or more of these objects could be achieved by providing an LC medium as disclosed and claimed hereinafter.

SUMMARY OF THE INVENTION

The invention thus relates to a liquid crystal medium comprising one or more compounds selected from the group of compounds of formula III

III

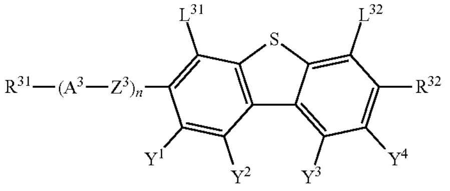

and/or formula IIIA

IIIA

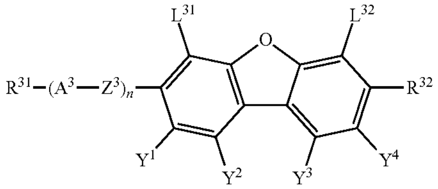

and/or formula BC

BC

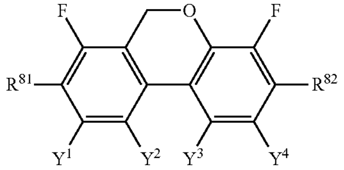

and/or formula PH-1

PH-1

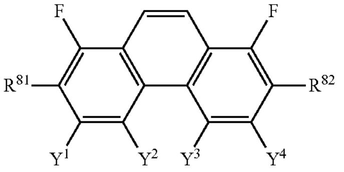

and one or more compounds of formula I

I

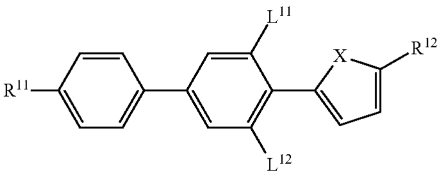

in which $R^{11}$, $R^{12}$, $R^{31}$, $R^{32}$, $R^{81}$, and $R^{82}$ each, independently of one another, denote H, an alkyl or alkoxy radical having 1 to 15 C atoms, preferably having 1 to 7 C atoms, where one or more —$CH_2$— groups in these radicals may each be replaced, independently of one another, by

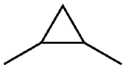, 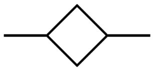, 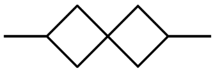,

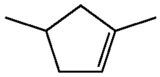, 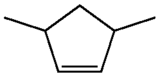, 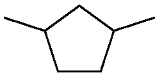,

—C≡C—, —$CF_2O$—, —$OCF_2$—, —CH═CH—, by —O—, —CO—O— or —O—CO— in such a way that O atoms are not linked directly to one another, and in which one or more H atoms may be replaced by halogen, X denotes S or O, preferably denotes S, $A^3$ on each occurrence, independently of one another, denotes a) a 1,4-cyclohexylene or 1,4-cyclohexenylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) are optionally mono-substituted or polysubstituted by halogen atoms, n denotes 0, 1 or 2, $Z^3$ on each occurrence independently of one another denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^{11}$, $L^{12}$, $L^{31}$ and $L^{32}$, each, independently of one another, denote F, Cl, $CF_3$ or $CHF_2$, and $Y^1$, $Y^2$, $Y^3$, $Y^4$, each, independently of one another, denote H, F, Cl, $CF_3$, $CHF_2$, $CH_3$ or $OCH_3$, preferably H, $CH_3$ or $OCH_3$, very preferably H, wherein H can be replaced by Deuterium.

The invention further relates to an LC display comprising the liquid crystal medium as described above and below, in particular a VA, PS-VA, FFS, PS-FFS, UB-FFS, UBplus, IPS, PS-IPS, or $UV^2A$ display.

The invention furthermore relates to the use of the liquid crystal medium as described above and below in a VA, PS-VA, FFS, PS-FFS, UB-FFS, UBplus, IPS, PS-IPS, or $UV^2A$ display.

The invention furthermore relates to a process for preparing an LC medium as described above and below, comprising the steps of mixing one or more compounds of formula I with one or more compounds selected from the group of compounds of formula III, and/or formula IIIA, and/or formula BC, and/or formula PH-1, and optionally with further LC compounds and/or additives.

The invention furthermore relates to a process for manufacturing an LC display as described above and below, comprising the steps of filling or otherwise providing an LC medium as described above and below between the substrates of the display.

The LC medium according to the present invention allow to achieve one or more of the following advantageous effects, especially when used in LC displays with small cell gaps, for example, cell gaps between 2.2 to 3.3 μm:

a reduced viscosity which enables fast response times, high birefringence, a favourably low ratio of rotational viscosity to clearing point $\gamma_1$/cl.p., an excellent low temperature stability, reduced ODF mura, high reliability and high VHR value after UV exposure and/or heat treatment, a low threshold voltage which is useful to reduce the driving voltage and enable energy-saving displays, enable an LC panel production process which is time- and cost-effective and energy saving.

It was surprisingly found that the LC media according to the present invention show a favourable combination of reduced low rotational viscosity and high birefringence. A relatively low rotational viscosity and high birefringence enable to achieve fast LC media mixtures suitable for very small cell gaps. Moreover, in terms of reliability the LC media according to the present invention show high VHR values and less or no undesired mura effects such as edge mura.

DETAILED DESCRIPTION OF THE INVENTION

An alkenyl group in the compounds of the LC medium as disclosed below is not considered to be within the meaning of the term “polymerizable group” as used herein.

The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the compounds as disclosed above and below, except for the chiral dopants, are preferably selected from achiral compounds.

As used herein, the expression “UV light having a wavelength of” followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term “substantially transmissive” means that the filter transmits a substantial part, preferably at least 50% of the intensity, of incident light of the desired wavelength(s). As used herein, the term “substantially blocking” means that the filter does not transmit a substantial part, preferably at least 50% of the intensity, of incident light of the undesired wavelengths. As used herein, the term “desired (undesired) wavelength” e.g. in case of a band pass filter means the wavelengths inside (outside) the given range of λ, and in case of a cut-off filter means the wavelengths above (below) the given value of λ.

As used herein, the terms “active layer” and “switchable layer” mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms “tilt” and “tilt angle” will be understood to mean a tilted alignment of the LC molecules of an LC medium relative to the surfaces of the cell in an LC display (here preferably a PSA display), and will be understood to be inclusive of “pretilt” and “pretilt angle”. The tilt angle here denotes the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms “reactive mesogen” and “RM” will be understood to mean a compound containing a mesogenic or liquid crystalline skeleton, and one or more functional groups attached thereto which are suitable for polymerization and are also referred to as “polymerizable group” or “P”.

Unless stated otherwise, the term “polymerizable compound” as used herein will be understood to mean a polymerizable monomeric compound.

An SA-VA display according to the present invention will be of the polymer stabilised mode as it contains, or is manufactured by use of, an LC medium containing RMs like those described below. Consequently, as used herein, the term “SA-VA display” when referring to a display according to the present invention will be understood to refer to a polymer stabilised SA-VA display even if not explicitly mentioned.

As used herein, the term “low-molecular-weight compound” will be understood to mean to a compound that is monomeric and/or is not prepared by a polymerization reaction, as opposed to a “polymeric compound” or a “polymer”.

As used herein, the term “unpolymerizable compound” will be understood to mean a compound that does not contain a functional group that is suitable for polymerization under the conditions usually applied for the polymerization of the RMs.

The term “mesogenic group” as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in Pure Appl. Chem. 2001, 73(5), 888 and C. Tschierske, G. PeIzI, S. Diele, Angew. Chem. 2004, 116, 6340-6368.

The term “spacer group”, hereinafter also referred to as “Sp”, as used herein is known to the person skilled in the art and is described in the literature, see, for example, Pure Appl. Chem. 2001, 73(5), 888 and C. Tschierske, G. PeIzI, S. Diele, Angew. Chem. 2004, 116, 6340-6368. As used herein, the terms “spacer group” or “spacer” mean a flexible group, for example an alkylene group, which connects the mesogenic group and the polymerizable group(s) in a polymerizable mesogenic compound.

Above and below,

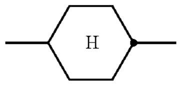

denotes a trans-1,4-cyclohexylene ring, and

denotes a 1,4-phenylene ring.

In a group

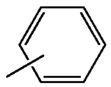

the single bond shown between the two ring atoms can be attached to any free position of the benzene ring.

If in the formulae shown above and below a terminal group like $R^{11}$, $R^{21,22}$, $R^{31,32,33}$, $R^{41,42}$, $R^{51,52}$, $R^{61}$, $R^{71}$, $R^{N1,N2}$, $R^{81,82}$, $R^{91,92,93}$, $R^{L1,L2}$, $R^{Q}$, $R^{R1,R2}$, or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetra-decyl, pentadecyl, methoxy, octyloxy, nonyloxy, decyloxy, undecyloxy, dodecyloxy, tridecyloxy or tetradecyloxy.

If one of the aforementioned terminal groups denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If one of the aforementioned terminal groups denotes an alkoxy or oxaalkyl group it may also contain one or more additional oxygen atoms, provided that oxygen atoms are not linked directly to one another.

If one of the aforementioned terminal groups denotes an alkyl radical in which one $CH_2$ group has been replaced by $-CH{=}CH-$, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If one of the aforementioned terminal groups denotes an alkyl or alkenyl radical which is at least monosubstituted by halogen, this radical is preferably straight-chain, and halogen is preferably F or Cl. In the case of polysubstitution, halogen is preferably F.

The resultant radicals also include perfluorinated radicals. In the case of mono-substitution, the fluorine or chlorine substituent may be in any desired position but is preferably in the on-position.

In another preferred embodiment, one or more of the aforementioned terminal groups, like $R^{11}$, $R^{21,22}$, $R^{31,32,33}$, $R^{41,42}$, $R^{51,52}$, $R^{61}$, $R^{71}$, $R^{N1,N2}$, $R^{81,82}$, $R^{91,92,93}$, $R^{L1,L2}$, $R^{Q}$, $R^{R1,R2}$, or L are selected from the group consisting of

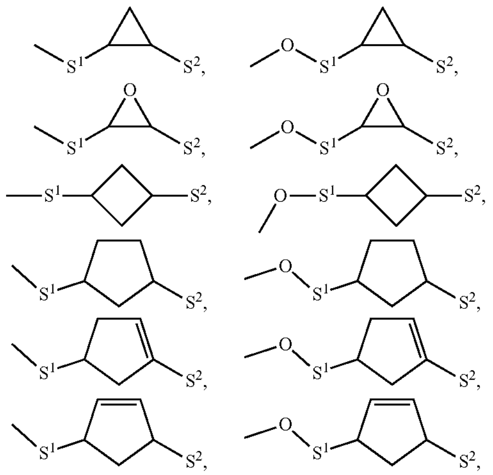

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

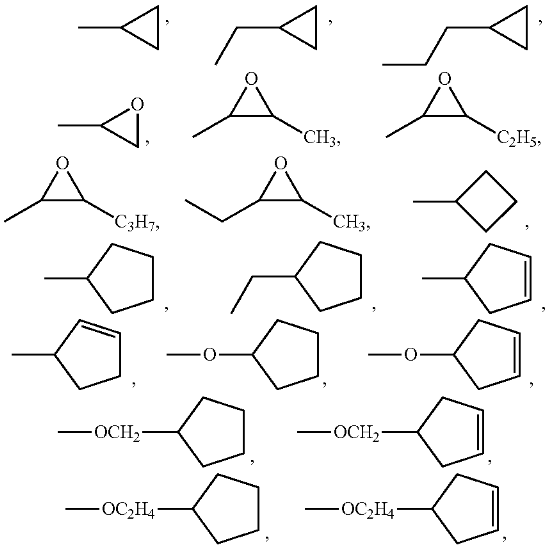

—$O(CH_2)_2OCH_3$, —$O(CH_2)_2OCH_3$, —$O(CH_2)_3OCH_3$, —$O(CH_2)_4OCH_3$, —$O(CH_2)_2F$, —$O(CH_2)_3F$, —$O(CH_2)_4F$.

Halogen is preferably F or Cl, very preferably F.

The group —$CR^0$═$CR^{00}$— is preferably —CH═CH—.

—CO—, —C(═O)— and —C(O)— denote a carbonyl group, i.e.

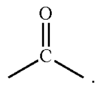

Preferred substituents L, are, for example, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O— and/or S-atoms are not directly connected with each other, and wherein one or more H atoms are each optionally replaced by F, Cl, P- or P-Sp-, and $Y^1$ denotes halogen.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

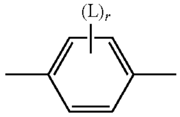

is preferably

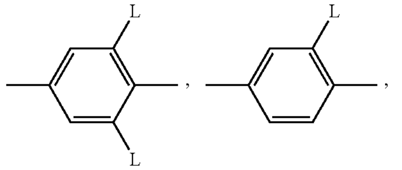

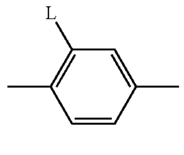

or

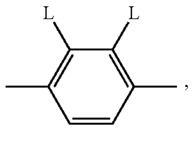

in which L has one of the meanings indicated above.

In a preferred embodiment the LC medium according to the invention, comprises one or more are compounds of formula I, wherein $R^{11}$ and $R^{12}$, each, independently of one another, denote straight-chain alkyl having 1 to 7 C atoms or alkenyl having 2 to 7 C atoms.

In a preferred embodiment the LC medium according to the invention comprises one or more compounds of the formula I, preferably selected from the compounds of the formulae I-1 to I-9:

I-1

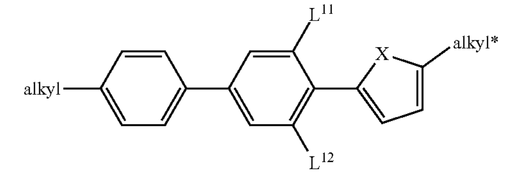

I-2

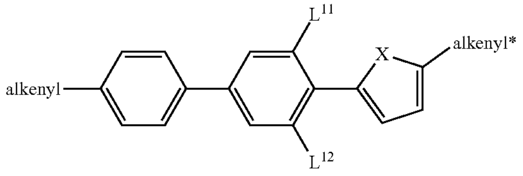

I-3

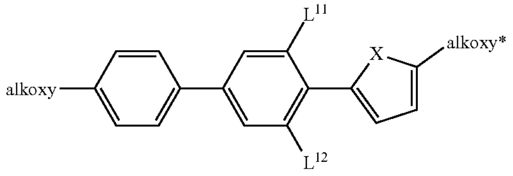

I-4

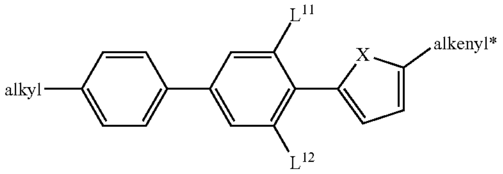

I-5

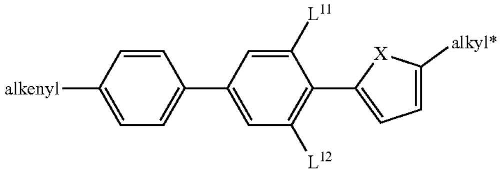

I-6

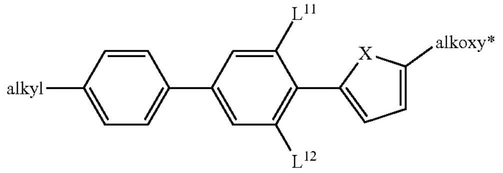

I-7

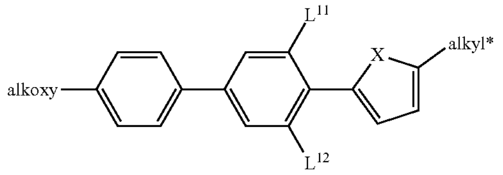

I-8

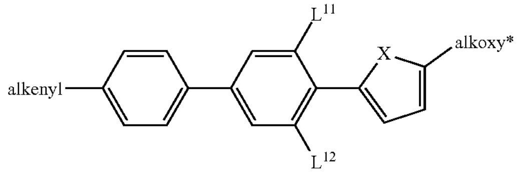

-continued

I-9

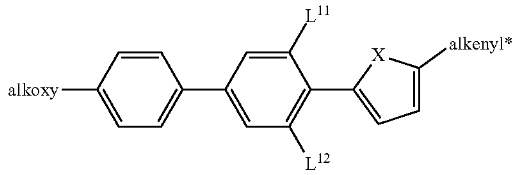

in which alkyl and alkyl* each, independently of one another, denote a straight-chain alkyl radical having 1 to 6 C atoms, or a cyclic alkyl group having 3 to 12 C atoms, preferably cyclopropyl, cyclobutyl, cyclopentyl, cyclopropylalkyl, cyclobutylalkyl or cyclopentylalkyl, alkenyl and alkenyl* each, independently of one another, denote a straight-chain alkenyl radical having 2 to 7 C atoms, alkoxy and alkoxy* each, independently of one another, denote a straight-chain alkoxy radical having 1 to 6 C atoms, X denotes S or O, preferably S, and $L^{11}$ and $L^{12}$ each, independently of one another, denote F or Cl, preferably both F.

Very preferred compounds of the formula 1-1 are selected from the compounds of the formulae I-1-1 to I-1-10.

I-1-1

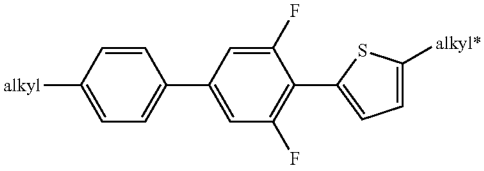

I-1-2

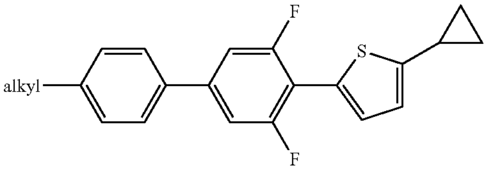

I-1-3

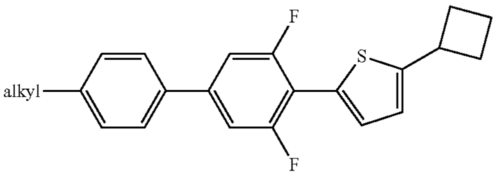

I-1-4

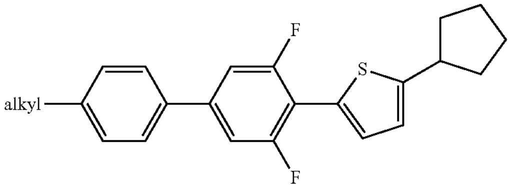

-continued

I-1-5

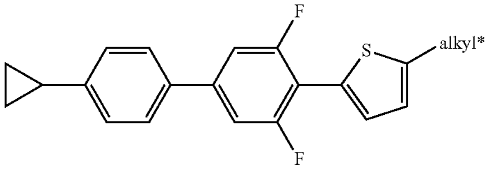

I-1-6

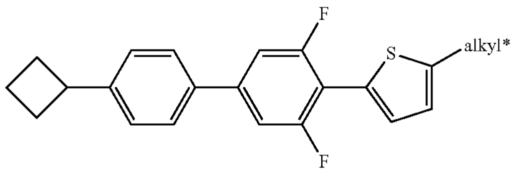

I-1-7

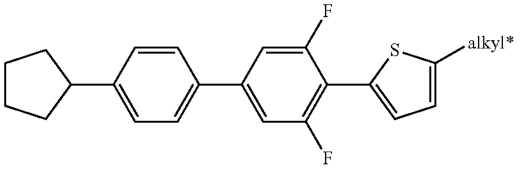

I-1-8

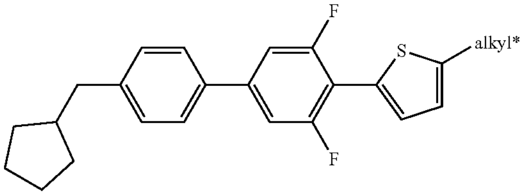

I-1-9

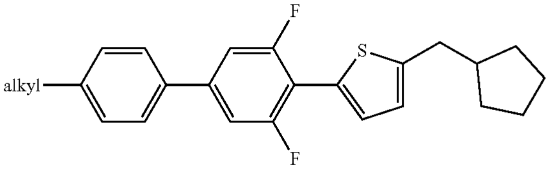

I-1-10

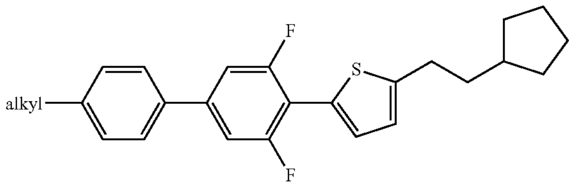

in which alkyl and alkyl* each, independently of one another, denote methyl, ethyl, n-propyl, n-butyl or n-pentyl, preferably n-propyl.

Very preferred compounds of the formula 1-6 are selected from the compounds of the formulae I-6-1 to I-6-3.

I-6-1

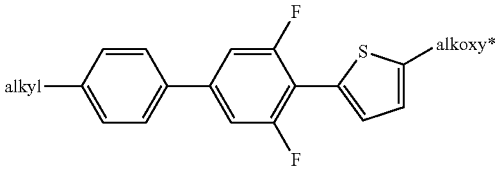

-continued

I-6-2

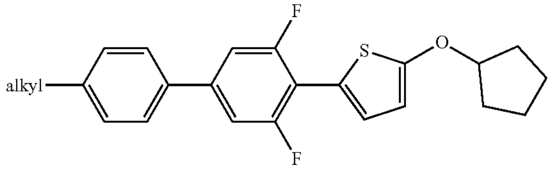

I-6-3

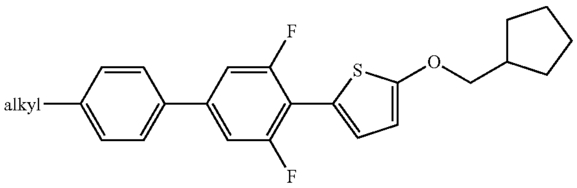

in which alkyl denotes methyl, ethyl, n-propyl, n-butyl or n-pentyl, preferably n-propyl, alkoxy* denotes a straight-chain alkoxy radical having 1 to 6 C atoms.

Preferred compounds of formula I is 1-1-1, and the most preferred is the compound PUS-n-m, where n and m, each, independently of one another, denote 1, 2, 3, 4, or 5.

Preferred compounds of formula III are those of formula III-1 to III-6:

III-1

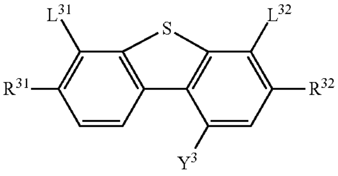

III-2

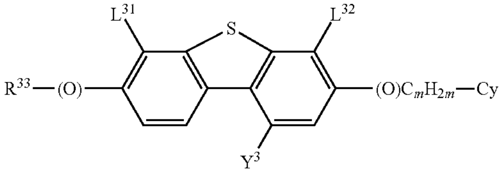

III-3

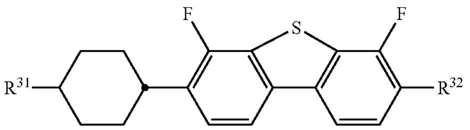

III-4

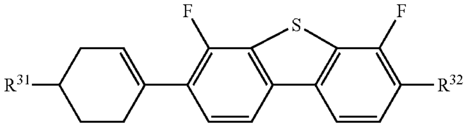

III-5

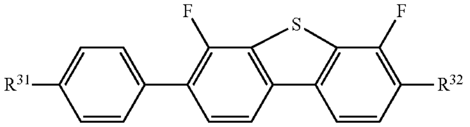

-continued

III-6

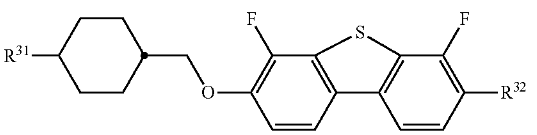

in which the occurring groups have the same meanings as given under formula III above and preferably $R^{31}$ and $R^{32}$ each, independently of one another, denote an alkyl, alkenyl or alkoxy radical having up to 15 C atoms, preferably having 1 to 7 C atoms, more preferably one or both of them denote an alkoxy radical; or cyclic alkyl having 3 to 6 C atoms, $R^{33}$ denotes alkyl or alkenyl having up to 7 C atoms or a group Cy-$C_nH_{2n+1}$—, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl, cyclopentyl or cyclopentenyl, (O) denotes O or a single bond, $L^{31}$ and $L^{32}$ each, independently of one another, denote F or Cl, preferably both denote F, and $Y^3$ denotes H, F, Cl, $CF_3$, $CHF_2$, $CH_3$ or $OCH_3$, preferably H or $CH_3$.

In another preferred embodiment the LC medium comprises one or more compounds of the formula III-1 selected from the group of compounds of formulae III-1-1 to III-1-20, preferably of formula III-1-1 and III-1-11,

III-1-1

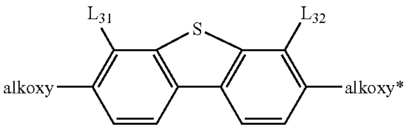

III-1-2

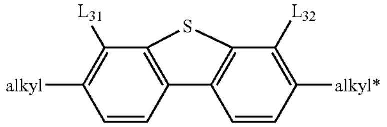

III-1-3

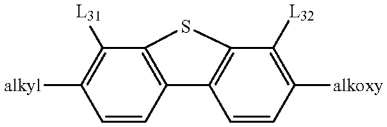

III-1-4

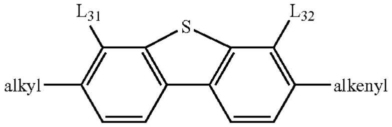

III-1-5

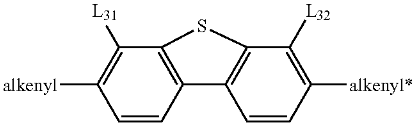

-continued

III-1-6

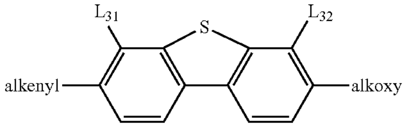

III-1-7

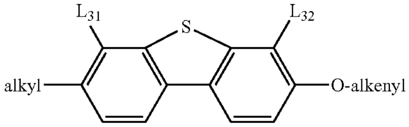

III-1-8

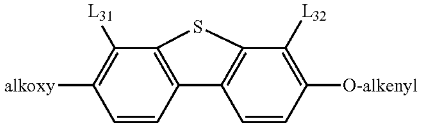

III-1-9

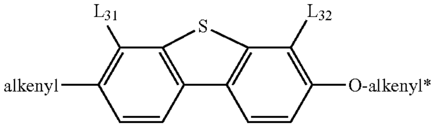

III-1-10

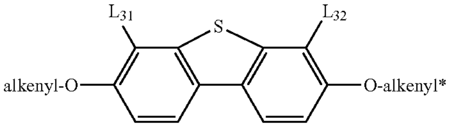

III-1-11

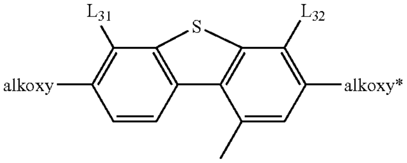

III-1-12

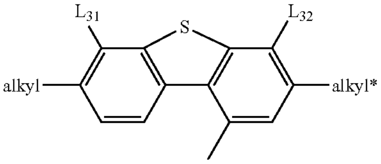

III-1-13

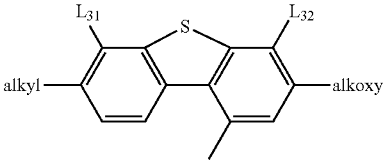

III-1-14

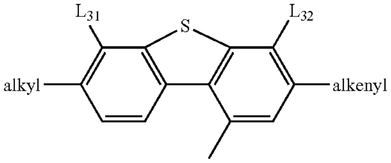

III-1-15

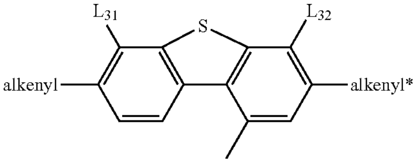

-continued

III-1-16

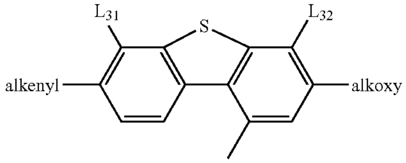

III-1-17

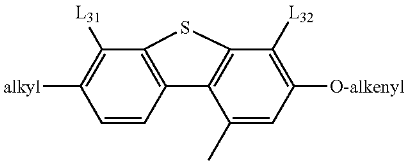

III-1-18

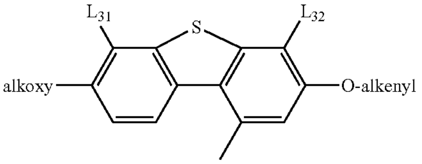

III-1-19

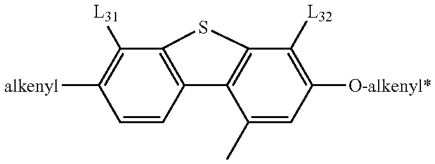

III-1-20

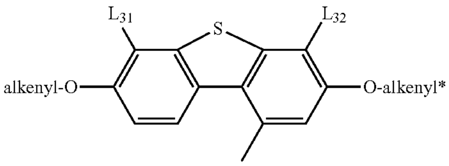

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{31}$ and $L^{32}$ each, independently of one another, denote F or Cl, preferably both F.

Very preferred compounds of formula III-1-1 are selected from the group consisting of the following subformulae,

III-1-1-1

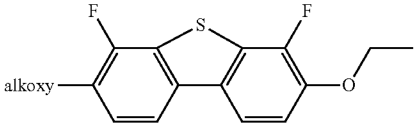

III-1-1-2

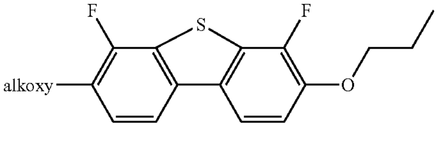

-continued

III-1-1-3

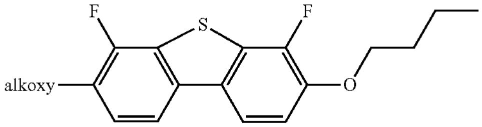

III-1-1-4

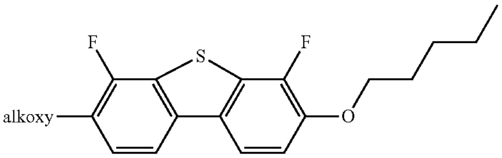

III-1-1-5

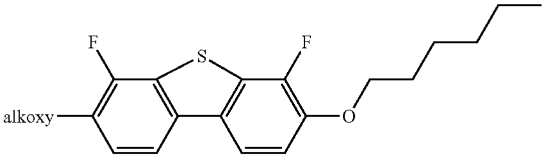

Very preferred compounds of formula III-1-11 are selected from the group consisting of the following subformulae,

III-1-11-1

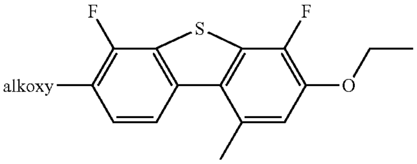

III-1-11-2

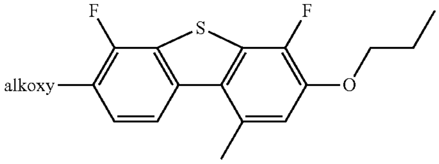

III-1-11-3

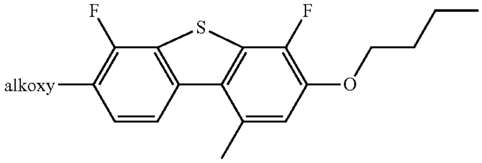

III-1-11-4

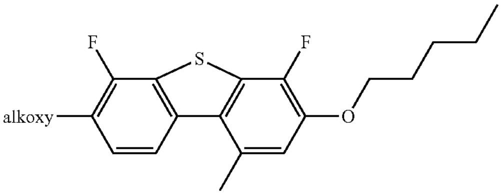

-continued

III-1-11-5

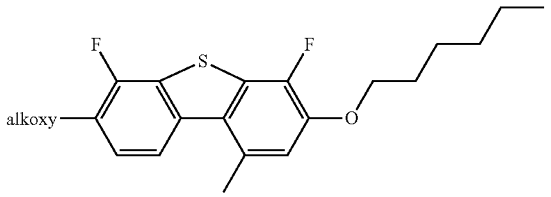

Very preferred compounds of the formula III-2 are the following,

III-2-1

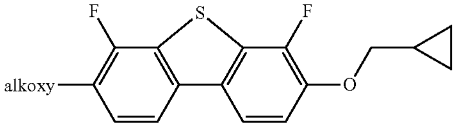

III-2-2

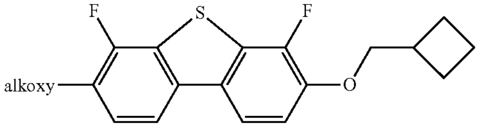

III-2-3

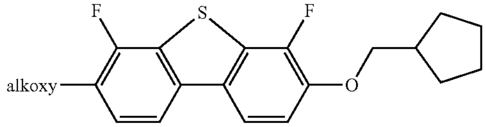

III-2-4

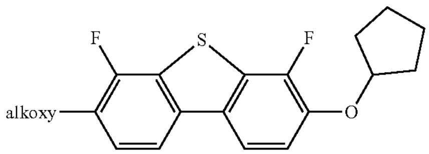

III-2-5

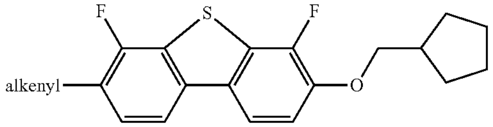

III-2-6

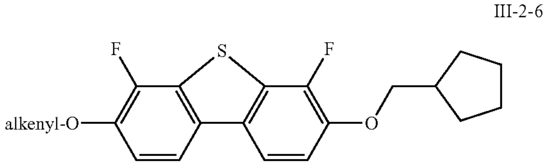

III-2-7

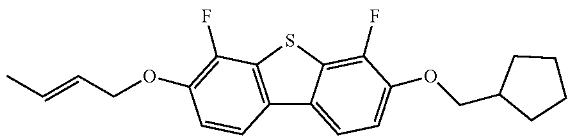

III-2-8

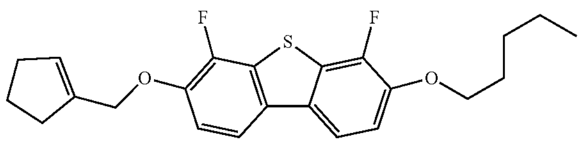

-continued

III-2-9

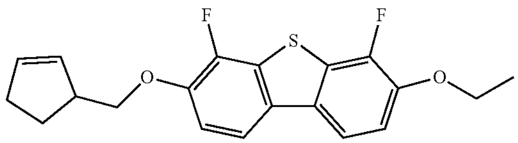

III-2-10

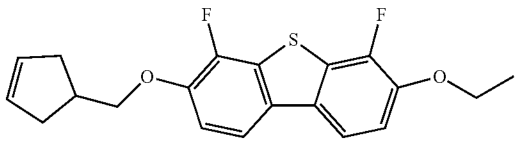

in which alkoxy denotes a straight-chain alkoxy radical having 1-6 C atoms, preferably ethoxy, propoxy, butoxy or pentoxy, very preferably ethoxy or propoxy, and alkenyl denotes a straight-chain alkenyl radical having 2-6 C atoms.

Very preferred compounds of formula III-6 are selected from the group consisting of the following formulae,

III-6-1

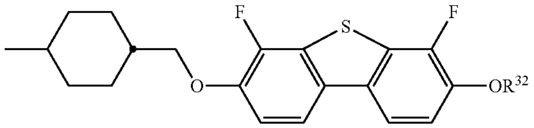

III-6-2

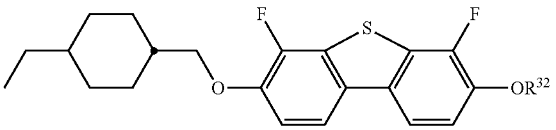

III-6-3

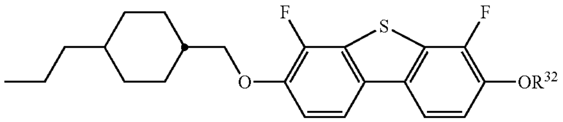

III-6-4

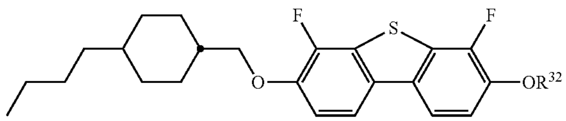

III-6-5

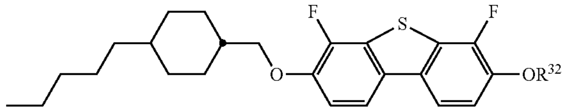

III-6-6

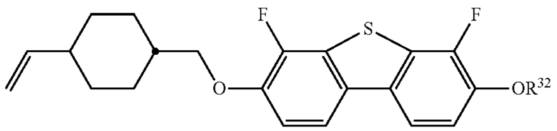

-continued

III-6-7

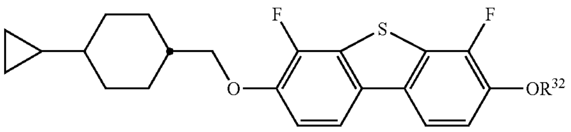

III-6-8

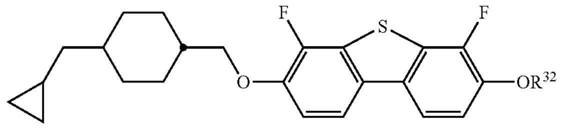

III-6-9

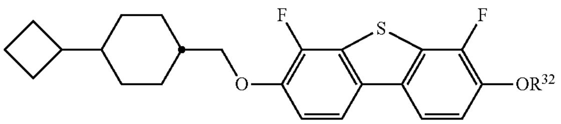

III-6-10

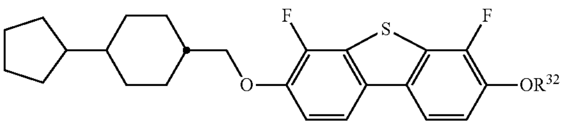

III-6-11

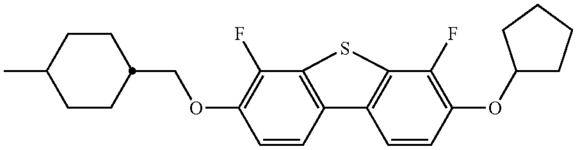

III-6-12

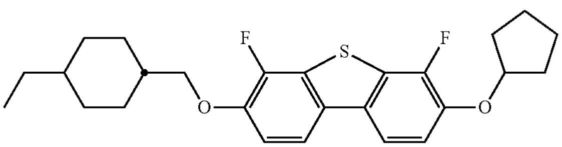

III-6-13

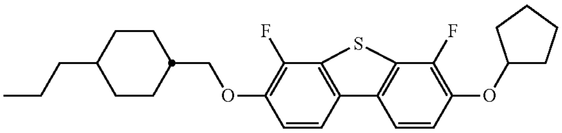

III-6-14

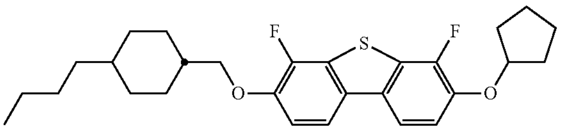

III-6-15

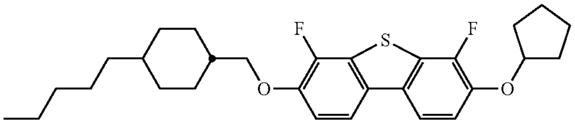

III-6-16

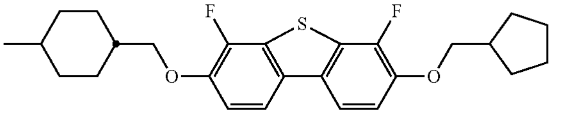

-continued

III-6-17

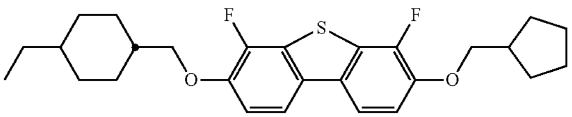

III-6-18

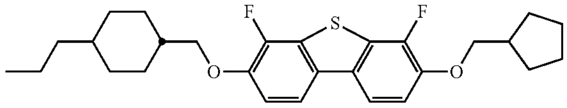

III-6-19

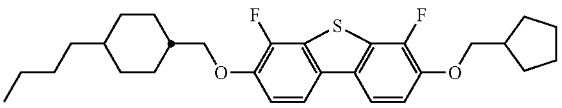

III-6-20

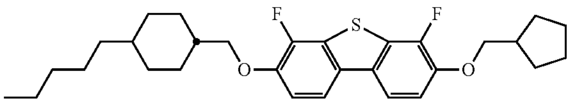

in which $R^{32}$ denotes alkyl having 1 to 7 C-atoms, preferably ethyl, n-propyl or n-butyl, or alternatively cyclopropylmethyl, cyclobutylmethyl or cyclopentylmethyl or alternatively $-(CH_2)_nF$ in which n is 2,3,4, or 5, preferably $C_2H_4F$.

Preferred compounds of formula III is III-1-1-3, III-1-1-4, III-1-1-5, III-2-7, as well as III-6-2, and the most preferred are compounds B(S)-2O-O4, B(S)-2O-O5, B(S)-2O-O6, B(S)-1V1O-O1(c5), and COB(S)-2-O4.

Preferably the LC medium further comprises one or more compounds of formula IIIA:

IIIA

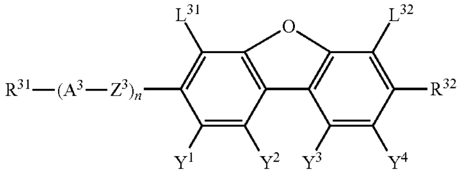

in which $R^{31}$, $R^{32}$, $A^3$, $Z^3$, $L^{31}$, $L^{32}$, $Y^1$, $Y^2$, $Y^3$, $Y^4$, and n have the meanings given above for formula III.

In a preferred embodiment of the present invention the LC medium comprises one or more compounds of the formula IIIA-1:

IIIA-1

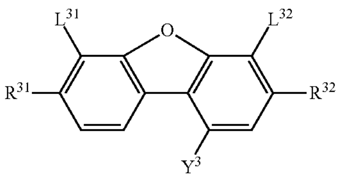

in which the occurring groups have the same meanings as given under formula IIIA above and preferably $R^{31}$ and $R^{32}$ each, independently of one another, an alkyl, alkenyl or alkoxy radical having up to 15 C atoms, preferably having 1 to 7 C atoms, more preferably one or both of them denote an alkoxy radical, or cyclic alkyl having 3 to 6 C atoms, and $L^{31}$ and $L^{32}$ each, independently of one another, denote F or Cl, preferably both denote F.

In another preferred embodiment the LC medium comprises one or more compounds of the formula IIIA-1 selected from the group of compounds of formulae IIIA-1-1 to IIIA-1-20 preferably of formulae IIIA-1-8 and IIIA-1-18,

IIIA-1-1

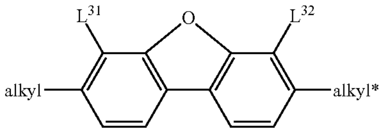

IIIA-1-2

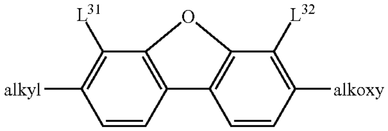

IIIA-1-3

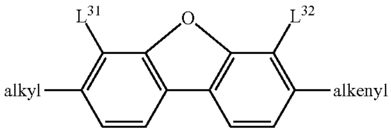

IIIA-1-4

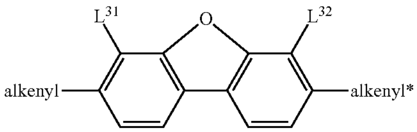

IIIA-1-5

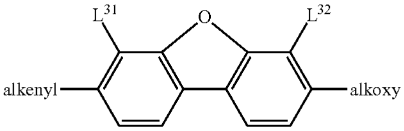

IIIA-1-6

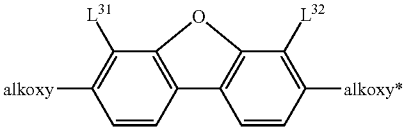

IIIA-1-7

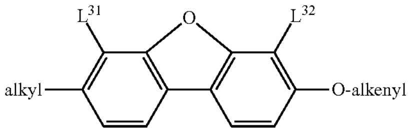

IIIA-1-8

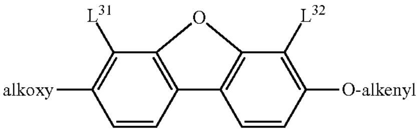

IIIA-1-9

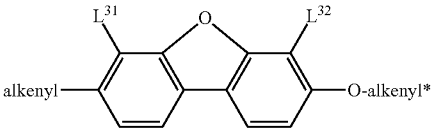

-continued

IIIA-1-10

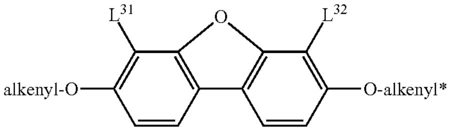

IIIA-1-11

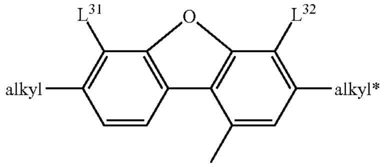

IIIA-1-12

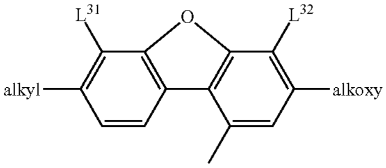

IIIA-1-13

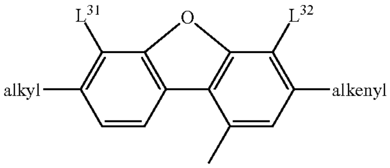

IIIA-1-14

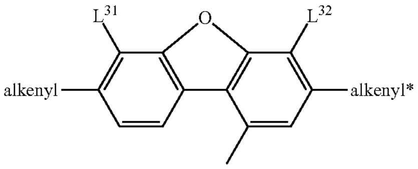

IIIA-1-15

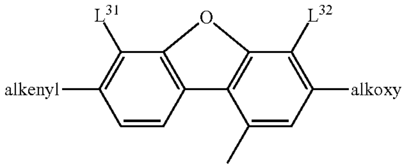

IIIA-1-16

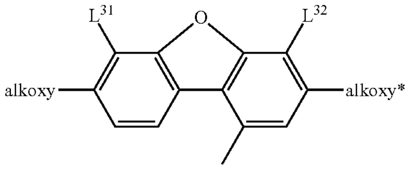

IIIA-1-17

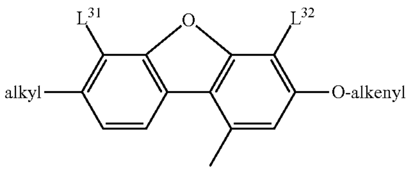

IIIA-1-18

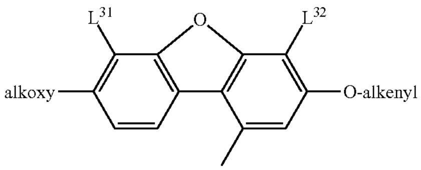

-continued

IIIA-1-19

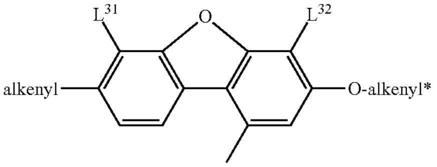

IIIA-1-20

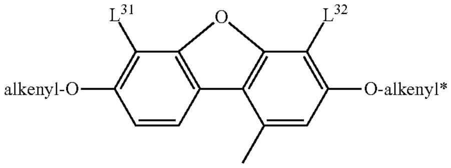

in which alkyl and alkyl* each, independently of one another, denote a straight-chain alkyl radical having 1-6 C atoms, or, or cyclic alkyl having 3 to 6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{31}$ and $L^{32}$ each, independently of one another, denote F or Cl, preferably both F.

Preferably, the LC medium comprises one or more compounds of the formula IIIA-1-8 selected from the following sub-formulae:

IIIA-1-8-1

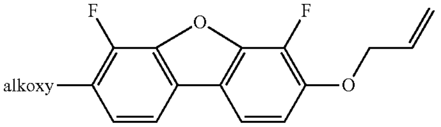

IIIA-1-8-2

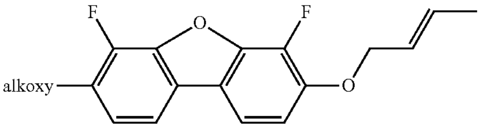

Preferably, the LC medium comprises one or more compounds of the formula IIIA-1-18 selected from the following sub-formulae:

IIIA-1-18-1

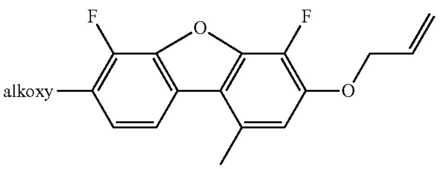

IIIA-1-18-2

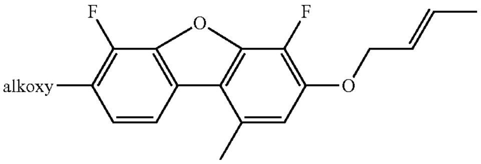

In another preferred embodiment of the present invention the LC medium comprises one or more compounds of the formula IIIA-2

IIIA-2

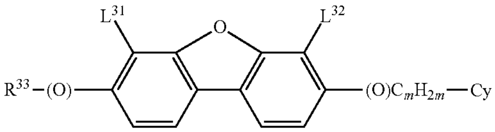

in which $L^{31}$ and $L^{32}$ have the same meanings as given under formula IIIA, (O) denotes O or a single bond, $R^{33}$ denotes alkyl or alkenyl having up to 7 C atoms or a group Cy-$C_nH_{2n+1}$—, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl, cyclopentyl or cyclopentenyl.

The compounds of formula IIIA-2 are contained in the LC medium either alternatively or additionally to the compounds of formula III, preferably additionally.

Very preferred compounds of the formula IIIA-2 are the following,

IIIA-2-1

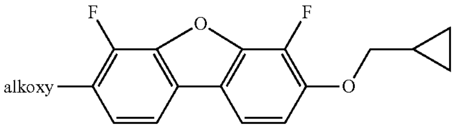

IIIA-2-2

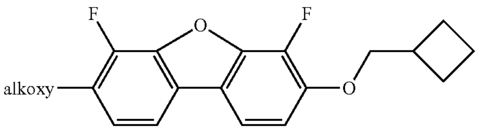

IIIA-2-3

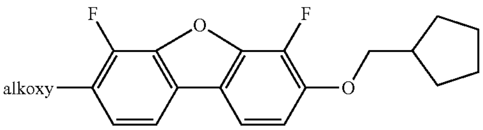

IIIA-2-4

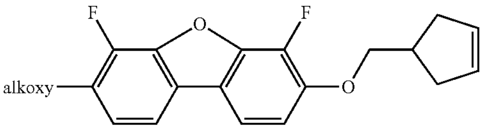

in which alkoxy denotes a straight-chain alkoxy radical having 1-6 C atoms.

In another preferred embodiment the LC medium comprises one or more compounds of the formula IIIA selected from the group of compounds of formulae IIIA-3 to IIIA-5,

IIIA-3

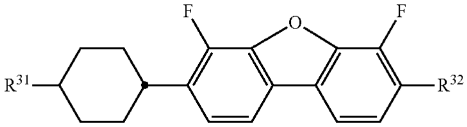

IIIA-4

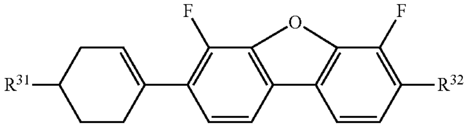

IIIA-5

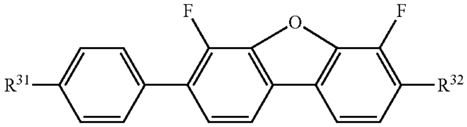

in which the occurring groups have the same meanings as given under formula III, and $R^{31}$ preferably denotes straight-chain alkyl or cyclic alkyl and $R^{32}$ preferably denotes alkoxy each having 1 to 7 C atoms.

In a preferred embodiment of the present invention the LC medium comprises one or more compounds of the formula IIIA-6:

IIIA-6

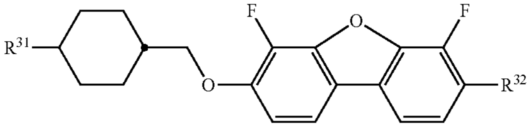

in which the occurring groups have the same meanings as given under formula III and preferably $R^{31}$ and $R^{32}$ each, independently of one another, an alkyl, alkenyl or alkoxy radical having up to 15 C atoms, preferably having 1 to 7 C atoms, more preferably one or both of them denote an alkoxy radical.

Very preferred compounds of formula IIIA-6 are selected from the group consisting of the following formulae,

IIIA-6-1

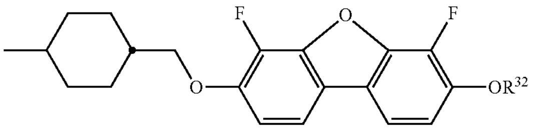

IIIA-6-2

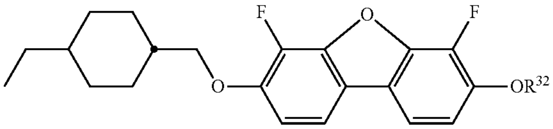

IIIA-6-3

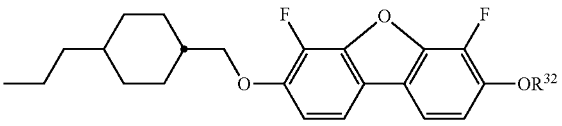

-continued

IIIA-6-4

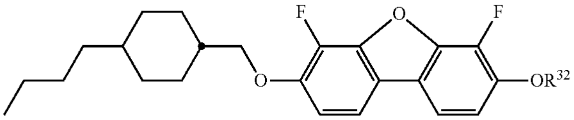

IIIA-6-5

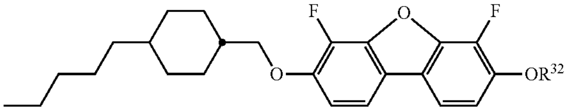

IIIA-6-6

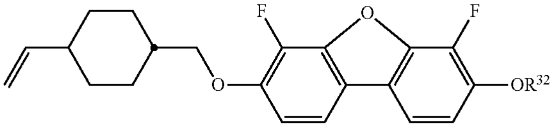

IIIA-6-7

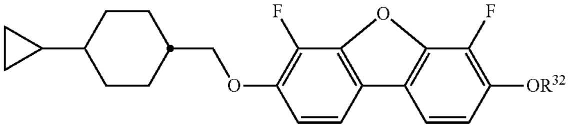

IIIA-6-8

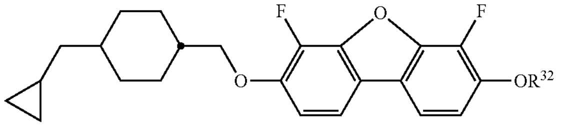

IIIA-6-9

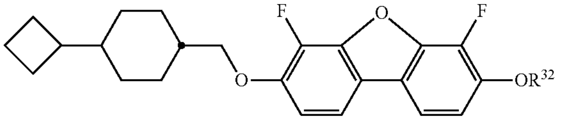

IIIA-6-10

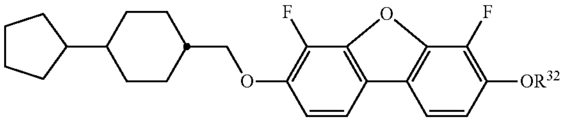

in which $R^{32}$ denotes alkyl having 1 to 7 C-atoms, preferably ethyl, n-propyl or n-butyl, or alternatively cyclopropylmethyl, cyclobutylmethyl or cyclopentylmethyl or alternatively $—(CH_2)_nF$ in which n is 2,3,4, or 5, preferably $C_2H_4F$.

In a preferred embodiment of the present invention, the LC medium comprises at least one compound of the formula I, at least one compound of the formula III and at least one compound of the formula IIIA.

The LC medium of the present invention comprises one or more compounds selected from the group of the difluorodibenzochroman compounds of the formula BC, chromans of the formula CR, and fluorinated phenanthrenes of the formulae PH-1 and PH-2,

BC

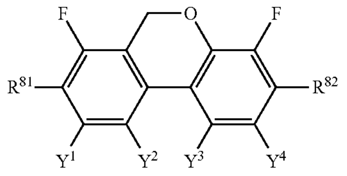

CR

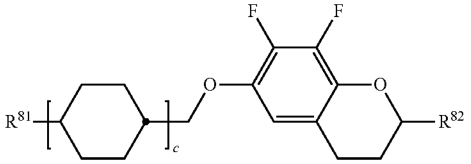

PH-1

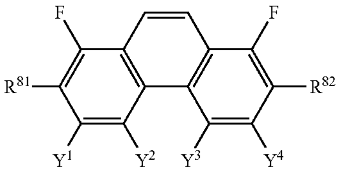

PH-2

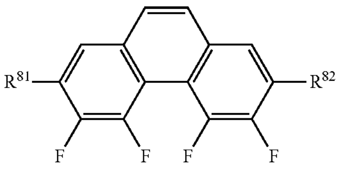

in which $R^{81}$ and $R^{82}$ each, independently of one another, denote H, an alkyl or alkoxy radical having 1 to 15 C atoms, preferably having 1 to 7 C atoms, where one or more $-CH_2-$ groups in these radicals may each be replaced, independently of one another, by

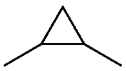, 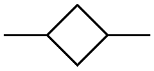, 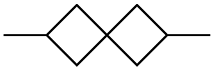, 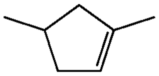, 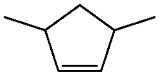, 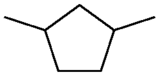, $-C \equiv C-$, $-CF_2O-$, $-OCF_2-$, $-CH=CH-$, by $-O-$, $-CO-O-$ or $-O-CO-$ in such a way that O atoms are not linked directly to one another, and in which one or more H atoms may be replaced by halogen, $R^{81}$ and $R^{82}$ preferably, independently of one another, denote alkyl or alkoxy having 1 to 6 C atoms, or cyclic alkyl having 3 to 6 C atoms, c is 0, 1 or 2, and $Y^1$, $Y^2$, $Y^3$, $Y^4$, each, independently of one another, denote H, F, Cl, $CF_3$, $CHF_2$, $CH_3$ or $OCH_3$.

The LC medium according to the invention preferably comprises the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

BC-1

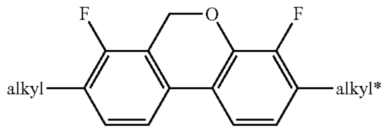

BC-2

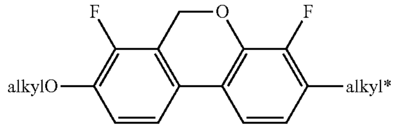

BC-3

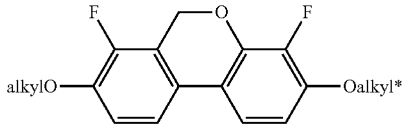

BC-4

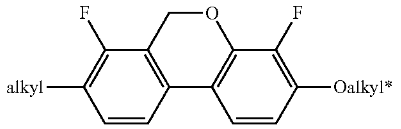

BC-5

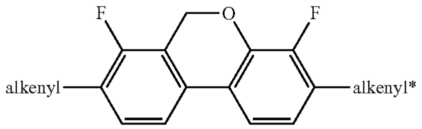

BC-6

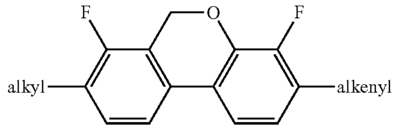

BC-7

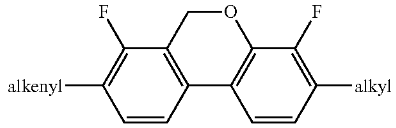

CR-1

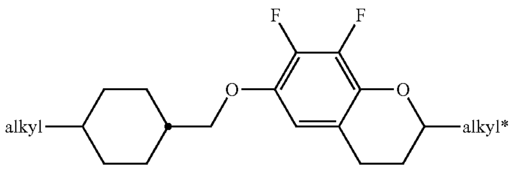

CR-2

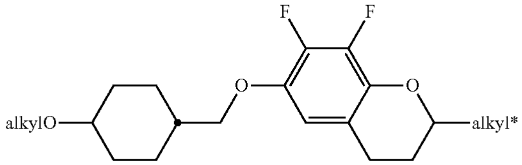

CR-3

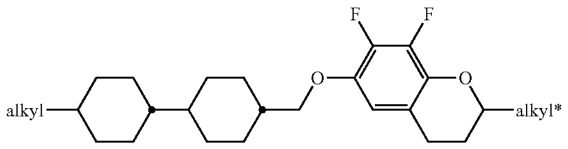

-continued

CR-4

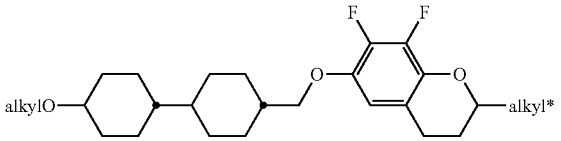

CR-5

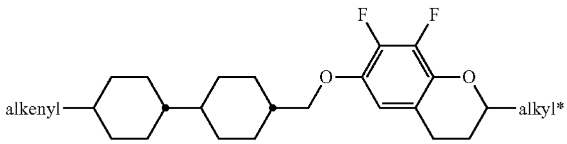

in which alkyl and alkyl* each, independently of one another, denote a straight-chain alkyl radical having 1 to 6 C atoms, or cyclic alkyl having 3 to 6 C atoms, and alkenyl and alkenyl* each, independently of one another, denote a straight-chain alkenyl radical having 2 to 6 C atoms.

Particularly preferred compounds of the formula BC the compounds B(A)-2O-O2,

B(A)-2O-O2

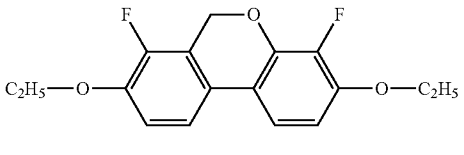

Particularly preferred compounds of the formula PH-1 the compounds B(P)-2O-O3 and B(P)-2O-O4,

B(P)-2O-O3

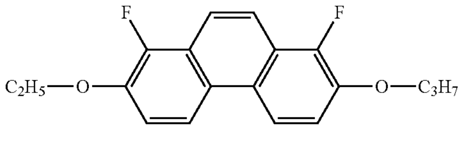

B(P)-2O-O4

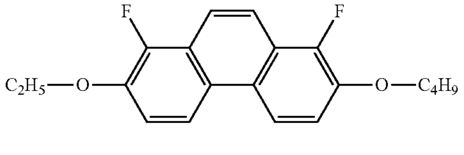

Further preferred embodiments of the LC medium according to the present invention are listed below, including any combination thereof:

Preferably the LC medium further comprises one or more compounds of formula II,

II

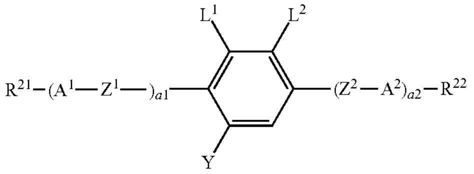

wherein the individual radicals, independently of each other and on each occurrence identically or differently, have the following meanings $R^{21}$ and $R^{22}$ straight chain, branched or cyclic alkyl or alkoxy having 1 to 20 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

, 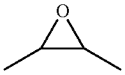, 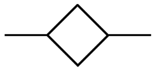, 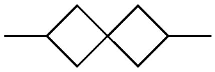, 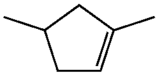, 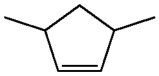, or 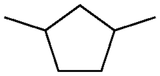, in such a manner that O- and/or S-atoms are not directly connected with each other, and wherein one or more H atoms are each optionally replaced by F, Cl, CN or $CF_3$, preferably alkyl or alkoxy having 1 to 6 C atoms, $R^0$, $R^{00}$ H or alkyl having 1 to 12 C atoms, $A^1$ and $A^2$ a group selected from the following formulae

A1

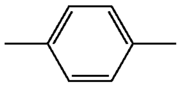

A2

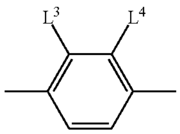

A3

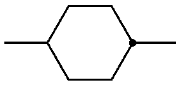

A4

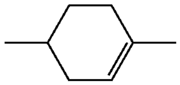

A5

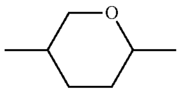

A6

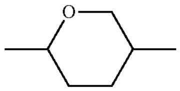

-continued

A7

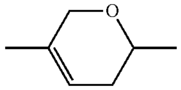

A8

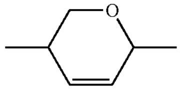

A9

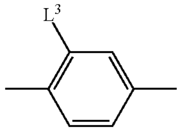

A10

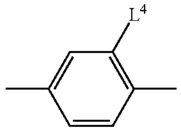

A11

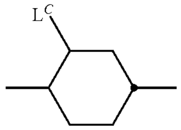

A12

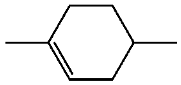

A13

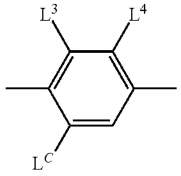

A14

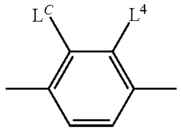

A15

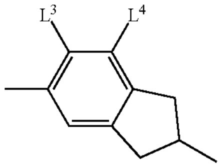

A16

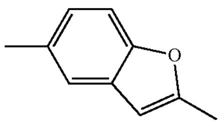

preferably from formulae A1, A2, A3, A4, A5, A6, A9 and A10, very preferably from formulae A1, A2, A3, A4, A5, A9 and A10, $Z^1$ and $Z^2$ $-CH_2CH_2-$, $-CH{=}CH-$, $-CF_2O-$, $-OCF_2-$, $-CH_2O-$, $-OCH_2-$, $-CO-O-$, $-O-CO-$, $-C_2F_4-$, $-CF{=}CF-$, $-CH{=}CH-CH_2O-$ or a single bond, preferably a single bond, $L^1$, $L^2$, $L^3$ and $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 0, 1 or 2, a2 0 or 1.

Preferably the LC medium comprises one or more compounds of formula II selected from the group consisting of compounds of the formulae IIA, IIB, IIC, IID, IIE, and IIF,

IIA

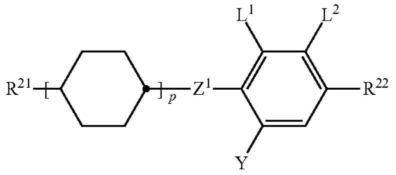

IIB

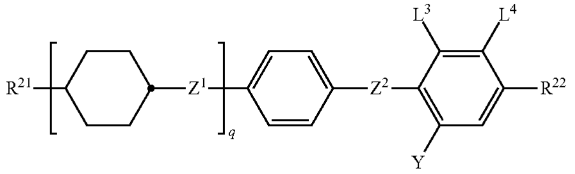

IIC

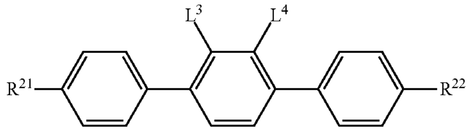

IID

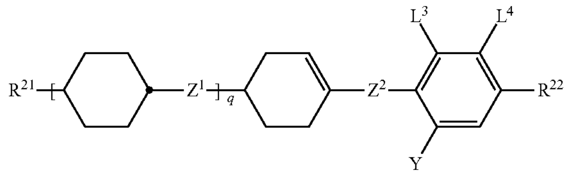

IIE

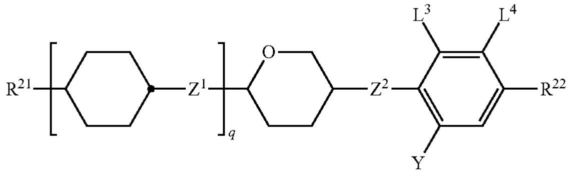

IIF

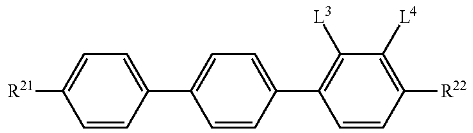

in which the individual radicals, on each occurrence identically or differently, and each, independently of one another, have the following meaning:

$R^{21}$, $R^{22}$ H, an alkyl, alkoxy or alkenyl radical having up to 15 C atoms which is unsubstituted or monosubstituted by F, Cl, CN or $CF_3$ and where, in addition, one or more $CH_2$ groups in these radicals may be replaced by $-O-$, $-S-$, $-C{\equiv}C-$, $-CF_2O-$, $-OCF_2-$, $-OC-O-$

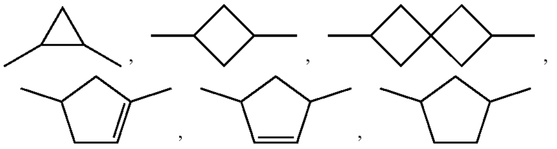

in such a way that O- and/or S-atoms are not linked directly to one another, $L^1$ to $L^4$ F, C, $CF_3$ or $CHF_2$, Y H, F, C, $CF_3$, $CHF_2$ or $CH_3$, preferably H or $CH_3$, particularly preferably H, $Z^1$, $Z^2$ a single bond, $-CH_2CH_2-$, $-CH{=}CH-$, $-CF_2O-$, $-OCF_2-$, $-CH_2O-$, $-OCH_2-$, $-COO-$, $-OCO-$, $-C_2F_4-$, $-CF{=}CF-$, $-CH{=}CHCH_2O$, p 0, 1 or 2, and q 0 or 1.

Preferred compounds of the formulae IIA, IIB, IIC; IID and IIE are those wherein $R^{22}$ denotes an alkyl or alkoxy radical having up to 15 C atoms, and very preferably denotes $(O)C_vH_{2v+1}$ wherein (0) is an oxygen atom or a single bond and v is 1, 2, 3, 4, 5 or 6.

Further preferred compounds of the formulae IIA, IIB, IIC; IID and IIE are those wherein $R^{21}$ or $R^{22}$ denotes or contains cycloalkyl or cycloalkoxy radical, preferably selected from the group consisting of

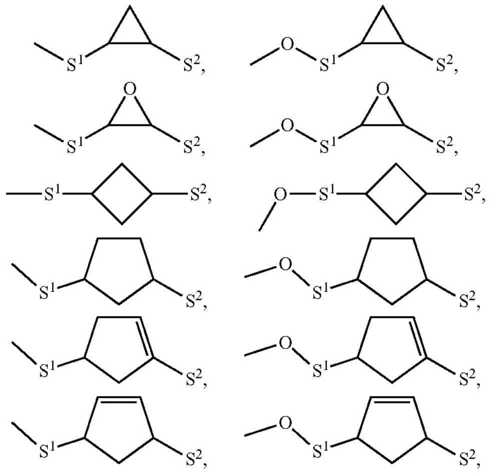

wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

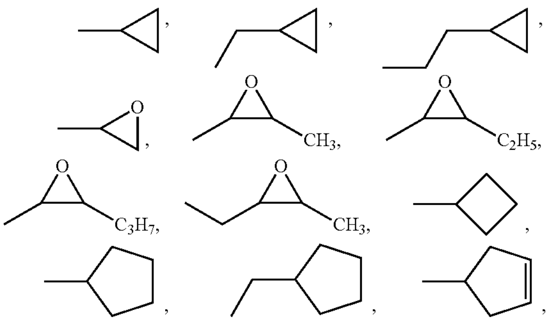

-continued

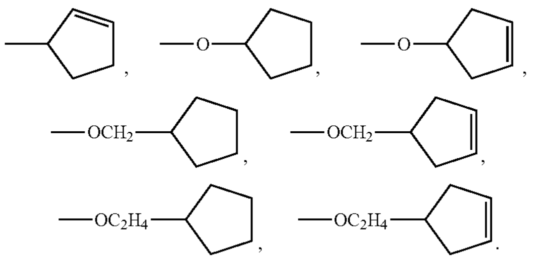

Further preferred compounds of the formulae IIA, IIB, IIC, IID and IIE are indicated below.

In a preferred embodiment the LC medium comprises one or more compounds of the formula IIA selected from the group consisting of the following formulae:

IIA-1

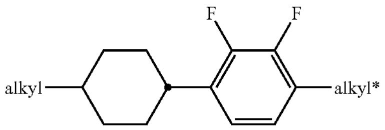

IIA-2

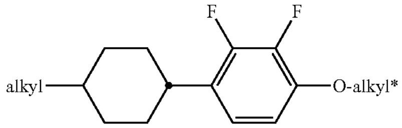

IIA-3

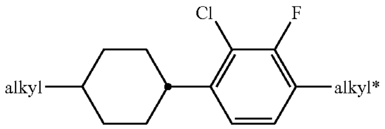

IIA-4

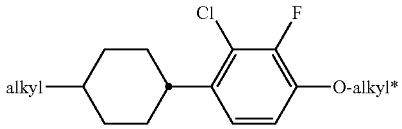

IIA-5

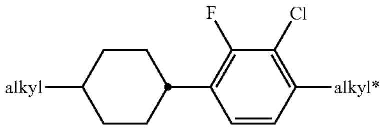

IIA-6

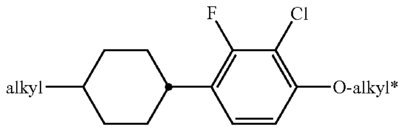

IIA-7

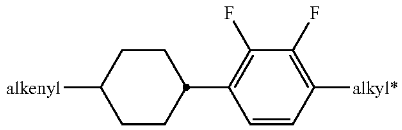

IIA-8

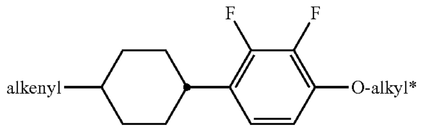

-continued
IIA-9
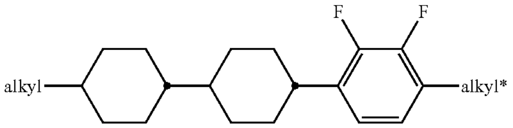
IIA-10
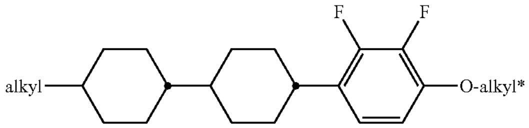
IIA-11
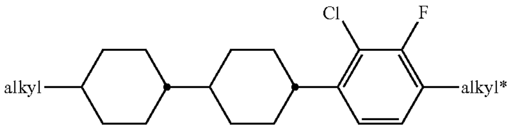
IIA-12
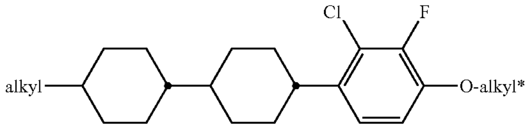
IIA-13
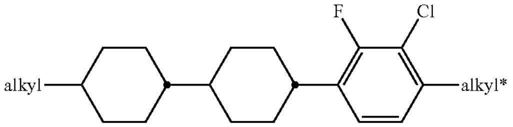
IIA-14
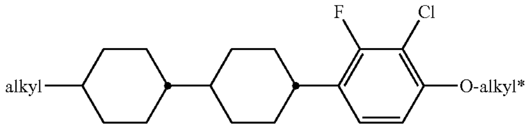
IIA-15
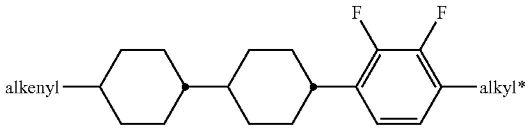
IIA-16
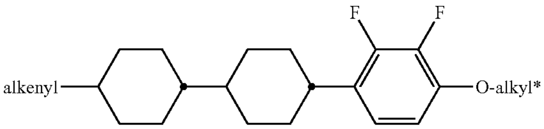
IIA-17
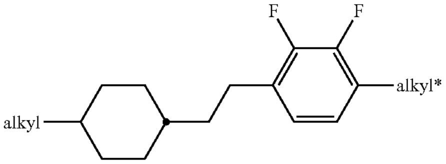
IIA-18
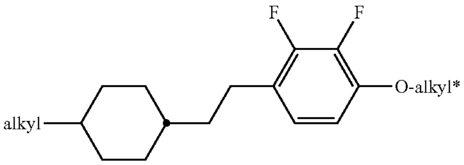
-continued
IIA-19
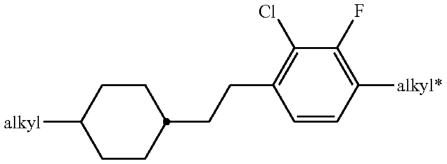
IIA-20
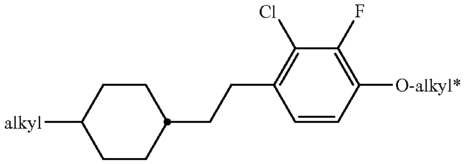
IIA-21
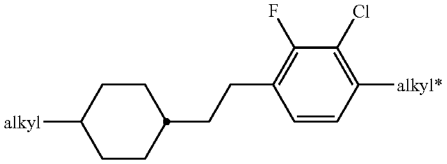
IIA-22
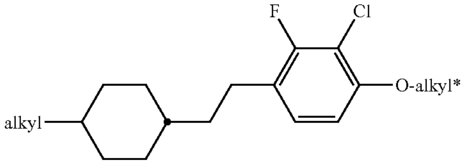
IIA-23
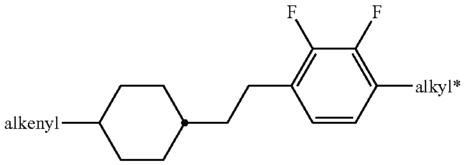
IIA-24
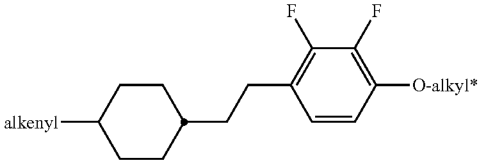
IIA-25
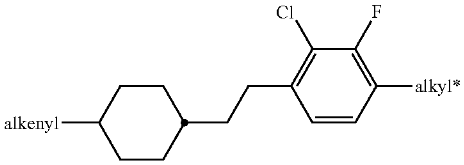
IIA-26
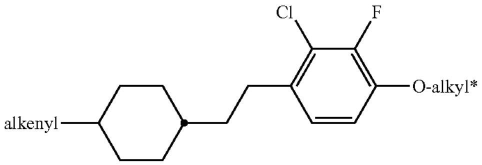
IIA-27
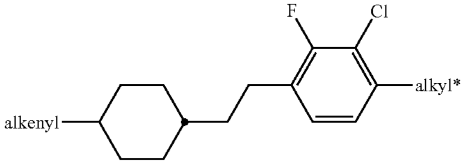

-continued
IIA-28
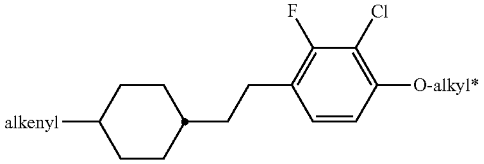
IIA-29
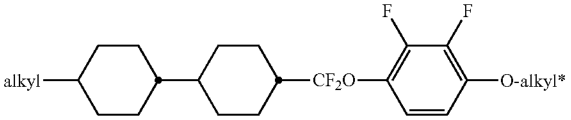
IIA-30
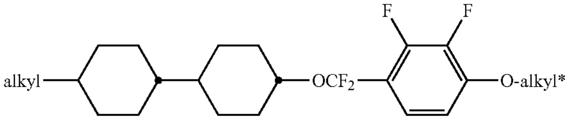
IIA-31
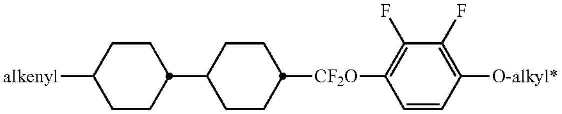
IIA-32
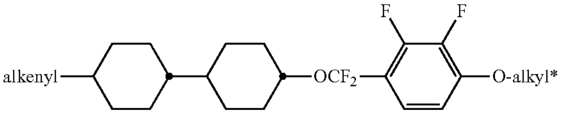
IIA-33
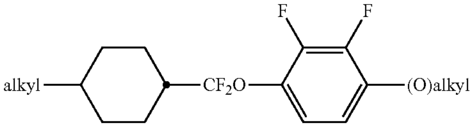
IIA-34
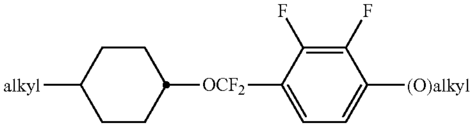
IIA-35
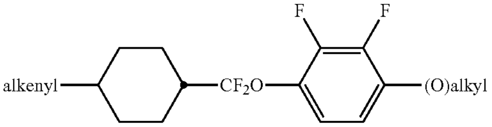
IIA-36
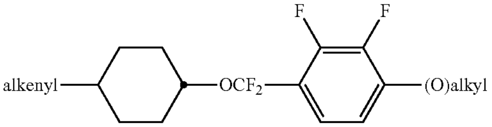
IIA-37
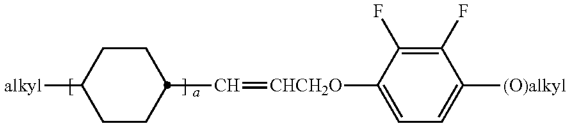
IIA-38
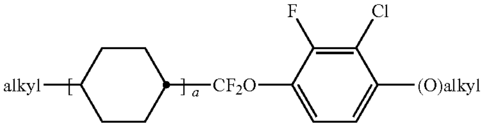
-continued
IIA-39
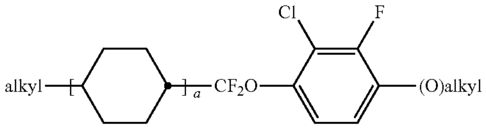
IIA-40
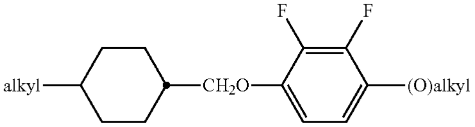
IIA-41
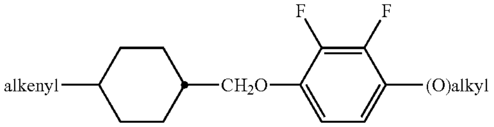
IIA-42
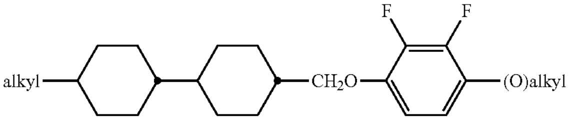
IIA-43
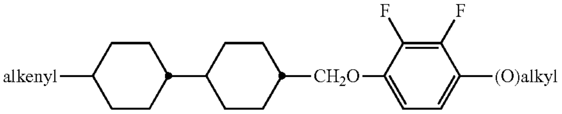
IIA-44
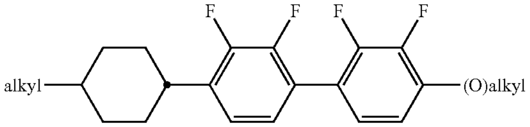
IIA-45
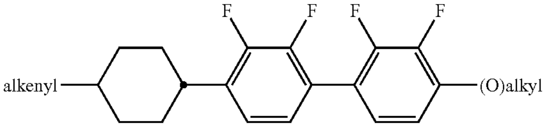
IIA-46
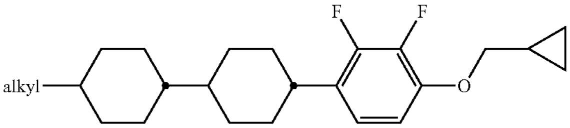
IIA-47
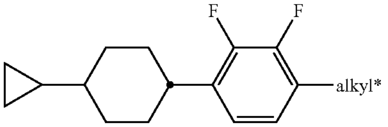
IIA-48
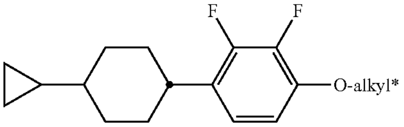

-continued
IIA-49
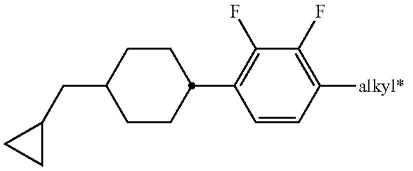
IIA-50
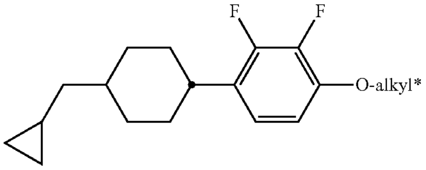
IIA-51
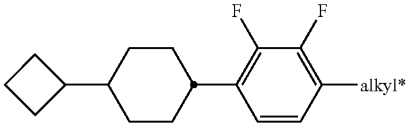
IIA-52
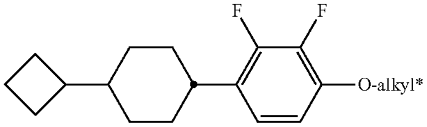
IIA-53
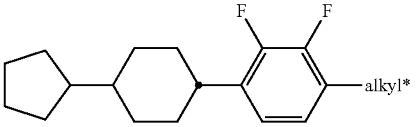
IIA-54
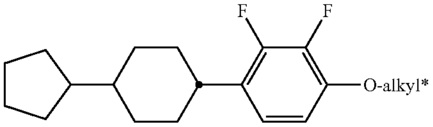
IIA-55
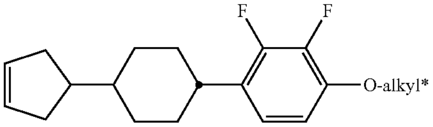
IIA-56
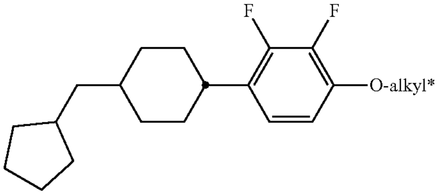
IIA-57
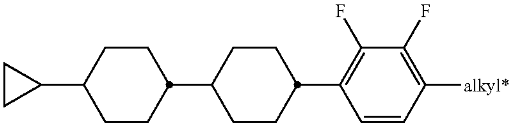
-continued
IIA-58
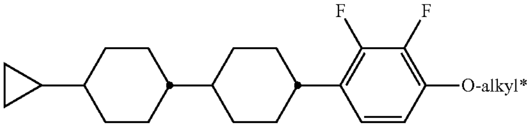
IIA-59
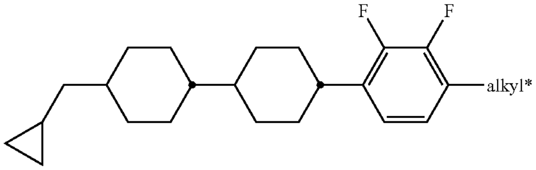
IIA-60
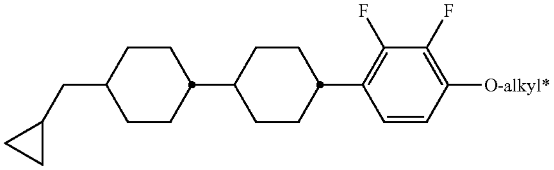
IIA--61
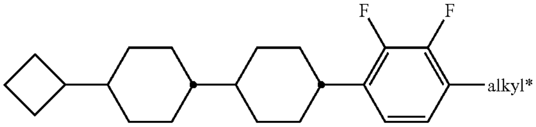
IIA-62
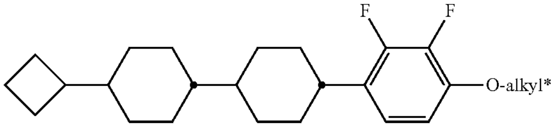
IIA-63
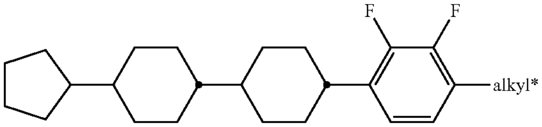
IIA-64
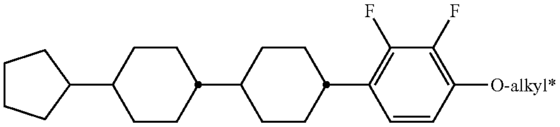
IIA-65
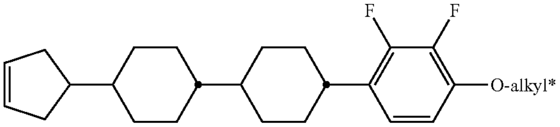
IIA-66
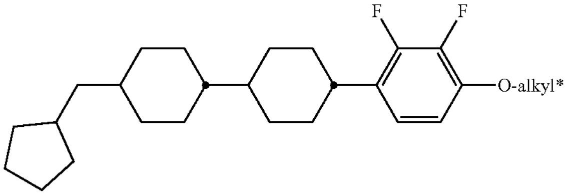

-continued

IIA-67

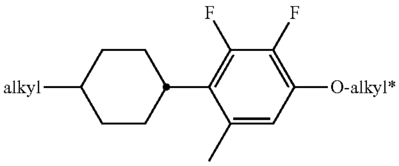

IIA-68

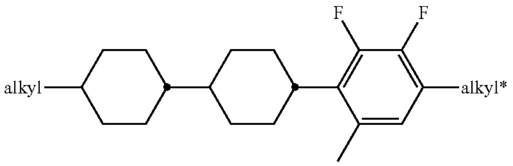

IIA-69

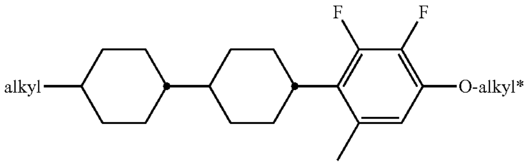

IIA-70

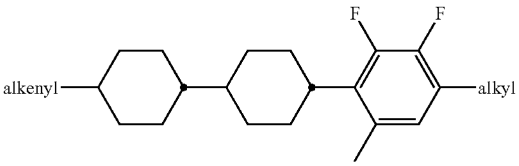

IIA-71

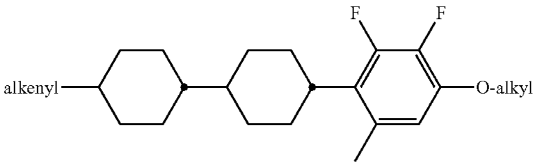

IIA-72

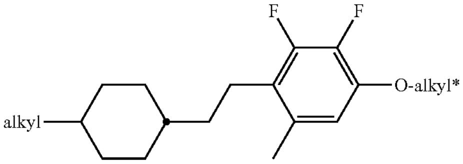

IIA-73

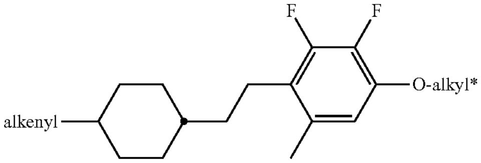

IIA-74

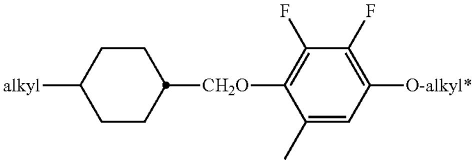

-continued

IIA75

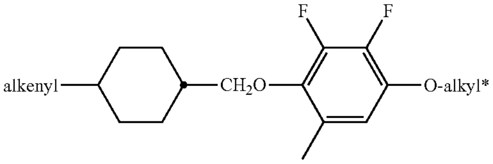

IIA-76

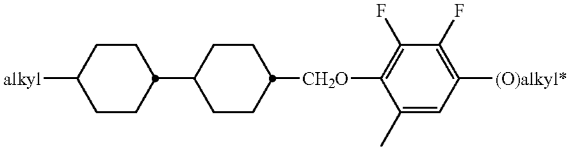

IIA-77

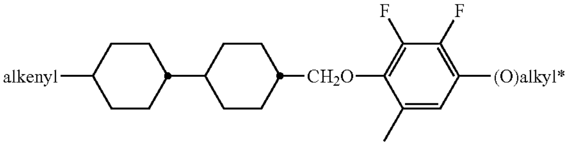

IIA78

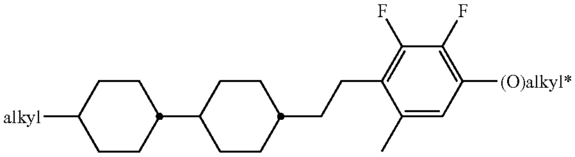

IIA-79

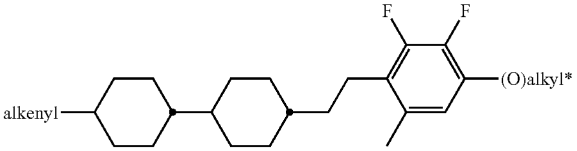

IIA-80

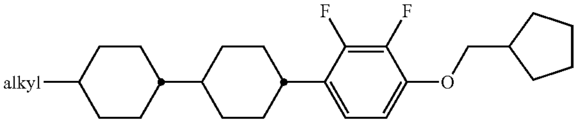

IIA-81

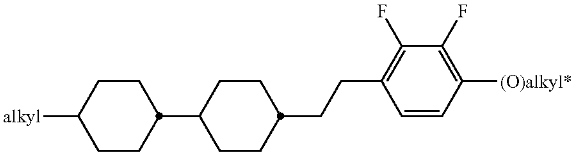

in which the index a denotes 1 or 2, alkyl and alkyl* each, independently of one another, denote a straight-chain or branched alkyl radical having 1-6 C atoms, alkenyl denotes a straight-chain or branched alkenyl radical having 2-6 C atoms, and (O) denotes an oxygen atom or a single bond, and alkenyl preferably denotes $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$, $CH_3-(CH_2)_3-CH{=}CH-$ or $CH_3-CH{=}CH-(CH_2)_2-$.

Particularly preferred LC media according to the invention comprise one or more compounds selected from the group consisting of formulae IIA-2, IIA-8, IIA-10, IIA-16, IIA-18, IIA-40, IIA-41, IIA-42, IIA-43, IIA-67, IIA-69, and IIA-81.

Preferably, the LC medium comprises one or more compounds of the formula IIA-2 selected from the following subformulae:

IIA-2-1

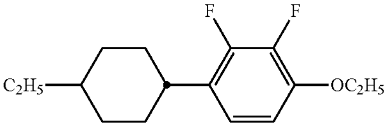

IIA-2-2

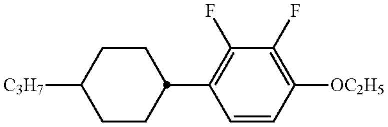

IIA-2-3

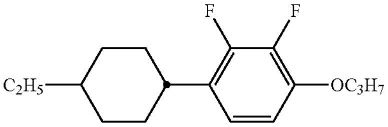

IIA-2-4

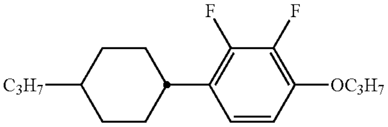

IIA-2-5

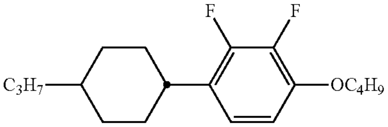

Alternatively, preferably in addition to the compounds of the formulae IIA-2-1 to IIA-2-5, the LC medium comprises one or more compounds of the following formulae:

IIA-2a-1

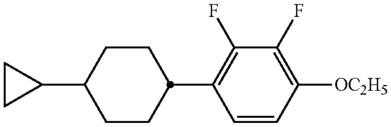

IIA-2a-2

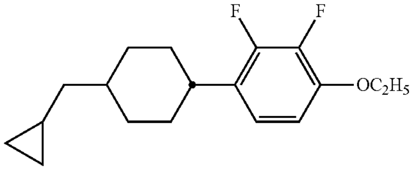

IIA-2a-3

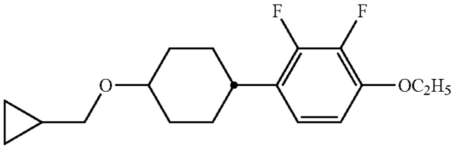

IIA-2a-4

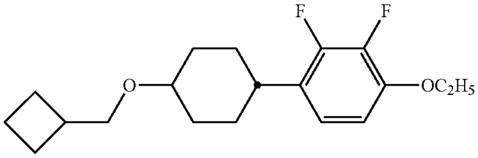

-continued

IIA-2a-5

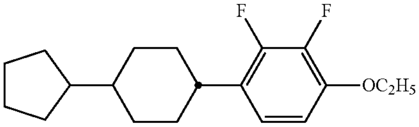

IIA-2a-6

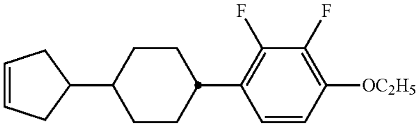

IIA-2a-7

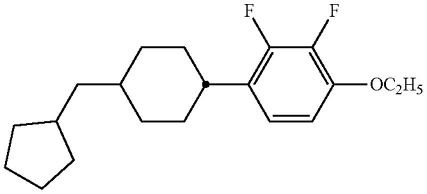

Further preferably, the LC medium comprises one or more compounds of the formula IIA-10 selected from the following sub-formulae:

IIA-10-1

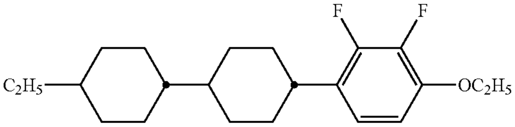

IIA-10-2

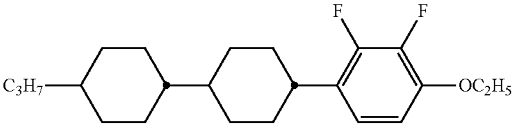

IIA-10-3

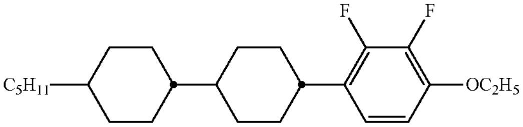

IIA-10-4

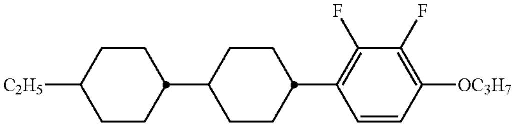

IIA-10-5

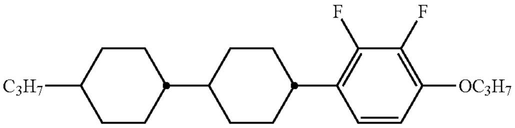

IIA-10-6

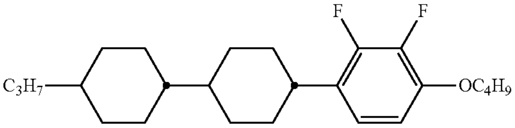

Alternatively, preferably in addition to the compounds of the formulae IIA-10-1 to IIA-10-6, the LC medium comprises one or more compounds of the following formulae:

IIA-10a-1

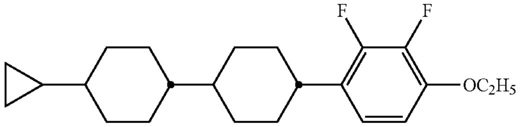

IIA-10a-2

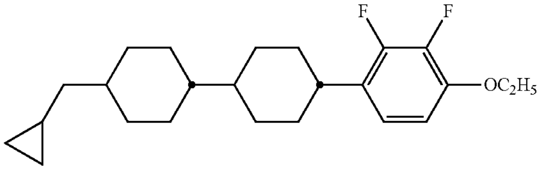

IIA-10a-3

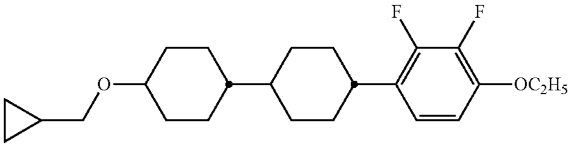

IIA-10a-4

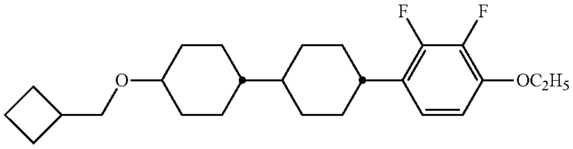

IIA-10a-5

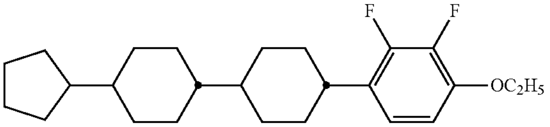

IIA-10a-6

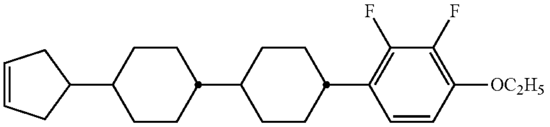

IIA-10a-7

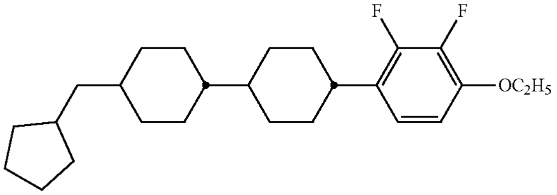

Further preferably, the LC medium comprises one or more compounds of the formula IIA-16 selected from the following sub-formulae:

IIA-16-1

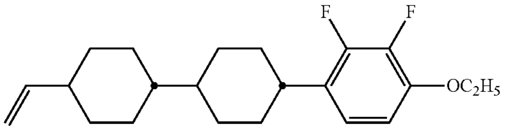

IIA-16-2

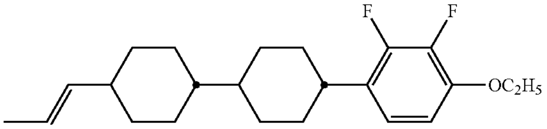

Further preferably, the LC medium comprises one or more compounds of the formula IIA-40 selected from the following sub-formulae:

IIA-40-1

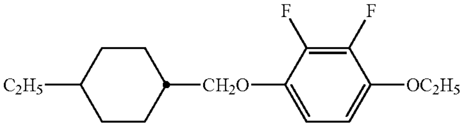

IIA-40-2

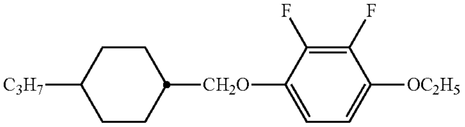

IIA-40-3

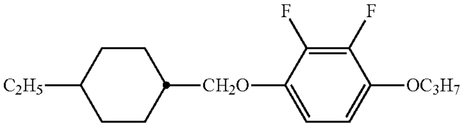

IIA-40-4

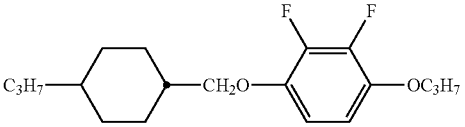

IIA-40-5

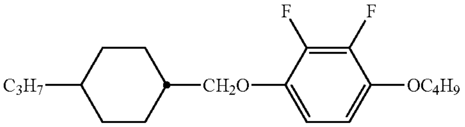

Alternatively, preferably in addition to the compounds of the formulae IIA-40-1 to IIA-40-5, the LC medium comprises one or more compounds of the following formulae:

IIA-40a-1

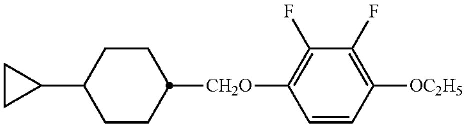

-continued

IIA-40a-2

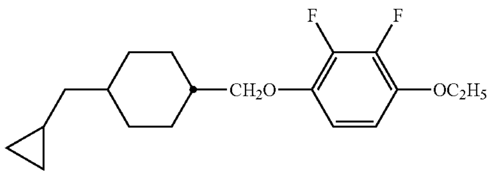

IIA-40a-3

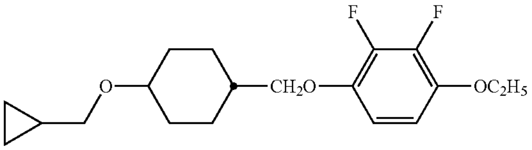

IIA-40a-4

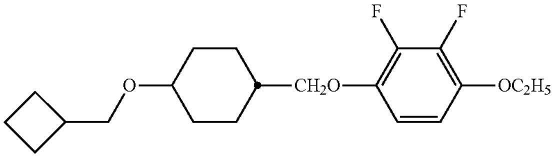

IIA-40a-5

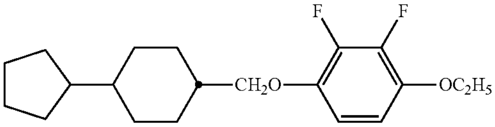

IIA-40a-6

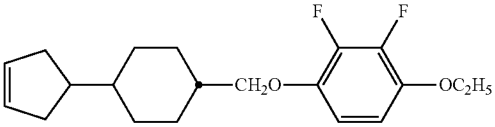

IIA-40a-7

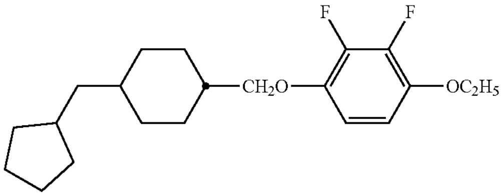

Further preferably, the LC medium comprises one or more compounds of the formula IIA-42 selected from the following sub-formulae:

IIA-42-1

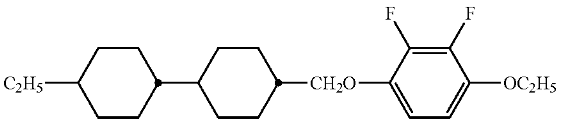

IIA-42-2

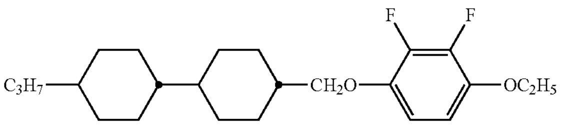

-continued

IIA-42-3

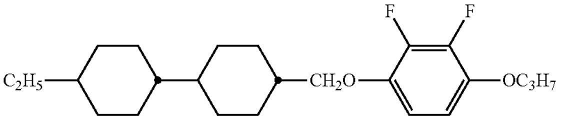

IIA-42-4

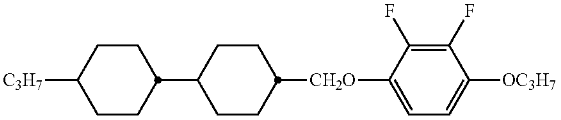

IIA-42-5

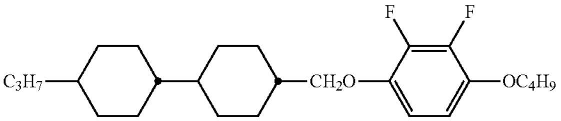

Further preferably, the LC medium comprises one or more compounds of the formula IIA-67 selected from the following subformulae:

IIA-67-1

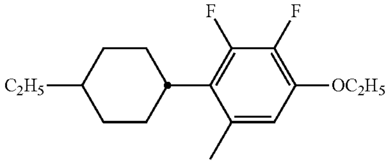

IIA-67-2

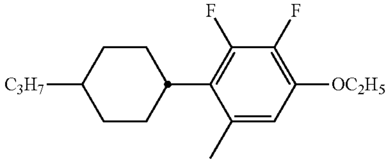

IIA-67-3

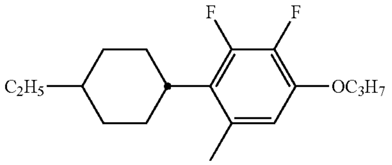

IIA-67-4

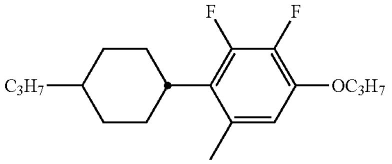

IIA-67-5

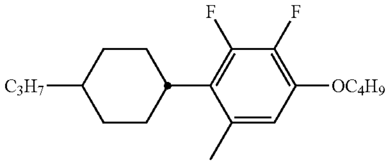

Further preferably, the LC medium comprises one or more compounds of the formula IIA-69 selected from the following sub-formulae:

IIA-69-1

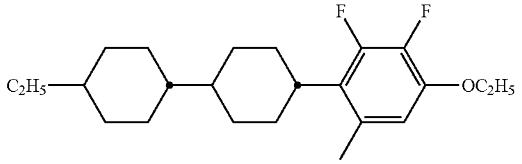

IIA-69-2

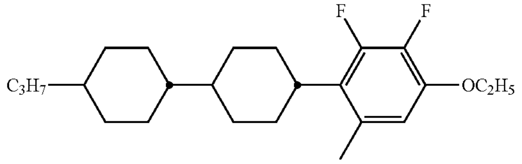

IIA-69-3

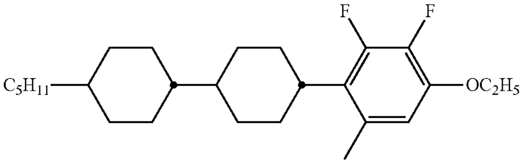

IIA-69-4

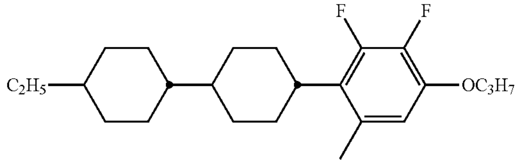

IIA-69-5

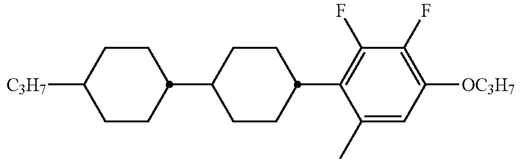

IIA-69-6

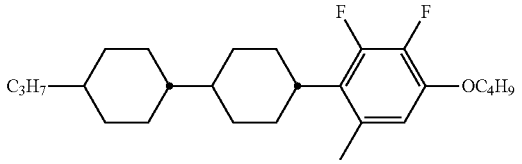

Further preferably, the LC medium comprises one or more compounds of the formula IIA-81 selected from the following sub-formulae:

IIA-81-1

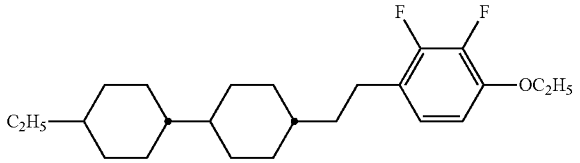

-continued

IIA-81-2

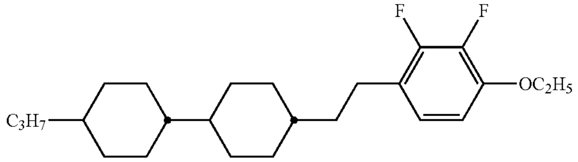

IIA-81-3

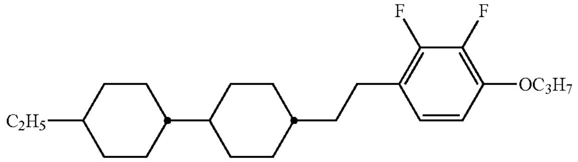

IIA-81-4

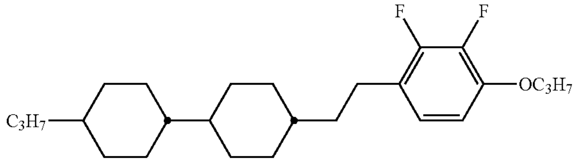

IIA-81-5

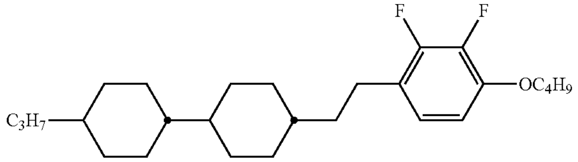

Preferred LC media additionally comprise one or more compounds of formula IIA-Y

IIA-Y

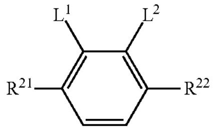

in which $R^{21}$ and $R^{22}$ have one of the meanings given in formula IIA above, and $L^1$ and $L^2$, identically or differently, denote F or Cl.

Preferred compounds of the formula IIA-Y are selected from the group consisting of the following subformulae

IIA-Y1

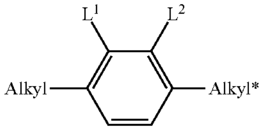

IIA-Y2

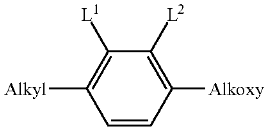

-continued

IIA-Y3

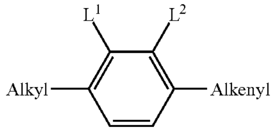

IIA-Y4

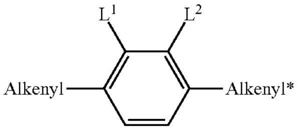

IIA-Y5

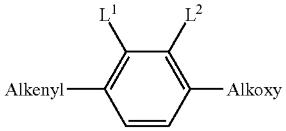

IIA-Y6

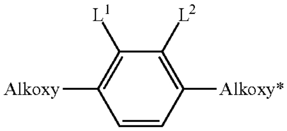

IIA-Y7

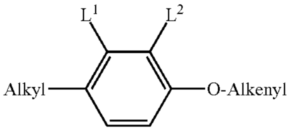

IIA-Y8

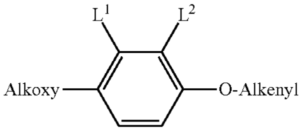

IIA-Y9

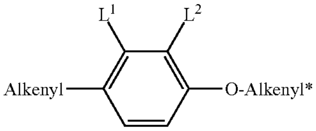

IIA-Y10

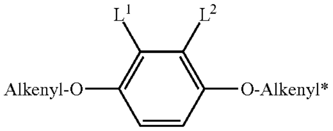

IIA-Y11

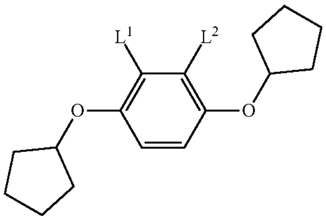

in which, Alkyl and Alkyl* each, independently of one another, denote a straight-chain or branched alkyl radical having 1-6 C atoms, Alkoxy denotes a straight-chain or branched alkoxy radical having 1-6 C atoms, Alkenyl and Alkenyl* each, independently of one another, denote a straight-chain or branched alkenyl radical having 2-6 C atoms, and O denotes an oxygen atom or a single bond. Alkenyl and Alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred compounds of the formula IIA-Y are selected from the group consisting of following subformulae:

IIA-Y6a

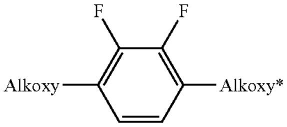

IIA-Y6b

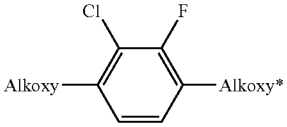

in which Alkoxy and Alkoxy* have the meanings defined above and preferably denote methoxy, ethoxy, n-propyloxy, n-butyloxy or n-pentyloxy.

In another preferred embodiment the LC medium comprises one or more compounds of the formula IIB selected from the group consisting of formulae IIB-1 to IIB-26,

IIB-1

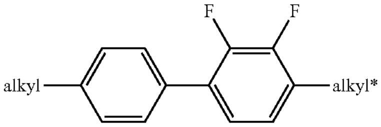

IIB-2

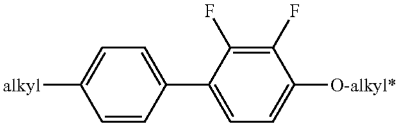

IIB-3

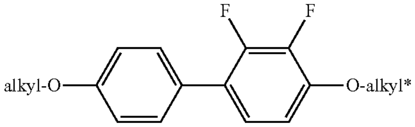

IIB-4

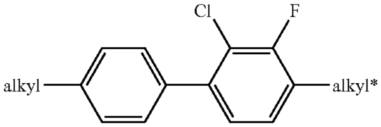

IIB-5

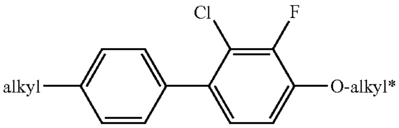

IIB-6

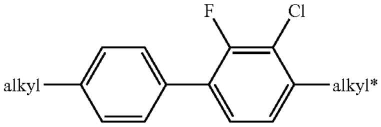

IIB-7

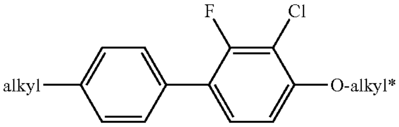

-continued
IIB-8
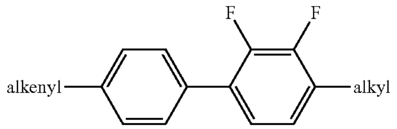
IIB-9
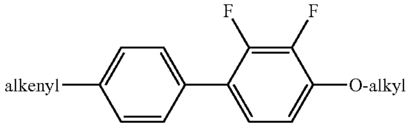
IIB-10
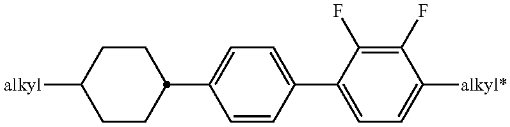
IIB-11
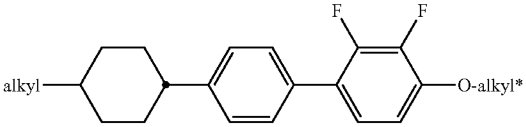
IIB-12
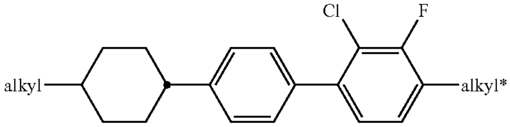
IIB-13
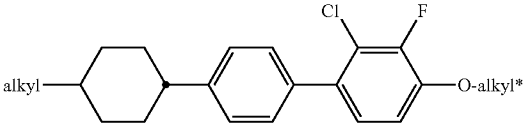
IIB-14
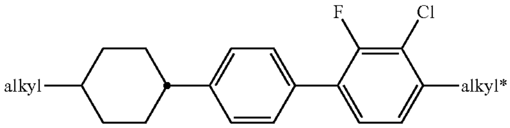
IIB-15
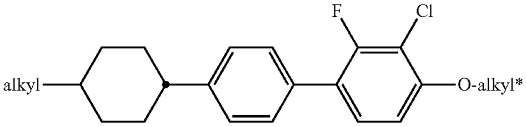
IIB-16
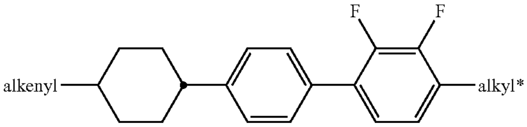
IIB-17
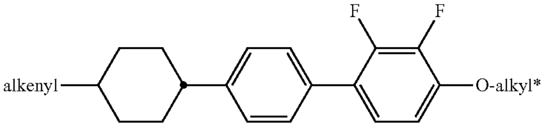
-continued
IIB-18
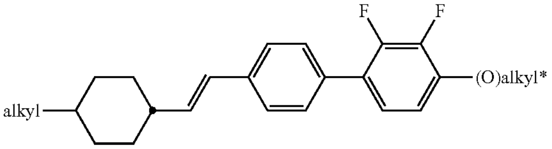
IIB-19
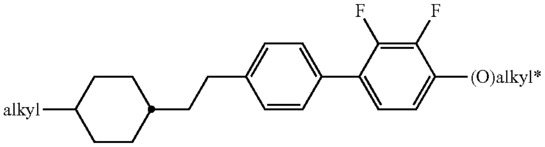
IIB-20
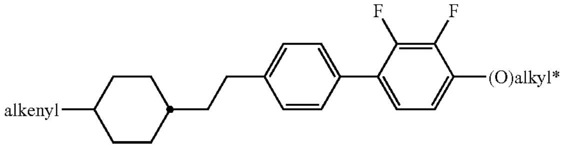
IIB-21
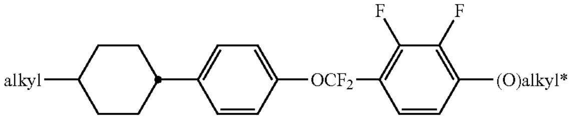
IIB-22
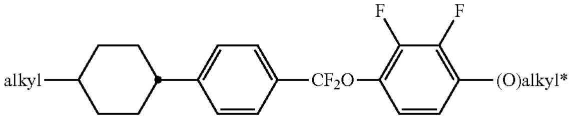
IIB-23
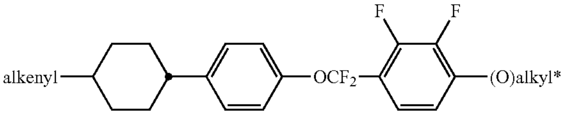
IIB-24
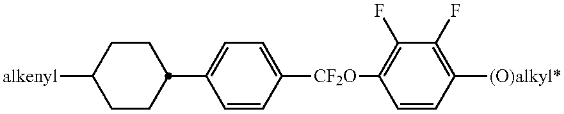
IIB-25
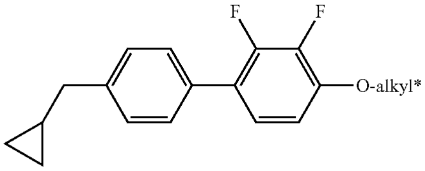
IIB-26
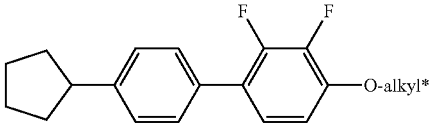
IIB-27
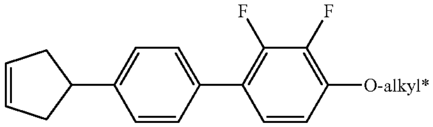

-continued

IIB-28

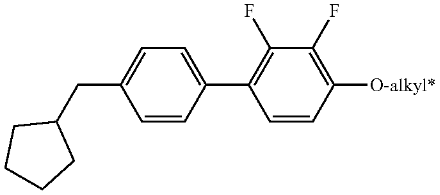

IIB-29

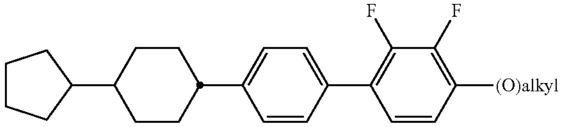

IIB-30

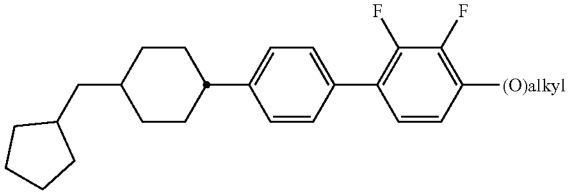

IIB-31

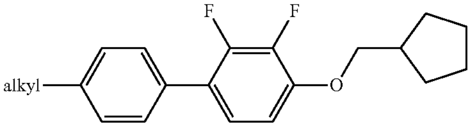

IIB-32

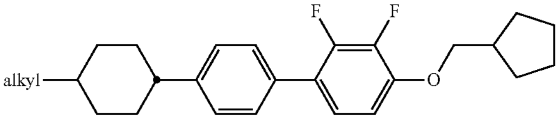

in which alkyl and alkyl* each, independently of one another, denote a straight-chain or branched alkyl radical having 1-6 C atoms, alkenyl denotes a straight-chain or branched alkenyl radical having 2-6 C atoms, and (O) denotes an oxygen atom or a single bond, and alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred LC media according to the invention comprise one or more compounds selected from the group consisting of formulae IIB-2, IIB-11 and IIB-17.

Preferably, the LC medium comprises one or more compounds of the formula IIB-11 selected from the following sub-formulae:

IIB-11-1

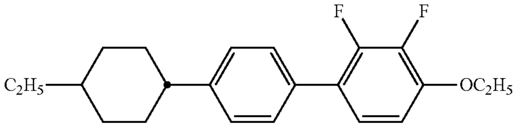

-continued

IIB-11-2

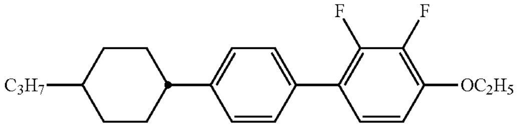

IIB-11-3

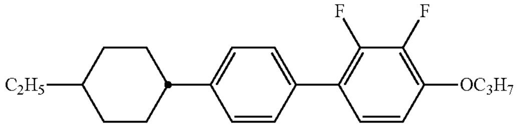

IIB-11-4

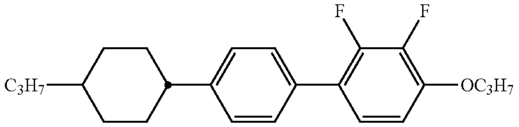

IIB-11-5

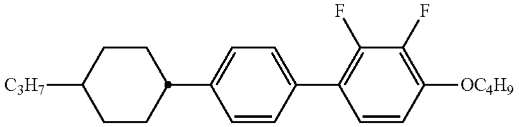

Alternatively, preferably in addition to the compounds of the formulae IIB-11-1 to IIB-11-5, the LC medium comprises one or more compounds of the formulae B-11a-1 to IIB-11a-5:

IIB-11a-1

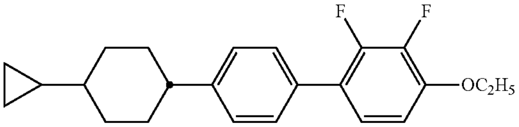

IIB-11a-2

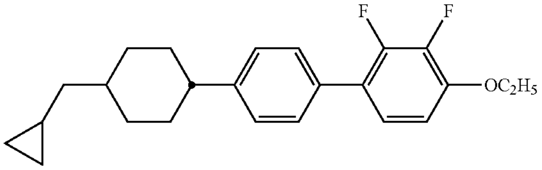

IIB-11a-3

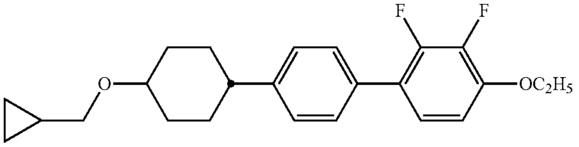

IIB-11a-4

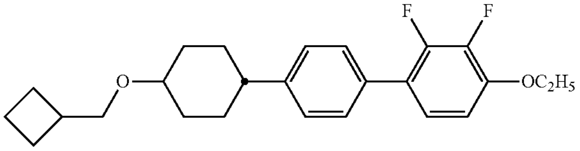

-continued

IIB-11a-5

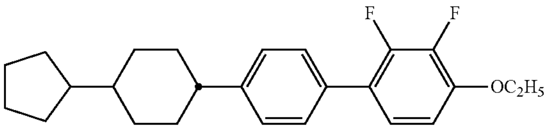

IIB-11a-6

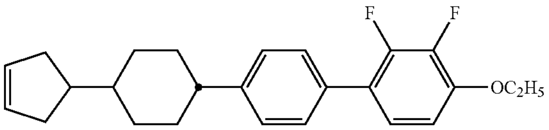

Preferably, the LC medium comprises one or more compounds of the formula IIB-17 selected from the following sub-formulae:

IIB-17-1

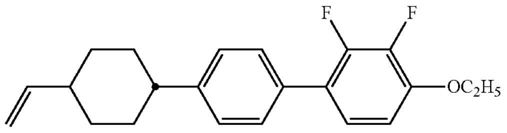

IIB-17-2

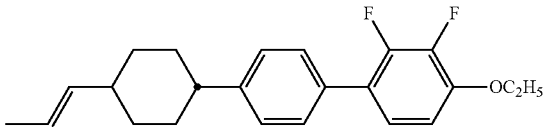

IIB-17-3

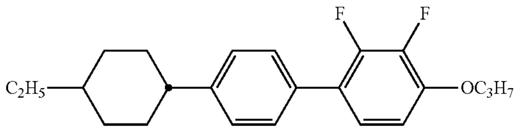

IIB-17-4

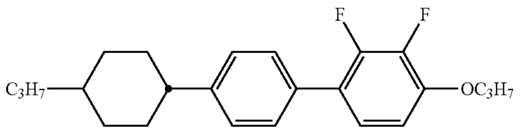

IIB-17-5

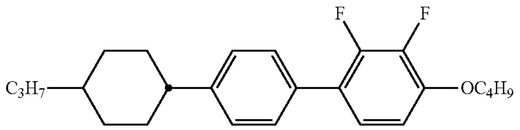

In another preferred embodiment the LC medium comprises one or more compounds of the formula IIC selected from the formula IIC-1,

IIC-1

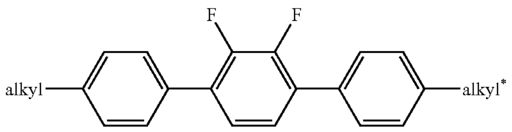

in which alkyl and alkyl* each, independently of one another, denote a straight-chain alkyl radical having 1-6 C atoms, preferably in amounts of 0.5% to 5% by weight, in particular 1% to 3% by weight.

In another preferred embodiment the LC medium comprises one or more compounds of the formula IID selected from the group consisting of the following formulae,

IID-1

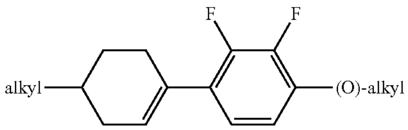

IID-2

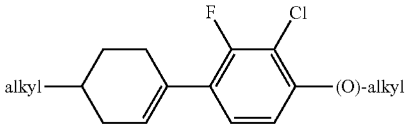

IID-3

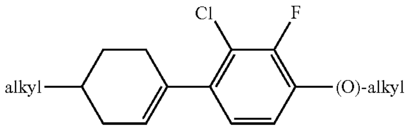

IID-4

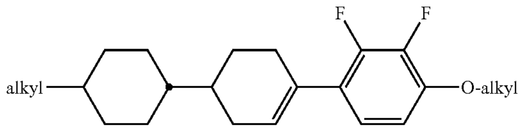

IID-5

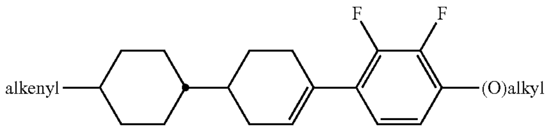

IID-6

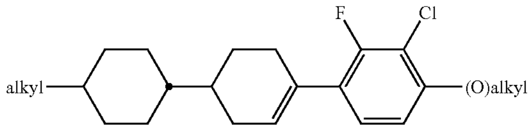

IID-7

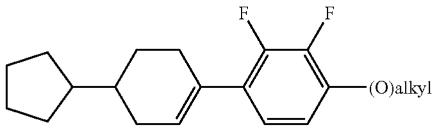

IID-8

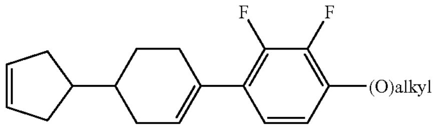

IID-9

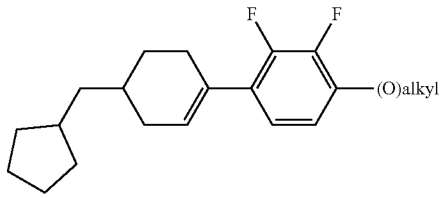

-continued

IID-10

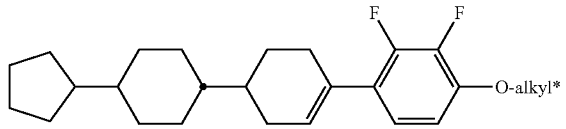

IID-11

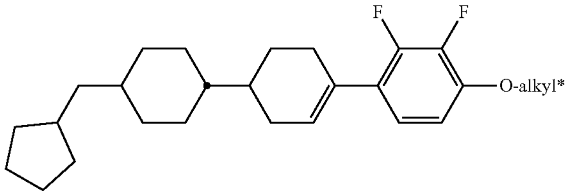

IID-12

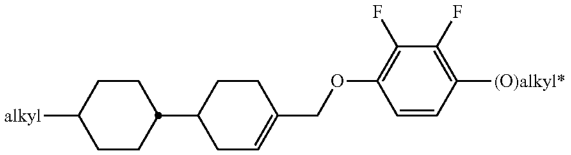

IID-13

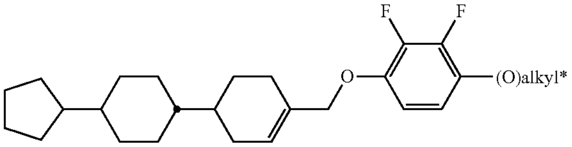

IID-14

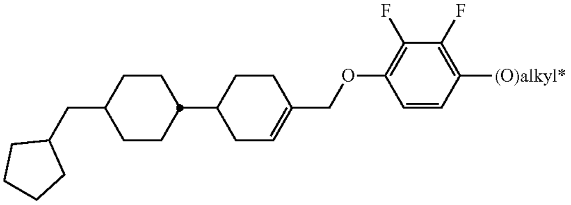

IID-15

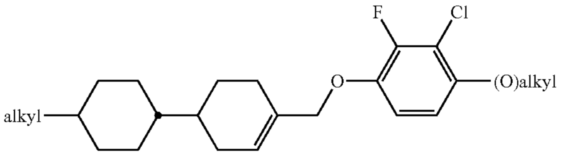

IID-16

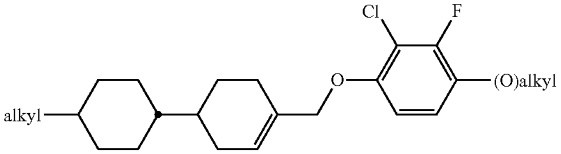

IID-17

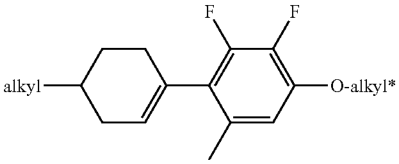

-continued

IID-18

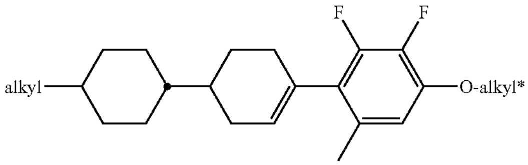

IID-19

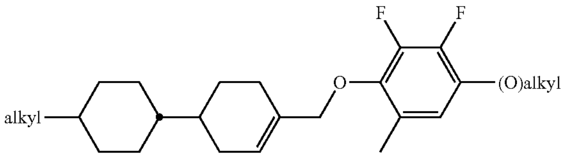

in which alkyl and alkyl* each, independently of one another, denote a straight-chain or branched alkyl radical having 1-6 C atoms, alkenyl denotes a straight-chain or branched alkenyl radical having 2-6 C atoms, and (O) denotes an oxygen atom or a single bond, and alkenyl preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Particularly preferred LC media according to the invention comprise one or more compounds of the formula IID-1, IID-4, IID-12, and/or IID-19.

Very preferred compounds of the formula IID are selected from the following subformulae of IID-1,

IID-1-1

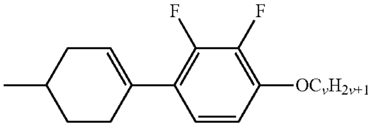

IID-1-2

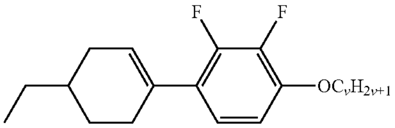

IID-1-3

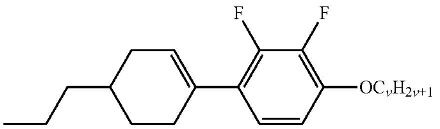

IID-1-4

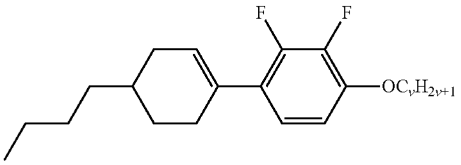

IID-1-5

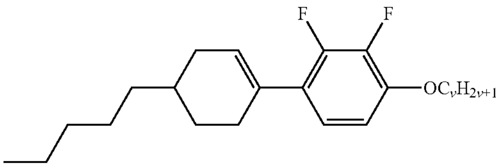

-continued
IID-1-6
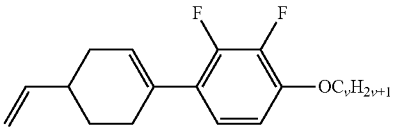
IID-1-7
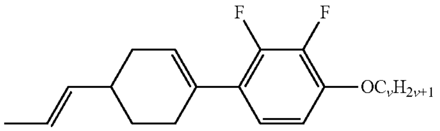
IID-1-8
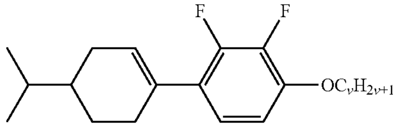
IID-1-9
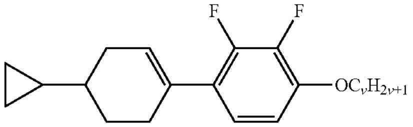
IID-1-10
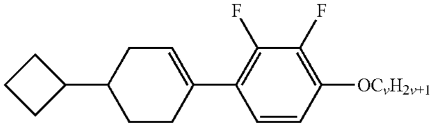
IID-1-11
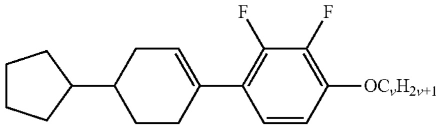
IID-1-12
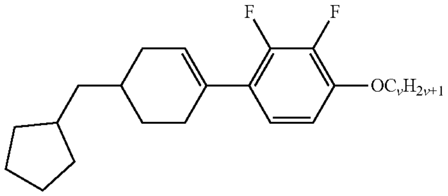
IID-1-13
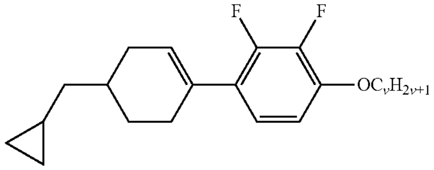
IID-1-14
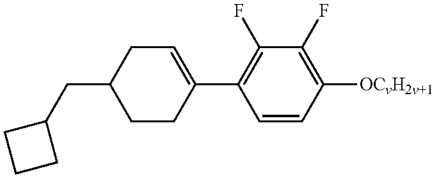
-continued
IID-1-15
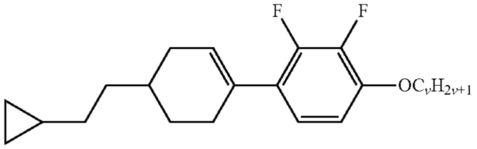
IID-1-16
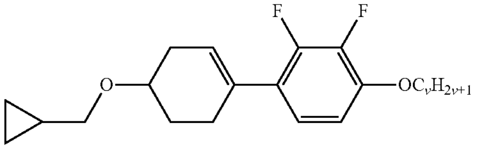
IID-1-17
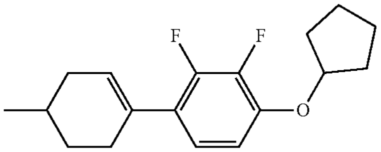
IID-1-18
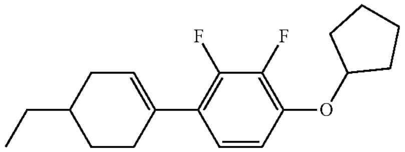
IID-1-19
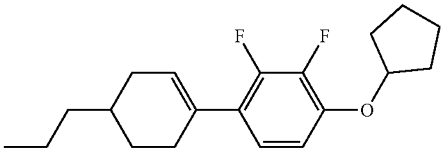
IID-1-20
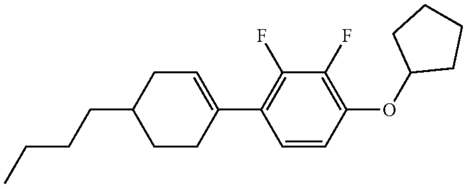
IID-1-21
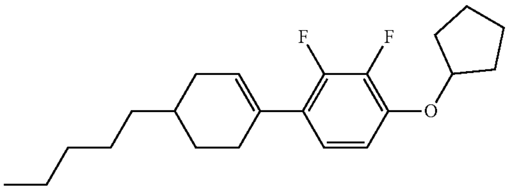
IID-1-22
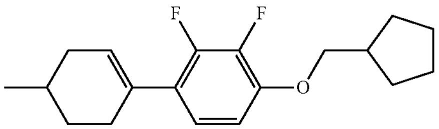
IID-1-23
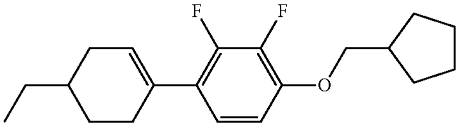

-continued
IID-1-24
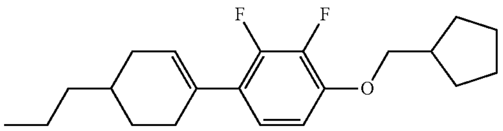
IID-1-25
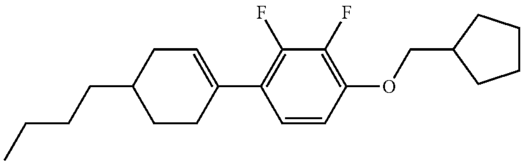
IID-1-26
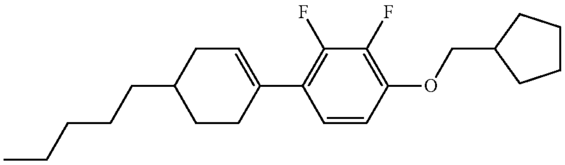
wherein v is 1, 2, 3, 4, 5 or 6.
Very preferred compounds of the formula IID are selected from the following subformulae of IID-4,
IID-4-1
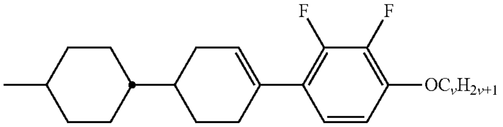
IID-4-2
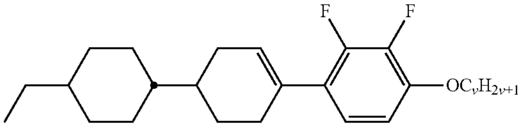
IID-4-3
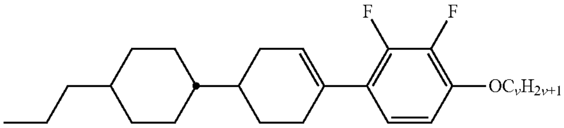
IID-4-4
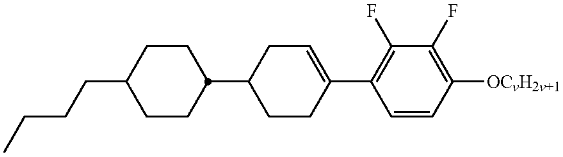
IID-4-5
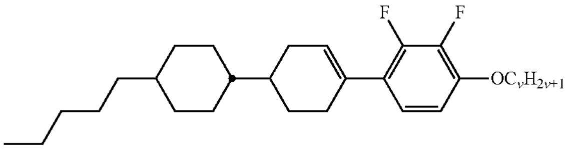
-continued
IID-4-6
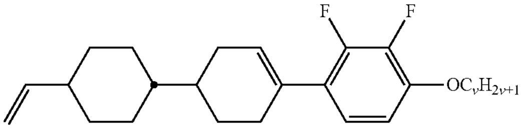
IID-4-7
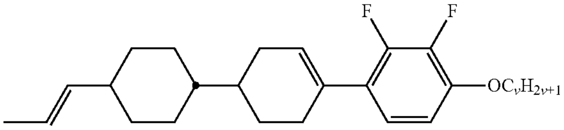
IID-4-8
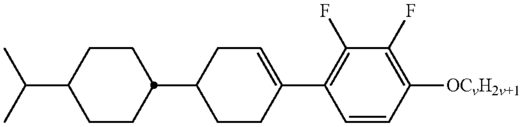
IID-4-9
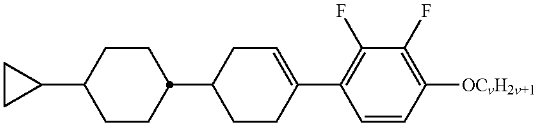
IID-4-10
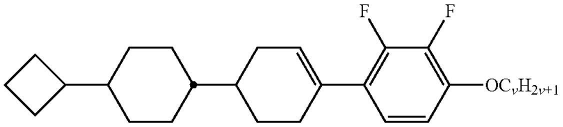
IID-4-11
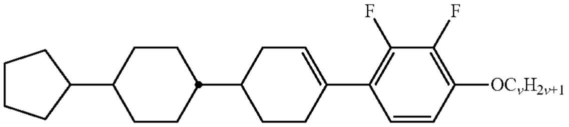
IID-4-12
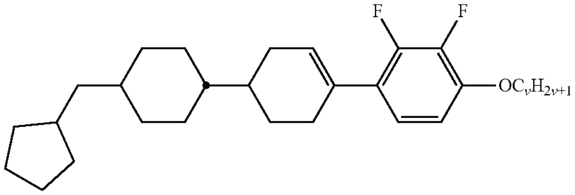
IID-4-13
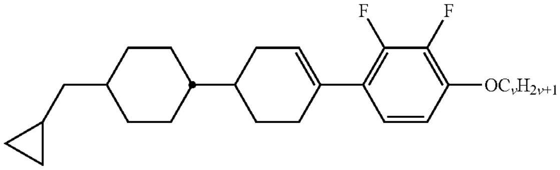
IID-4-14
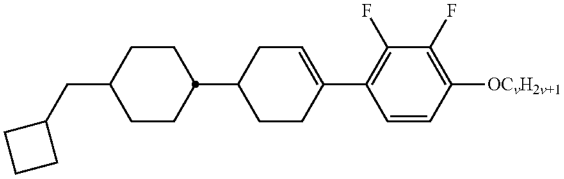

-continued
IID-4-15
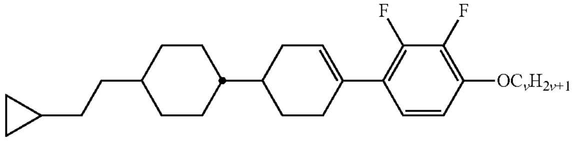
IID-4-16
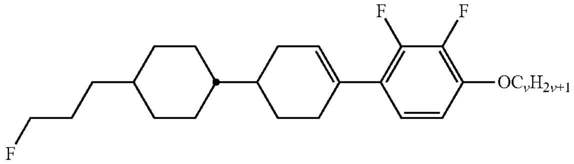
IID-4-17
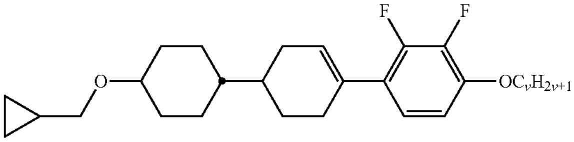
IID-4-18
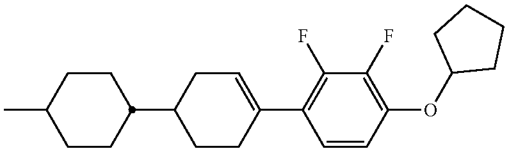
IID-4-19
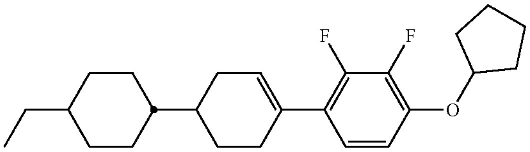
IID-4-20
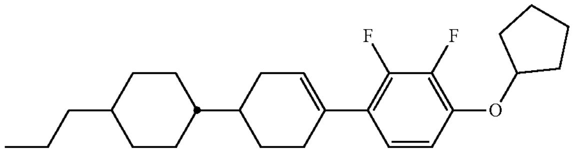
IID-4-21
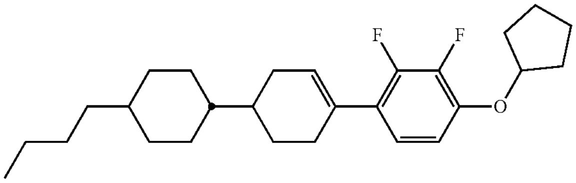
IID-4-22
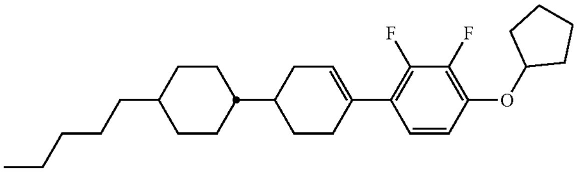
-continued
IID-4-23
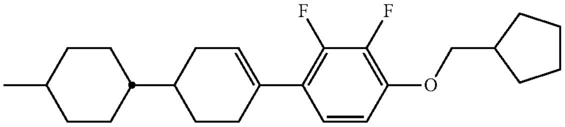
IID-4-24
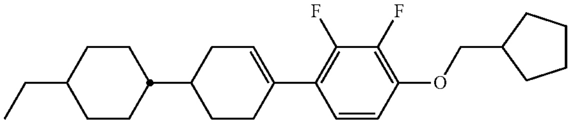
IID-4-25
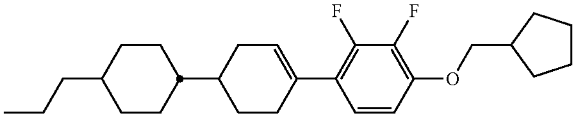
IID-4-26
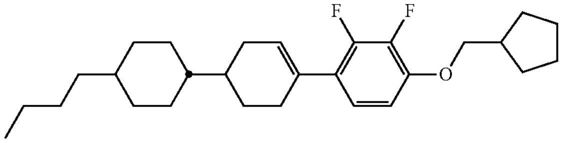
IID-4-27
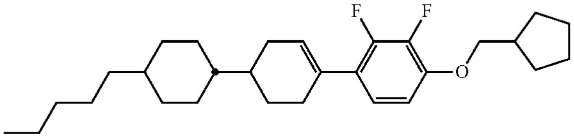
wherein v is 1, 2, 3, 4, 5 or 6.
Very preferred compounds of the formula IID are selected from the following subformulae of IID-12
IID-12-1
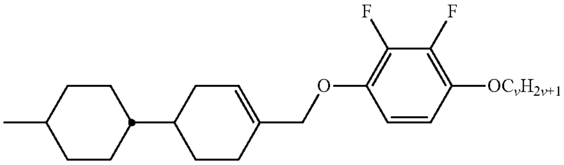
IID-12-2
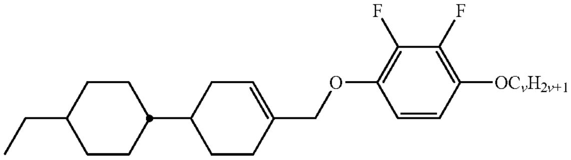
IID-12-3
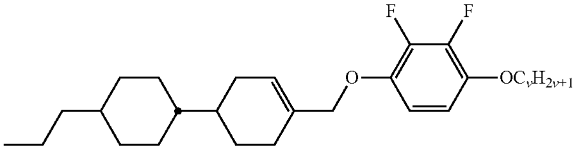

-continued
IID-12-4
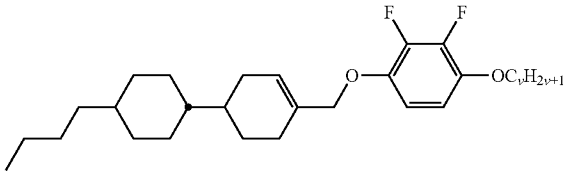
IID-12-5
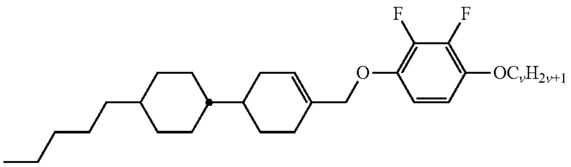
IID-12-6
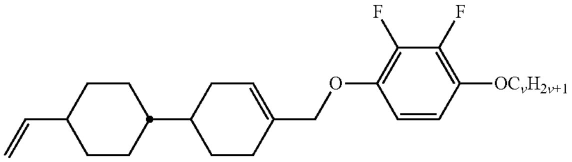
IID-12-7
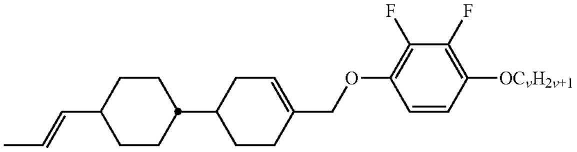
IID-12-8
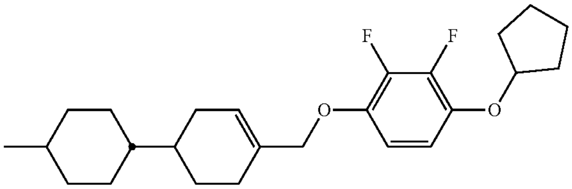
IID-12-9
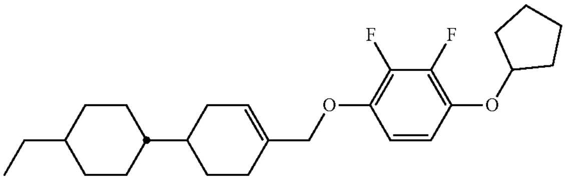
IID-12-10
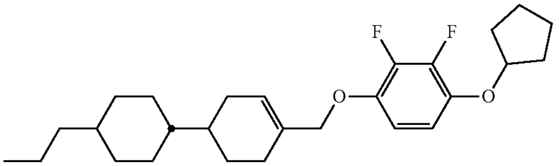
IID-12-11
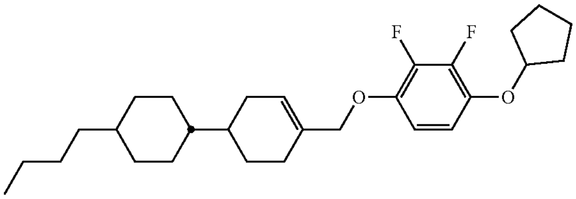
-continued
IID-12-12
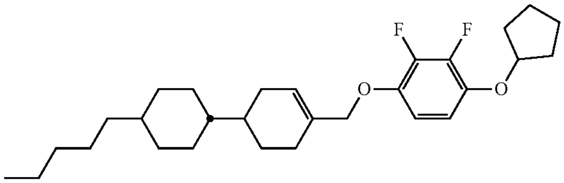
IID-12-13
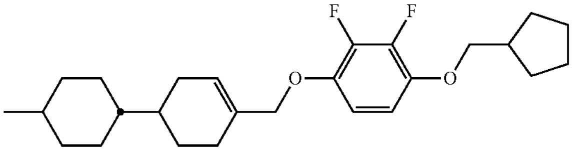
IID-12-14
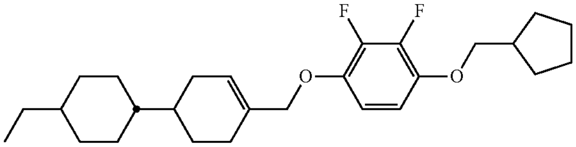
IID-12-15
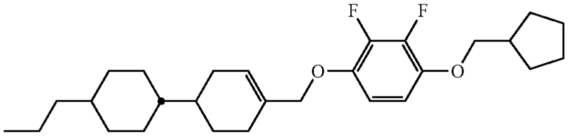
IID-12-16
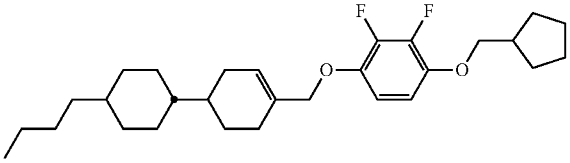
IID-12-17
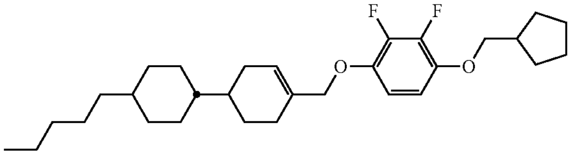
wherein v is 1, 2, 3, 4, 5 or 6.
In a preferred embodiment, the LC medium comprises one or more compounds of formula IID-12a
IID-12a
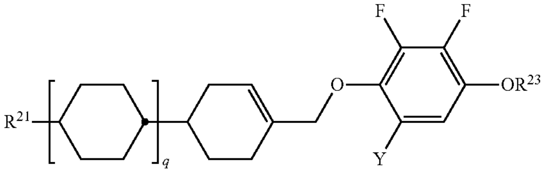
in which $R^{21}$, Y and q have the meanings given in formula IID, and $R^{23}$ is

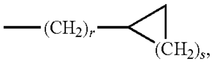
in which r is 0, 1, 2, 3, 4, 5 or 6 and s is 1, 2 or 3.
Preferred compounds of formula IID-10a are the compounds IID-12a-1 to IID-12a-14:
IID-12a-1
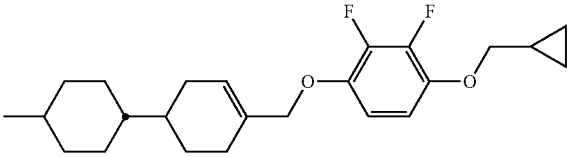
IID-12a-2
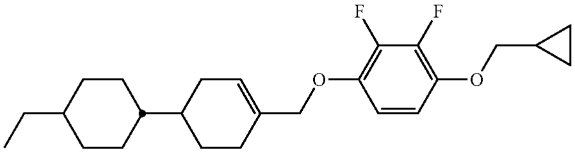
IID-12a-3
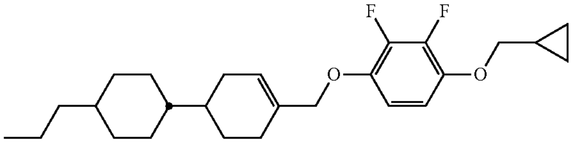
IID-12a-4
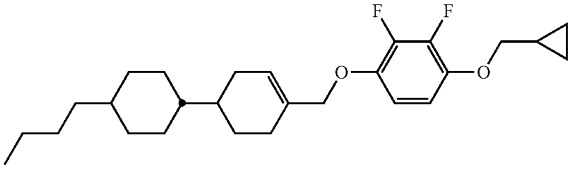
IID-12a-5
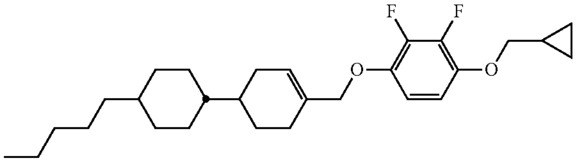
IID-12a-6
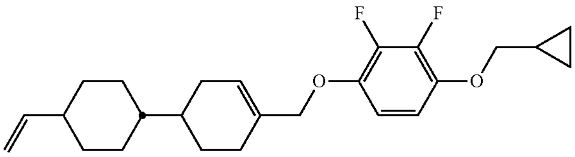
IID-12a-7
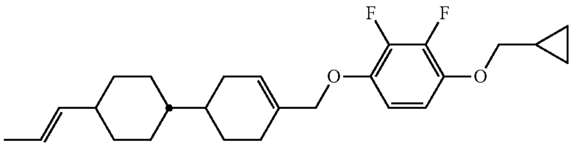
-continued
IID-12a-8
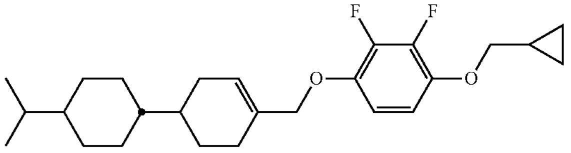
IID-12a-9
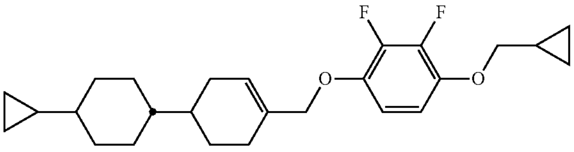
IID-12a-10
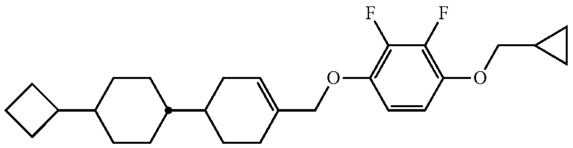
IID-12a-11
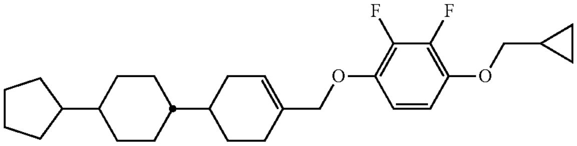
IID-12a-12
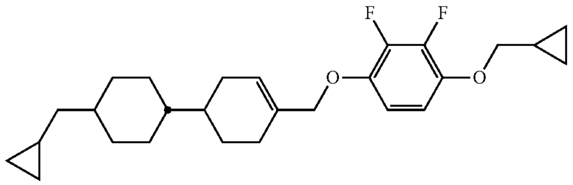
IID-12a-13
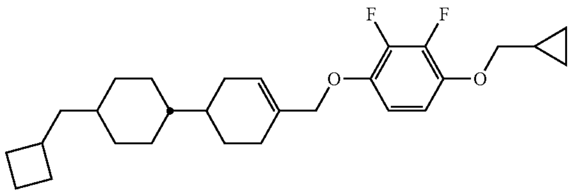
IID-12a-14
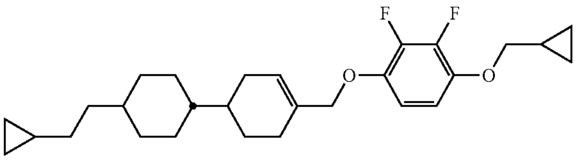
Very preferred compounds of the formula IID are selected from the following subformulae of IID-19, IID-19-1
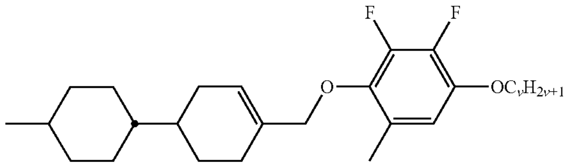
IID-19-2
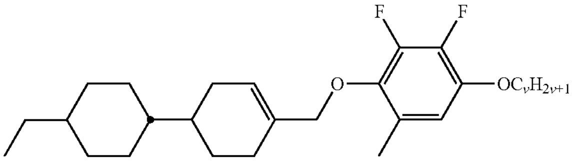
IID-19-3
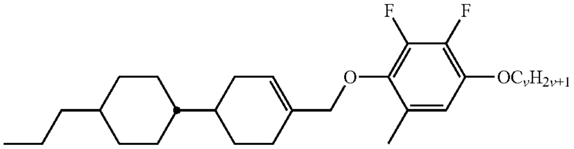
IID-19-4
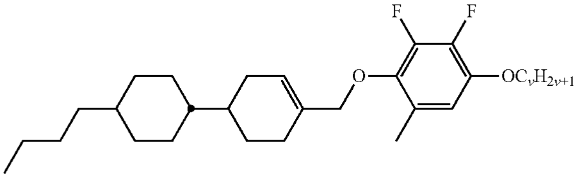
IID-19-5
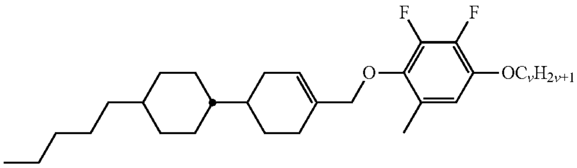
IID-19-6
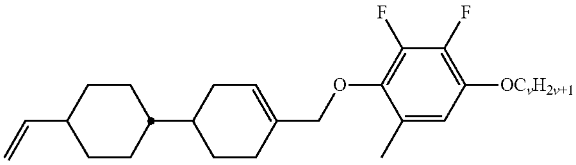
IID-19-7
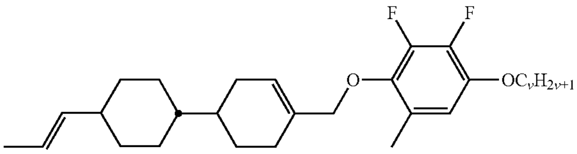
IID-19-8
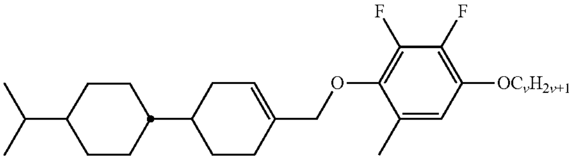
-continued
IID-19-9
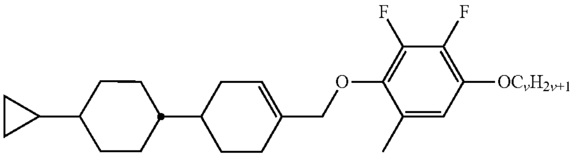
IID-19-10
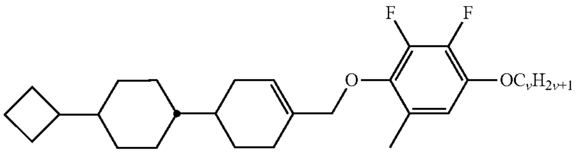
IID-19-11
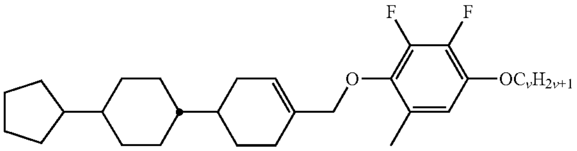
IID-19-12
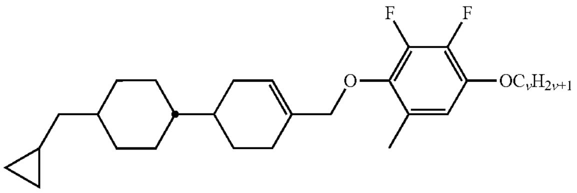
IID-19-13
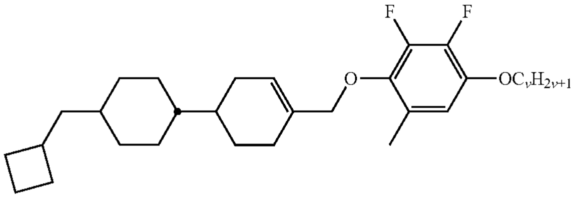
IID-19-14
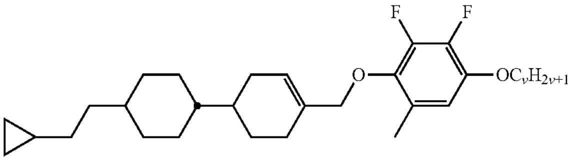
IID-19-15
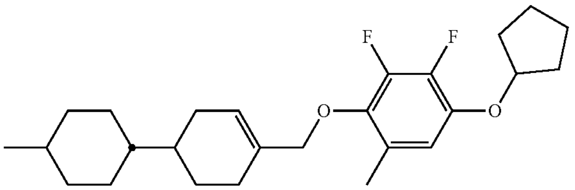
IID-19-16
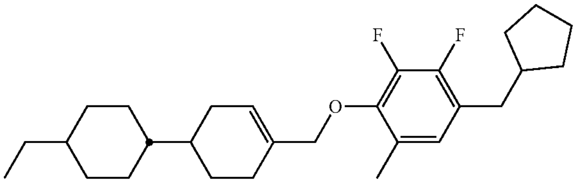

-continued
IID-19-17
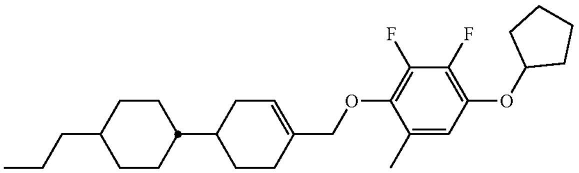
IID-19-18
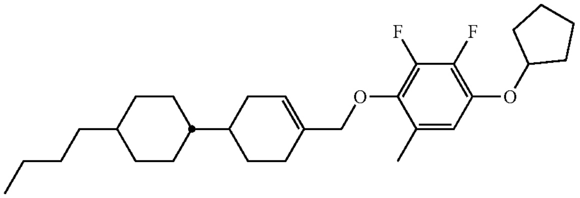
IID-19-19
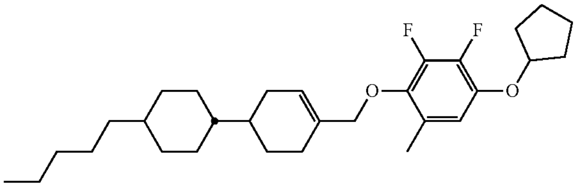
IID-19-20
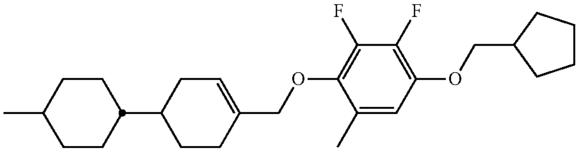
IID-19-21
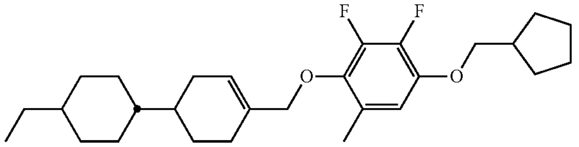
IID-19-22
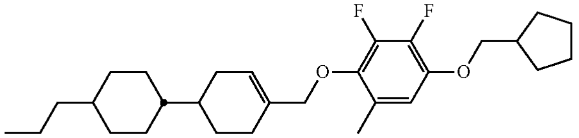
IID-19-23
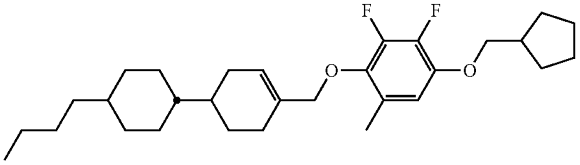
IID-19-24
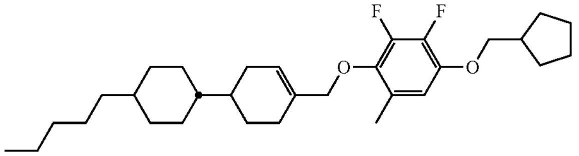
wherein v is 1, 2, 3, 4, 5 or 6.
In a preferred embodiment the LC medium comprises one or more compounds of the formula IIE selected from the group consisting of the following formulae:
IIE-1
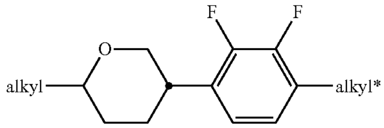
IIE-2
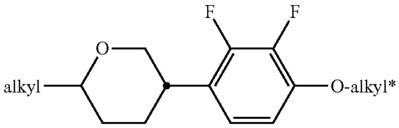
IIE-3
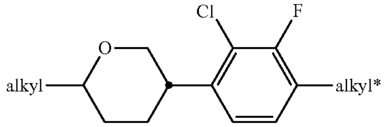
IIE-4
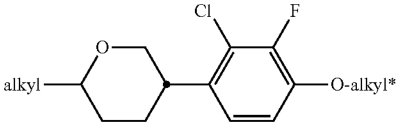
IIE-5
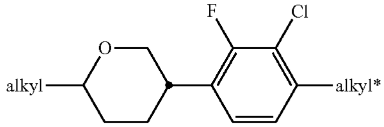
IIE-6
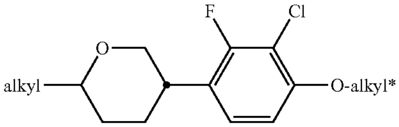
IIE-7
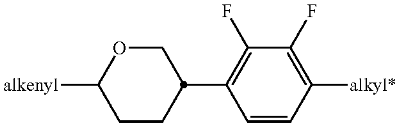
IIE-8
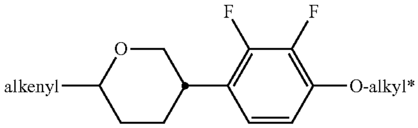
IIE-9
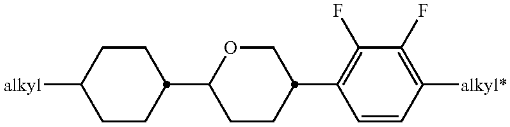
IIE-10
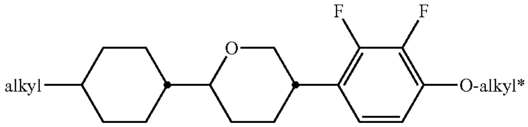

-continued
IIE-11
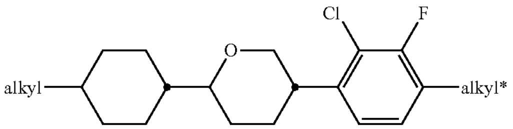
IIE-12
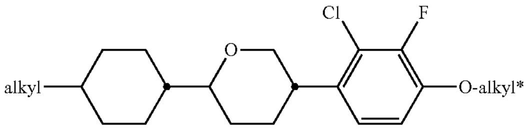
IIE-13
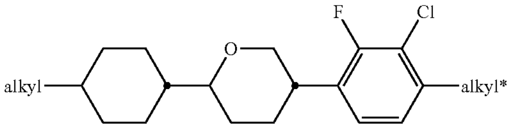
IIE-14
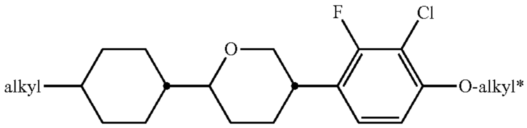
IIE-15
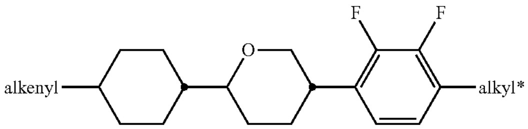
IIE-16
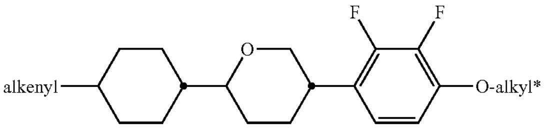
IIE-17
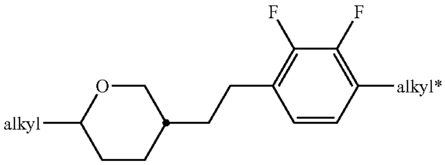
IIE-18
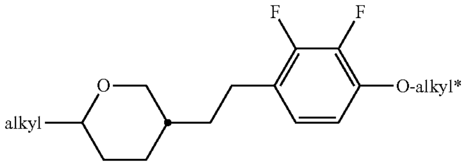
IIE-19
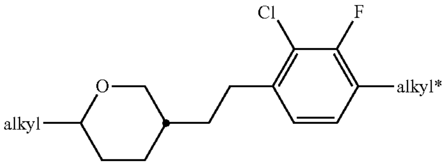
-continued
IIE-20
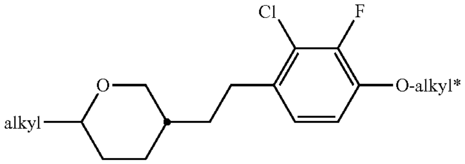
IIE-21
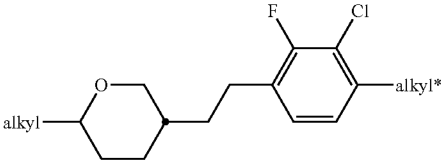
IIE-22
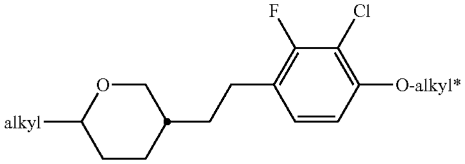
IIE-23
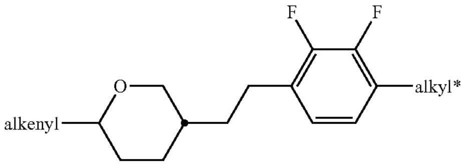
IIE-24
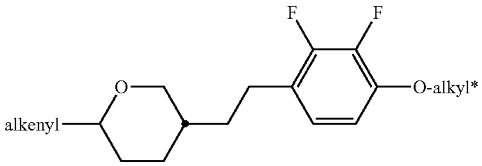
IIE-25
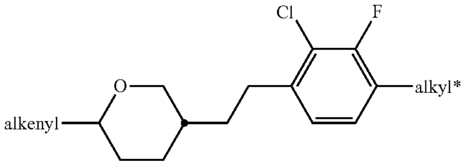
IIE-26
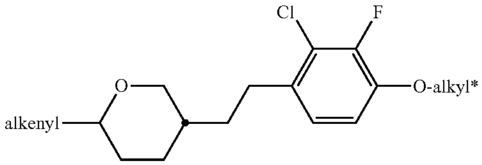
IIE-27
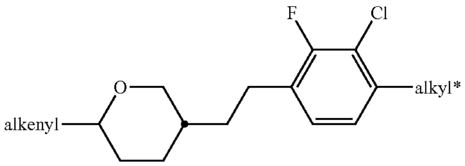
IIE-28
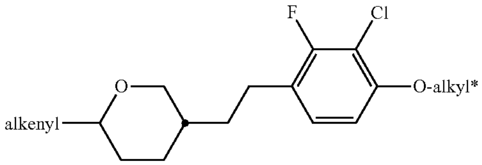

-continued
IIE-29
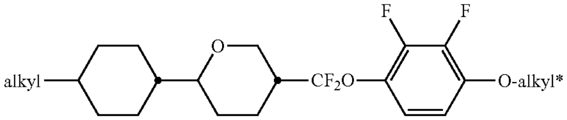
IIE-30
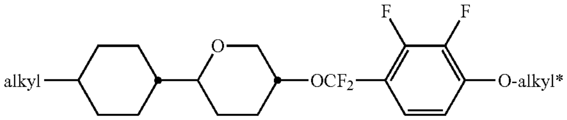
IIE-31
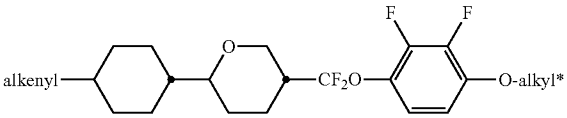
IIE-32
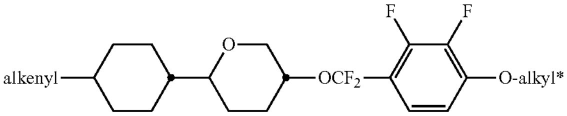
IIE-33
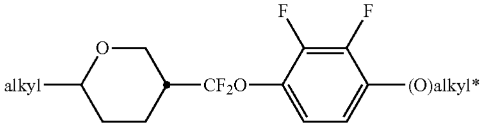
IIE-34
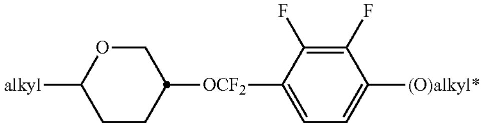
IIE-35
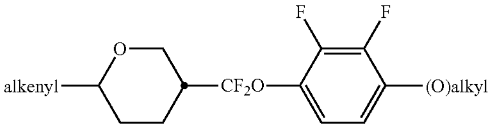
IIE-36
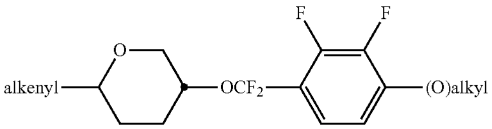
IIE-37
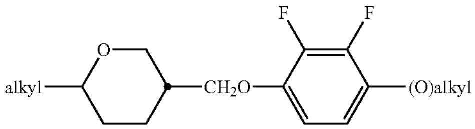
IIE-38
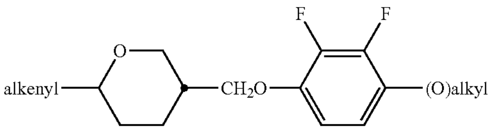
IIE-39
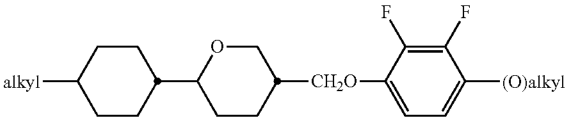
-continued
IIE-40
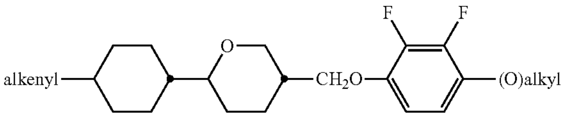
IIE-41
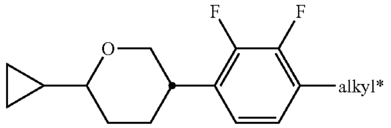
IIE-42
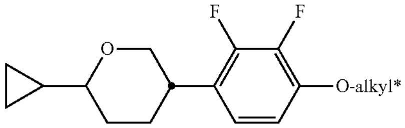
IIE-43
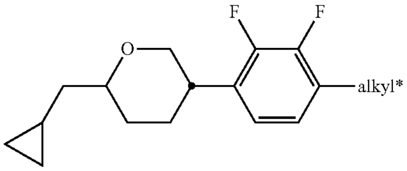
IIE-44
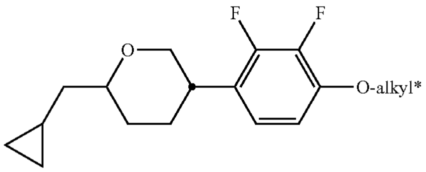
IIE-45
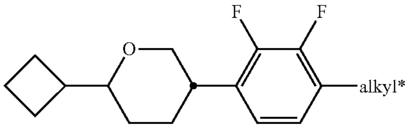
IIE-46
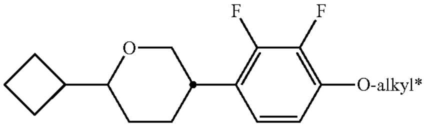
IIE-47
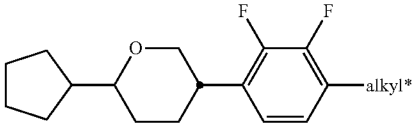
IIE-48
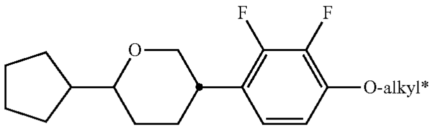
IIE-49
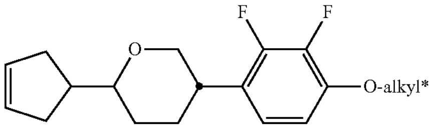

-continued
IIE-50
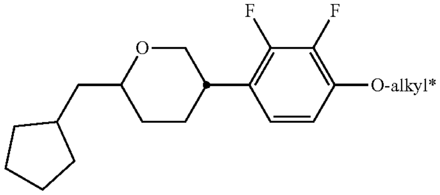
IIE-51
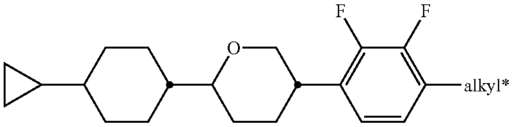
IIE-52
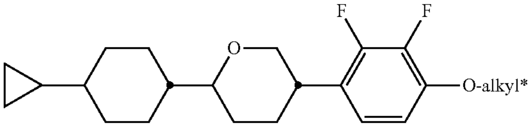
IIE-53
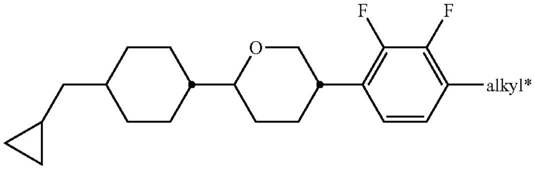
IIE-54
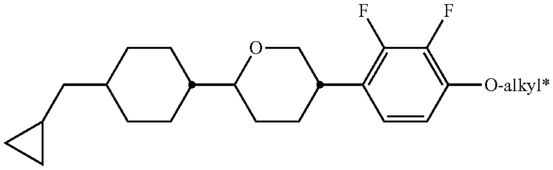
IIE-55
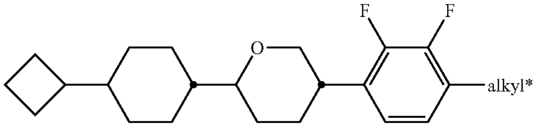
IIE-56
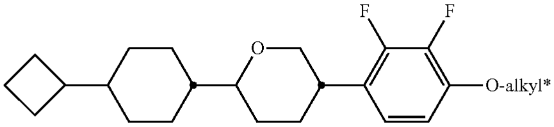
IIE-57
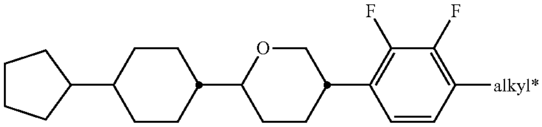
-continued
IIE-58
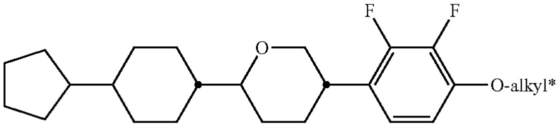
IIE-59
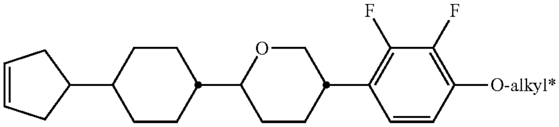
IIE-60
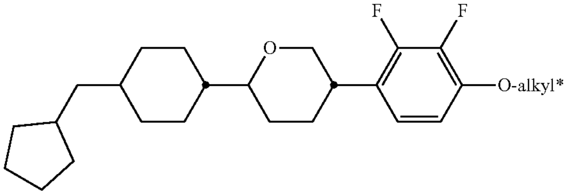
IIE-61
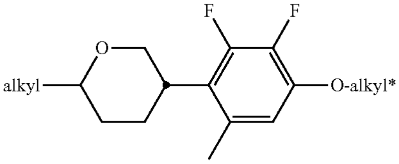
IIE-62
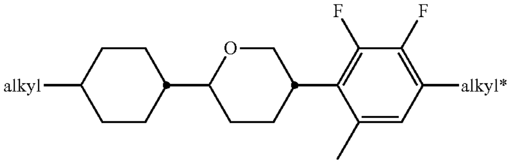
IIE-63
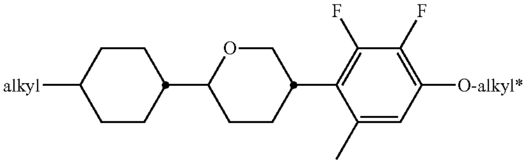
IIE-64
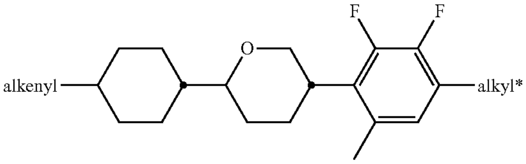
IIE-65
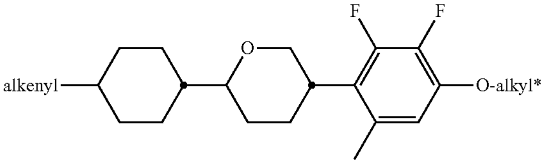

-continued

IIE-66

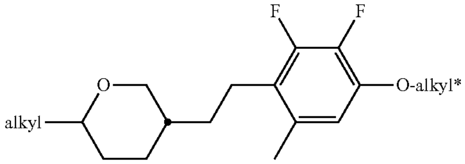

IIE-67

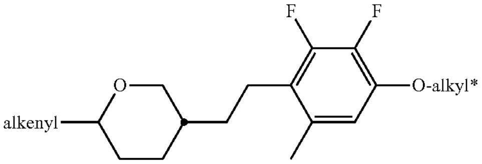

IIE-68

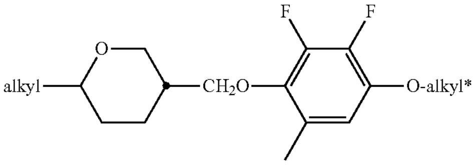

IIE-69

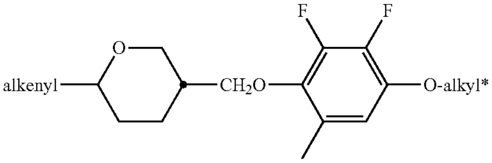

IIE-70

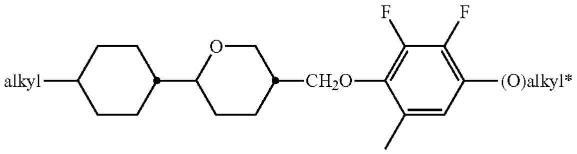

IIE-71

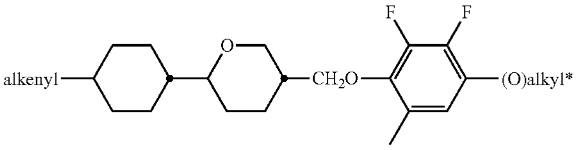

IIE-72

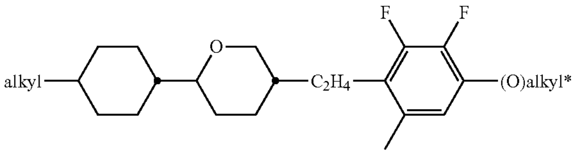

IIE-73

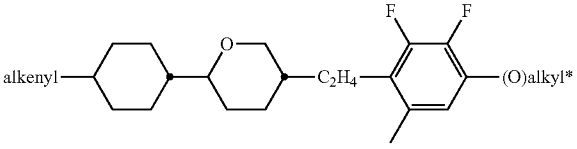

IIE-74

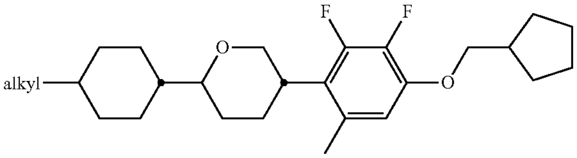

-continued

IIE-75

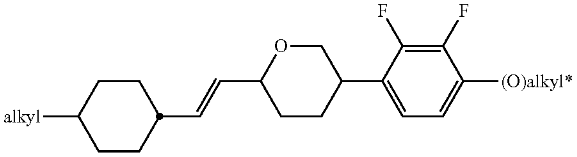

IIE-76

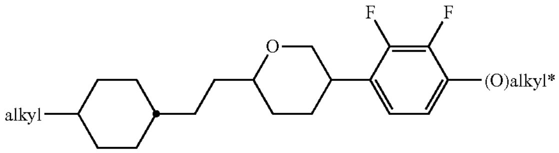

IIE-77

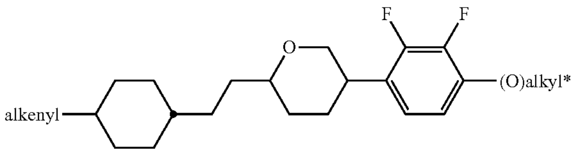

IIE-78

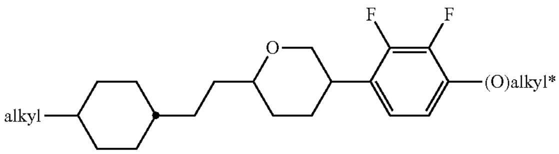

IIE-79

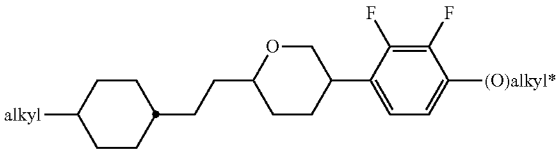

in which the index a denotes 1 or 2, alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond, and alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred LC media according to the invention comprise one or more compounds selected from the group consisting of formulae IIE-2, IIE-8, IE-10, IIE-16, IIE-18, IIE-37, IIE-38, IIE-39 and IIE-40.

Preferably, the LC medium comprises one or more compounds of the formula IIE-2 selected from the following sub-formulae:

IIE-2-1

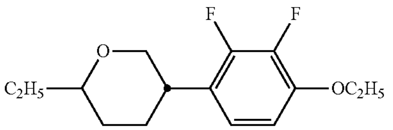

-continued

IIE-2-2

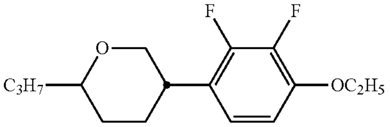

IIE-2-3

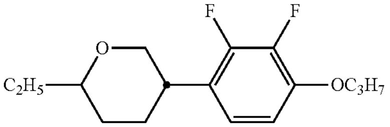

IIE-2-4

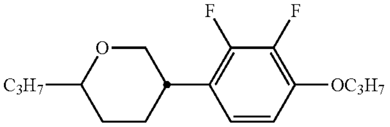

IIE-2-5

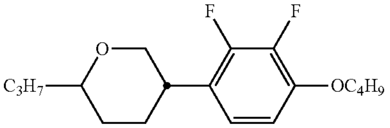

Preferably, the LC medium comprises one or more compounds of the formula IIE-10 selected from the following sub-formulae:

IIE-10-1

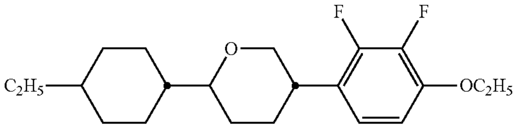

IIE-10-2

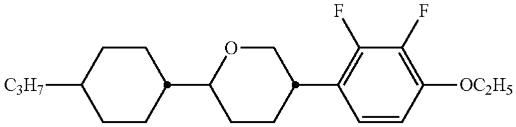

IIE-10-3

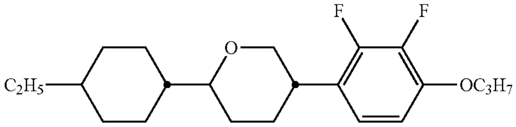

IIE-10-4

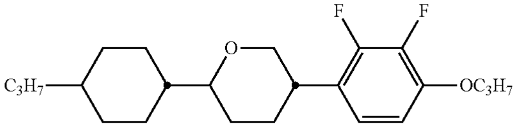

IIE-10-5

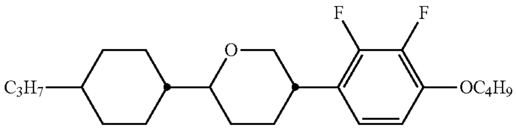

In another preferred embodiment the LC medium comprises one or more compounds of the formula IIF selected from the group consisting of the following formulae,

IIF-1

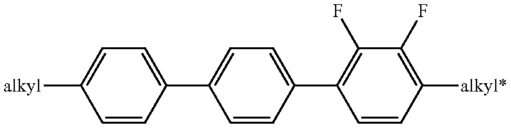

IIF-2

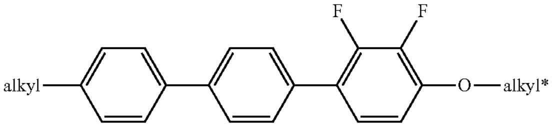

in which alkyl and alkyl* each, independently of one another, denote a straight-chain or branched alkyl radical having 1-6 C atoms.

Preferably, the LC medium comprises one or more compounds of the formula IIF-2 selected from the following sub-formulae:

IIF-2-1

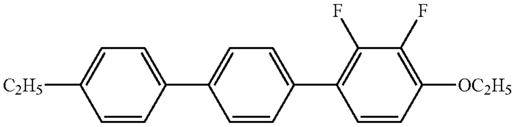

IIF-2-2

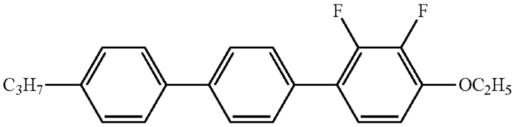

IIF-2-3

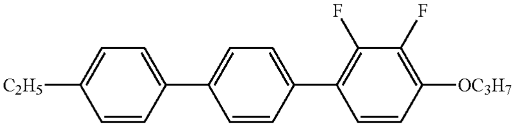

IIF-2-4

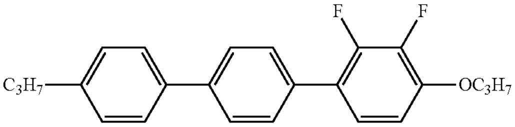

IIF-2-5

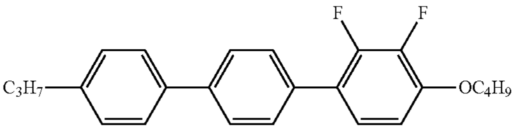

Particularly preferred LC media according to the invention comprise one or more compounds selected from the formulae IIA-2, IIA-8, IIA-10, IIA-16, 11-18, IIA-40, IIA-41, IIA-42, IIA-43, IIA-67, IIA-69, IIA-81, IIB-2, IIB-10, IIB-16, IIC-1, and IID-1, IID-4, IID-12, IID-19, IIE-2, IIE-8, IE-10, IIE-16, IIE-18, IIE-37, IIE-38, IIE-39, IIE-40, and IIF-2 or their subformulae.

The proportion of compounds of the formulae IIA and/or IIB in the mixture as a whole is preferably at least 20% by weight.

In a preferred embodiment, the LC medium comprises one or more compounds of the formula IV,

IV

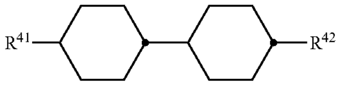

in which $R^{41}$ denotes an unsubstituted alkyl radical having 1 to 7 C atoms where, in addition, one or more $CH_2$ groups may be replaced by

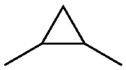
,
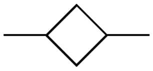
or
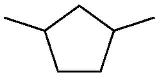
, or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms, or cyclic alkyl having 3 to 6 C atoms, or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

IV-1

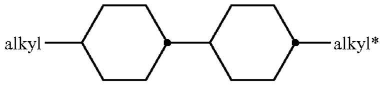

IV-2

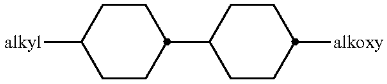

IV-3

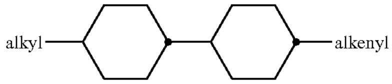

IV-4

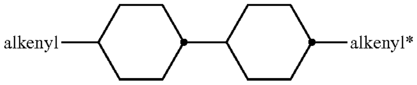

in which alkyl and alkyl*, independently of one another, denote alkyl radical having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl* denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the LC medium comprises one or more compounds selected from the compounds of the formulae IV-1-1 to IV-1-14:

IV-1-1

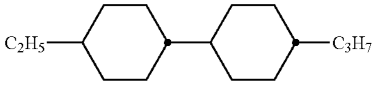

IV-1-2

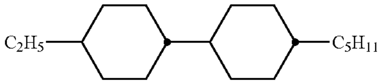

IV-1-3

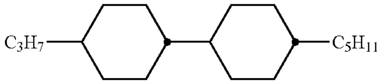

IV-1-4

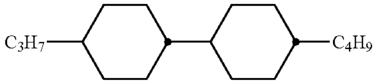

IV-1-5

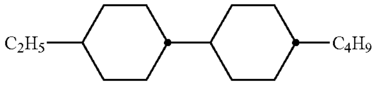

IV-1-6

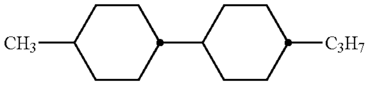

IV-1-7

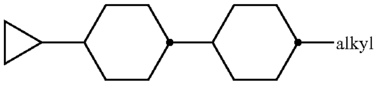

IV-1-8

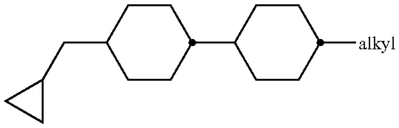

IV-1-9

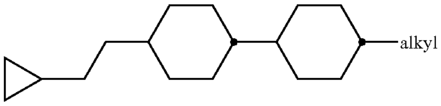

IV-1-10

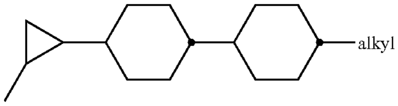

IV-1-11

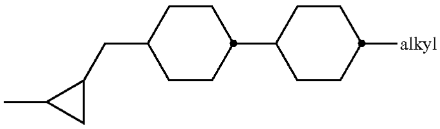

IV-1-12

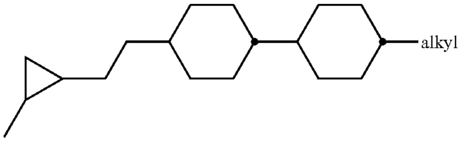

IV-1-13

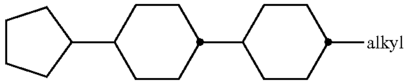

-continued

IV-1-14

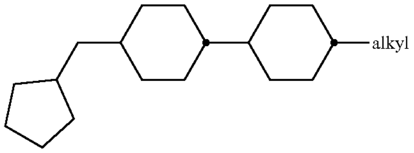

in which alkyl denotes methyl, ethyl, n-propyl, isopropyl, n-butyl, isobutyl, or n-pentyl.

Very preferably, the LC medium according to the invention comprises one or more compounds of the formulae IV-2-1 and/or IV-2-2

IV-2-1

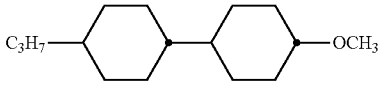

IV-2-2

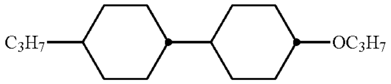

Very preferably, the LC medium according to the invention comprises a compound of formula IV-3, in particular selected from the compounds of the formulae IV-3-1 to IV-3-9:

IV-3-1

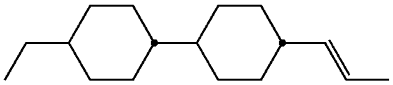

IV-3-2

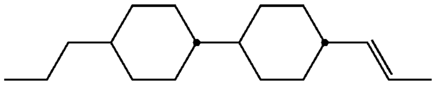

IV-3-3

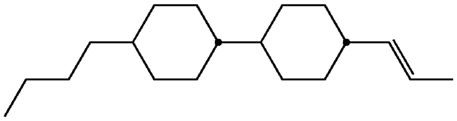

IV-3-4

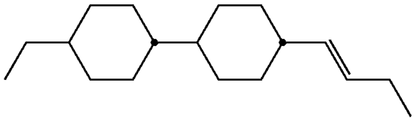

IV-3-5

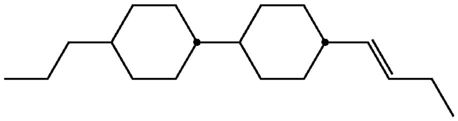

IV-3-6

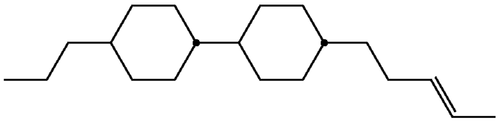

IV-3-7

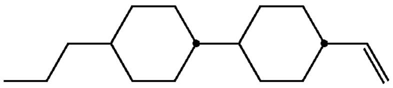

-continued

IV-3-8

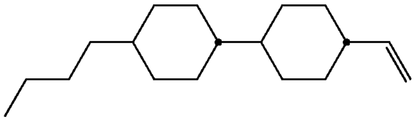

IV-3-9

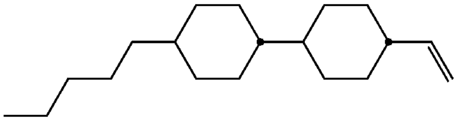

The LC medium according to the invention preferably comprises one or more compounds CC-n-V and/or CC-n-Vm, in particular CC-3-V, CC-4-V, CC-3-V1 and/or CC-4-V1, preferably in a total concentration in the range of from 15 to 70%, preferably from 25 to 55%, very preferably from 30 to 50%. CC-3-V is preferably used in concentrations of 5-60%, in particular 10-55%.

In another preferred embodiment, the LC medium according to the invention comprises one or more compounds of formula IV-3 selected from the compounds of the formulae IV-3-10 to IV-3-25:

IV-3-10

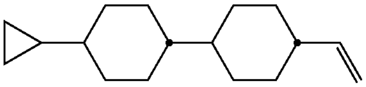

IV-3-11

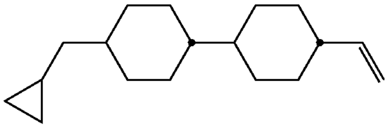

IV-3-12

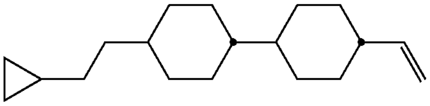

IV-3-13

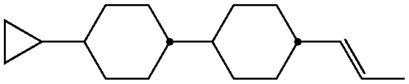

IV-3-14

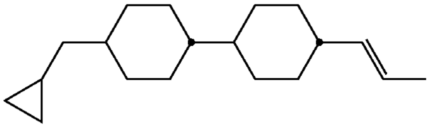

IV-3-15

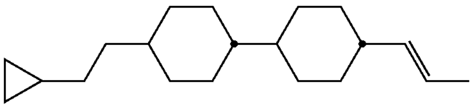

IV-3-16

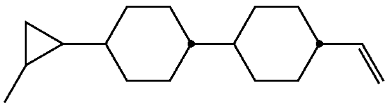

IV-3-17

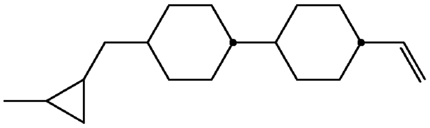

-continued

IV-3-18

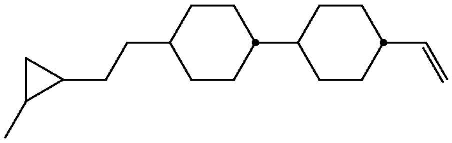

IV-3-19

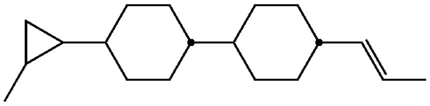

IV-3-20

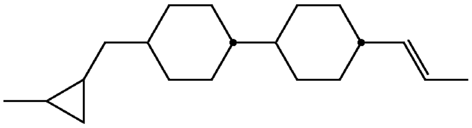

IV-3-21

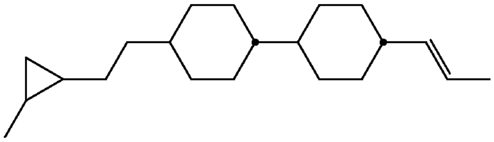

IV-3-22

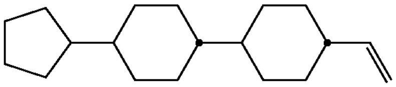

IV-3-23

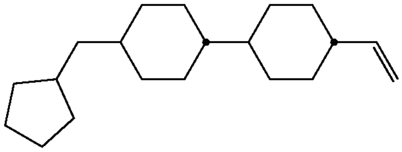

IV-3-24

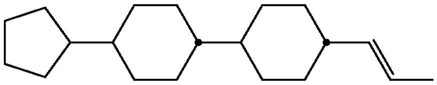

IV-3-25

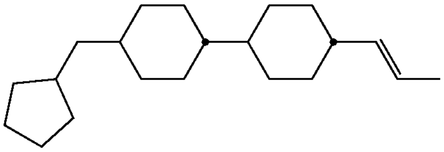

Very preferably, the LC medium according to the invention comprises a compound of formula IV-4, in particular selected from the compounds of the following formulae:

IV-4-1

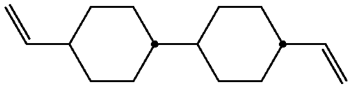

IV-4-2

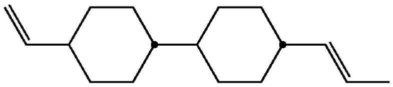

IV-4-3

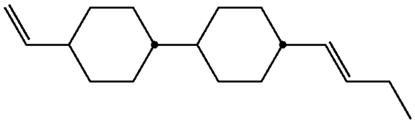

-continued

IV-4-4

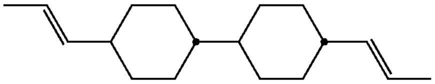

IV-4-5

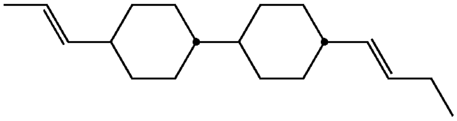

IV-4-6

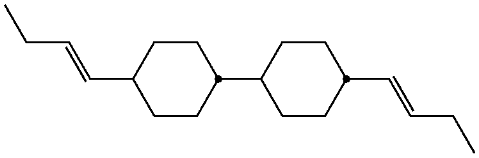

In another preferred embodiment the LC medium comprises one or more compounds of formula IV-4 and its subformulae in which one or both of "alkenyl" and "alkenyl" "denote

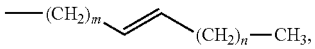

in which m is 0, 1 or 2, and n is 0, 1 or 2, very preferably selected from compounds of formulae IV-4-3 to IV-4-6.

Very preferably, the LC medium according to the invention comprises one or more compounds of the formula IV-1 or its subformulae and/or one or more compounds of the formula IV-3 or its subformulae and/or one or more compounds of the formula IV-4 or its subformulae, where the total concentration of these compounds of the formula IV-1 is in the range from 1% to 30%.

The LC medium according to the invention preferably additionally comprises one or more compounds of the formula IVa, IVa

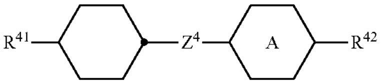

in which $R^{41}$ and $R^{42}$ each, independently of one another, denote a straight-chain alkyl, alkoxy, alkenyl, alkoxyalkyl or alkoxy radical having up to 12 C atoms, or cyclic alkyl having 3 to 6 C atoms,

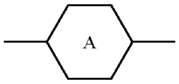

A denotes

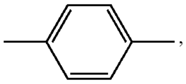,

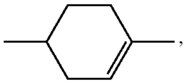,

-continued

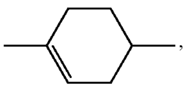, 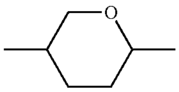 or

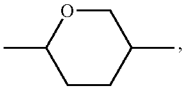, $Z^4$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$— or —CF═CF—.

Preferred compounds of the formula IVa are indicated below:

IVa-1

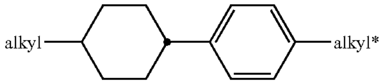

IVa-2

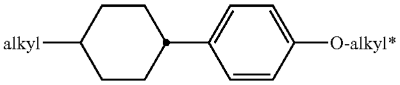

IVa-3

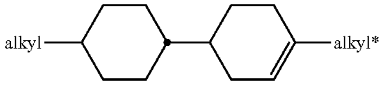

IVa-4

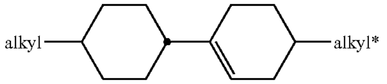

in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight.

Preferably, the LC medium comprises one or more compounds of formula IVb-1 to IVb-3

IVb-1

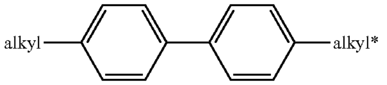

IVb-2

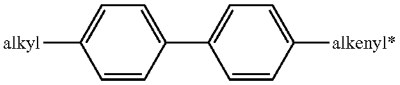

IVb-3

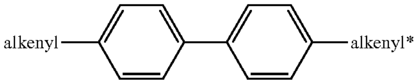

in which alkyl and alkyl* each, independently of one another, denote a straight-chain alkyl radical having 1 to 6 C atoms, or cyclic alkyl having 3 to 6 C atoms, preferably alkyl denotes methyl, and alkenyl and alkenyl* each, independently of one another, denote a straight-chain alkenyl radical having 2 to 6 C atoms.

The proportion of the compounds of the formulae IV-1 to IV-3 in the mixture as a whole is preferably at least 3% by weight, in particular ≥5% by weight.

Of the compounds of the formulae IVa-1 to IVa-4, the compounds of the formula IVa-2 are particularly preferred.

Of the compounds of the formulae IVb-1 to IVb-3, the compounds of the formula IVb-2 are particularly preferred.

Particularly preferred compounds of the formulae IV-1 to IV-3 are selected from the group consisting of the following formulae IVb-1-1

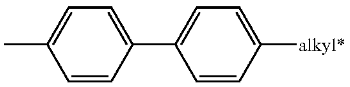

IVb-2-1

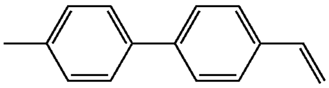

IVb-2-2

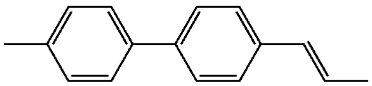

IVb-2-3

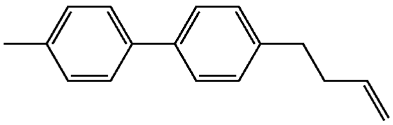

IVb-2-4

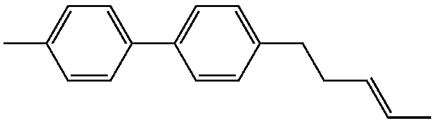

in which alkyl* denotes an alkyl radical having 1 to 6 C atoms and preferably denotes n-propyl.

The LC medium according to the invention particularly preferably comprises one or more compounds of the formulae IVb-1-1, IVb-2-3 and/or IVb-2-4.

In another preferred embodiment, the LC medium according to the invention comprises one or more compounds of formula V

V

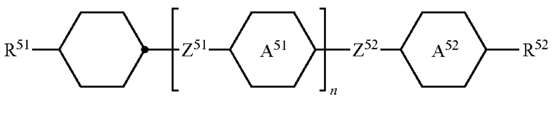

in which $R^{51}$ and $R^{52}$ independently of one another, denote H, an alkyl, alkoxy or alkenyl radical having up to 15 C atoms which is unsubstituted, monosubstituted by F, Cl, CN or $CF_3$ or at least monosubstituted by halogen, where, in addition, one or more $CH_2$ groups in these radicals may be replaced by —O—, —S—, —C≡C—, —$CF_2O$—, —$OCF_2$—, —OC—O— —O—CO—

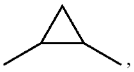, 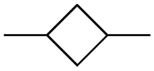, 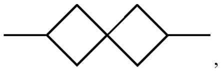,

-continued

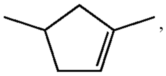, 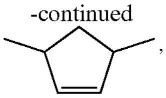, 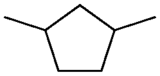

in such a way that O atoms are not linked directly to one another, and preferably denote alkyl having 1 to 7 C atoms, preferably n-alkyl, particularly preferably n-alkyl having 1 to 5 C atoms, alkoxy having 1 to 6 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

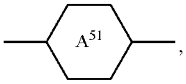, 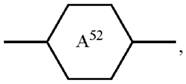, identically or differently, denote in which

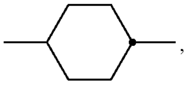, 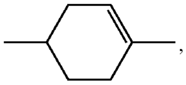, 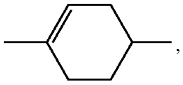, ,

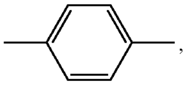, 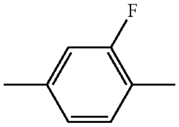 or 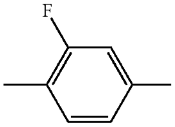

preferably denotes

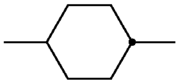 or, 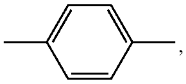,

- $Z^{51}$, $Z^{52}$ each, independently of one another, denote $-CH_2-CH_2-$, $-CH_2-O-$, $-CH=CH-$, $-C\equiv C-$, $-COO-$ or a single bond, preferably $-CH_2-CH_2-$, $-CH_2-O-$ or a single bond and particularly preferably a single bond, and
- n is 1 or 2,
- wherein one or more compounds of formula V are different from formula I.

The compounds of formula V are preferably selected from the compounds of the formulae V-1 to V-17:

V-1

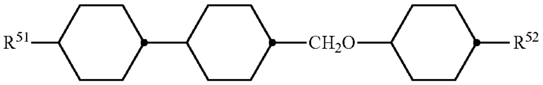

-continued

V-2

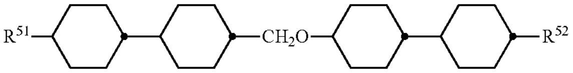

V-3

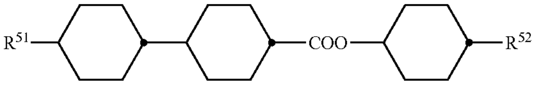

V-4

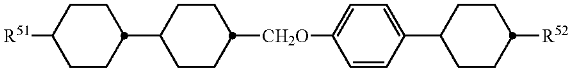

V-5

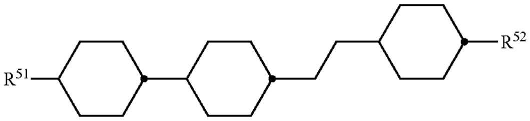

V-6

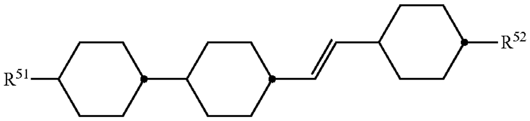

V-7

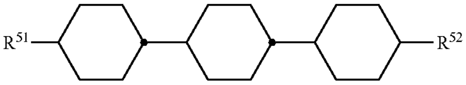

V-8

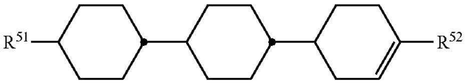

V-9

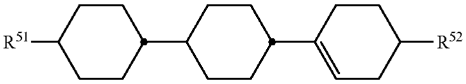

V-10

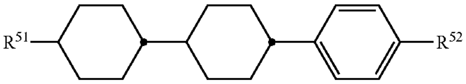

V-11

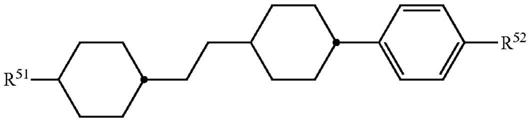

V-12

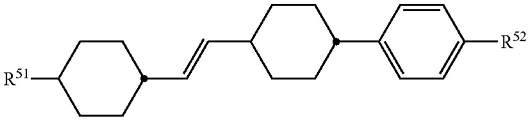

V-13

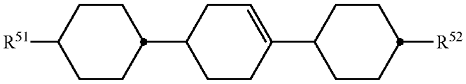

V-14

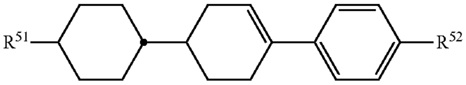

-continued

V-15

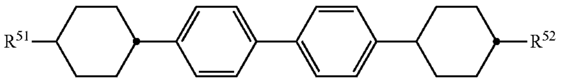

V-16

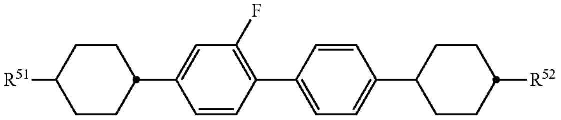

V-17

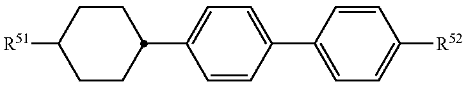

in which $R^{51}$ and $R^{52}$ have the meanings as indicated above, $R^{51}$ and $R^{52}$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16.

LC media according to the invention very particularly preferably comprise the compounds of the formula V-10 and/or IV-1, in particular in amounts of 5 to 30%.

Preferred compounds of the formulae V-10 are indicated below:

V-10a

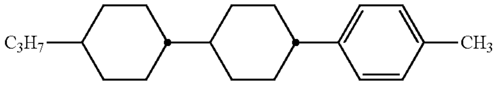

V-10b

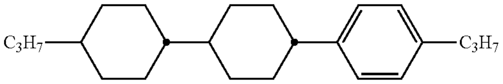

V-10c

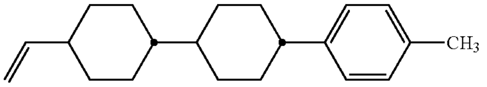

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Particularly preferred LC media comprise the compounds V-9a and/or IV-1-1

V-10a

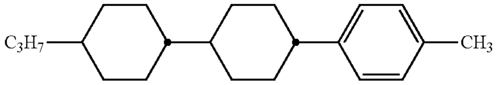

IV-1-1

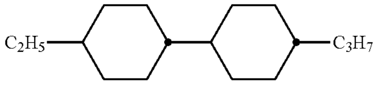

The compounds V-10a and IV-1-1 are preferably present in the mixture in a concentration of 5 to 30%, very preferably 10 to 25%, based on the mixture as a whole.

Preferred LC media comprise at least one compound selected from the group of the compounds

IV

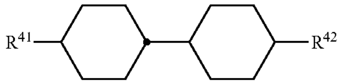

V-6

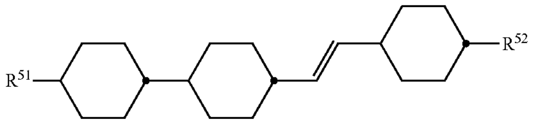

V-7

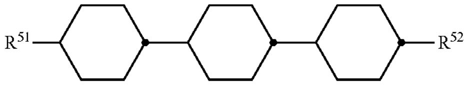

V-14

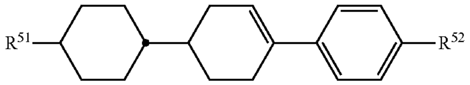

V-17

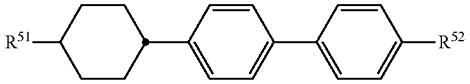

in which $R^{41}$, $R^{42}$, $R^{51}$ and $R^{52}$ have the meanings as indicated above. Preferably in the compounds V-6, I and IV, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms. Preferably in the compounds V-14, $R^{51}$ denotes alkyl or alkenyl having 1 to 6 or 2 to 6 C atoms and $R^{52}$ denotes alkyl having 1 to 6 C atoms.

In another preferred embodiment the LC medium according to the invention comprises one or more compounds of the formula V-7, preferably selected from the compounds of the formulae V-7a to V-7e:

V-7a

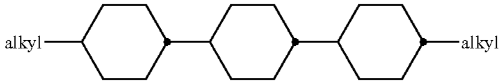

V-7b

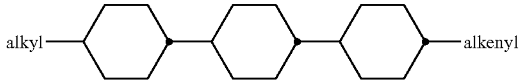

V-7c

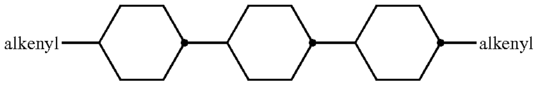

V-7d

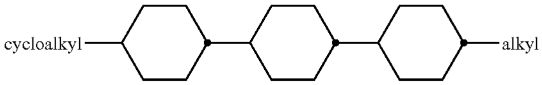

-continued

V-7e

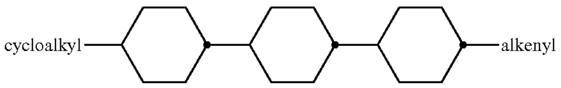

in which alkyl denotes an alkyl group having 1 to 7 C atoms, alkenyl denotes an alkenyl group having 2 to 7 C atoms, and cycloalkyl denotes a cyclic alkyl group having 3 to 12 C atoms, preferably cyclopropyl, cyclobutyl, cyclopentyl, cyclopropylalkyl, cyclobutylalkyl or cyclopentylalkyl.

Very preferred compounds of the formulae V-7a to V-7e are selected from the compounds of the following subformulae:

V-7b-1

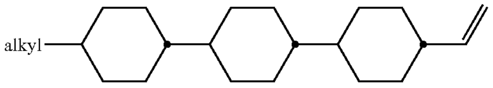

V-7b-2

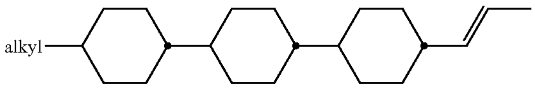

V-7b-3

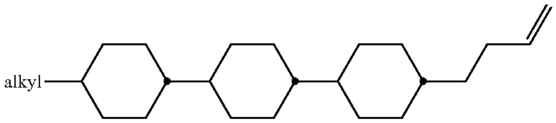

V-7d-1

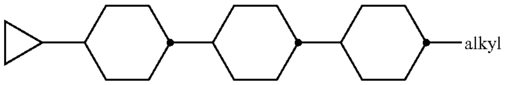

V-7d-2

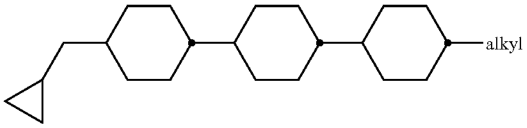

V-7d-3

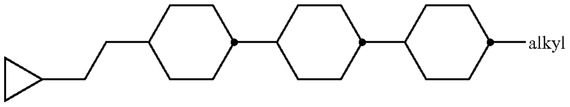

V-7d-4

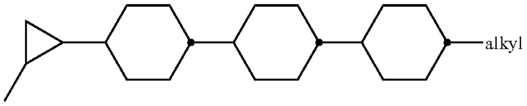

V-7d-5

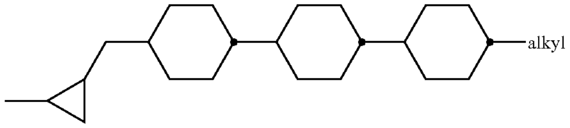

-continued

V-7d-6

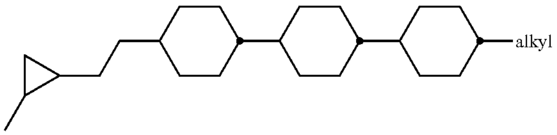

V-7d-7

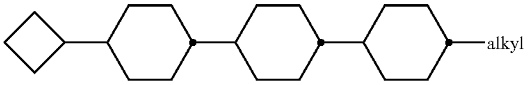

V-7d-8

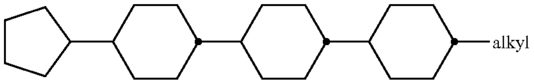

V-7d-9

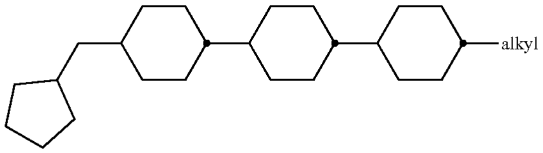

V-7e-1

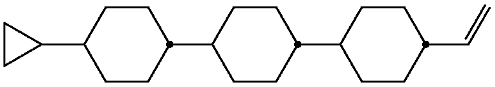

V-7e-2

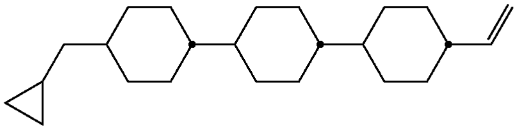

V-7e-3

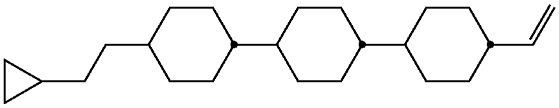

V-7e-4

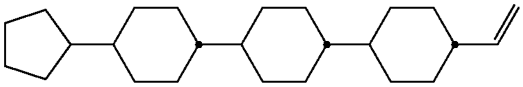

V-7e-5

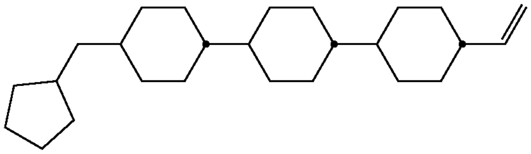

V-7e-6

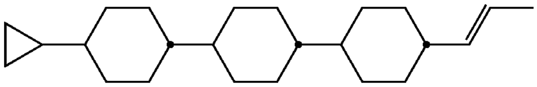

V-7e-7

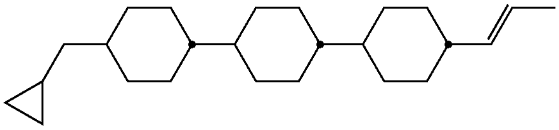

-continued

V-7e-8

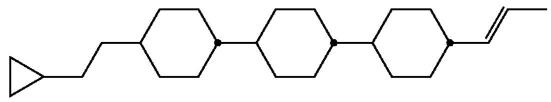

V-7e-9

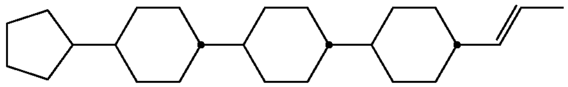

V-7e-10

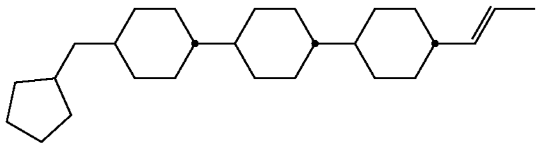

V-7e-11

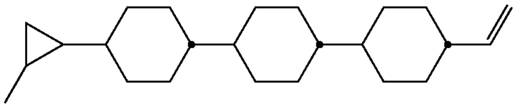

V-7e-12

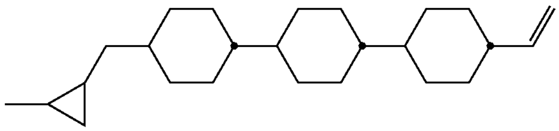

V-7e-13

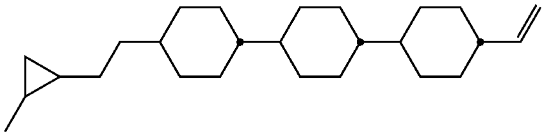

V-7e-14

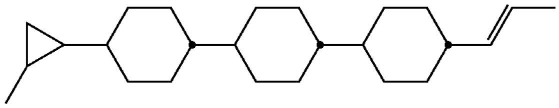

V-7e-15

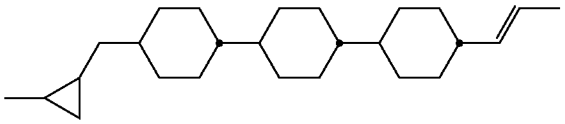

V-7e-16

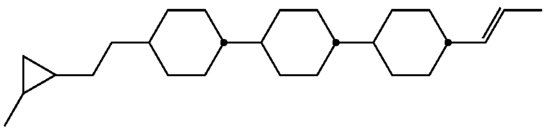

in which alkyl denotes ethyl, n-propyl, n-butyl or n-pentyl, preferably n-propyl.

Further preferred are compounds of formula V, wherein $R^{51}$ and $R^{52}$ independently of one another denote straight-chain alkyl having 1 to 7 C atoms or alkenyl having 2 to 7 C atoms.

In a preferred embodiment of the present invention the LC medium additionally comprises one or more compounds of the formulae VI-1 to VI-22,

VI-1

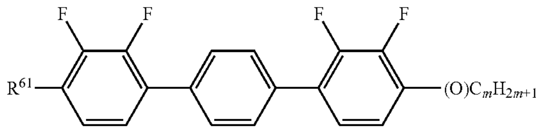

VI-2

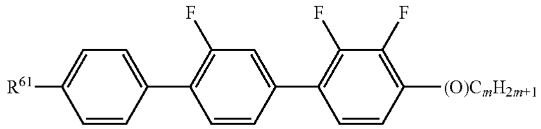

VI-3

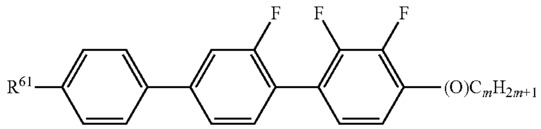

VI-4

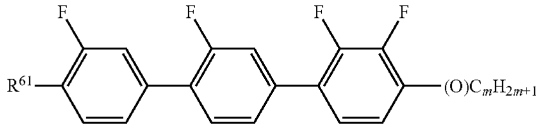

VI-5

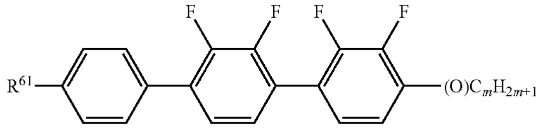

VI-6

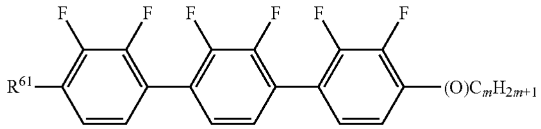

VI-7

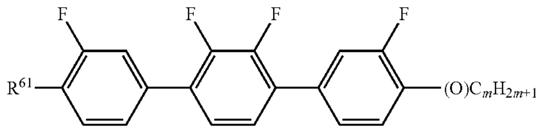

VI-8

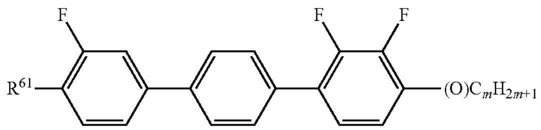

VI-9

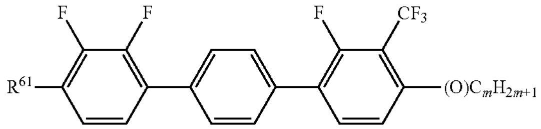

VI-10

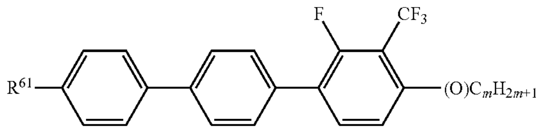

-continued

VI-11

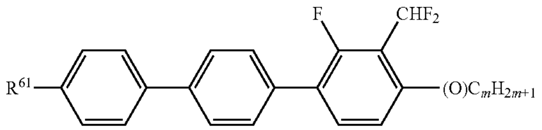

VI-12

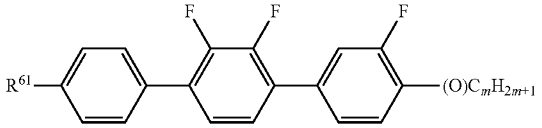

VI-13

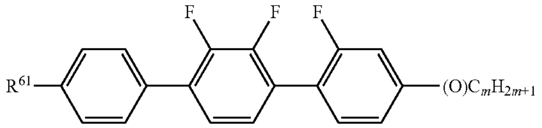

VI-14

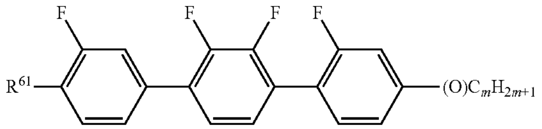

VI-15

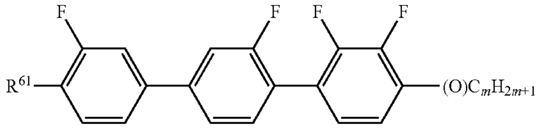

VI-16

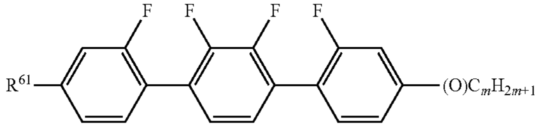

VI-17

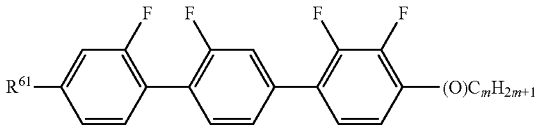

VI-18

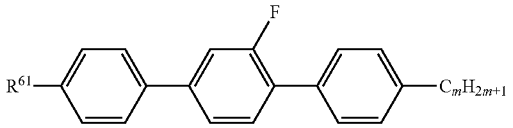

VI-19

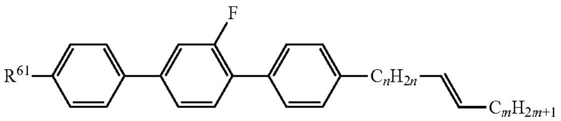

VI-20

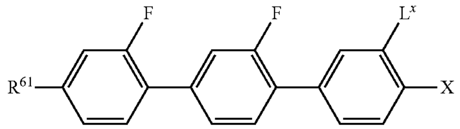

-continued

VI-21

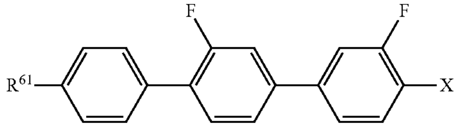

VI-22

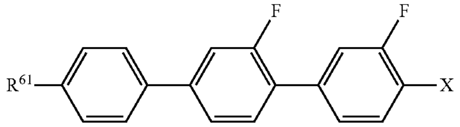

$R^{61}$ denotes a straight-chain alkyl or alkoxy radical having 1 to 6 C atoms, or cyclic alkyl having 3 to 6 C atoms, (O) denotes —O— or a single bond, X denotes F, Cl, $OCF_3$ or $OCHF_2$, $L^x$ denotes H or F, m is 0, 1, 2, 3, 4, 5 or 6 and n is 0, 1, 2, 3 or 4.

$R^{61}$ preferably denotes methyl, ethyl, propyl, butyl, pentyl, hexyl, methoxy, ethoxy, propoxy, butoxy, pentoxy.

X preferably denotes F or $OCH_3$, very preferably F.

The LC medium according to the invention preferably comprises the terphenyls of the formulae VI-1 to VI-22 in amounts of 2 to 30% by weight, in particular 5 to 20% by weight.

Particular preference is given to compounds of the formulae VI-2, VI-18, and VI-20 wherein X denotes F. In these compounds, $R^{61}$ preferably denotes alkyl, furthermore alkoxy, each having 1 to 5 C atoms. In the compounds of the formula VI-18, $R^{61}$ preferably denotes alkyl or alkenyl, in particular alkyl. In the compounds of the formula VI-19, $R^{61}$ preferably denotes alkyl. In the compounds of the formulae VI-20 to VI-22, X preferably denotes F.

The terphenyls of formula VI-1 to VI-22 are preferably employed in the LC media according to the invention if the $\Delta n$ value of the mixture is to be $\geq 0.1$. Preferred LC media comprise 2 to 20% by weight of one or more terphenyl compounds selected from the group of the compounds of formulae VI-1 to VI-22.

In another preferred embodiment of the present invention the LC medium additionally comprises one or more compounds of the formulae VII-1 to VII-9

VII-1

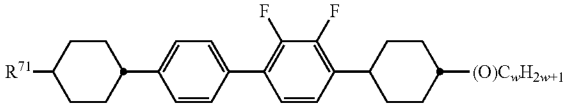

VII-2

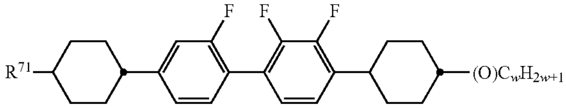

VII-3

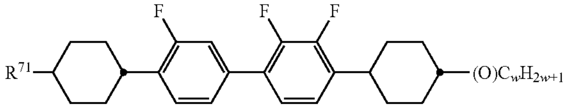

VII-4

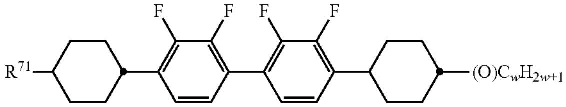

-continued

VII-5

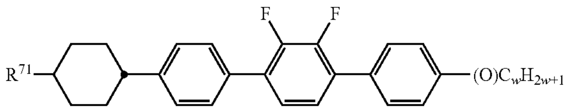

VII-6

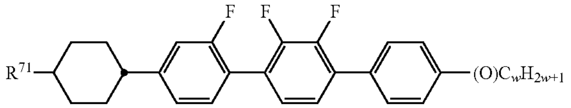

VII-7

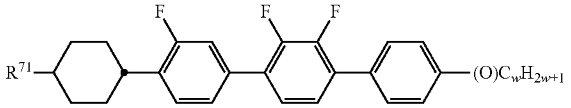

VII-8

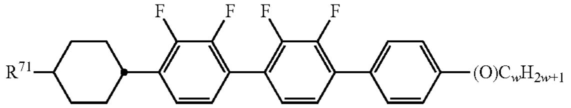

VII-9

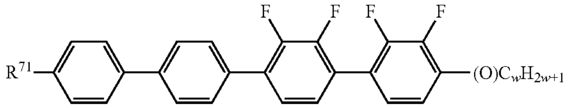

in which $R^{71}$ each, independently of one another, have one of the meanings indicated for $R^{21}$ in formula IIA, and w and x each, independently of one another, denote 1 to 6.

Particular preference is given to LC media comprising at least one compound of the formula VII-9.

LC medium comprising one or more substances which contain a tetrahydronaphthyl or naphthyl unit, such as, for example, the compounds of the formulae N-1 to N-5,

N-1

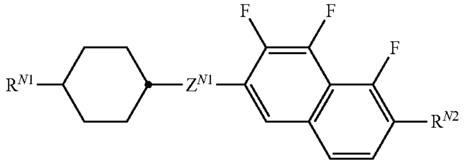

N-2

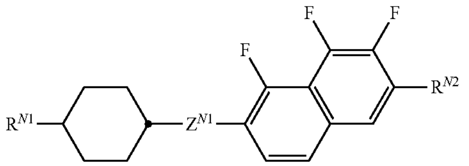

N-3

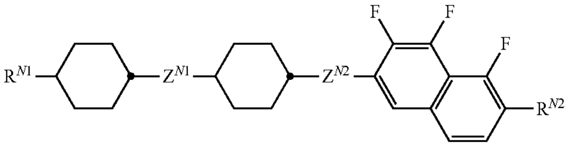

-continued

N-4

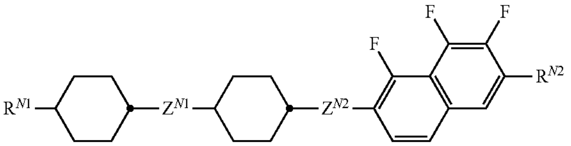

N-5

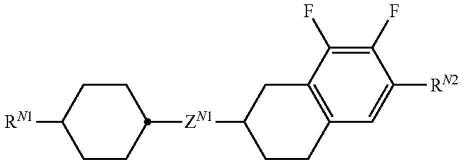

in which $R^{N1}$ and $R^{N2}$ each, independently of one another, have the meanings indicated for $R^{21}$, preferably denote straight-chain alkyl, straight-chain alkoxy or straight-chain alkenyl, and $Z^{N1}$ and $Z^{N2}$ each, independently of one another, denote $-C_2H_4-$, $-CH{=}CH-$, $-(CH_2)_4-$, $-(CH_2)_3O-$, $-O(CH_2)_3-$, $-CH{=}CHCH_2CH_2-$, $-CH_2CH_2CH{=}CH-$, $-CH_2O-$, $-OCH_2-$, $-COO-$, $-OCO-$, $-C_2F_4-$, $-CF{=}CF-$, $-CF{=}CH-$, $-CH{=}CF-$, $-CF_2O-$, $-OCF_2-$, $-CH_2-$ or a single bond.

LC medium comprising one or more indane compounds of the formula In,

In

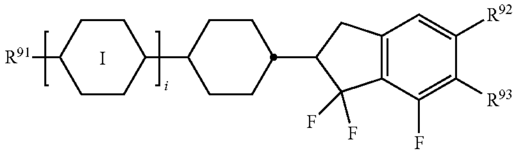

in which $R^{91}$, $R^{92}$, $R^{93}$ each, independently of one another, denote a straight-chain alkyl, alkoxy, alkoxyalkyl or alkenyl radical having 1 to 6 C atoms, or cyclic alkyl having 3 to 6 C atoms, $R^{92}$ and $R^{93}$ may also denote halogen, preferably F,

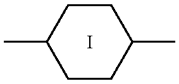

denotes

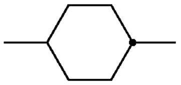 , 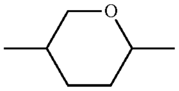 ,

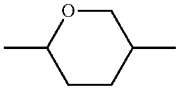 , 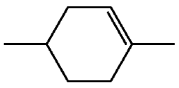 ,

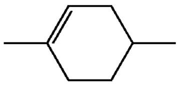 , 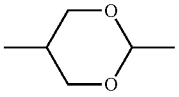 ,

-continued

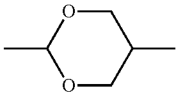 , 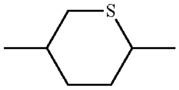 ,

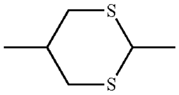 , 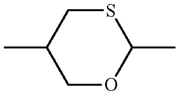 , i denotes 0, 1 or 2.

Preferred compounds of the formula In are the compounds of the formulae In-1 to In-16 indicated below:

In-1

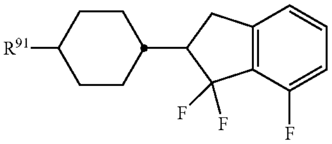

In-2

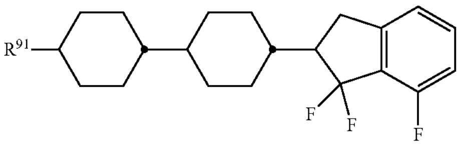

In-3

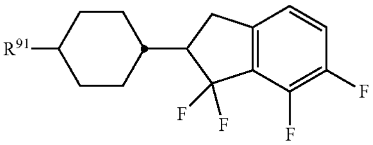

In-4

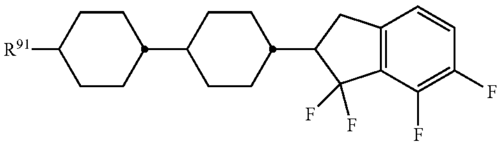

In-5

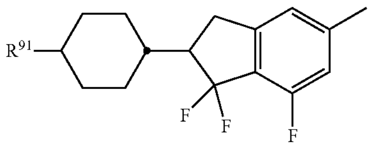

In-6

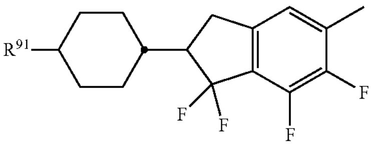

In-7

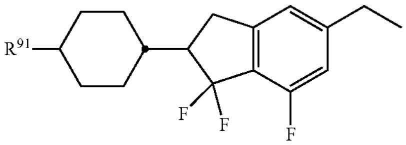

In-8

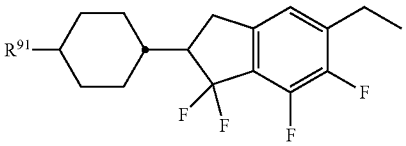

-continued

In-9

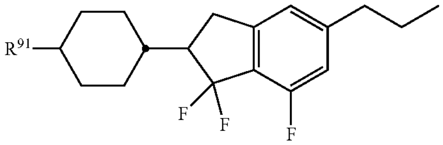

In-10

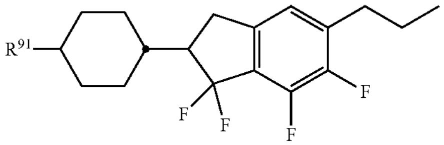

In-11

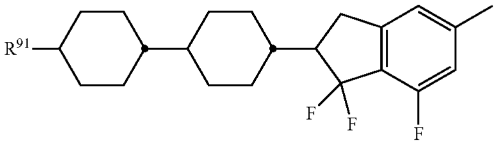

In-12

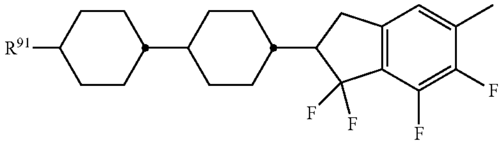

In-13

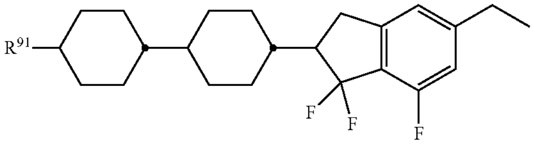

In-14

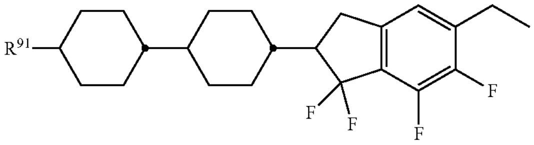

In-15

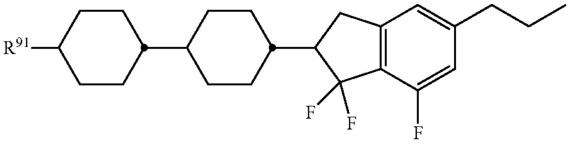

In-16

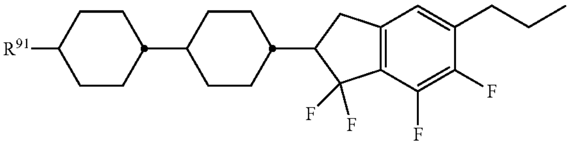

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

LC medium comprising one or more compounds of the formulae L-1 to L-8,

L-1

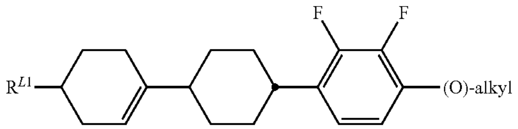

L-2

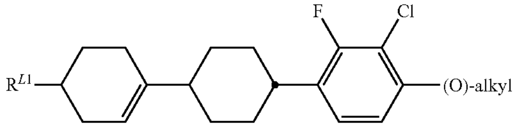

L-3

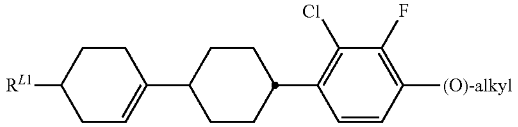

L-4

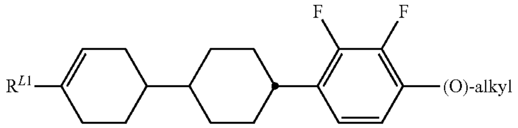

L-5

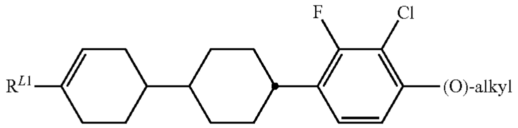

L-6

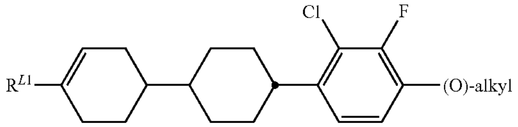

L-7

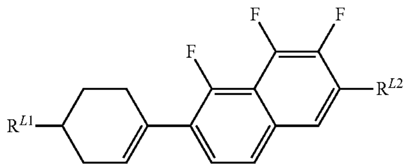

L-8

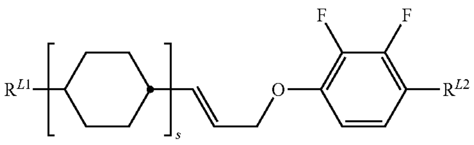

in which $R^{L1}$ and $R^{L2}$ each, independently of one another, have the meanings indicated for $R^{21}$ in formula IIA above, and alkyl denotes an alkyl radical having 1 to 6 C atoms. The parameter s denotes 1 or 2.

The compounds of the formulae L-1 to L-8 are preferably employed in concentrations of 5 to 15% by weight, in particular 5 to 12% by weight and very particularly preferably 8 to 10% by weight.

LC medium comprising one or more quaterphenyl compounds selected from the following formula:

Q

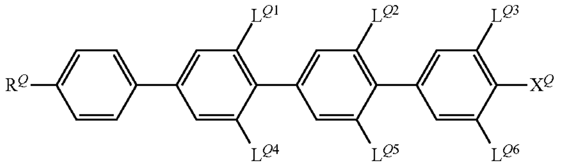

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $LQ^1$ and $LQ^2$ are F.

Preferred compounds of formula Q are those wherein $X^Q$ denotes F or $OCF_3$, very preferably F.

The compounds of formula Q are preferably selected from the following subformulae

Q1

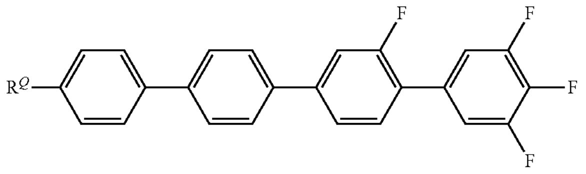

Q2

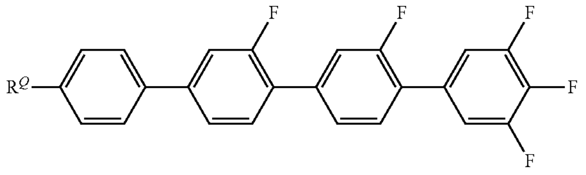

wherein $R^Q$ as one of the meanings of formula Q or one of its preferred meanings given above and below, and is preferably ethyl, n-propyl or n-butyl.

Especially preferred are compounds of formula Q1, in particular those wherein $R^Q$ is n-propyl or cyclopentyl.

Preferably the proportion of compounds of formula Q in the LC medium is from >0 to ≤55% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC mixture of a polymerisable LC medium enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_{\parallel}$ and $\varepsilon_{\perp}$, and in particular enables to achieve a high value of the dielectric constant $\varepsilon_{\parallel}$ while keeping the dielectric anisotropy $\Delta\varepsilon$ constant, thereby reducing the kick-back voltage and reducing image sticking.

The LC medium according to the invention preferably comprises one or more compounds of formula I or its subformulae, preferably of formula 1-1, preferably in a proportion from 2 to 30%, very preferably from 5 to 20%, most preferably from 8 to 12% by weight, based on the mixture as a whole;

and/or one or more compounds of formula III, preferably of formula III-1 and/or III-6, very preferably of formula III-1-1 and/or III-6-2, wherein formula III-1 preferably in a total concentration in the range of 2 to 20%, very preferably 7 to 14% by weight, based on the mixture as a whole; wherein formula III-6 preferably in a total concentration in the range of 2 to 20%, very preferably 8 to 12% by weight, based on the mixture as a whole;

and/or one or more compounds of formula IIIA, preferably of formula IIIA-1, very preferably of formula IIIA-1-6, preferably in a total concentration in the range of 2 to 8%, very preferably 3 to 5% by weight, based on the mixture as a whole;

and/or one or more compounds of formula BC, or its subformulae, preferably in a total concentration in the range of from 0.1 to 10%, more preferably from 1 to 7%, very preferably from 1 to 4% by weight, based on the mixture as a whole;

and/or one or more compounds of formula PH-1, or its subformulae, preferably in a total concentration in the range of from 0.1 to 10%, more preferably from 1 to 7%, very preferably from 1 to 4% by weight, based on the mixture as a whole;

and/or one or more compounds of formula II, or its subformulae, preferably of formula IIA, IIB, IIC, IID, IIE, and IIF, preferably in a total concentration in the range of from 20 to 70%, more preferably from 25 to 65%, particularly preferably from 30 to 65%, based on the mixture as a whole.

and/or one or more compounds of formula IV, or its subformulae, preferably of formula IV-1, IV-3, and IVa-2, preferably in a total concentration in the range of 10 to 60%, more preferably 13 to 55%, particularly preferably 15 to 50% by weight, based on the mixture as a whole;

and/or one or more compounds of formula V, or its subformulae, preferably of formula V-10, preferably in a total concentration in the range of 0.1 to 30%, more preferably 0.5 to 25%, particularly preferably 1 to 15% by weight, based on the mixture as a whole;

and/or one or more compounds of formula VI, or its subformulae, preferably of formula VI-1, preferably in a total concentration in the range of 0.5 to 20%, more preferably 0.75 to 15%, particularly preferably 1 to 10% by weight, based on the mixture as a whole;

Further preferred embodiments are listed below, where the acronyms used are explained in Table B, wherein n and m are, independently of one another, each an integer from 1 to 7:

one or more compounds of PUS-n-m, preferably in a proportion from 2 to 30%, very preferably from 5 to 20%, most preferably from 8 to 12% by weight, based on the mixture as a whole;

and/or one or more compounds of B(S)-nO-Om, in particular B(S)-2O-O4, B(S)-2O-O5, B(S)-2O-O6, preferably in a total concentration in the range of from 2 to 20%, more preferably from 7 to 14% by weight, based on the mixture as a whole;

and/or one or more compounds of COB(S)-n-Om, in particular COB(S)-2-O4, preferably in a total concentration in the range of from 2 to 20%, more preferably from 8 to 12% by weight, based on the mixture as a whole;

and/or one or more compounds of B-nO-Om, in particular B-2O-O5, preferably in a total concentration in the range of 2 to 8%, very preferably 3 to 5% by weight, based on the mixture as a whole;

and/or one or more compounds B(P)-nO-Om, in particular B(P)-2O-O3, and/or B(P)-2O-O4, preferably in a total concentration in the range of from 0.1 to 10%, more preferably from 1 to 7%, very preferably from 1 to 4% by weight, based on the mixture as a whole;

and/or one or more compounds B(A)-nO-Om, in particular B(A)-2O-O2, preferably in a total concentration in the range of from 0.1 to 10%, more preferably from 1 to 7%, very preferably from 1 to 4% by weight, based on the mixture as a whole;

and/or one or more compounds Y-nO-Om, CY-n-Om, CPY-n-Om, CCY-n-Om, CCY-Vn-Om, CLY-n-Om, CLOY-n-Om, LOY-n-Om, COY-n-Om, CCOY-n-Om, CCEY-n-Om, PY-n-Om, PYP-n-m, and/or CAIY-n-Om, in particular Y-4O-O4, CY-3-O2, CPY-3-O2, CCY-3-O2, CCY-5-O2, CLY-3-O2, CLY-3-O3, CLY-4-O2, CLY-5-O2, CLOY-3-O2, LOY-3-O2, PYP-2-3, PYP-2-4, and/or CAIY-3-O2, preferably in a total concentration in the range of from 20 to 70%, more preferably from 25 to 65% by weight, based on the mixture as a whole;

and/or one or more compounds CC-n-m, CC-n-V, CC-n-Vm, and/or CP-n-Om, preferably CC-3-4, CC-3-5, CC-3-V, CC-3-V1, CC-4-V1, and/or CP-3-O2, preferably in a total concentration in the range of from 10 to 60%, more preferably from 13 to 55%, particularly preferably from 15 to 50%, based on the mixture as a whole;

and/or one or more compounds CY-n-Om, in particular CY-3-O4, CY-5-O4 and/or CY-3-O2, preferably in a total concentration in the range of from 5% to 30%, preferably 10% to 20%, based on the mixture as a whole;

and/or one or more compounds PY-n-Om, and/or PY-nO-Om, in particular PY-1-O2, PY-2-O2 and/or PY-3-O2, preferably in a total concentration in the range of from 5% to 40%, preferably 10% to 30%, based on the mixture as a whole;

and/or one or more compounds CPY-n-Om, and/or CPY-Vn-m, in particular CPY-2-O2, CPY-3-O2 and/or CPY-5-O2, preferably in concentrations >5%, in particular 7% to 20%, based on the mixture as a whole, and/or one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;

and/or one or more compounds CPY-n-Om and CY-n-Om, preferably in concentrations of 10 to 80%, based on the mixture as a whole, and/or one or more compounds CPY-n-Om and PY-n-Om, preferably CPY-2-O2 and/or CPY-3-O2 and PY-3-O2 or PY-1-O2, preferably in concentrations of 5 to 20%, more preferably 10 to 15%, based on the mixture as a whole, and/or one or more compound(s) selected from the group consisting of CCH—13, CCH—23, CCH—24, CCH—25, CCH—34, CCH—35, CCH—301 and CCH—303, preferably in a total concentration of 3 to 40%, preferably 3 to 25% based on the mixture as a whole, and/or one or more compounds selected from the group consisting of CC-2-V1, CC-3-V1, CC-3-V2, CC-4-V1, CC-3-V, CC-4-V and CC-5-V, preferably in a total concentration of 3 to 40%, more preferably from 5% to 30% based on the mixture as a whole, and/or one or more compound(s) CCP-n-m and/or CCP-Vn-m and/or CPP-n-m, preferably selected from the group consisting of CCP-3-1, CCP-V-1, CCP-V2-1 and CPP-3-2, preferably in a total concentration of 4 to 35%, preferably 5 to 25% based on the mixture as a whole, and/or one or more compound(s) CLP-n-m, CLP-n-Om and/or CLP-Vn-m, preferably selected from the group consisting of CLP-3-1, CLP-3-2, CLP-3-O1, CLP-3-O2 and CLP-V-1, preferably in a total concentration of 1 to 25%, preferably 2 to 15% based on the mixture as a whole, and/or one or more compounds selected from the group consisting of PYP-n-m, PGIY-n-Om and PGP-n-2V, preferably in a total concentration of 2 to 20%, more preferably 2% to 15%, most preferably 2 to 10%, based on the mixture as a whole, and/or one or more compound(s) PP-n-m and/or PP-n-nVm, preferably selected from the group consisting of PP-1-3, PP-1-4, PP-1-5, PP-1-2V and PP-1-2V1, preferably in a total concentration of 1 to 15%, preferably 2 to 10% based on the mixture as a whole, and/or the compound PPGU-3-F, preferably in a concentration of 0.1% to 3% based on the mixture as a whole.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The LC medium according to the invention has a clearing temperature of 70° C. or more, preferably of 85° C. or more, e.g., from 85° C. to 125° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the LC medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.15. In a preferred embodiment of the present invention, the LC medium has a birefringence in the range from 0.075 to 0.147, preferably from 0.090 to 0.145, in particular from 0.1150 to 0.1420.

The liquid-crystal mixture according to the invention has a dielectric anisotropy Δε of −1.5 to −8.0, preferably of −2.6 to −6.0.

The rotational viscosity $\gamma_1$ at 20° C. is preferably ≤245 mPa·s, in particular ≤240 mPa·s. In a preferred embodiment, the rotational viscosity $\gamma_1$ at 20° C. is ≤215 mPa·s, in particular ≤200 mPa·s.

The liquid-crystal media according to the invention have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5 Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all FFS (_fringe field switching) and UB-FFS (Ultra Brightness FFS) applications having negative Δε. The LC media according to the invention are further suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilised VA). They are furthermore suitable for IPS (in-plane switching) applications having negative Δε.

The nematic LC media in the displays according to the invention generally comprise two components A and B, which themselves consist of one or more individual compounds.

Component A has significantly negative dielectric anisotropy and gives the nematic phase a dielectric anisotropy of ≤−0.5.

The proportion of component A is preferably between 45 and 100%, in particular between 60 and 85%.

For component A, one (or more) individual compound(s) which has (have) a value of Δε≤−1.5 is (are) preferably selected. This value must be more negative, the smaller the proportion A in the mixture as a whole.

Component B are dielectrically neutral compounds which has −1.5≤Δε≤1.5. Furthermore, component B has pronounced nematogeneity and a flow viscosity of not greater than 30 $mm^2 \cdot s^{-1}$, preferably not greater than 25 $mm^2 \cdot s^{-1}$, at 20° C.

A multiplicity of suitable materials is known to the person skilled in the art from the literature.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

Besides compounds of the formula I, compounds of the formula III, compounds of the formula IIIA, compounds of the formula BC, compounds of the formula PH-1, and the compounds of the formulae IIA, IIB, IIC, IID, IIE and IIF, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula R $R^{R1}$-L-G-E-$R^{R2}$ R in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH═CH— —N(O)═N—
—CH═CQ- —CH═N(O)—
—C≡C— —$CH_2$—$CH_2$—
—CO—O— —$CH_2$—O—
—CO—S— —$CH_2$—S—
—CH═N— —COO-Phe-COO—
—$CF_2$O— —CF═CF—
$OCF_2$— —$OCH_2$—
—$(CH_2)_4$— —$(CH_2)_3$O— or a C≡C single bond, Q denotes halogen, preferably chlorine, or —CN, and $R^{R1}$ and $R^{R2}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{R1}$ and $R^{R2}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, C and F have been replaced by the corresponding isotopes.

The LC medium has preferably a nematic LC phase.

The LC medium may also comprise one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox®1076. If stabilisers are employed, their proportion, based on the total amount of RMs or the polymerizable component (component A), is preferably 10-50,000 ppm, particularly preferably 50-5,000 ppm.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table C below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilisers.

Preferred stabilisers are selected from the compounds of formula H

H

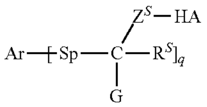

in which

Ar denotes an aromatic or heteroaromatic hydrocarbon group having 4 to 40 C atoms, preferably 6 to 30 C atoms;

Sp denotes a spacer group;

$R^S$ denotes H, alkyl having 1 to 12 C atoms or alkenyl having 2 to 12 C atoms;

$Z^S$ denotes —O—, —C(O)O—, —$(CH_2)_z$— or —$(CH_2)_z$O—, or a single bond;

HA denotes

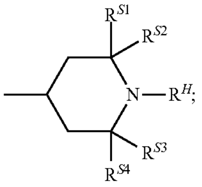

$R^H$ denotes H, $O^-$, $CH_3$, OH or $OR^S$, preferably H or $O^-$;

$R^{S1}$, $R^{S2}$, $R^{S3}$ and $R^{S4}$, identically or differently, denote alkyl having 1 to 6 C atoms, preferably having 1 to 3 C atoms, very preferably $CH_3$;

G denotes H or $R^S$ or a group $Z^S$-HA;

z is an integer from 1 to 6; and q is 3 or 4.

The compounds of formula H are described in EP3354710 A1 and EP3354709 A1.

Preferred compounds of formula H are selected from the formulae H-1, H-2 and H-3:

H-1

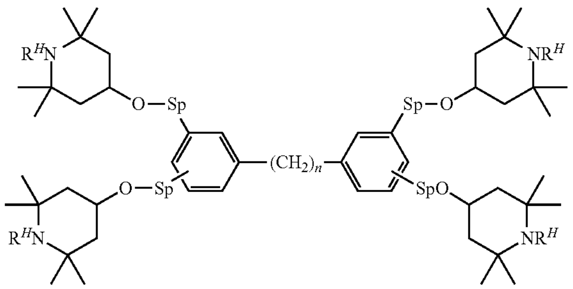

H-2

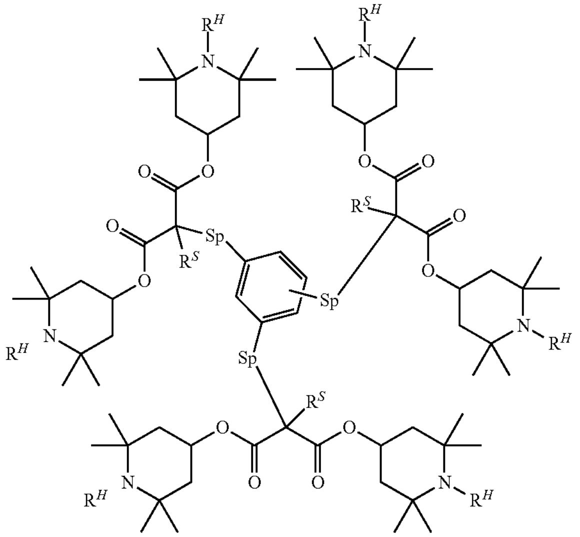

-continued

H-3

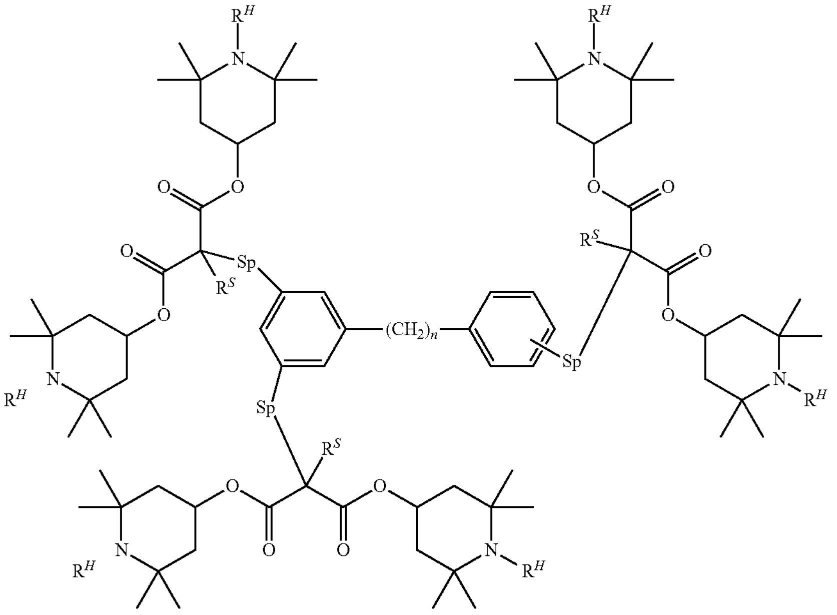

in which $R^H$ has the meanings given above and preferably denotes H or $O^-$, and n is an integer from 0 to 12, preferably 5, 6, 7, 8 or 9, very preferably 7, and Sp denotes a spacer group, preferably alkylene having 1 to 12 C atoms in which one or more non-adjacent —$CH_2$— groups may be replaced with —O—.

Preferred compounds of formula H-1 are those of formula H-1-1:

H-1-1

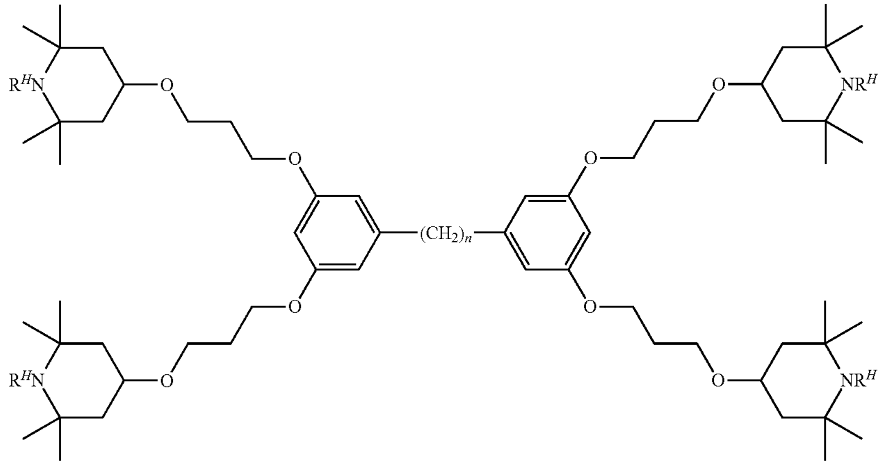

in which $R^H$ has the meanings given above and preferably denotes H or $O^-$, and n is an integer from 0 to 12, preferably 5, 6, 7, 8 or 9, very preferably 7.

Very preferred compounds of formula H-1-1 are those of formula H-1-1-1:

H-1-1-1

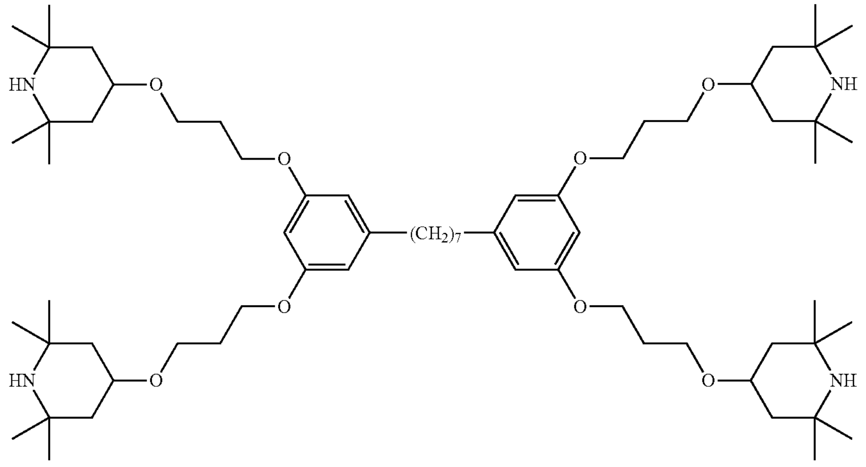

Preferred compounds of formula H-2 are those of formula H-2-1:

H-2-1

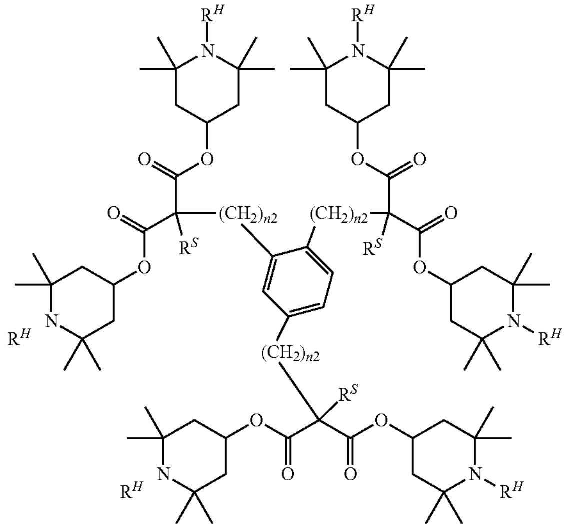

in which $R^H$ has the meanings given above and preferably denotes H or $O^-$, and n2, on each occurrence identically or differently, preferably identically, is an integer from 1 to 12, preferably 2, 3, 4, 5, or 6, very preferably 3, and $R^S$ on each occurrence identically or differently, preferably identically, denotes alkyl having 1 to 6 C atoms, preferably n-butyl.

Very preferred compounds of formula H-2-1 are those of formula H-2-1-1:

H-2-1-1

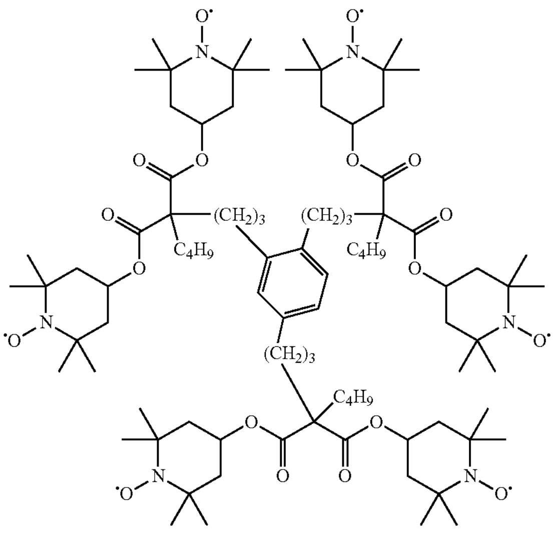

Preferred compounds of formula H-3 are selected from the formula H-3-1:

H-3-1
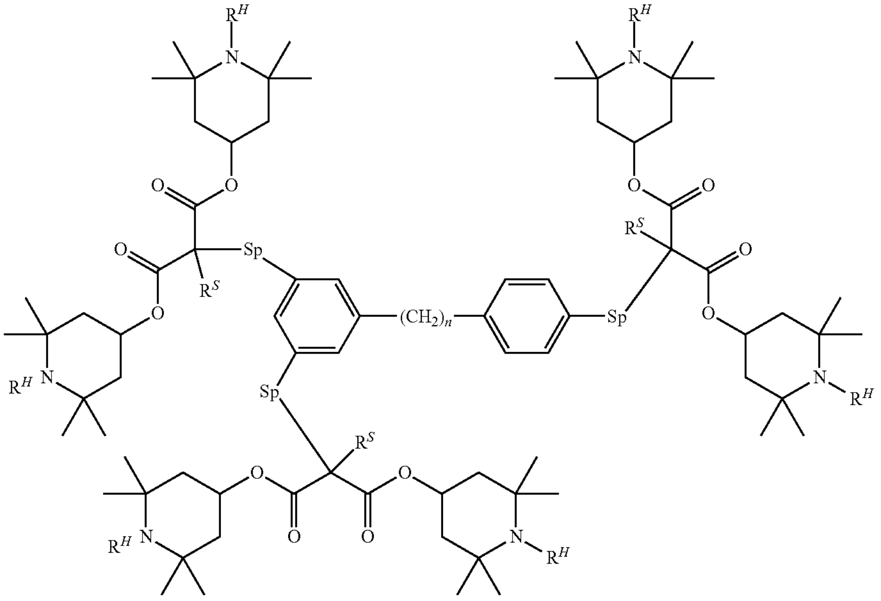
in which Sp and $R^H$ have the meanings given above and $R^H$ preferably denotes H or $O^-$, and n is an integer from 0 to 12, preferably 5, 6, 7, 8 or 9, very preferably 7.
Further preferred stabilisers are selected from the group consisting of the formulae ST-1 to ST-18:
ST-1
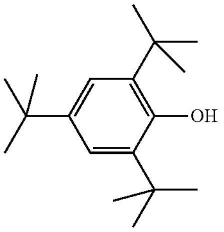
ST-2
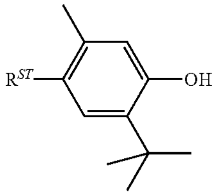
ST-3
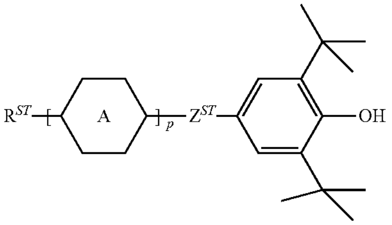
ST-4
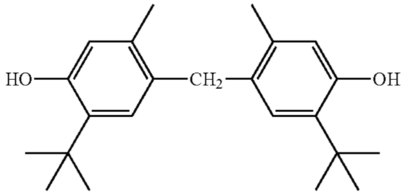
ST-5
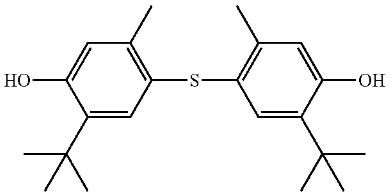
ST-6
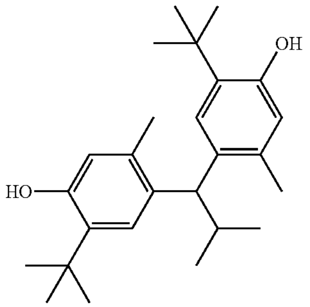

-continued
ST-7
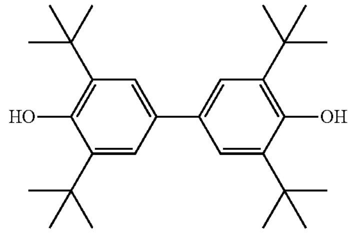
ST-8
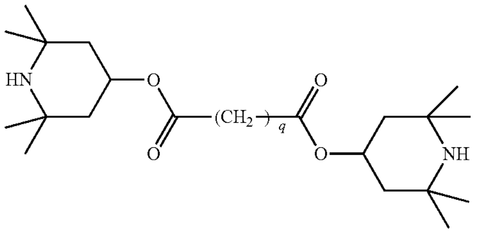
ST-9
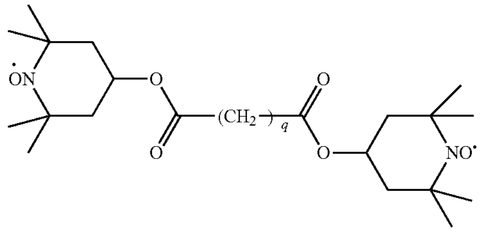
ST-10
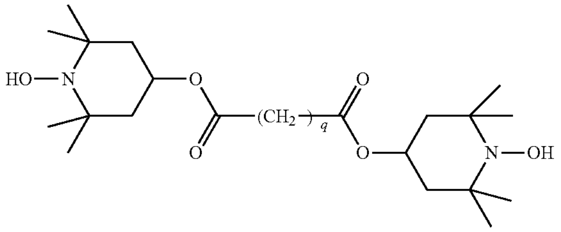
ST-11
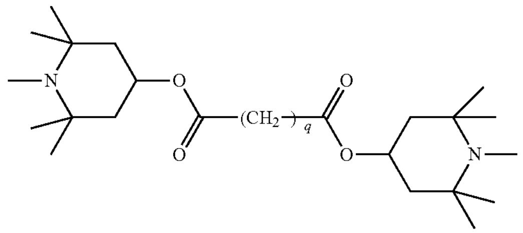
ST-12
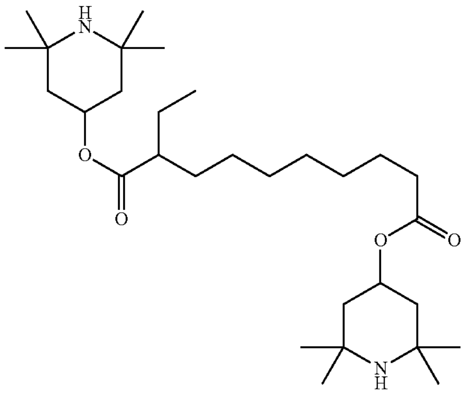
ST-13
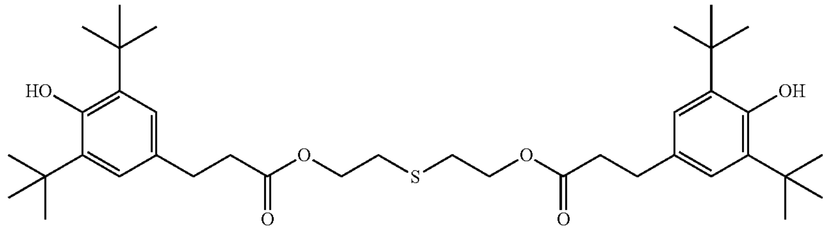
ST-14
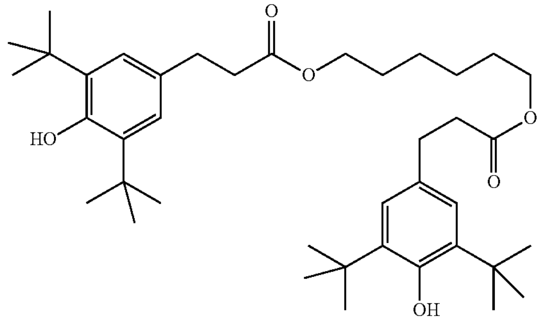
ST-15
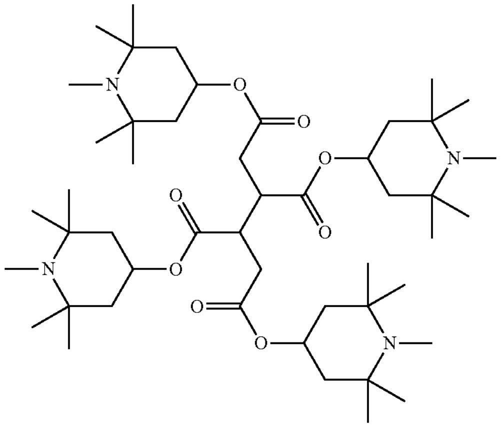

-continued

ST-16

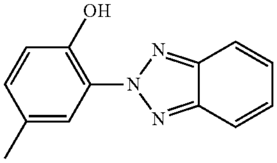

ST-17

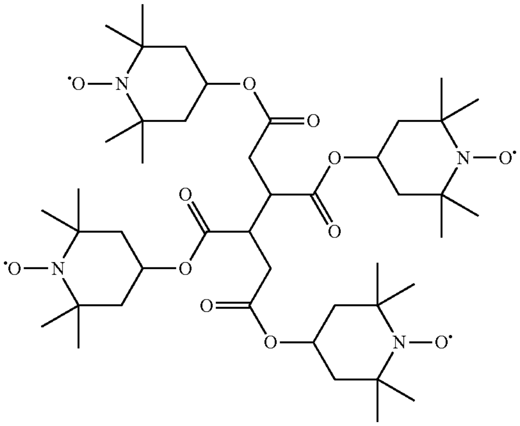

ST-18

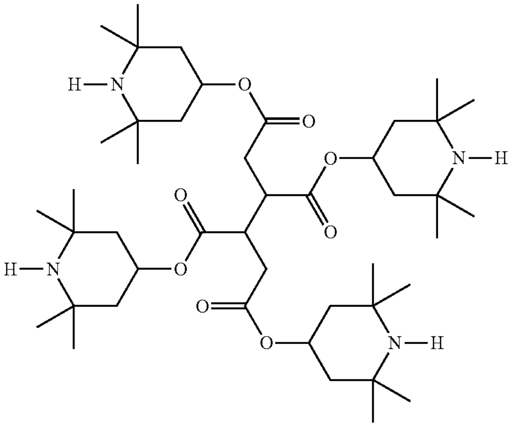

in which $R^{ST}$ denotes H, an alkyl or alkoxy radical having 1 to 15 C atoms, wherein, in addition, one or more $CH_2$ groups may each be replaced, independently of one another, by —C≡C—, —$CF_2O$—, —$OCF_2$—, —CH═CH—,

 , 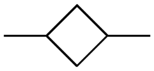 , 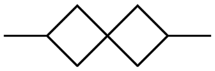 ,

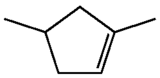 , 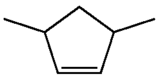 , 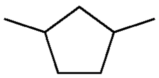 ,

—O—, —CO—O—, —O—CO— in such a way that O atoms are not linked directly to one another, and in which, in addition, one or more H atoms may be replaced by halogen,

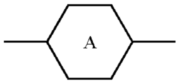 , on each occurrence, identically or differently, denotes

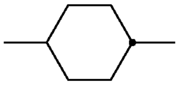 or 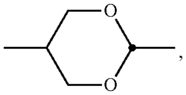 , $Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—, —$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CH_3$, $CF_3$ or $CHF_2$, p denotes 0, 1 or 2, q denotes 1, 2, 3, 4, 5, 6, 7, 8, 9 or 10.

Preferred compounds of formula ST are those selected from the formulae ST-1, ST-3, ST-8, ST-9, ST-12, ST-16, ST-17, and ST-18, and in particular:

ST-1
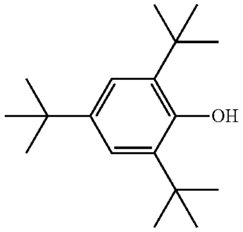
ST-3a
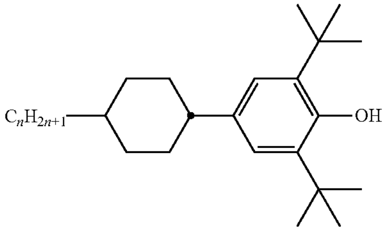
in which n=1, 2, 3, 4, 5, 6 or 7, preferably n=3
ST-3b
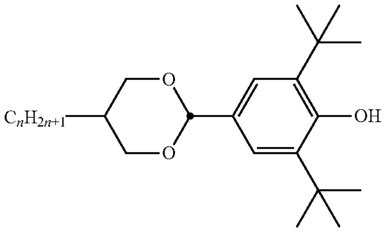
in which n=1, 2, 3, 4, 5, 6 or 7, preferably n=3
ST-3c
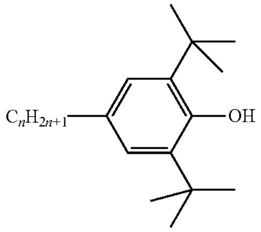
in which n=1, 2, 3, 4, 5, 6 or 7, preferably n=1 or 7
ST-8-1
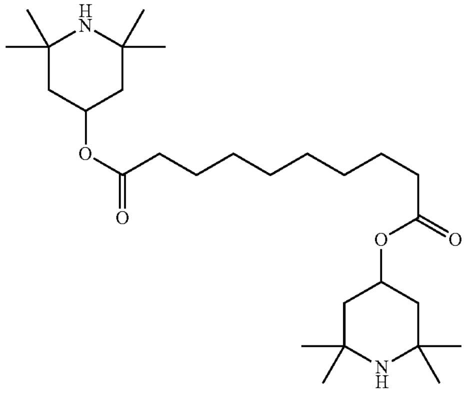
ST-9-1
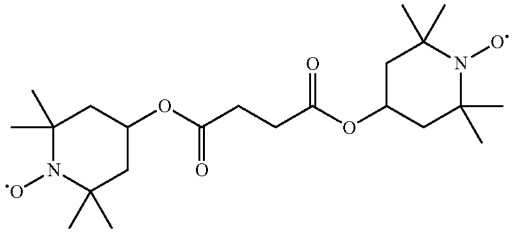
ST-11
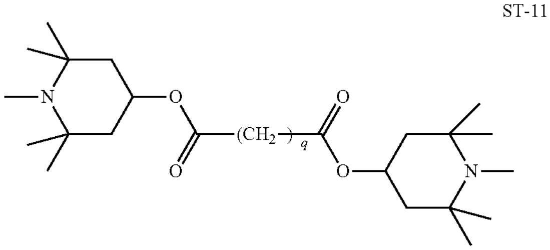
in which q=8.
ST-12
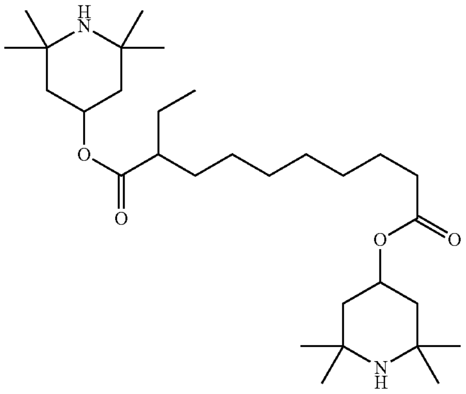
ST-16
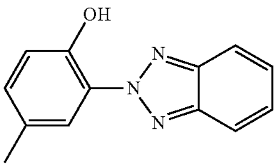

-continued
ST-17
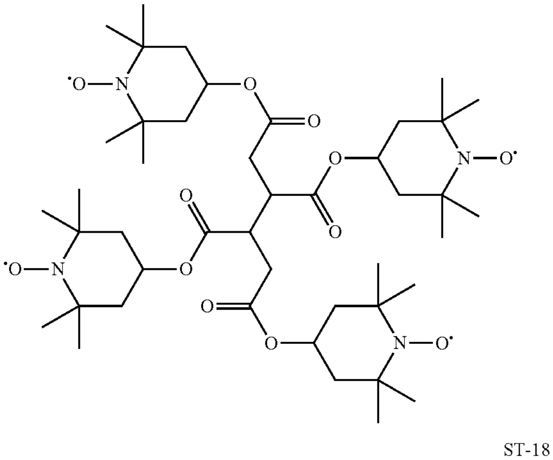
ST-18
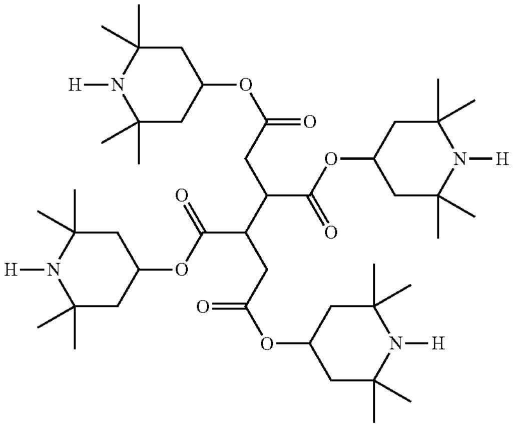
In the compounds of the formula ST-2a, n preferably denotes 7.
Very preferred stabilisers are selected from the group of the compounds of the formulae ST-2a-1, ST-3a-1, ST-3a-2, ST-3b-1, ST-3b-2, ST-3c-1, ST-7, ST-8-1, ST-9-1 and ST-12:
ST-3a-1
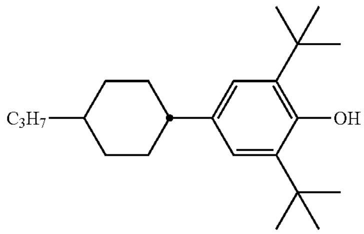
ST-3a-2
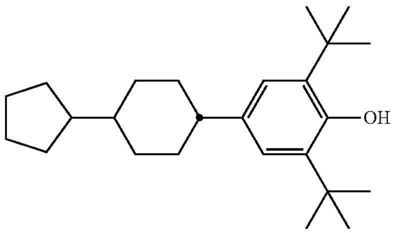
-continued
ST-3b-1
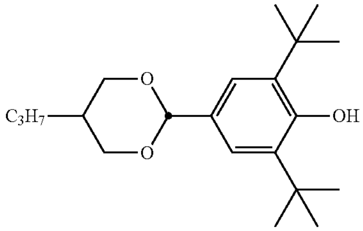
ST-3b-2
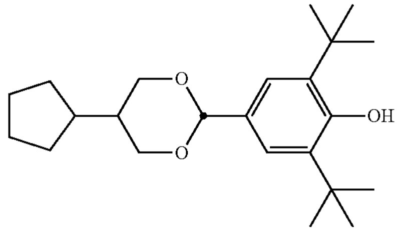
ST-3c-1
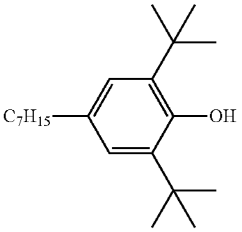
ST-7
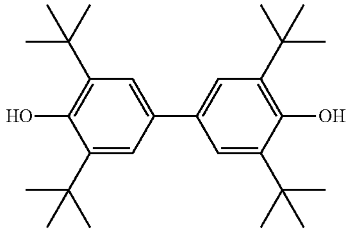
ST-8-1
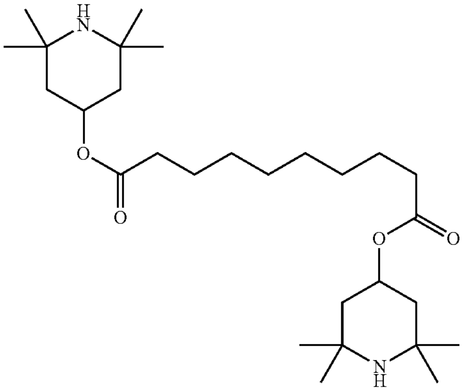
ST-9-1
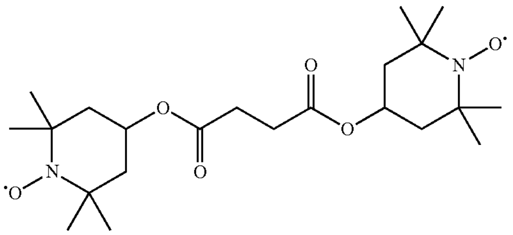

-continued

ST-12

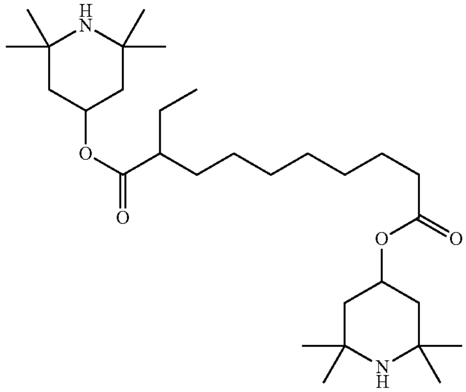

In another preferred embodiment the LC medium comprises one or more stabilisers selected from Table D below.

Preferably the proportion of stabilisers in the LC medium is from 10 to 500 ppm, very preferably from 20 to 100 ppm.

The LC medium according to the present invention may additionally comprise one or more further components or additives, preferably selected from the list including but not limited to co-monomers, chiral dopants, polymerization initiators, inhibitors, stabilisers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula IV are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

For the present invention and in the following examples, the structures of the liquid-crystal compounds are indicated by means of acronyms. Unless stated otherwise, the transformation into chemical formulae is done in accordance with Tables A.1 to A.3 below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A.1 shows the codes for the ring elements of the nuclei of the compound, Table A.2 lists the bridging units, and Table A.3 lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group.

TABLE A.1

| Ring elements | |
|---|---|
| C | 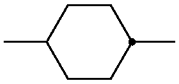 |
| D | 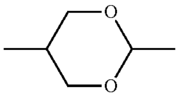 |
| DI | 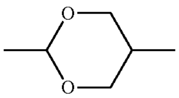 |
| A | 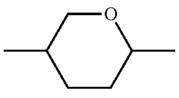 |
| AI | 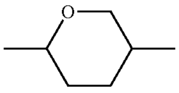 |
| P | 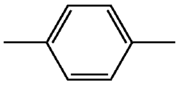 |
| G | 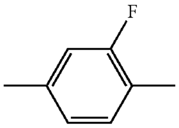 |

TABLE A.1-continued
| Ring elements | |
|---|---|
| GI | 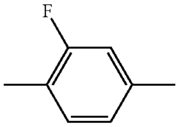 |
| U | 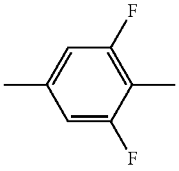 |
| UI | 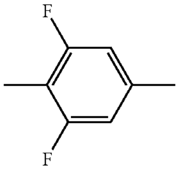 |
| Y | 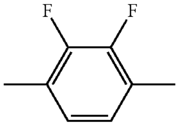 |
| P(F, CI)Y | 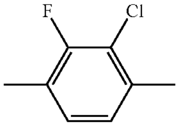 |
| P(Cl, F)Y | 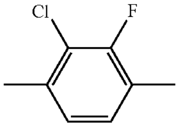 |
| np | 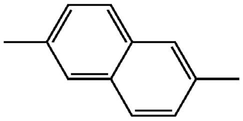 |
| n3f | 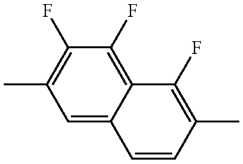 |
| nN3fl | 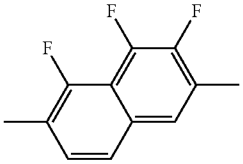 |
| th | 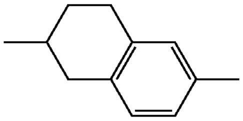 |
TABLE A.1-continued
| Ring elements | |
|---|---|
| thl | 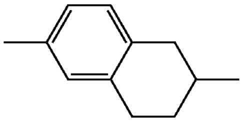 |
| tH2f | 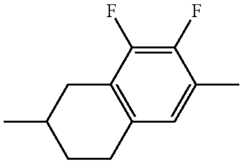 |
| tH2fl | 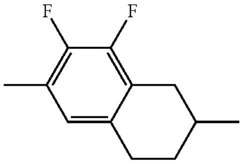 |
| o2f | 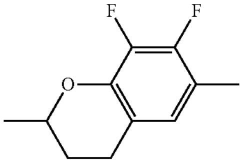 |
| o2fl | 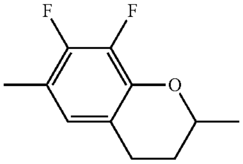 |
| dh | 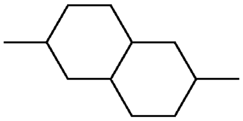 |
| nf | 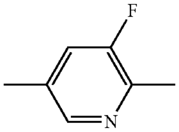 |
| B | 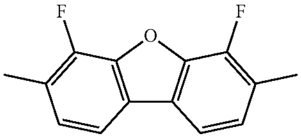 |
| B(S) | 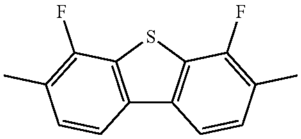 |
| O | 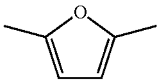 |
| S | 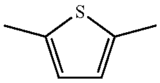 |

TABLE A.1-continued
| Ring elements | |
|---|---|
| K | 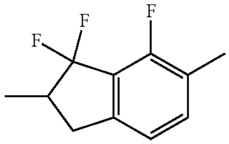 |
| KI | 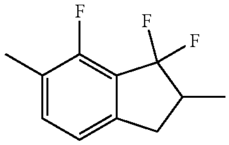 |
| L | 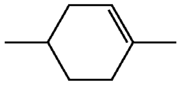 |
| LI | 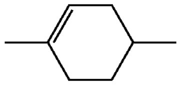 |
| F | 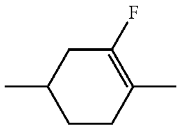 |
| Fl | 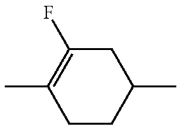 |
| Bh | 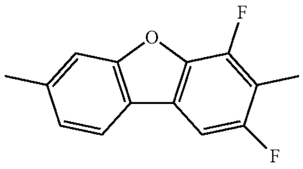 |
TABLE A.1-continued
| Ring elements | |
|---|---|
| Bh(S) | 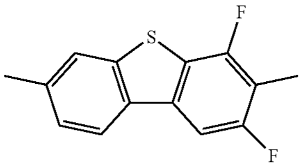 |
| Bf | 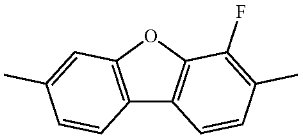 |
| Bf(S) | 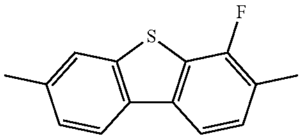 |
| Bfi | 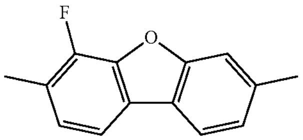 |
| Bfi(S) | 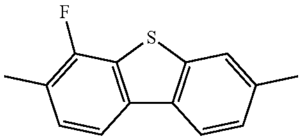 |
| B(P) | 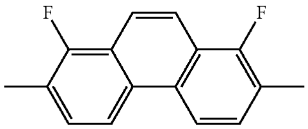 |
| B(A) | 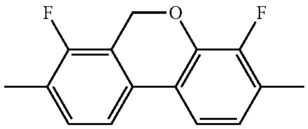 |
TABLE A.2
| Bridging units | | | |
|---|---|---|---|
| E | $-CH_2-CH_2-$ | | |
| V | $-CH{=}CH-$ | | |
| T | $-C{\equiv}C-$ | | |
| W | $-CF_2-CF_2-$ | | |
| B | $-CF{=}CF-$ | | |
| Z | $-CO-O-$ | ZI | $-O-CO-$ |
| X | $-CF{=}CH-$ | XI | $-CH{=}CF-$ |
| O | $-CH_2-O-$ | OI | $-O-CH_2-$ |
| Q | $-CF_2-O-$ | QI | $-O-CF_2-$ |

TABLE A.3

| End group— | | | |
|---|---|---|---|
| On the left individually or in combination | | On the right individually or in combination | |
| -n- | $C_nH_{2n+1}$— | -n | —$C_nH_{2n+1}$ |
| -no- | $C_nH_{2n+1}$—O— | -On | —O—$C_nH_{2n+1}$ |
| | | -m | —$C_mH_{2m+1}$ |
| | | -Om | —O—$C_mH_{2m+1}$ |
| —V— | $CH_2$=CH— | —V | —CH=$CH_2$ |
| -nV- | $C_nH2_{n+1}$—CH=CH— | -nV | —$C_nH_{2n}$—CH=$CH_2$ |
| -Vn- | $CH_2$=CH— $C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C≡— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| —A— | H—C≡C— | —A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| -(cn)- | 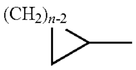 | -(cn) | 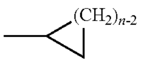 |
| -(cn)m- | 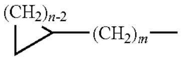 | -m(cn) | 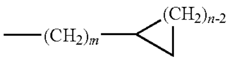 |
| On the left only in combination | | On the right only in combination | |
| - . . . n . . . - | —$C_nH_{2n}$— | - . . . n . . . - | —$C_nH_{2n}$— |
| | | - . . . m . . . - | —$C_mH_{2m}$— |
| - . . . M . . . - | —CFH— | - . . . M . . . - | —CFH— |
| - . . . D . . . - | —$CF_2$— | - . . . D . . . - | —$CF_2$— |
| - . . . V . . . - | —CH=CH— | - . . . V . . . - | —CH=CH— |
| - . . . Z . . . - | —CO—O— | - . . . Z . . . - | —CO—O— |
| - . . . ZI . . . - | —O—CO— | - . . . ZI . . . - | —O—CO— |
| - . . . K . . . - | —CO— | - . . . K . . . - | —CO— |
| - . . . W . . . - | —CF=CF— | - . . . W . . . - | —CF=CF— |
| - . . . O . . . - | —O— | - . . . O . . . - | —O— |

in which n and m are each integers, and the three dots " . . . " are placeholders for other abbreviations from this table.

Table B shows illustrative structures of compounds together with their respective abbreviations which are preferred co-compounds according to the claimed mixture concept of the present invention.

TABLE B

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

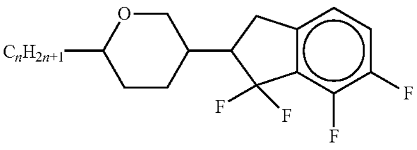

AIK-n-F

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

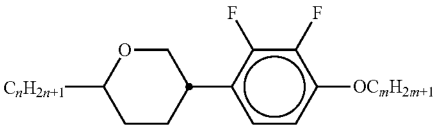

AIY-n-Om

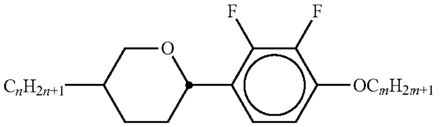

AY-n-Om

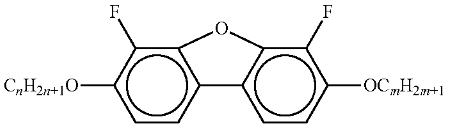

B-nO-Om

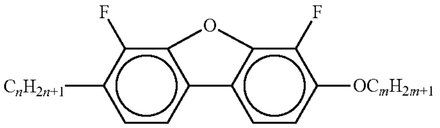

B-n-Om

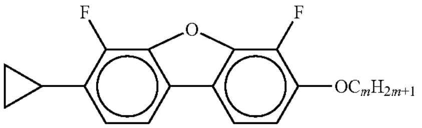

B-(c3)-Om

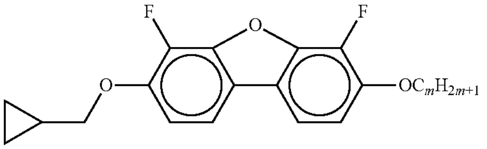

B-(c3)1O-Om

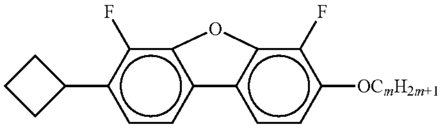

B-(c4)-Om

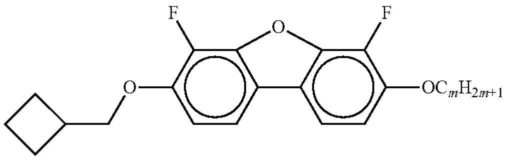

B-(c4)1O-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

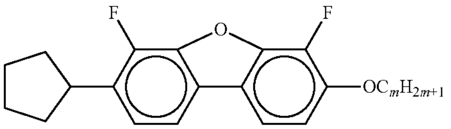

B-(c5)-Om

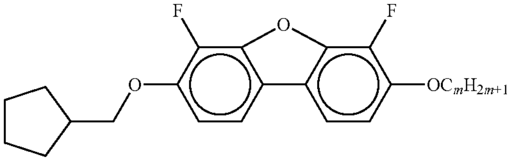

B-(c5)1O-Om

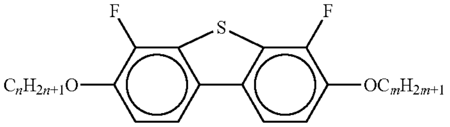

B(S)-nO-Om

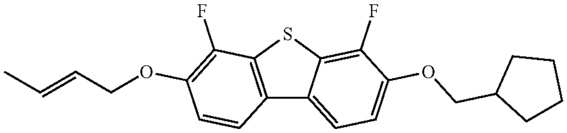 [SMILES: C/C=C/COc1ccc2c(sc3c(F)c(OCC4CCCC4)ccc32)c1F]

B(S)-1V1O-O1(c5)

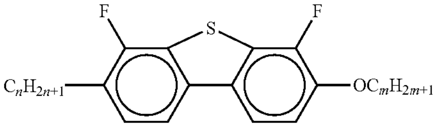

B(S)-n-Om

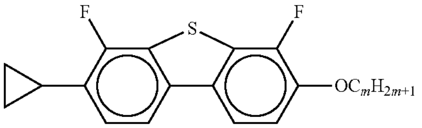

B(S)-(c3)-Om

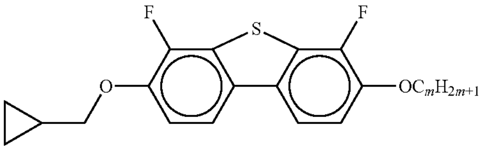

B(S)(c3)1O-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

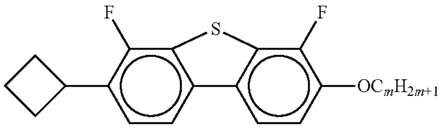

B(S)-(c4)-Om

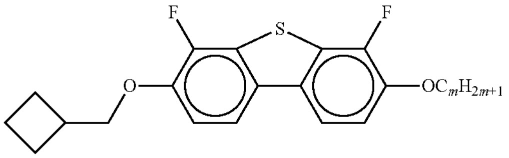

B(S)-(c4)1O-Om

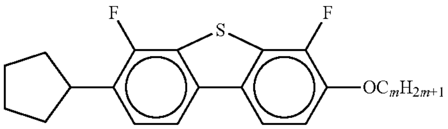

B(S)-(c5)-Om

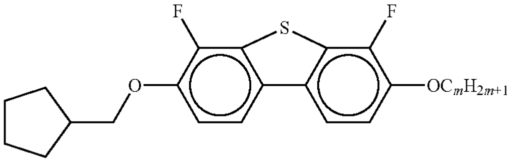

B(S)-(c5)1O-Om

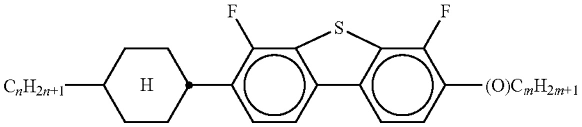

CB(S)-n-(O)m

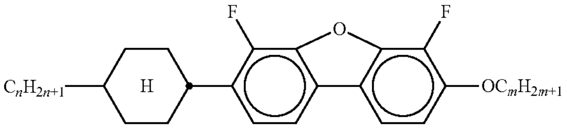

CB-n-m

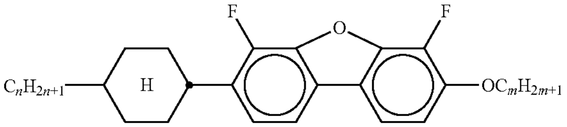

CB-n-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

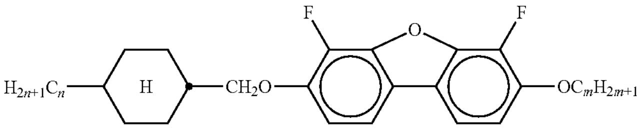

COB-n-Om

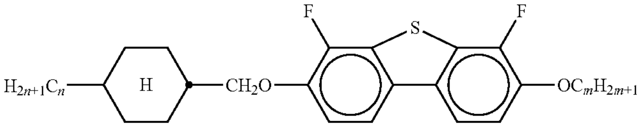

COB(S)-n-Om

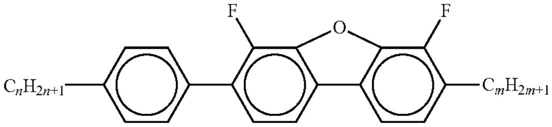

PB-n-m

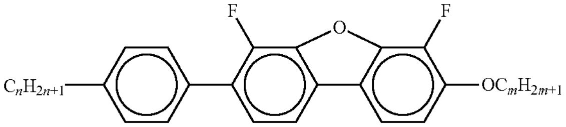

PB-n-Om

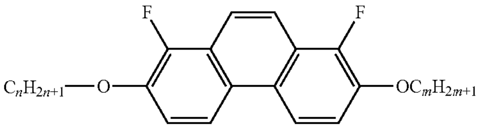

B(P)-nO-Om

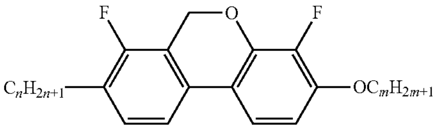

B(A)-nO-Om

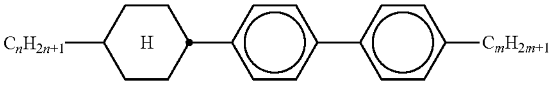

BCH-nm

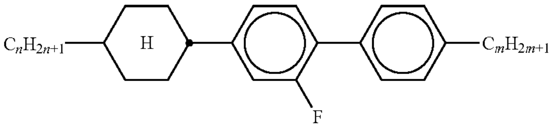

BCH-nmF

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

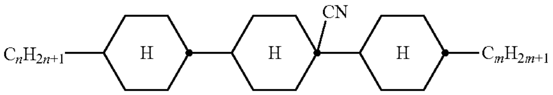

BCN-nm

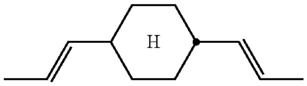

C-1V-V1

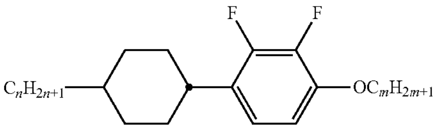

CY-n-Om

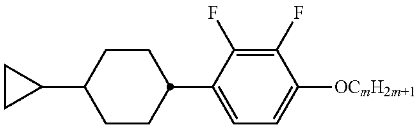

CY-(c3)-Om

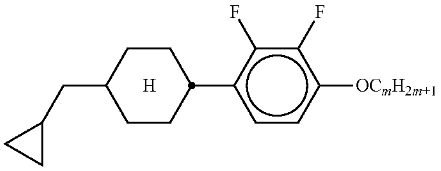

CY-(c3)1-Om

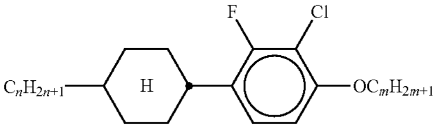

CY(F,Cl)-n-Om

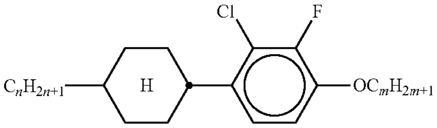

CY(Cl,F)-n-Om

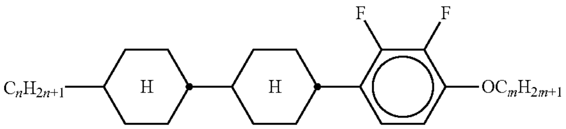

CCY-n-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

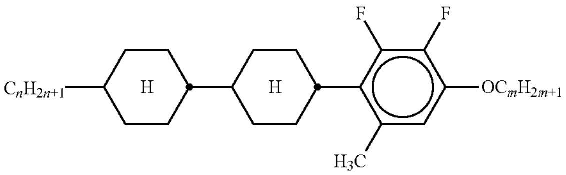

CC1Y-n-Om

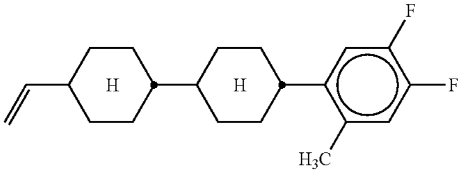

CC1G-V-F

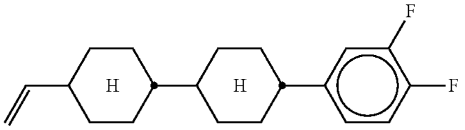

CCG-V-F

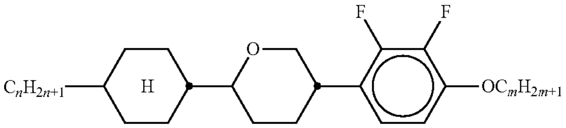

CAIY-n-Om

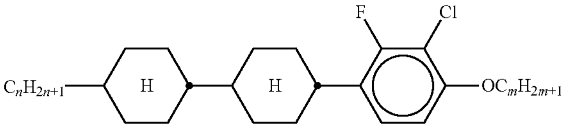

CCY(F,Cl)-n-Om

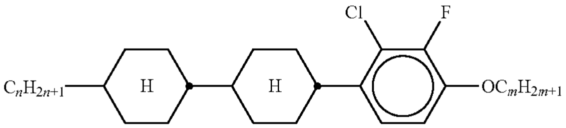

CCY(Cl,F)-n-Om

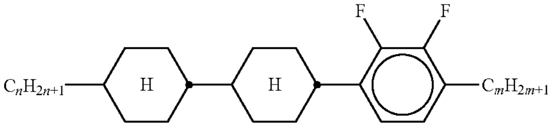

CCY-n-m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

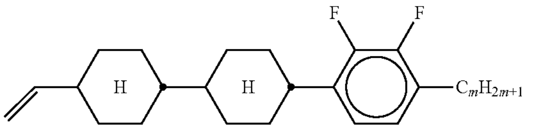

CCY-V-m

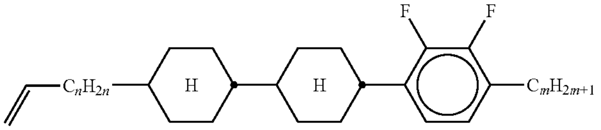

CCY-Vn-m

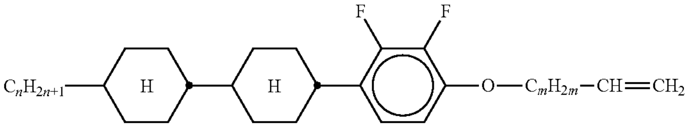

CCY-n-OmV

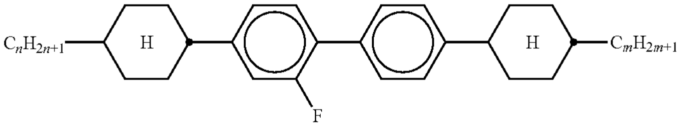

CGPC-n-m, CBC-nmF

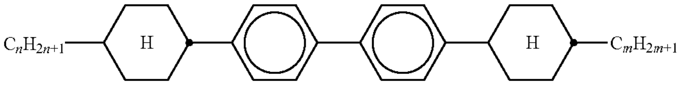

CPPC-n-m, CBC-nm

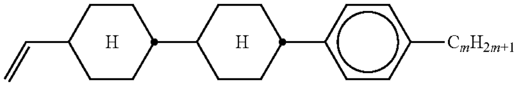

CCP-V-m

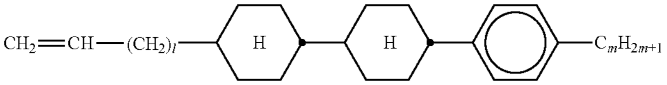

CCP-VI-m

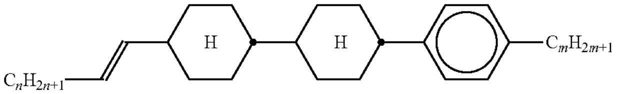

CCP-nV-m

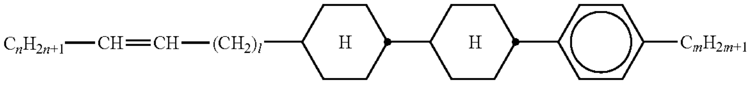

CCP-nVI-m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

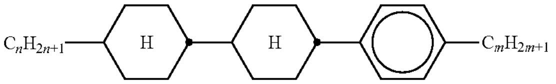

CCP-n-m

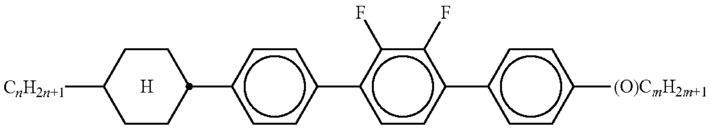

CPYP-n-(O)m

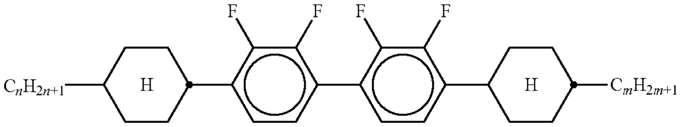

CYYC-n-m

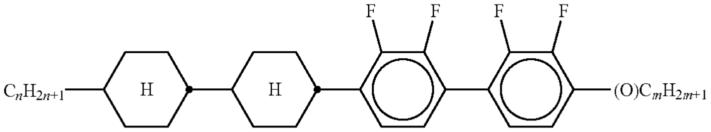

CCYY-n-(O)m

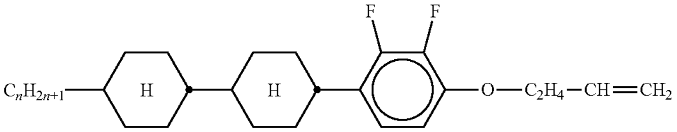

CCY-n-O2V

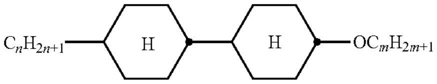

CCH-nOm, CC-n-Om

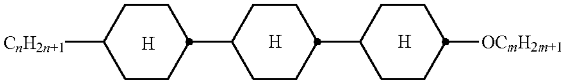

CCC-n-m

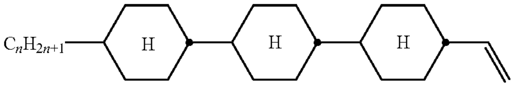

CCC-n-V

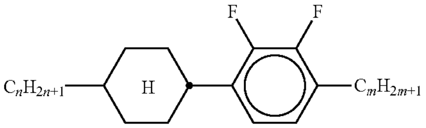

CY-n-m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

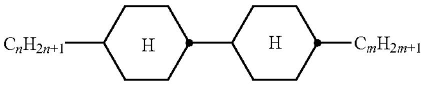

CCH-nm, CC-n-m

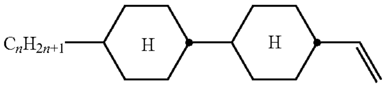

CC-n-V

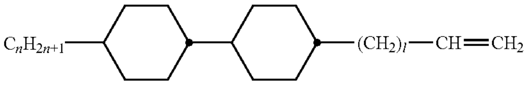

CC-n-IV

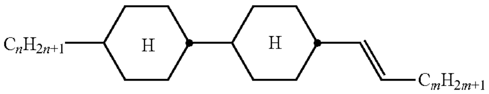

CC-n-Vm

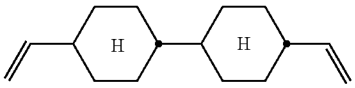

CC-V-V

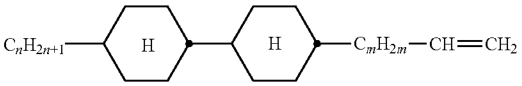

CC-n-mV

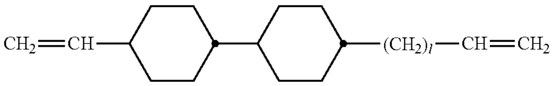

CC-V-IV

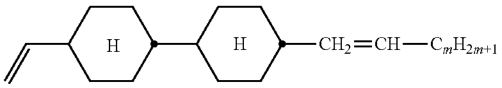

CC-V-Vm

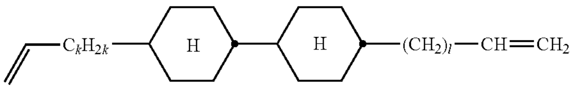

CC-Vk-IV

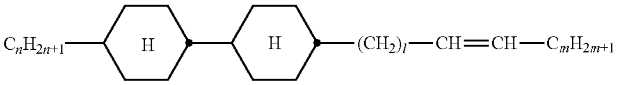

CC-n-IVm

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

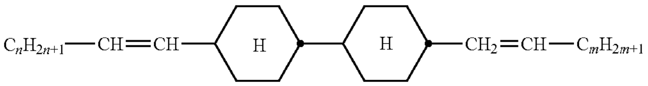

CC-nV-Vm

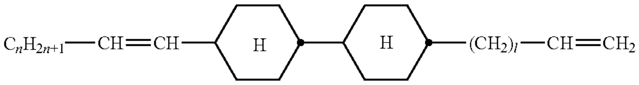

CC-nV-IV

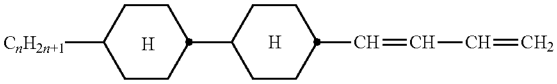

CC-n-VV

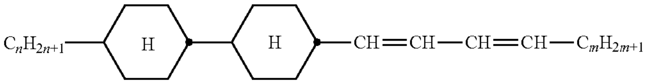

CC-n-VVm

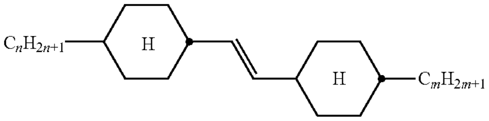

CVC-n-m

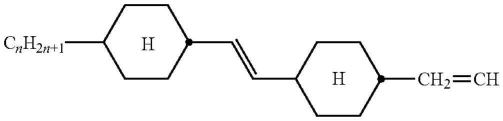

CVC-n-V

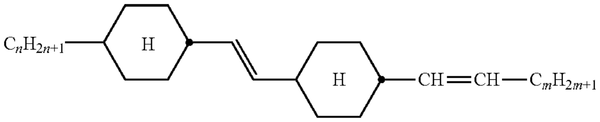

CVC-n-Vm

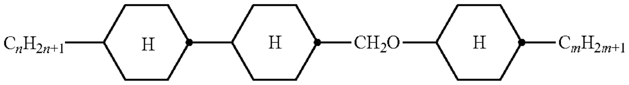

CCOC-n-m

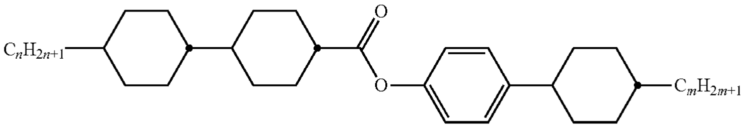

CCZPC-n-m

TABLE B-continued

| |
|---|
| In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$. |

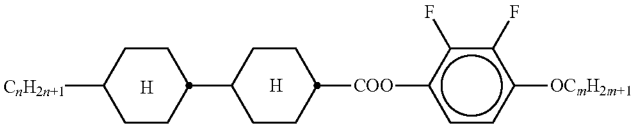

CCZY-n-Om, CP-nOmFF

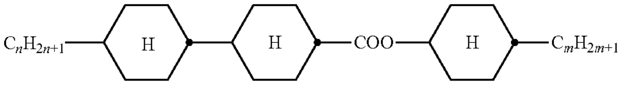

CCZC-n-m, CH-nm

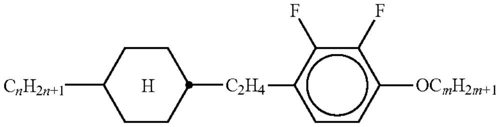

CEY-n-Om

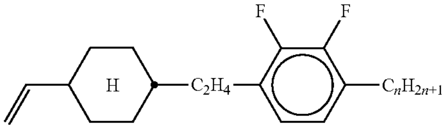

CEY-V-n

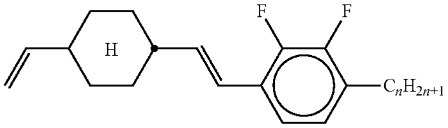

CVY-V-n

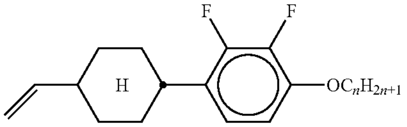

CY-V-On

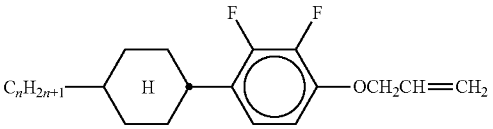

CY-n-O1V

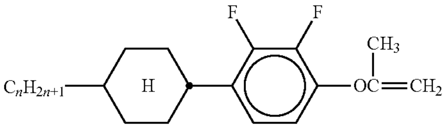

CY-n-OC($CH_3$)=$CH_2$

TABLE B-continued

| In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$. |
|---|
| 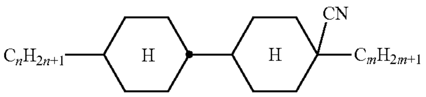 |
| CCN-nm |
| 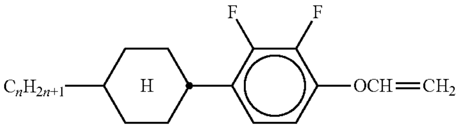 |
| CY-n-OV |
| 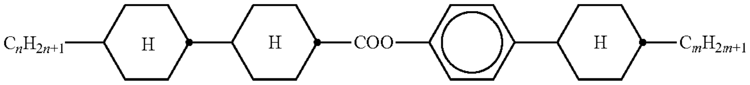 |
| CCPC-nm |
| 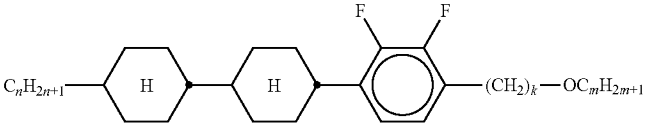 |
| CCY-n-kOm |
| 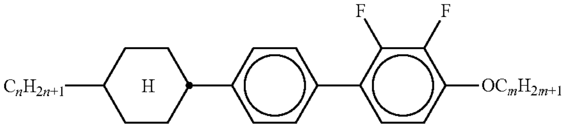 |
| CPY-n-Om |
| 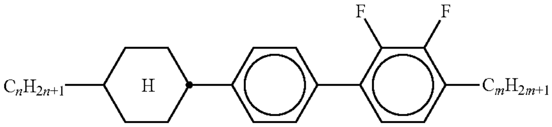 |
| CPY-n-m |
| 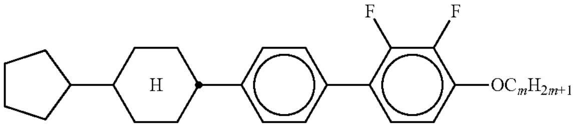 |
| CPY-(c5)-Om |
| 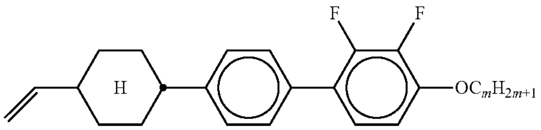 |
| CPY-V-Om |

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

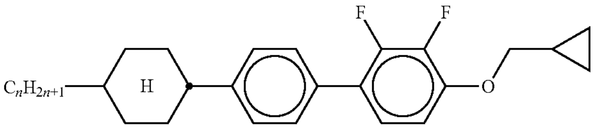

CPY-n-O1(c3)

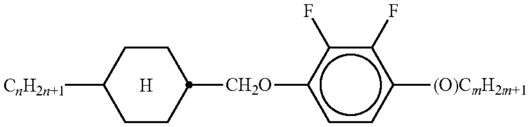

CQY-n-(O)m

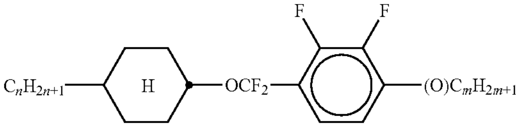

CQIY-n-(O)m

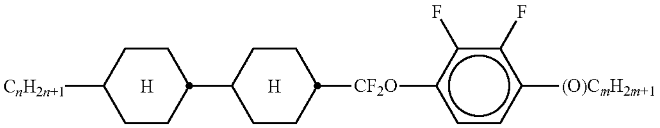

CCQY-n-(O)m

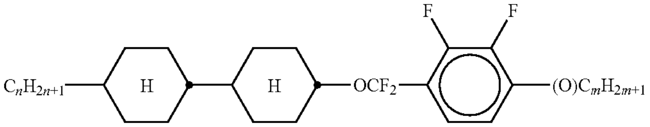

CCQIY-n-(O)m

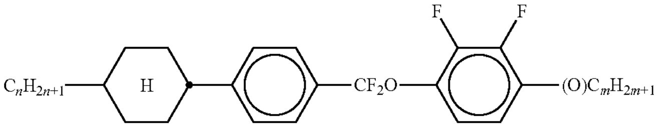

CPQY-n-(O)m

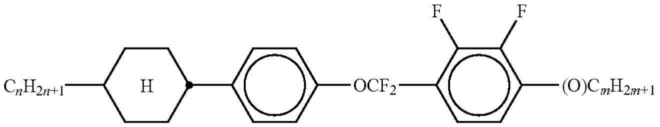

CPQIY-n-(O)m

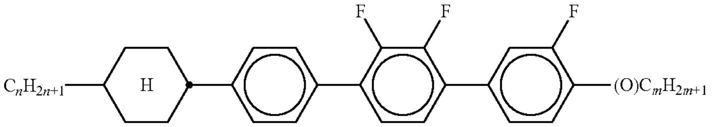

CPYG-n-(O)m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

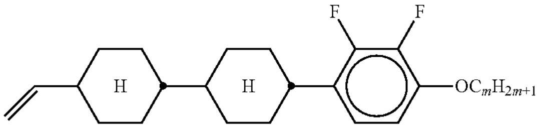

CCY-V-Om

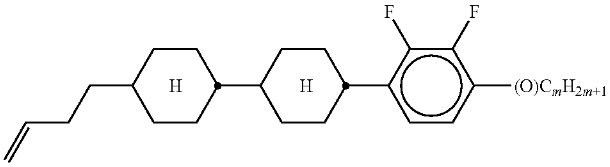

CCY-V2-(O)m

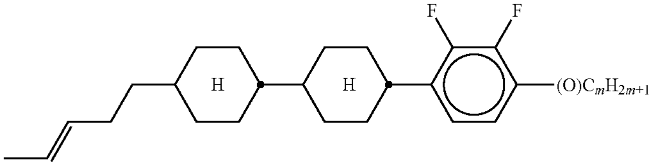

CCY-1V2-(O)m

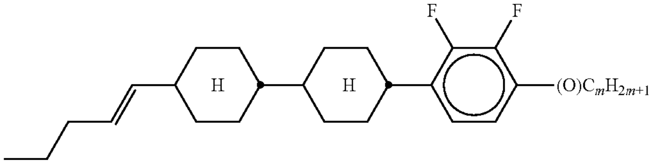

CCY-3V-(O)m

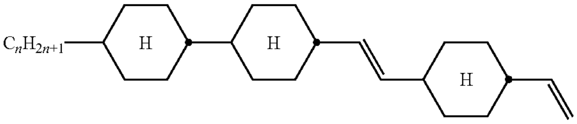

CCVC-n-V

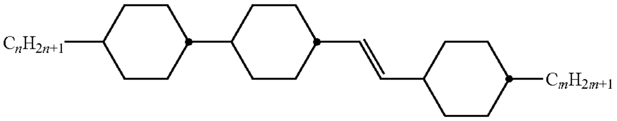

CCVC-n-m

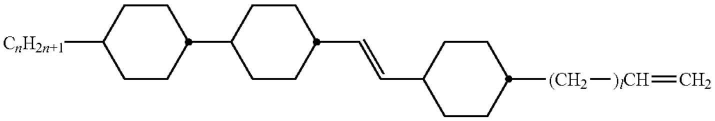

CCVC-n-IV

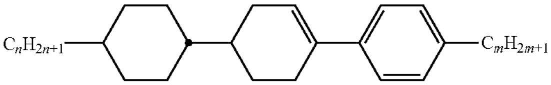

CLP-n-m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

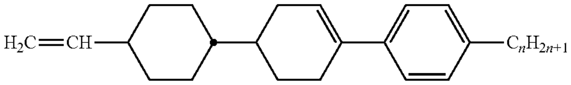

CLP-V-n

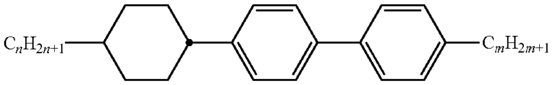

CPP-n-m

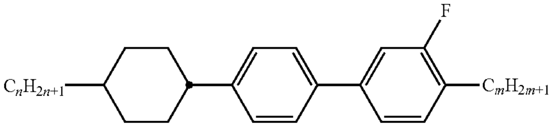

CPG-n-m

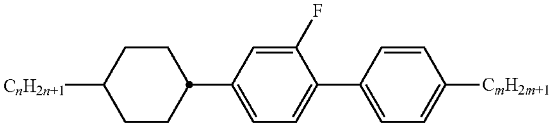

CGP-n-m

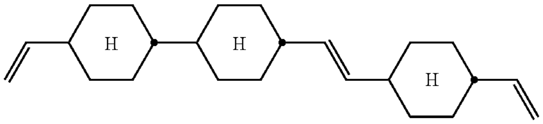

CCVC-V-V

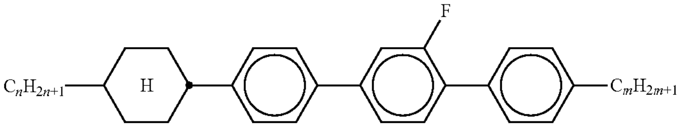

CPGP-n-m

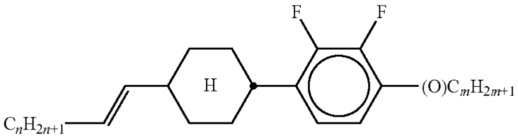

CY-nV-(O)m

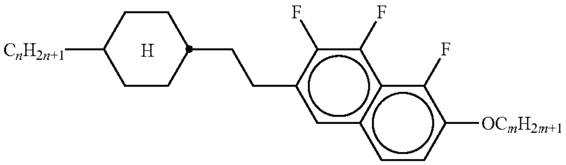

CENaph-n-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

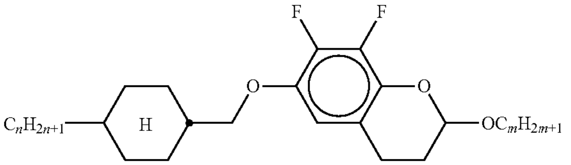

COChrom-n-Om

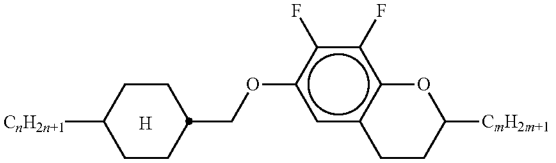

COChrom-n-m

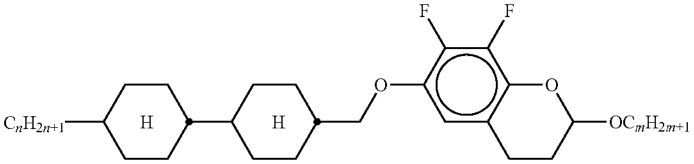

CCOChrom-n-Om

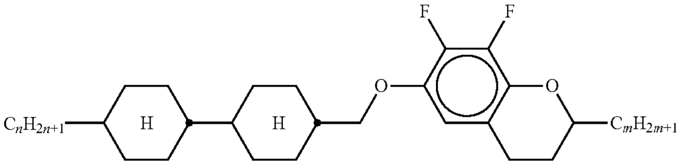

CCOChrom-n-m

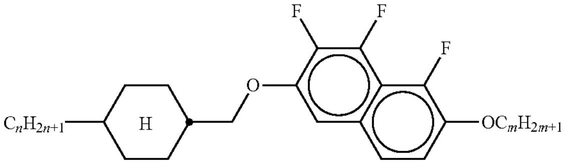

CONaph-n-Om

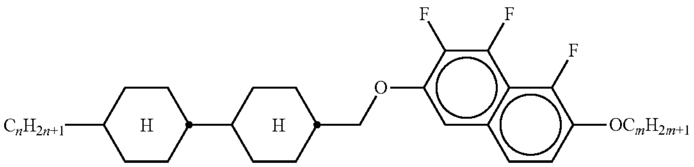

CCONaph-n-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

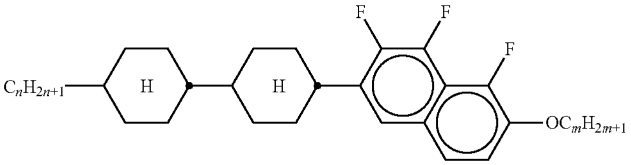

CCNaph-n-Om

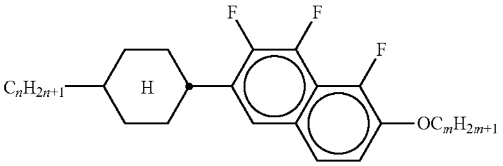

CNaph-n-Om

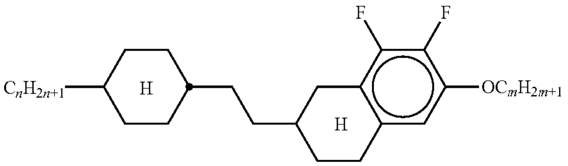

CETNaph-n-Om

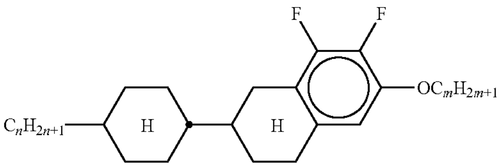

CTNaph-n-Om

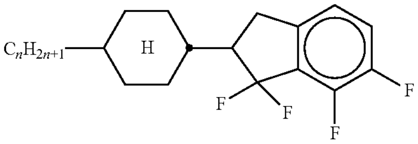

CK-n-F

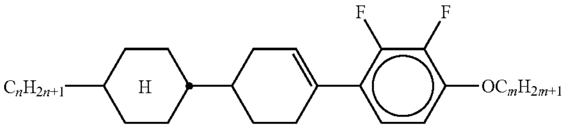

CLY-n-Om

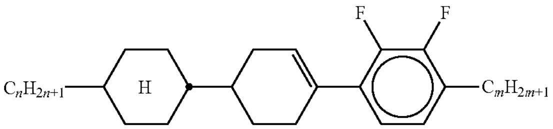

CLY-n-m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

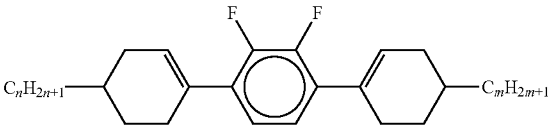

LYLI-n-m

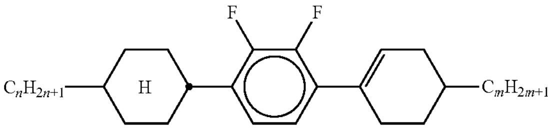

CYLI-n-m

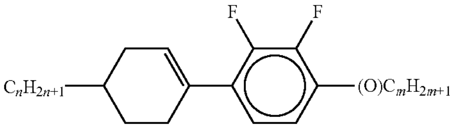

LY-n-(O)m

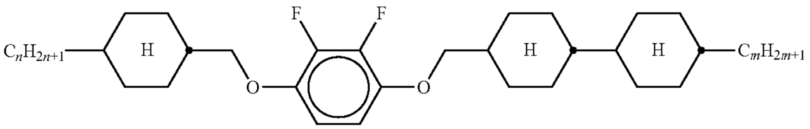

COYOICC-n-m

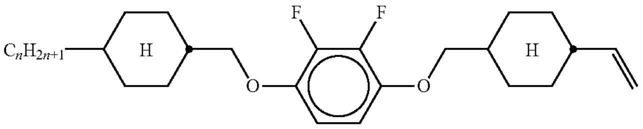

COYOIC-n-V

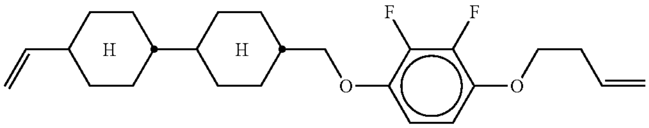

CCOY-V-O2V

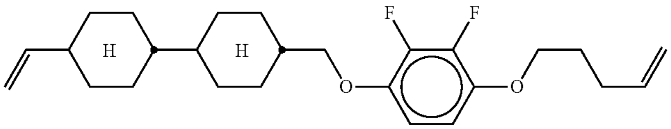

CCOY-V-O3V

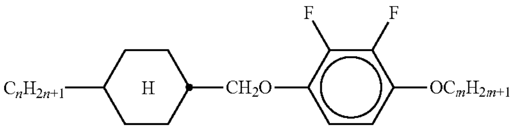

COY-n-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

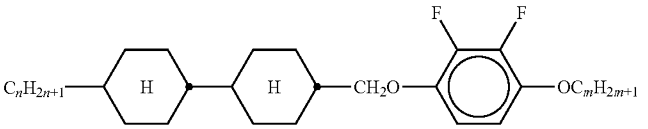

CCOY-n-Om

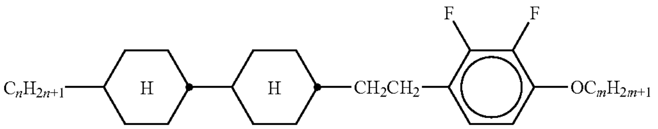

CCEY-n-Om

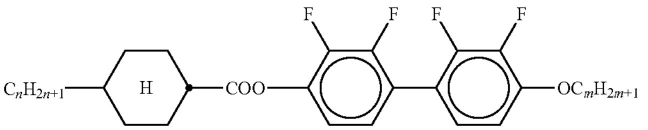

CZYY-n-Om

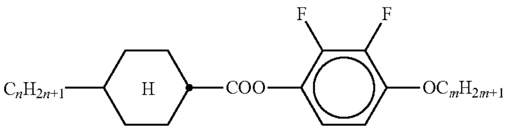

D-nOmFF

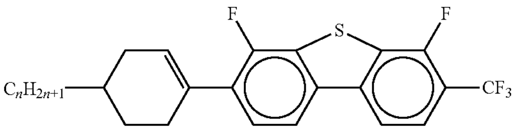

LB(S)-n-T

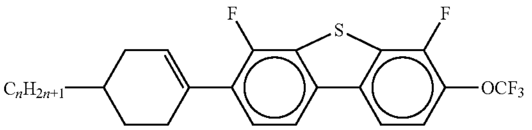

LB(S)-n-OT

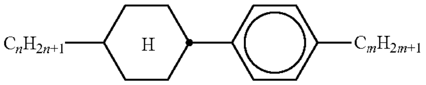

PCH-nm, CP-n-m

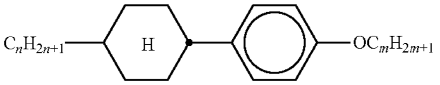

PCH-nOm, CP-n-Om

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

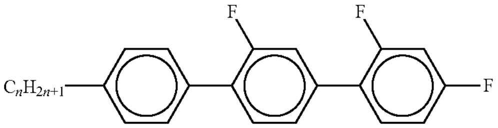

PGIGI-n-F

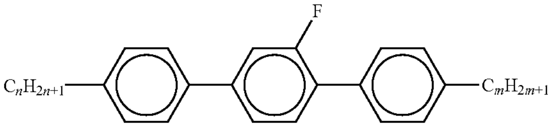

PGP-n-m

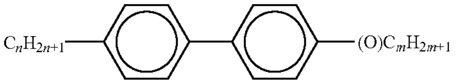

PP-n-(O)m

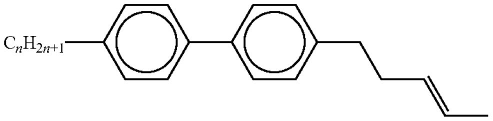

PP-n-2V1

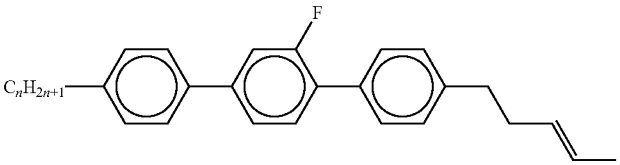

PGP-n-2V1

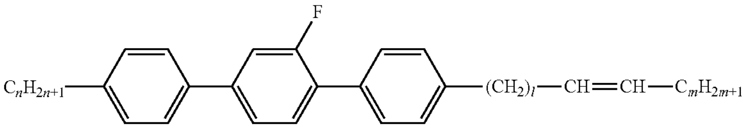

PGP-n-IVm

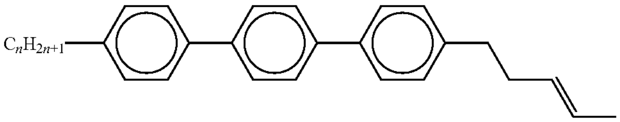

PPP-n-2V1

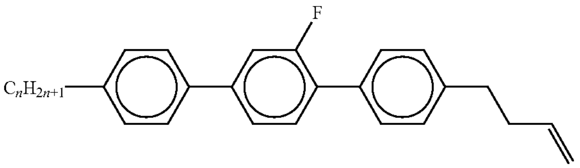

PGP-n-2V

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

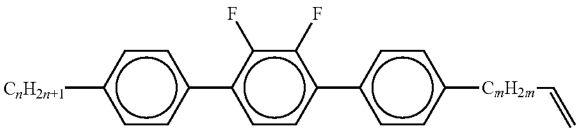

PYP-n-mV

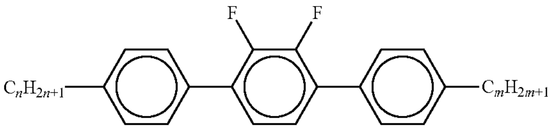

PYP-n-m

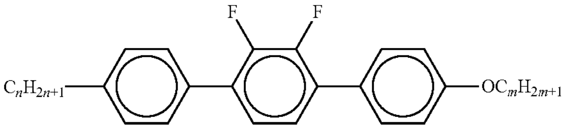

PYP-n-Om

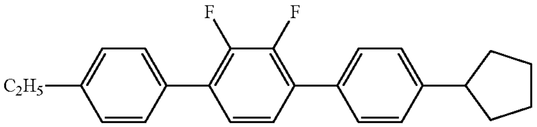 [SMILES: CCc1ccc(-c2ccc(-c3ccc(C4CCCC4)cc3)c(F)c2F)cc1]

PYP-2-(c5)

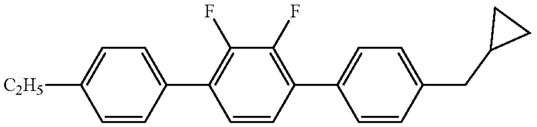 [SMILES: CCc1ccc(-c2ccc(-c3ccc(CC4CC4)cc3)c(F)c2F)cc1]

PYP-2-1(c3)

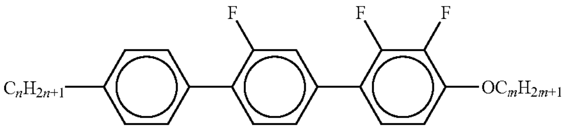

PGIY-n-Om

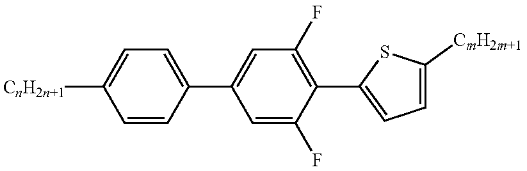

PUS-n-m

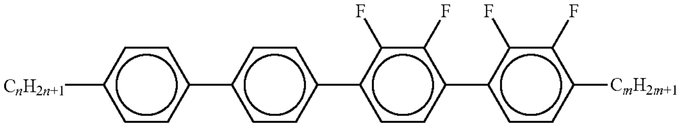

PPYY-n-m

TABLE B-continued

In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$.

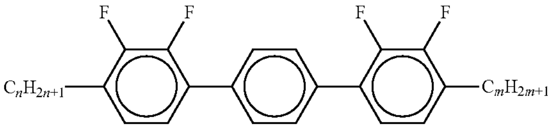

YPY-n-m

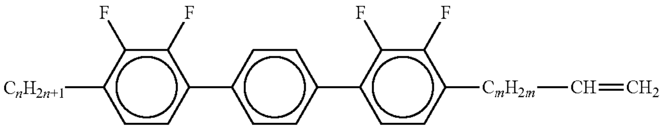

YPY-n-mV

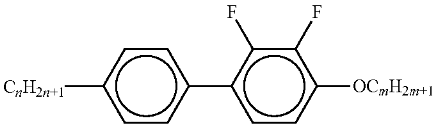

PY-n-Om

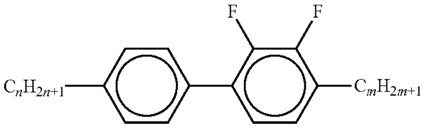

PY-n-m

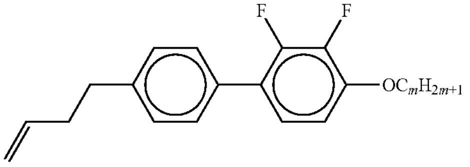

PY-V2-Om

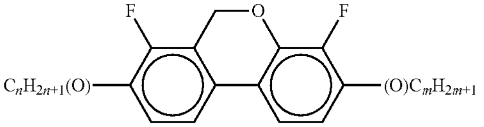

B(A)-n(O)-(O)m

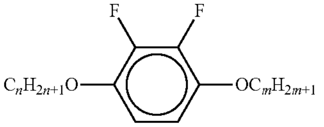

Y-nO-Om

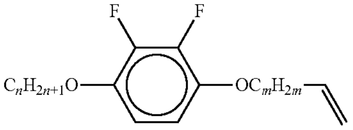

Y-nO-OmV

TABLE B-continued

| |
|---|
| In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$. |

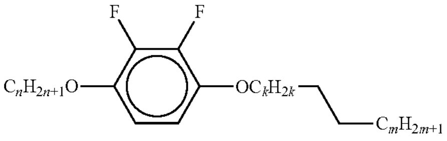

Y-nO-OkVm

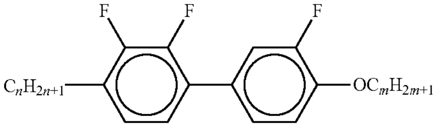

YG-n-Om

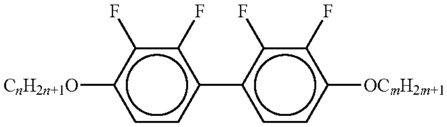

YG-nO-Om

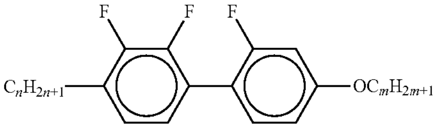

YGI-n-Om

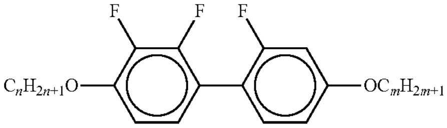

YGI-nO-Om

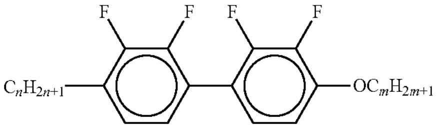

YY-n-Om

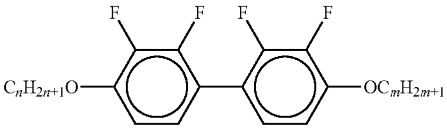

YY-nO-Om

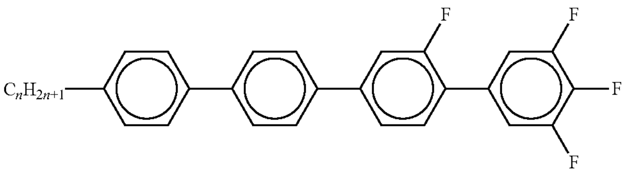

PPGU-n-F

TABLE B-continued

| |
|---|
| In Table B, n, m, k and I are, independently of one another, each an integer, preferably 1 to 9 preferably 1 to 7, k and I may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1". $(O)C_mH_{2m+1}$ means $C_mH_{2m+1}$ or $OC_mH_{2m+1}$. |

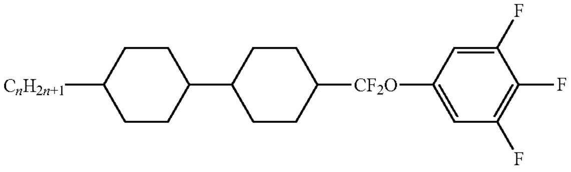

CCQU-n-F

In a preferred embodiment of the present invention, the LC media according to the invention comprise one or more compounds selected from the group consisting of compounds from Table B.

TABLE C

Table C shows possible chiral dopants which can be added to the LC media according to the invention.

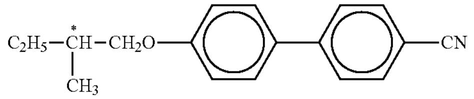

C 15

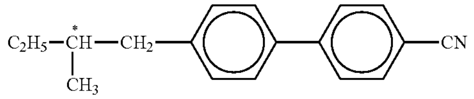

CB 15

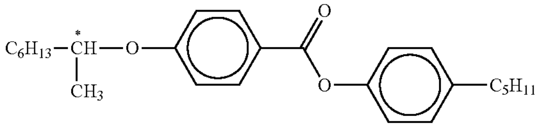

CM 21

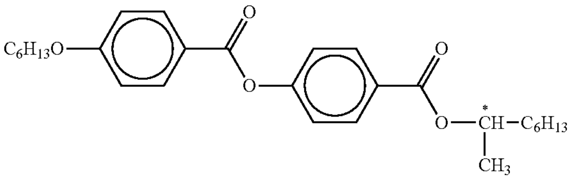

R/S-811

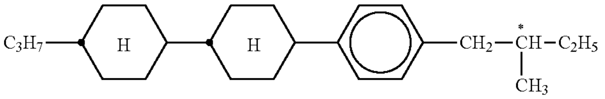

CM 44

TABLE C-continued
| Table C shows possible chiral dopants which can be added to the LC media according to the invention. |
| --- |
| 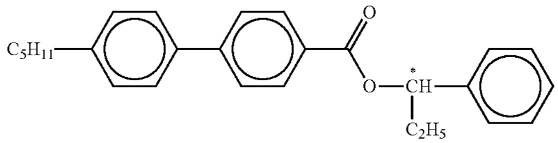 |
| CM 45 |
| 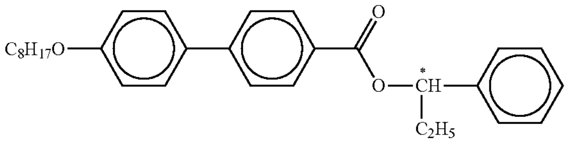 |
| CM 47 |
| 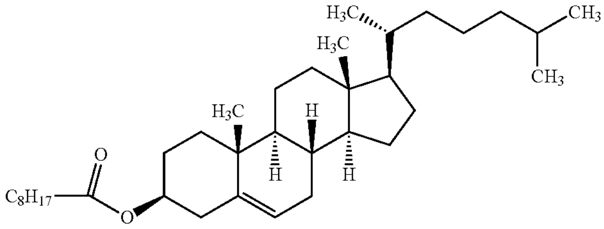 |
| CN |
| 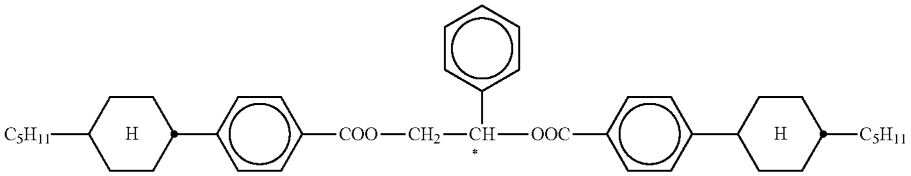 |
| R/S-1011 |
| 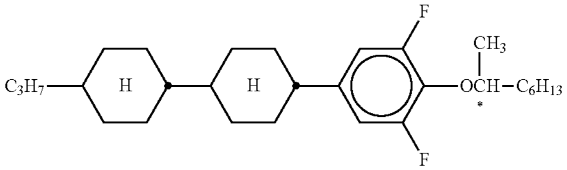 |
| R/S-2011 |
| 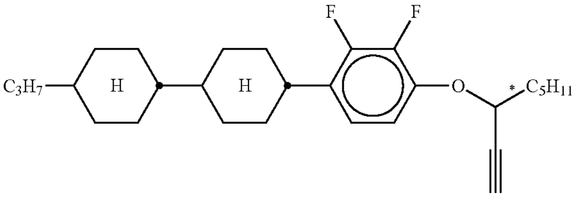 |
| R/S-3011 |
| 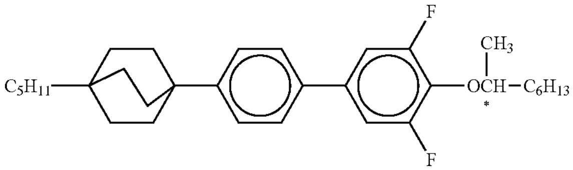 |
| R/S-4011 |

TABLE C-continued

| Table C shows possible chiral dopants which can be added to the LC media according to the invention. |
| --- |
| 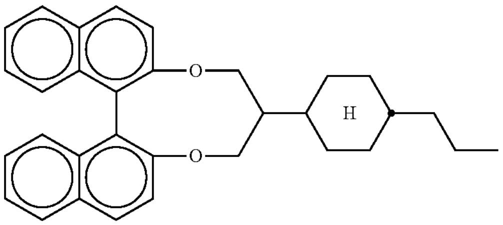 R/S-5011 |

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table C.

TABLE D

| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
| 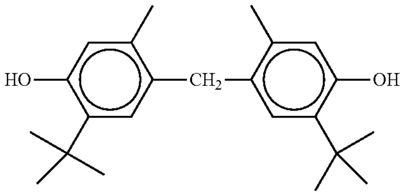 |
| 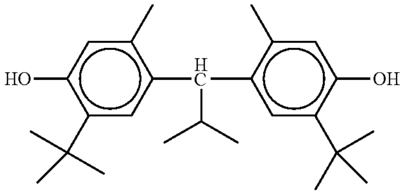 |
| 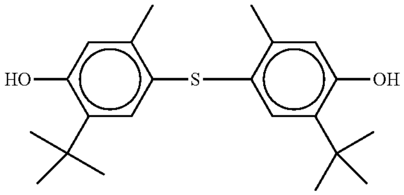 |
| 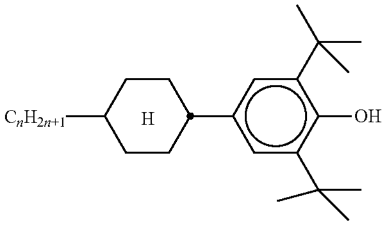 |

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
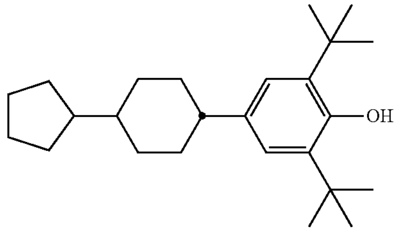
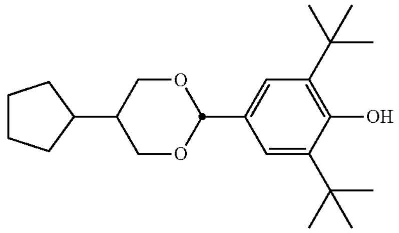
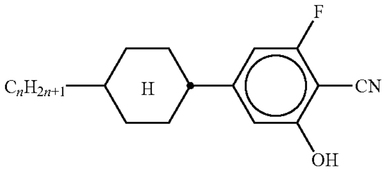
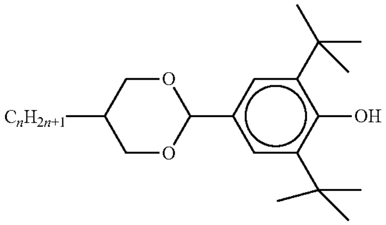
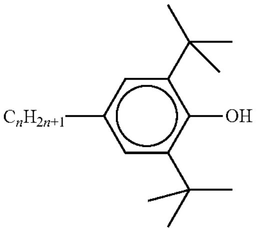
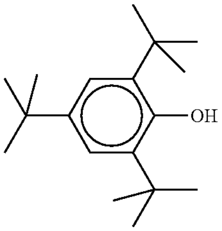

TABLE D-continued
| |
|---|
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
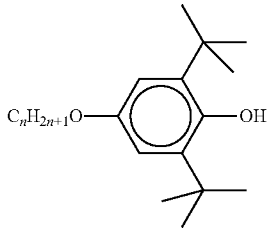
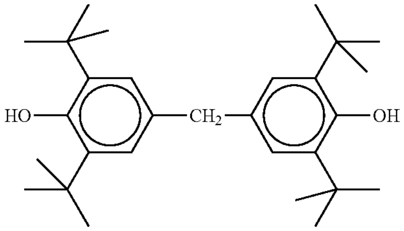
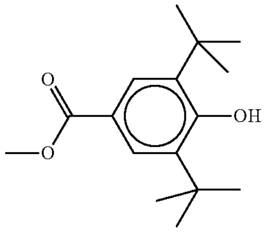
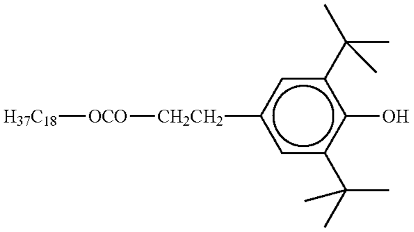
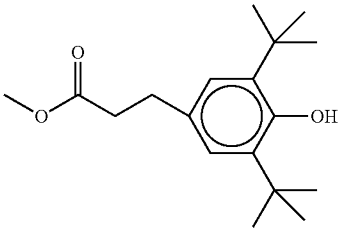
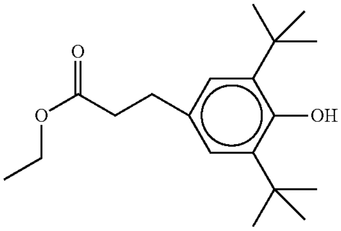

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
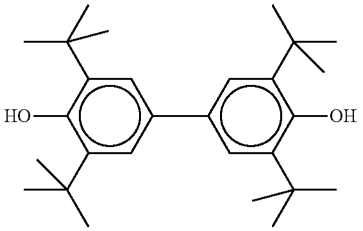
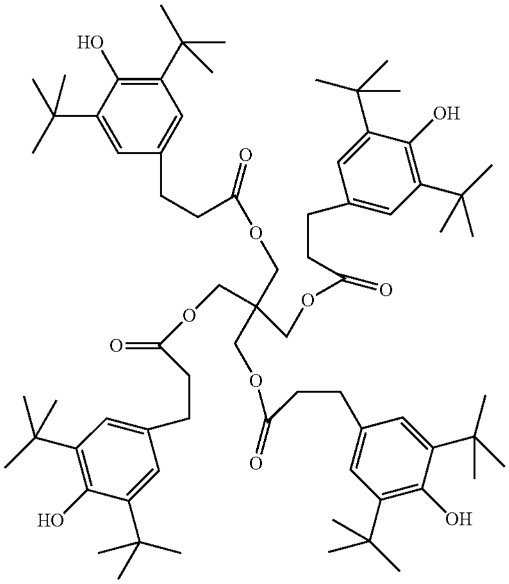 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
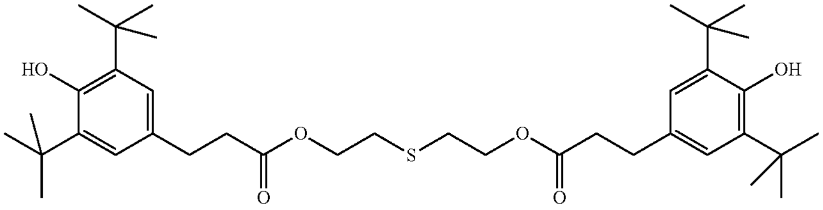 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
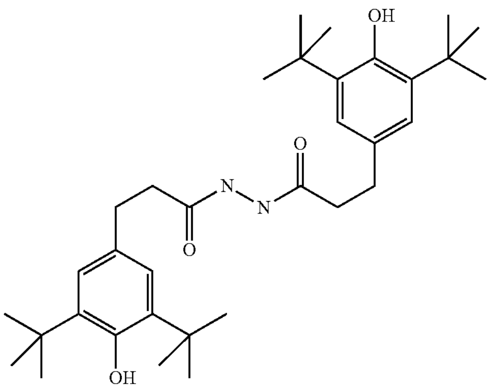 [SMILES: CC(C)(C)c1cc(CCC(=O)NNC(=O)CCc2cc(C(C)(C)C)c(O)c(C(C)(C)C)c2)cc(C(C)(C)C)c1O]

TABLE D-continued
| |
|---|
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
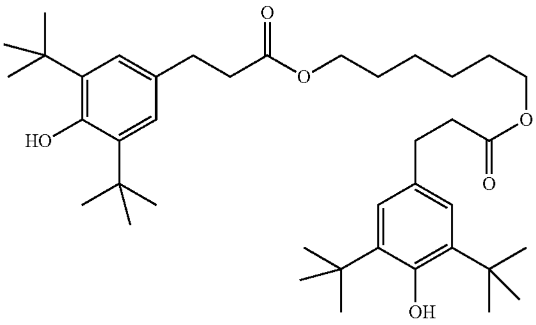 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
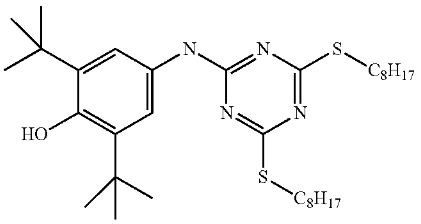
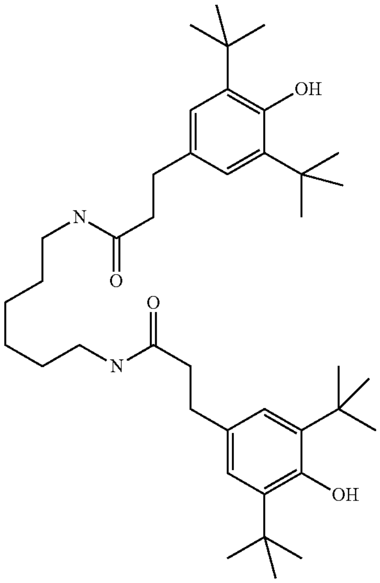 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 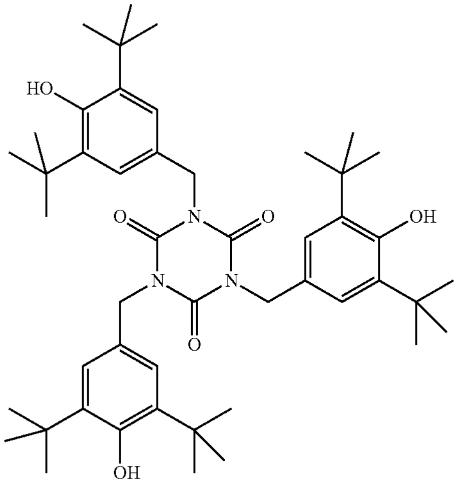 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O] |
| 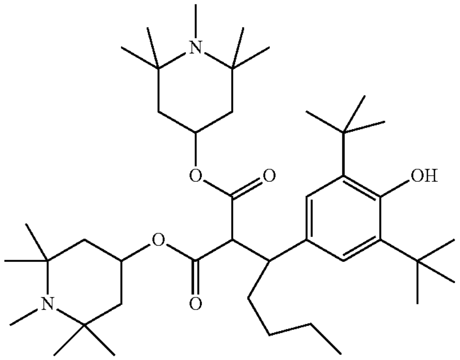 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1] |
| 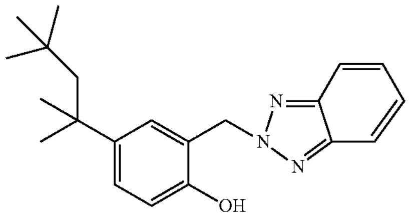 [SMILES: CC(C)(C)CC(C)(C)c1ccc(O)c(Cn2nc3ccccc3n2)c1] |
| 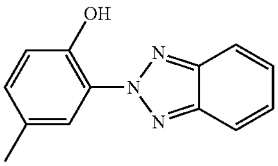 [SMILES: Cc1ccc(O)c(-n2nc3ccccc3n2)c1] |
| 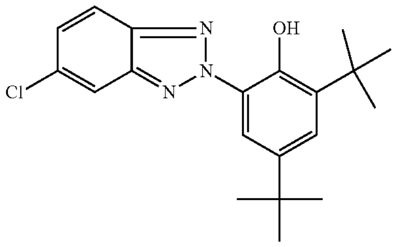 [SMILES: CC(C)(C)c1cc(-n2nc3ccc(Cl)cc3n2)c(O)c(C(C)(C)C)c1] |

TABLE D-continued
| |
|---|
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
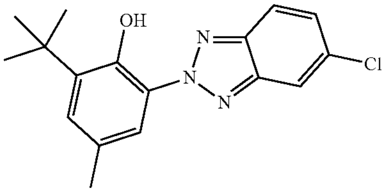 [SMILES: Cc1cc(-n2nc3ccc(Cl)cc3n2)c(O)c(C(C)(C)C)c1]
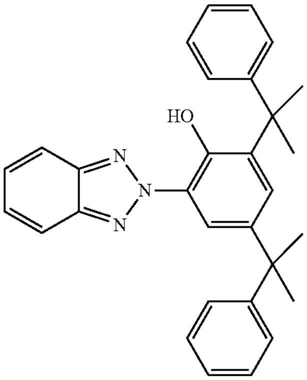 [SMILES: CC(C)(c1ccccc1)c1cc(-n2nc3ccccc3n2)c(O)c(C(C)(C)c2ccccc2)c1]
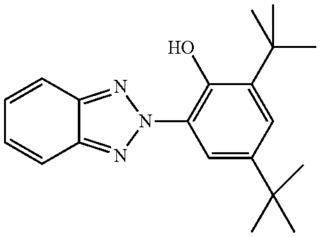 [SMILES: CC(C)(C)c1cc(-n2nc3ccccc3n2)c(O)c(C(C)(C)C)c1]
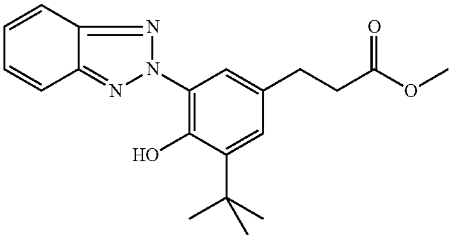 [SMILES: COC(=O)CCc1cc(-n2nc3ccccc3n2)c(O)c(C(C)(C)C)c1]
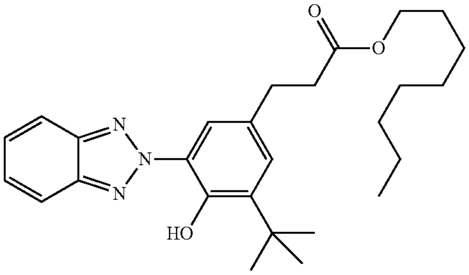 [SMILES: CCCCCCCCOC(=O)CCc1cc(-n2nc3ccccc3n2)c(O)c(C(C)(C)C)c1]

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 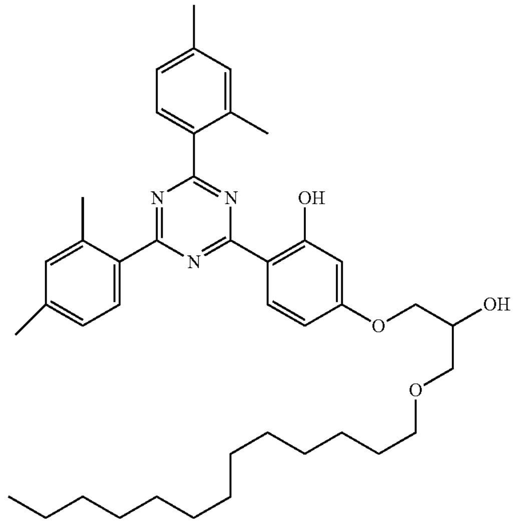 [SMILES: CCCCCCCCCCCCCOCC(O)COc1ccc(-c2nc(-c3ccc(C)cc3C)nc(-c3ccc(C)cc3C)n2)c(O)c1] |
| 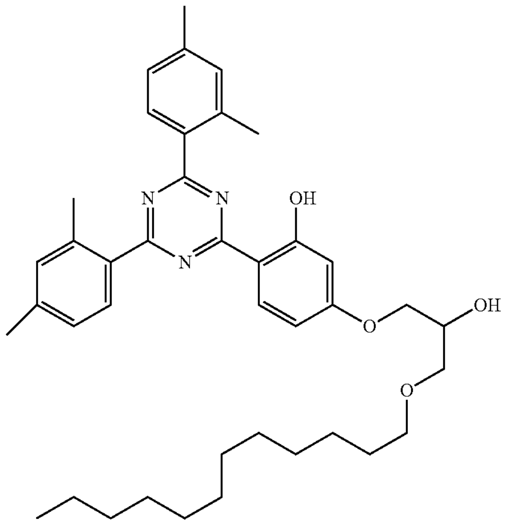 [SMILES: CCCCCCCCCCCCOCC(O)COc1ccc(-c2nc(-c3ccc(C)cc3C)nc(-c3ccc(C)cc3C)n2)c(O)c1] |
| 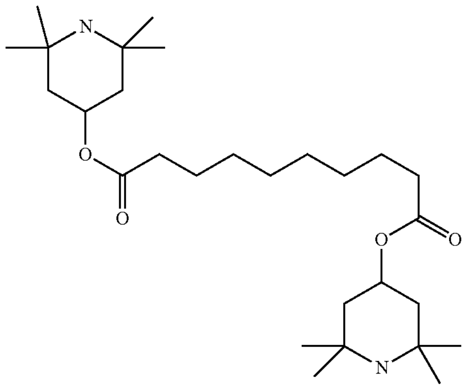 |

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
| --- |
| 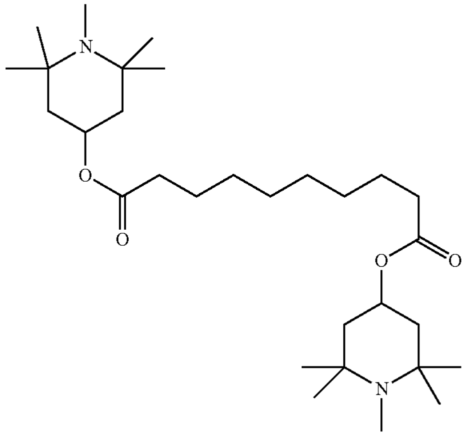 |
| 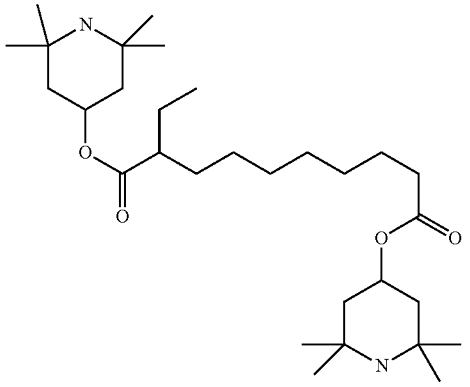 |
| 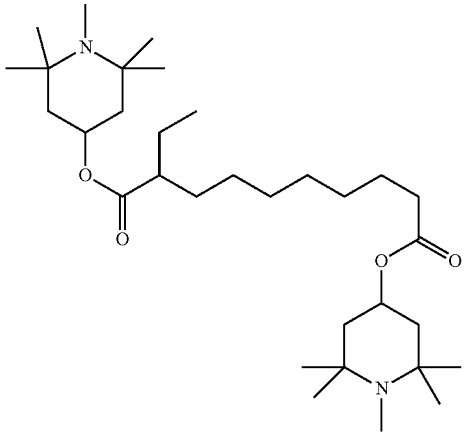 |

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 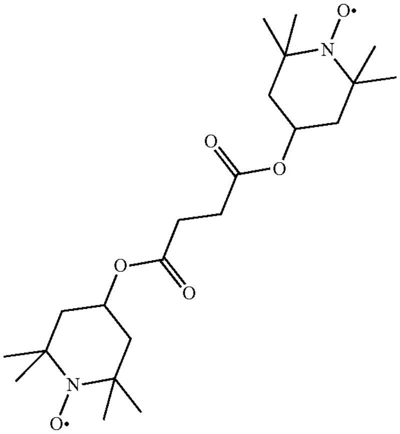 |
| 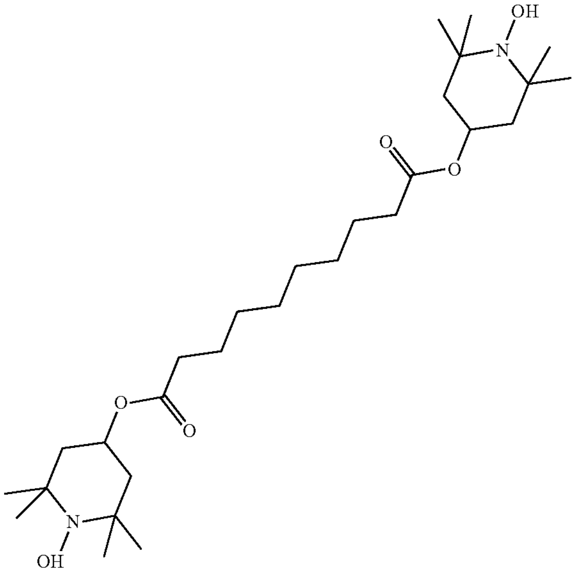 |
| 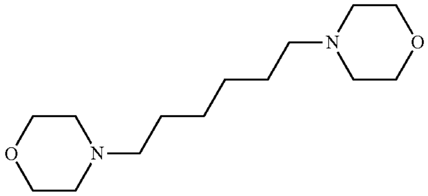 [SMILES: C(CCCN1CCOCC1)CCN1CCOCC1] |

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 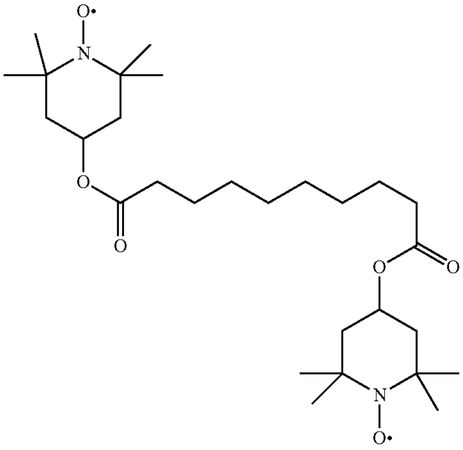 |
| 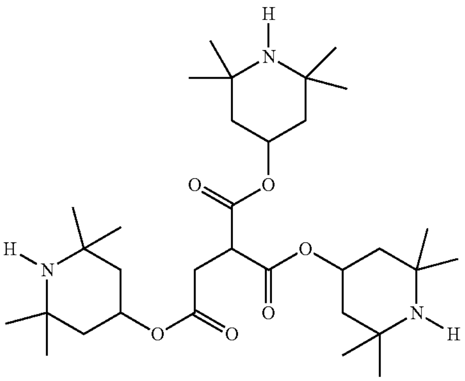 |
| 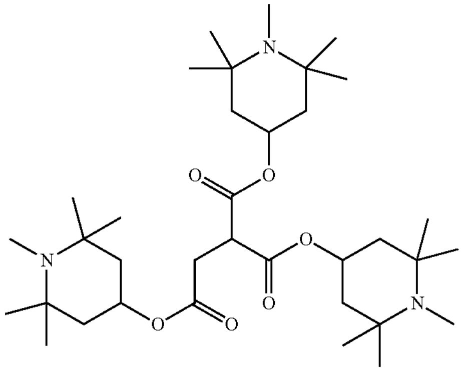 |

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 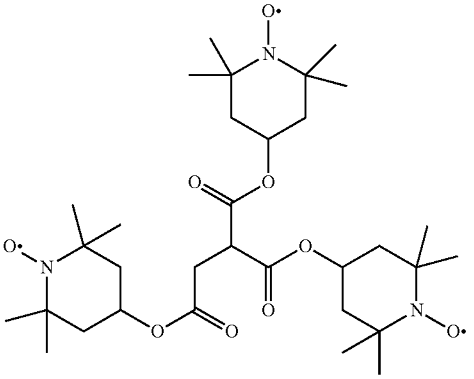 |
| 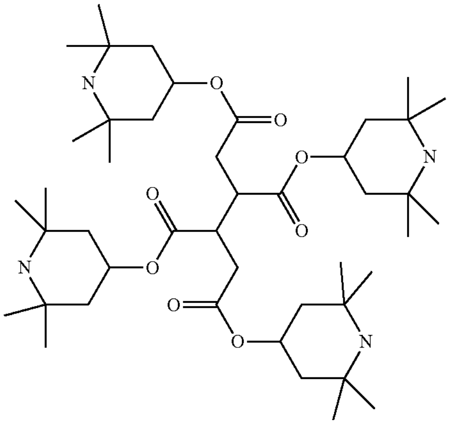 |
| 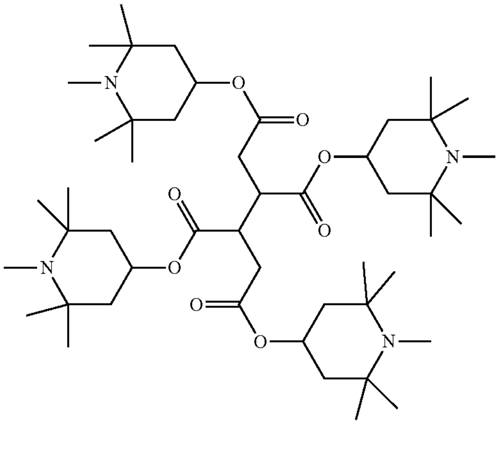 |

TABLE D-continued
| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 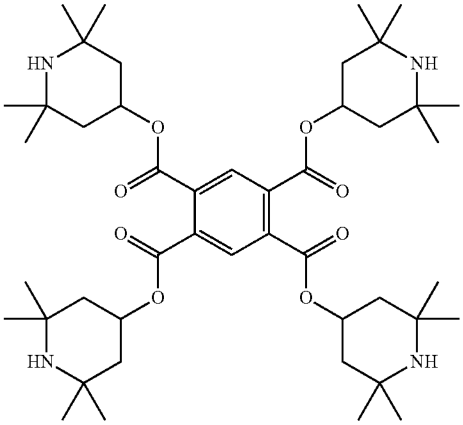 |
| 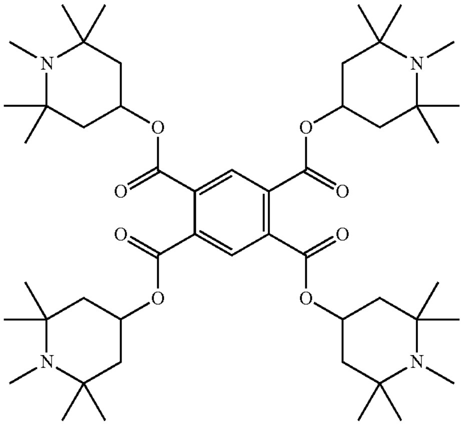 |
| 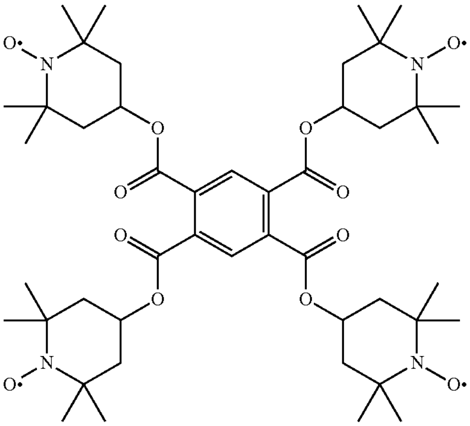 |
| 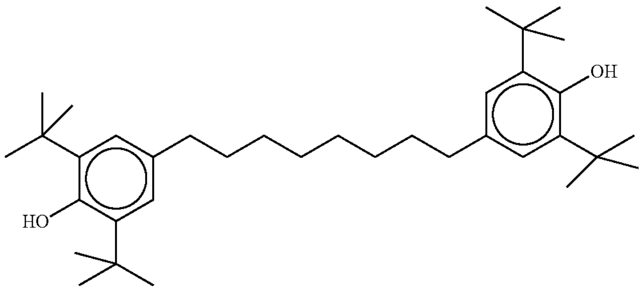 |

TABLE D-continued

| Table D shows possible stabilisers which can be added to the LC media according to the invention. Therein n denotes an integer from 1 to 12, preferably 1, 2, 3, 4, 5, 6, 7 or 8, and terminal methyl groups are not shown. |
|---|
| 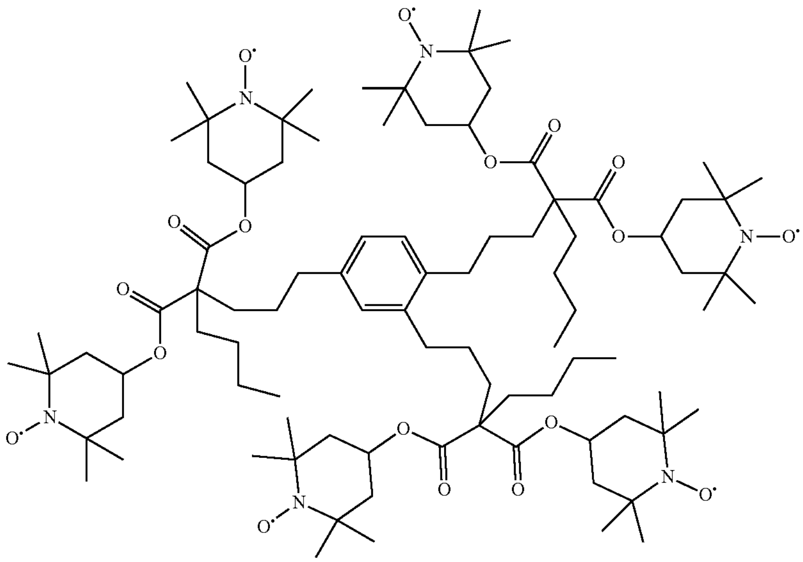 |

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

| Table E shows illustrative reactive mesogenic compounds which can be used in the LC media in accordance with the present invention. | |
|---|---|
| 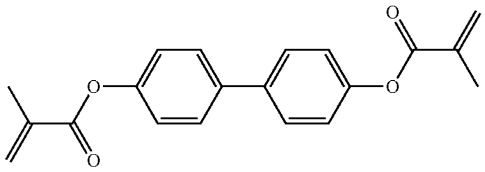 [SMILES: C=C(C)C(=O)Oc1ccc(-c2ccc(OC(=O)C(=C)C)cc2)cc1] | RM-1 |
| 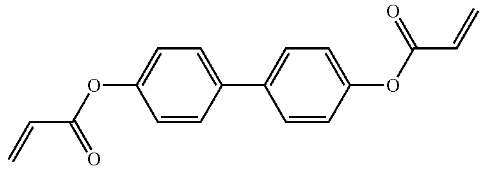 [SMILES: C=CC(=O)Oc1ccc(-c2ccc(OC(=O)C=C)cc2)cc1] | RM-2 |
| 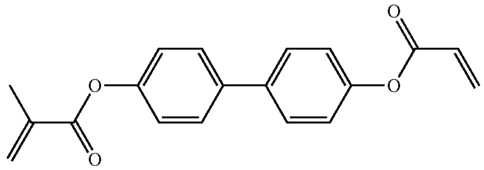 [SMILES: C=CC(=O)Oc1ccc(-c2ccc(OC(=O)C(=C)C)cc2)cc1] | RM-3 |

TABLE E-continued
| Table E shows illustrative reactive mesogenic compounds which can be used in the LC media in accordance with the present invention. | |
|---|---|
| 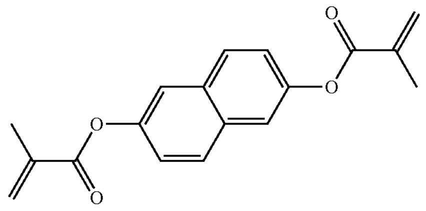 [SMILES: C=C(C)C(=O)Oc1ccc2cc(OC(=O)C(=C)C)ccc2c1] | RM-4 |
| 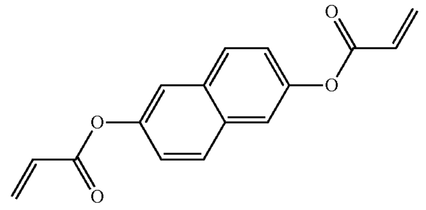 [SMILES: C=CC(=O)Oc1ccc2cc(OC(=O)C=C)ccc2c1] | RM-5 |
| 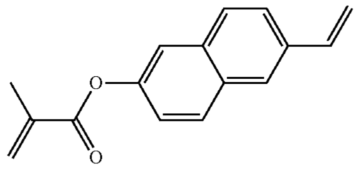 [SMILES: C=Cc1ccc2cc(OC(=O)C(=C)C)ccc2c1] | RM-6 |
| 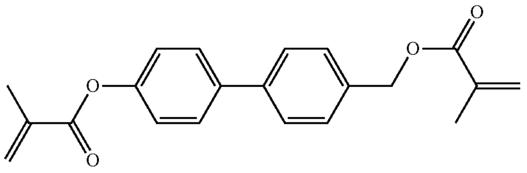 [SMILES: C=C(C)C(=O)OCc1ccc(-c2ccc(OC(=O)C(=C)C)cc2)cc1] | RM-7 |
| 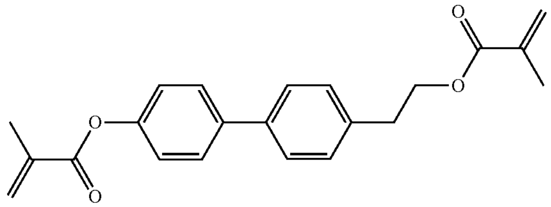 [SMILES: C=C(C)C(=O)OCCc1ccc(-c2ccc(OC(=O)C(=C)C)cc2)cc1] | RM-8 |
| 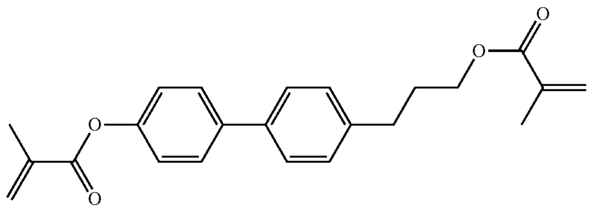 [SMILES: C=C(C)C(=O)OCCCc1ccc(-c2ccc(OC(=O)C(=C)C)cc2)cc1] | RM-9 |
| 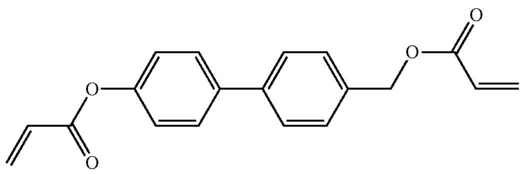 [SMILES: C=CC(=O)OCc1ccc(-c2ccc(OC(=O)C=C)cc2)cc1] | RM-10 |

TABLE E-continued
Table E shows illustrative reactive mesogenic compounds which can be used in the LC media in accordance with the present invention.
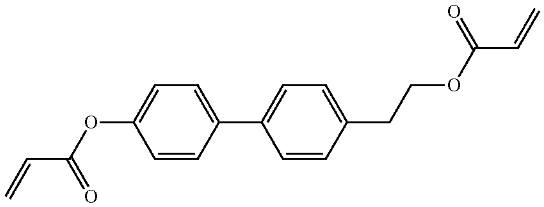 [SMILES: C=CC(=O)OCCc1ccc(-c2ccc(OC(=O)C=C)cc2)cc1]
RM-11
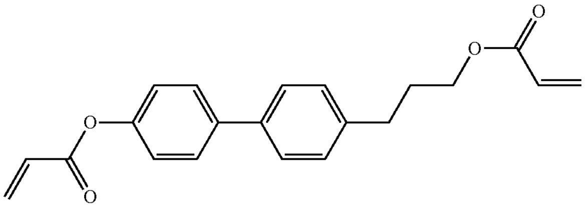 [SMILES: C=CC(=O)OCCCc1ccc(-c2ccc(OC(=O)C=C)cc2)cc1]
RM-12
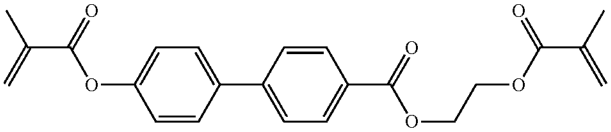 [SMILES: C=C(C)C(=O)OCCOC(=O)c1ccc(-c2ccc(OC(=O)C(=C)C)cc2)cc1]
RM-13
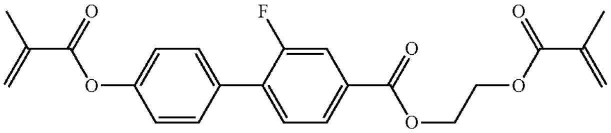 [SMILES: C=C(C)C(=O)OCCOC(=O)c1ccc(-c2ccc(OC(=O)C(=C)C)cc2)c(F)c1]
RM-14
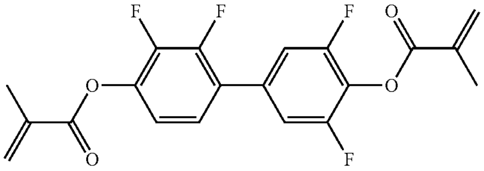 [SMILES: C=C(C)C(=O)Oc1ccc(-c2cc(F)c(OC(=O)C(=C)C)c(F)c2)c(F)c1F]
RM-15
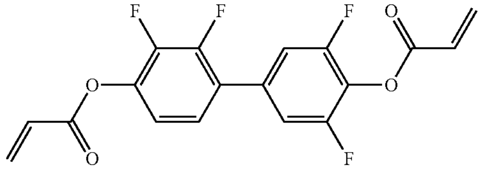 [SMILES: C=CC(=O)Oc1ccc(-c2cc(F)c(OC(=O)C=C)c(F)c2)c(F)c1F]
RM-16
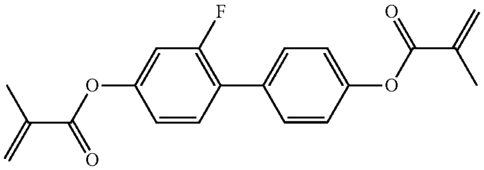
RM-17
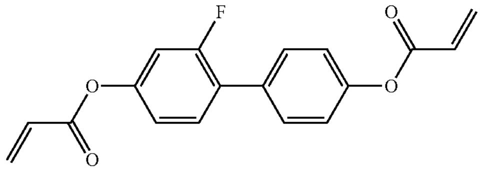 [SMILES: C=CC(=O)Oc1ccc(-c2ccc(OC(=O)C=C)cc2F)cc1]
RM-18

TABLE E-continued
Table E shows illustrative reactive mesogenic compounds which can be used in the LC media in accordance with the present invention.
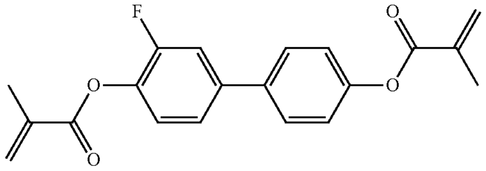 [SMILES: C=C(C)C(=O)Oc1ccc(-c2ccc(OC(=O)C(=C)C)c(F)c2)cc1]
RM-19
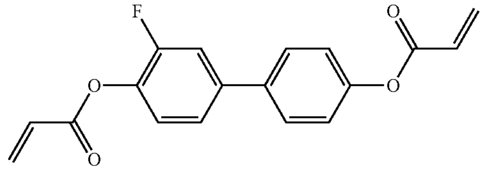 [SMILES: C=CC(=O)Oc1ccc(-c2ccc(OC(=O)C=C)c(F)c2)cc1]
RM-20
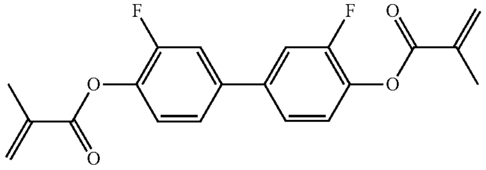 [SMILES: C=C(C)C(=O)Oc1ccc(-c2ccc(OC(=O)C(=C)C)c(F)c2)cc1F]
RM-21
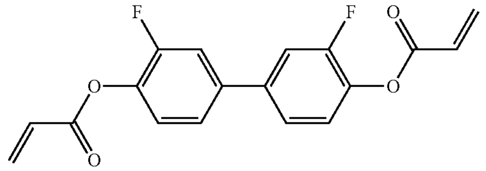 [SMILES: C=CC(=O)Oc1ccc(-c2ccc(OC(=O)C=C)c(F)c2)cc1F]
RM-22
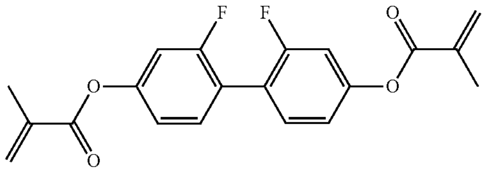
RM-23
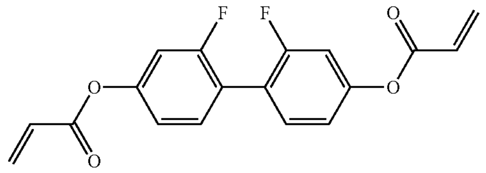 [SMILES: C=CC(=O)Oc1ccc(-c2ccc(OC(=O)C=C)cc2F)c(F)c1]
RM-24
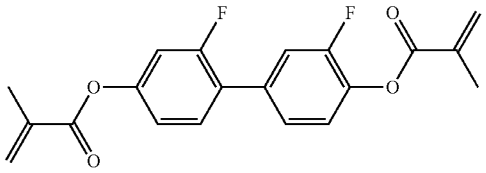
RM-25
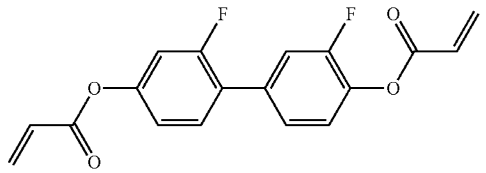 [SMILES: C=CC(=O)Oc1ccc(-c2ccc(OC(=O)C=C)c(F)c2)c(F)c1]
RM-26

TABLE E-continued
Table E shows illustrative reactive mesogenic compounds which can be used in the LC media in accordance with the present invention.
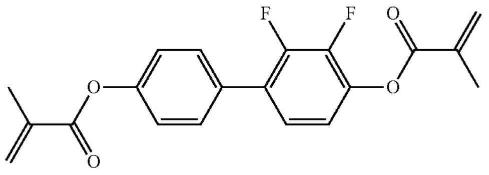 [SMILES: C=C(C)C(=O)Oc1ccc(-c2ccc(OC(=O)C(=C)C)c(F)c2F)cc1]
RM-27
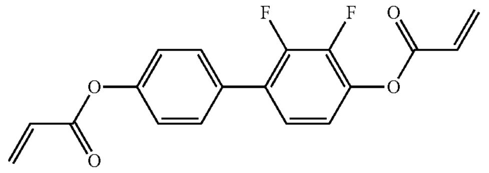 [SMILES: C=CC(=O)Oc1ccc(-c2ccc(OC(=O)C=C)c(F)c2F)cc1]
RM-28
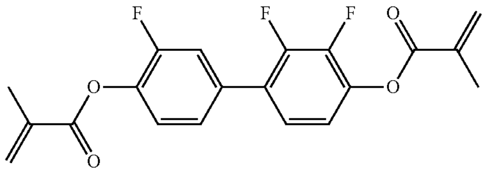 [SMILES: C=C(C)C(=O)Oc1ccc(-c2ccc(OC(=O)C(=C)C)c(F)c2F)cc1F]
RM-29
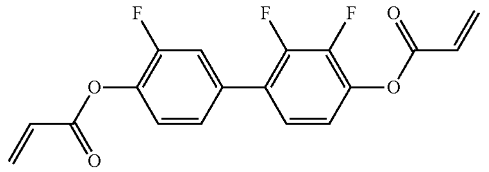 [SMILES: C=CC(=O)Oc1ccc(-c2ccc(OC(=O)C=C)c(F)c2F)cc1F]
RM-30
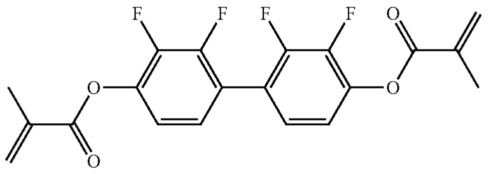 [SMILES: C=C(C)C(=O)Oc1ccc(-c2ccc(OC(=O)C(=C)C)c(F)c2F)c(F)c1F]
RM-31
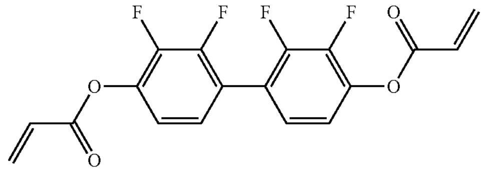
RM-32
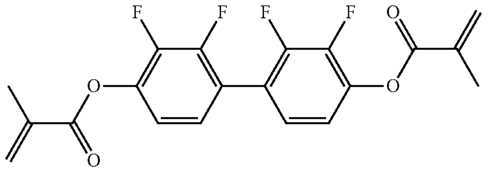 [SMILES: C=C(C)C(=O)Oc1ccc(-c2ccc(OC(=O)C(=C)C)c(F)c2F)c(F)c1F]
RM-33
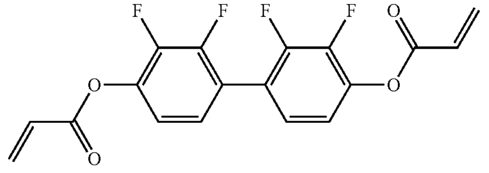
RM-34

TABLE E-continued
Table E shows illustrative reactive mesogenic compounds which can be used in the LC media in accordance with the present invention.
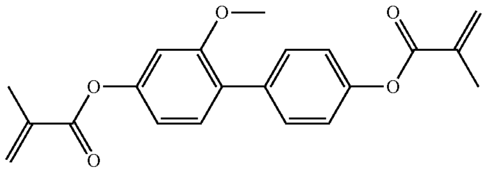 [SMILES: C=C(C)C(=O)Oc1ccc(-c2ccc(OC(=O)C(=C)C)cc2OC)cc1]
RM-35
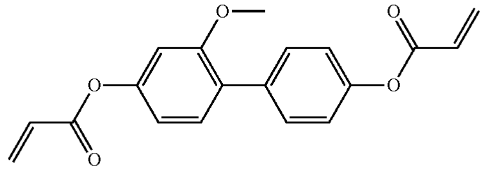 [SMILES: C=CC(=O)Oc1ccc(-c2ccc(OC(=O)C=C)cc2OC)cc1]
RM-36
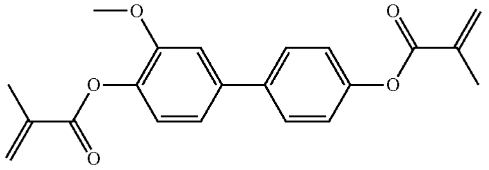
RM-37
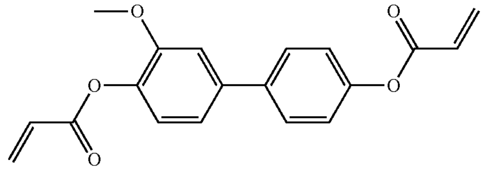 [SMILES: C=CC(=O)Oc1ccc(-c2ccc(OC(=O)C=C)c(OC)c2)cc1]
RM-38
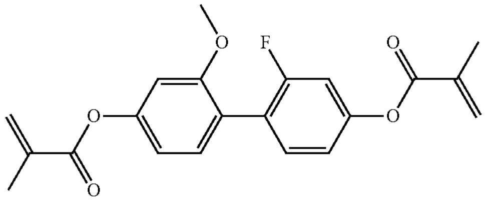 [SMILES: C=C(C)C(=O)Oc1ccc(-c2ccc(OC(=O)C(=C)C)cc2OC)c(F)c1]
RM-39
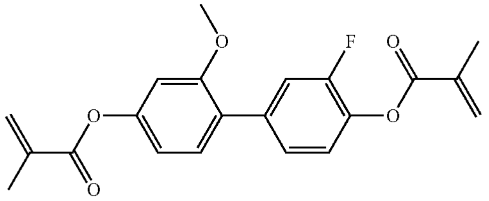 [SMILES: C=C(C)C(=O)Oc1ccc(-c2ccc(OC(=O)C(=C)C)c(F)c2)c(OC)c1]
RM-40
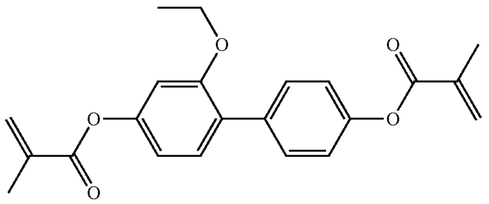 [SMILES: C=C(C)C(=O)Oc1ccc(-c2ccc(OC(=O)C(=C)C)cc2OCC)cc1]
RM-41
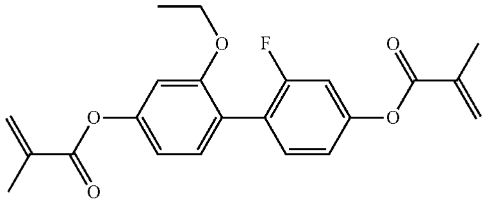 [SMILES: C=C(C)C(=O)Oc1ccc(-c2ccc(OC(=O)C(=C)C)cc2OCC)c(F)c1]
RM-42

TABLE E-continued
Table E shows illustrative reactive mesogenic compounds which can be used in the LC media in accordance with the present invention.
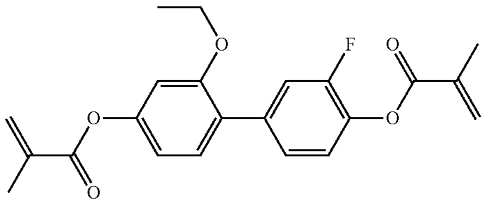
RM-43
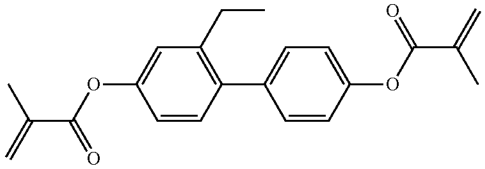 [SMILES: C=C(C)C(=O)Oc1ccc(-c2ccc(OC(=O)C(=C)C)cc2CC)cc1]
RM-44
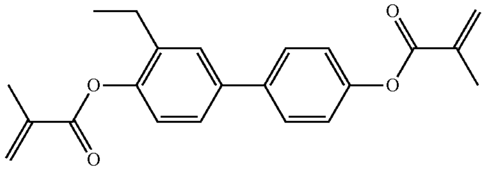 [SMILES: C=C(C)C(=O)Oc1ccc(-c2ccc(OC(=O)C(=C)C)c(CC)c2)cc1]
RM-45
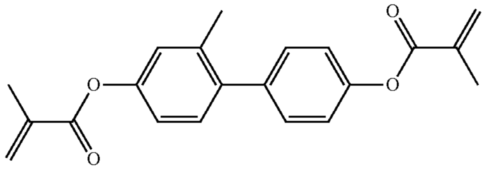 [SMILES: C=C(C)C(=O)Oc1ccc(-c2ccc(OC(=O)C(=C)C)cc2C)cc1]
RM-46
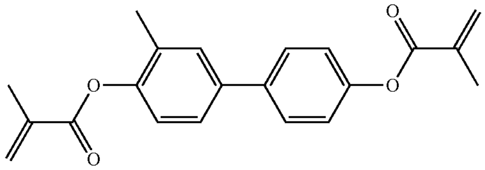
RM-47
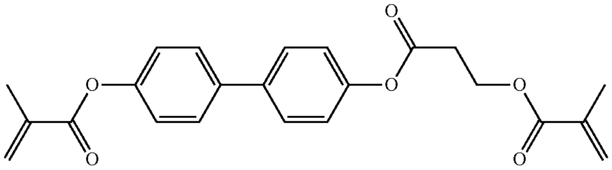 [SMILES: C=C(C)C(=O)OCCC(=O)Oc1ccc(-c2ccc(OC(=O)C(=C)C)cc2)cc1]
RM-48
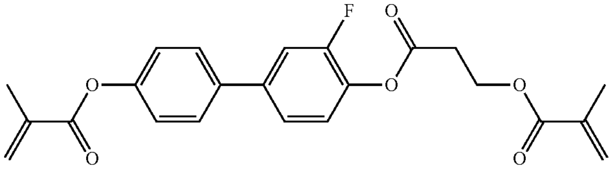 [SMILES: C=C(C)C(=O)OCCC(=O)Oc1ccc(-c2ccc(OC(=O)C(=C)C)cc2)cc1F]
RM-49
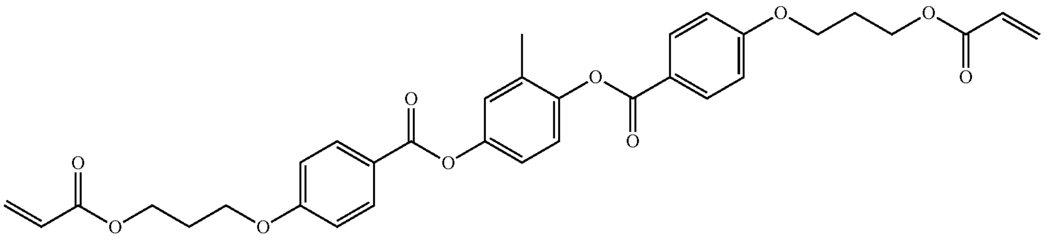 [SMILES: C=CC(=O)OCCCOc1ccc(C(=O)Oc2ccc(OC(=O)c3ccc(OCCCOC(=O)C=C)cc3)c(C)c2)cc1]
RM-50

TABLE E-continued
Table E shows illustrative reactive mesogenic compounds which can be used in the LC media in accordance with the present invention.
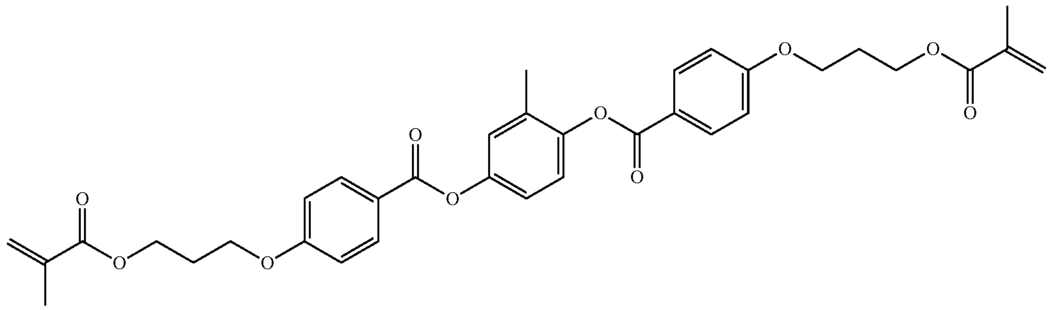 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
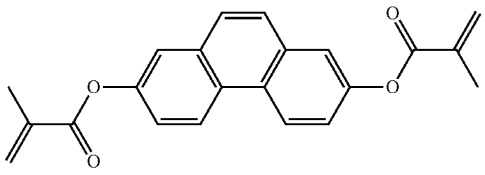 [SMILES: C=C(C)C(=O)Oc1ccc2c(ccc3cc(OC(=O)C(=C)C)ccc32)c1]
RM-52
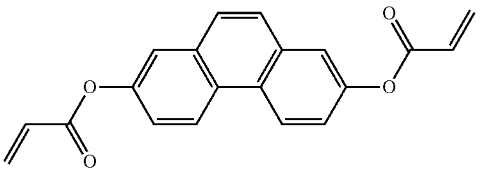 [SMILES: C=CC(=O)Oc1ccc2c(ccc3cc(OC(=O)C=C)ccc32)c1]
RM-53
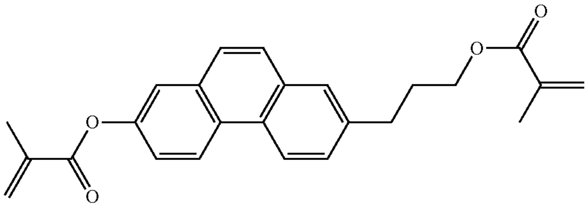 [SMILES: C=C(C)C(=O)OCCCc1ccc2c(ccc3cc(OC(=O)C(=C)C)ccc32)c1]
RM-54
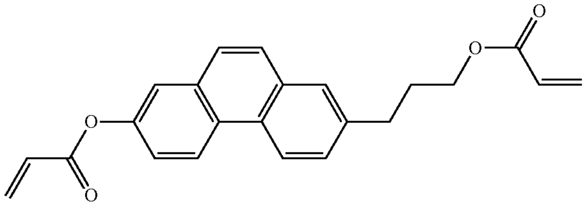 [SMILES: C=CC(=O)OCCCc1ccc2c(ccc3cc(OC(=O)C=C)ccc32)c1]
RM-55
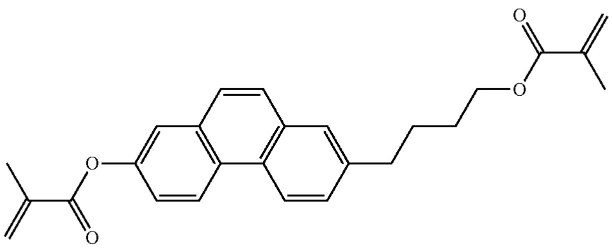 [SMILES: C=C(C)C(=O)OCCCCc1ccc2c(ccc3cc(OC(=O)C(=C)C)ccc32)c1]
RM-56

TABLE E-continued
Table E shows illustrative reactive mesogenic compounds which can be used in the LC media in accordance with the present invention.
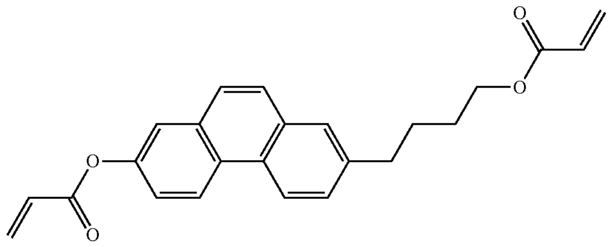 [SMILES: C=CC(=O)OCCCCc1ccc2c(ccc3cc(OC(=O)C=C)ccc32)c1]
RM-57
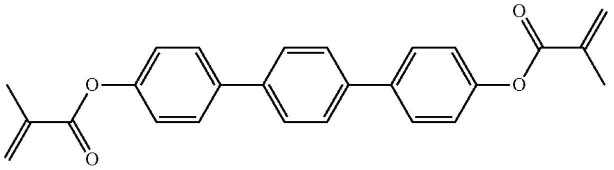 [SMILES: C=C(C)C(=O)Oc1ccc(-c2ccc(-c3ccc(OC(=O)C(=C)C)cc3)cc2)cc1]
RM-58
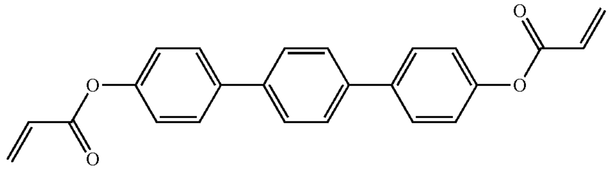
RM-59
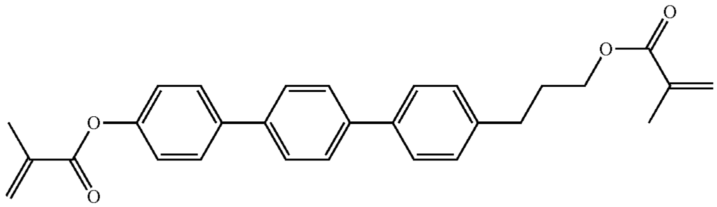 [SMILES: C=C(C)C(=O)OCCCc1ccc(-c2ccc(-c3ccc(OC(=O)C(=C)C)cc3)cc2)cc1]
RM-60
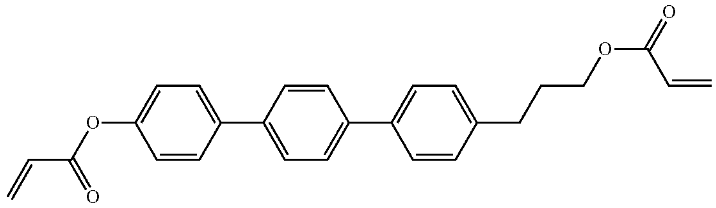 [SMILES: C=CC(=O)OCCCc1ccc(-c2ccc(-c3ccc(OC(=O)C=C)cc3)cc2)cc1]
RM-61
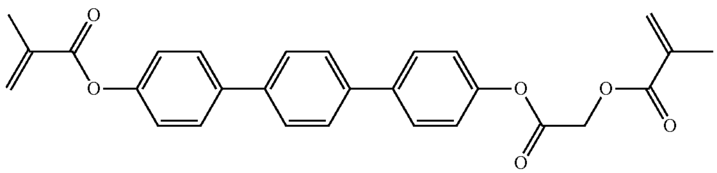 [SMILES: C=C(C)C(=O)OCC(=O)Oc1ccc(-c2ccc(-c3ccc(OC(=O)C(=C)C)cc3)cc2)cc1]
RM-62
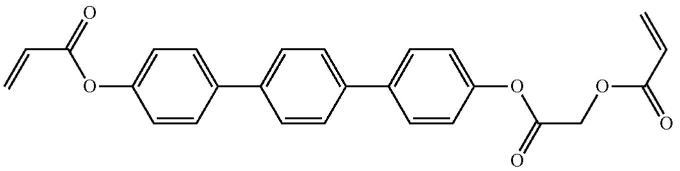 [SMILES: C=CC(=O)OCC(=O)Oc1ccc(-c2ccc(-c3ccc(OC(=O)C=C)cc3)cc2)cc1]
RM-63

TABLE E-continued
Table E shows illustrative reactive mesogenic compounds which can be used in the LC media in accordance with the present invention.
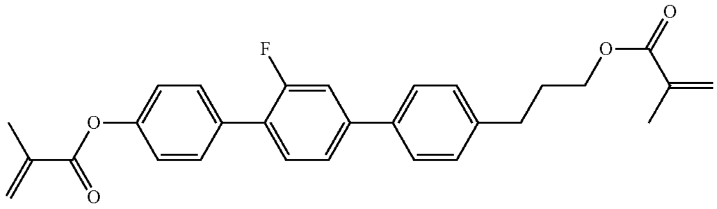 [SMILES: C=C(C)C(=O)OCCCc1ccc(-c2ccc(-c3ccc(OC(=O)C(=C)C)cc3)c(F)c2)cc1]
RM-64
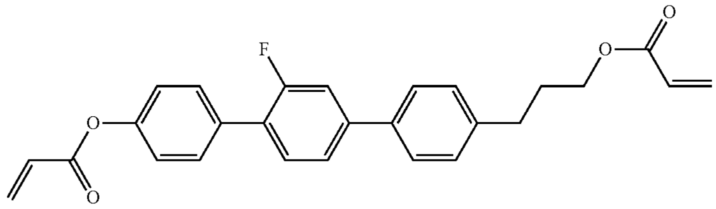
RM-65
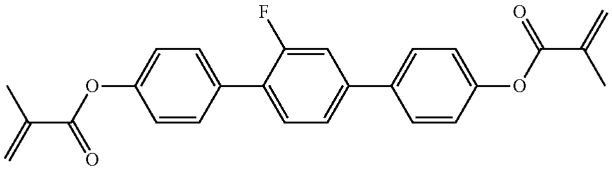
RM-66
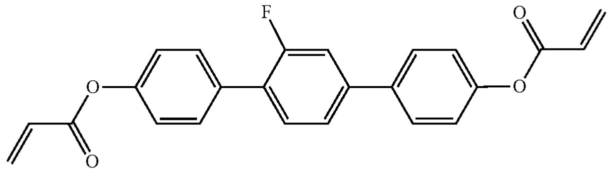
RM-67
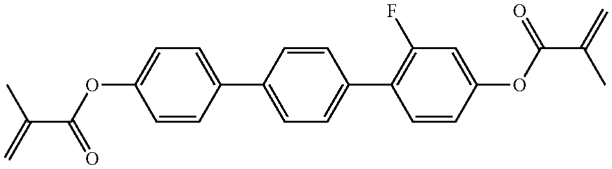 [SMILES: C=C(C)C(=O)Oc1ccc(-c2ccc(-c3ccc(OC(=O)C(=C)C)cc3F)cc2)cc1]
RM-68
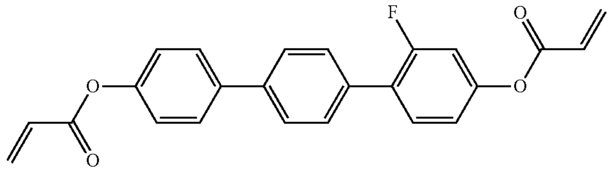 [SMILES: C=CC(=O)Oc1ccc(-c2ccc(-c3ccc(OC(=O)C=C)cc3F)cc2)cc1]
RM-69
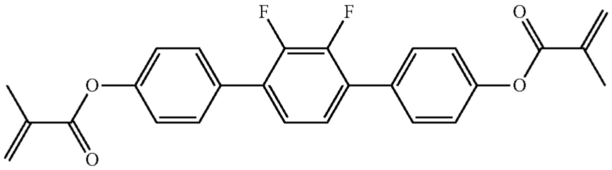
RM-70
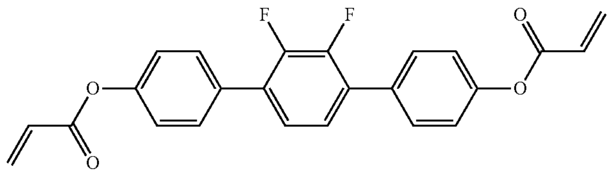 [SMILES: C=CC(=O)Oc1ccc(-c2ccc(-c3ccc(OC(=O)C=C)cc3)c(F)c2F)cc1]
RM-71

TABLE E-continued
Table E shows illustrative reactive mesogenic compounds which can be used in the LC media in accordance with the present invention.
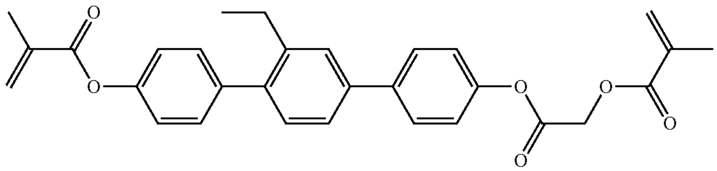 [SMILES: C=C(C)C(=O)OCC(=O)Oc1ccc(-c2ccc(-c3ccc(OC(=O)C(=C)C)cc3)c(CC)c2)cc1]
RM-72
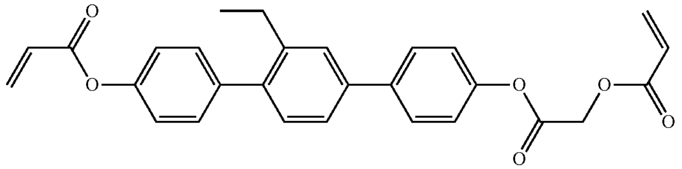 [SMILES: C=CC(=O)OCC(=O)Oc1ccc(-c2ccc(-c3ccc(OC(=O)C=C)cc3)c(CC)c2)cc1]
RM-73
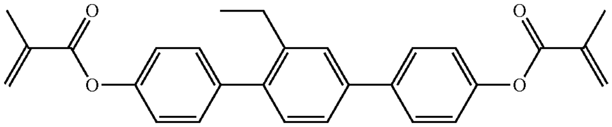 [SMILES: C=C(C)C(=O)Oc1ccc(-c2ccc(-c3ccc(OC(=O)C(=C)C)cc3)c(CC)c2)cc1]
RM-74
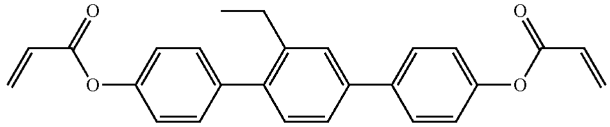 [SMILES: C=CC(=O)Oc1ccc(-c2ccc(-c3ccc(OC(=O)C=C)cc3)c(CC)c2)cc1]
RM-75
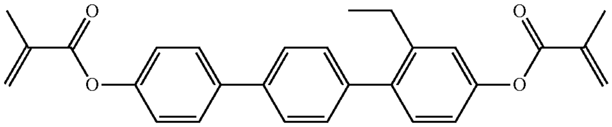 [SMILES: C=C(C)C(=O)Oc1ccc(-c2ccc(-c3ccc(OC(=O)C(=C)C)cc3CC)cc2)cc1]
RM-76
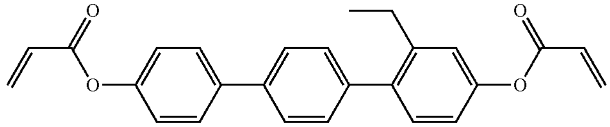 [SMILES: C=CC(=O)Oc1ccc(-c2ccc(-c3ccc(OC(=O)C=C)cc3CC)cc2)cc1]
RM-77
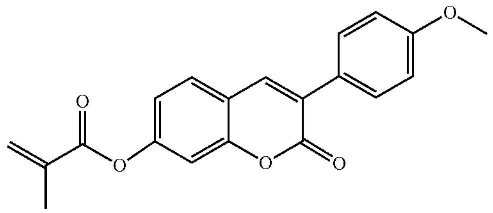 [SMILES: C=C(C)C(=O)Oc1ccc2cc(-c3ccc(OC)cc3)c(=O)oc2c1]
RM-78
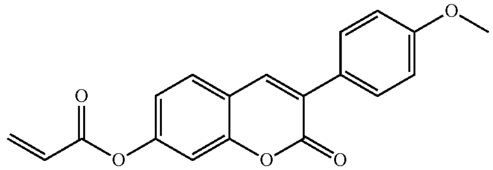 [SMILES: C=CC(=O)Oc1ccc2cc(-c3ccc(OC)cc3)c(=O)oc2c1]
RM-79
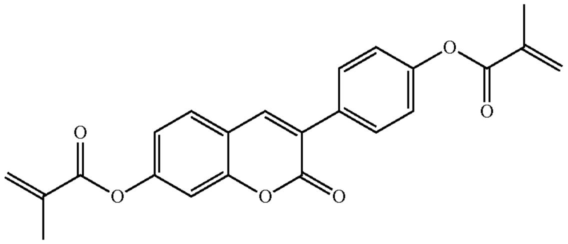 [SMILES: C=C(C)C(=O)Oc1ccc(-c2cc3ccc(OC(=O)C(=C)C)cc3oc2=O)cc1]
RM-80

TABLE E-continued
Table E shows illustrative reactive mesogenic compounds which can be used in the LC media in accordance with the present invention.
RM-81
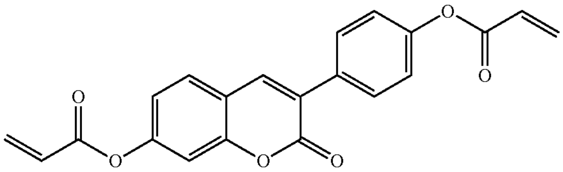 [SMILES: C=CC(=O)Oc1ccc(-c2cc3ccc(OC(=O)C=C)cc3oc2=O)cc1]
RM-82
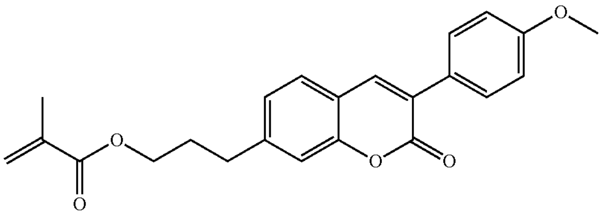 [SMILES: C=C(C)C(=O)OCCCc1ccc2cc(-c3ccc(OC)cc3)c(=O)oc2c1]
RM-83
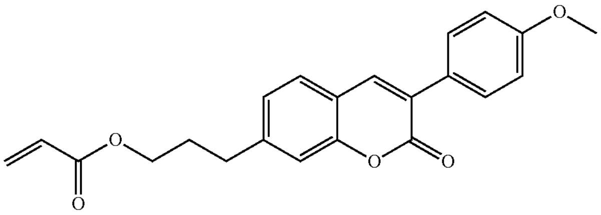 [SMILES: C=CC(=O)OCCCc1ccc2cc(-c3ccc(OC)cc3)c(=O)oc2c1]
RM-84
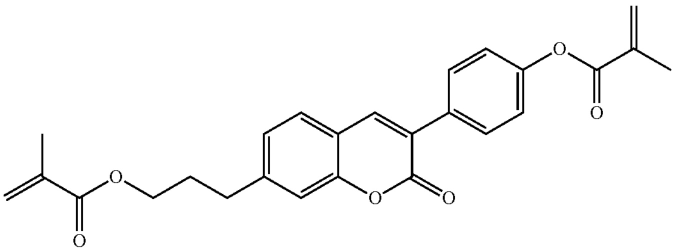 [SMILES: C=C(C)C(=O)OCCCc1ccc2cc(-c3ccc(OC(=O)C(=C)C)cc3)c(=O)oc2c1]
RM-85
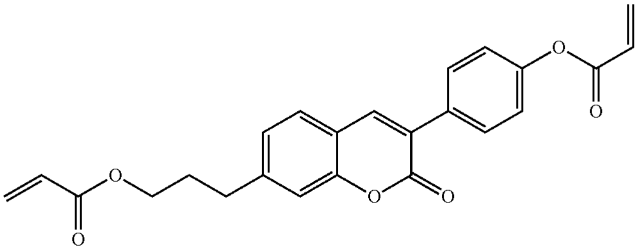 [SMILES: C=CC(=O)OCCCc1ccc2cc(-c3ccc(OC(=O)C=C)cc3)c(=O)oc2c1]
RM-86
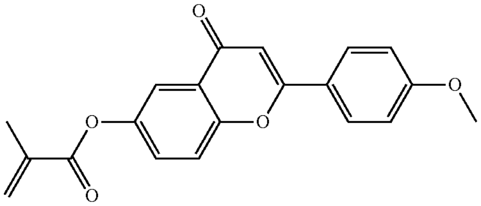 [SMILES: C=C(C)C(=O)Oc1ccc2oc(-c3ccc(OC)cc3)cc(=O)c2c1]

TABLE E-continued
Table E shows illustrative reactive mesogenic compounds which can be used in the LC media in accordance with the present invention.
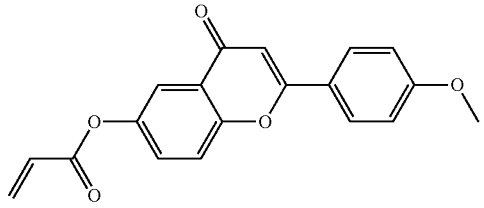 [SMILES: C=CC(=O)Oc1ccc2oc(-c3ccc(OC)cc3)cc(=O)c2c1]
RM-87
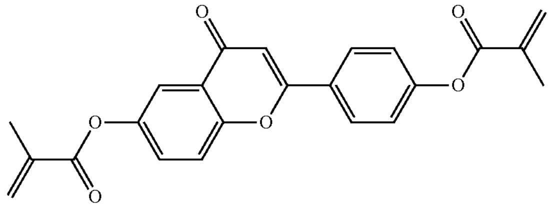
RM-88
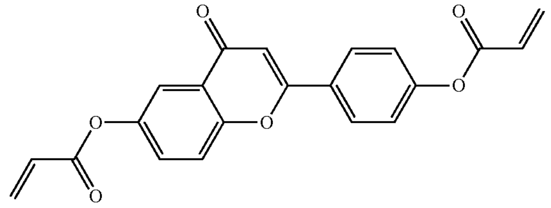 [SMILES: C=CC(=O)Oc1ccc(-c2cc(=O)c3cc(OC(=O)C=C)ccc3o2)cc1]
RM-89
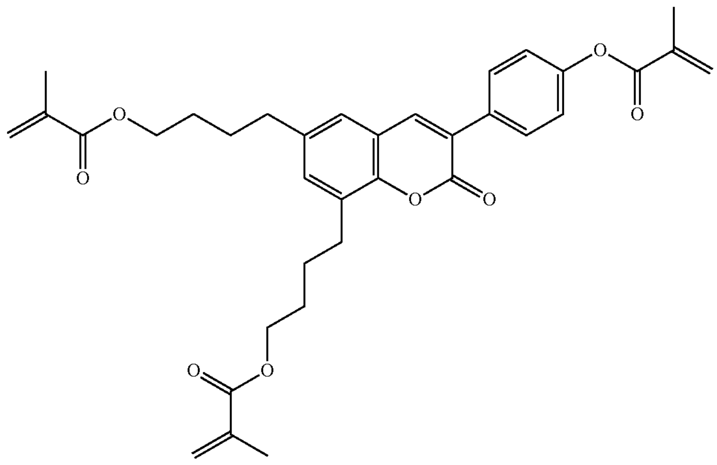 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90
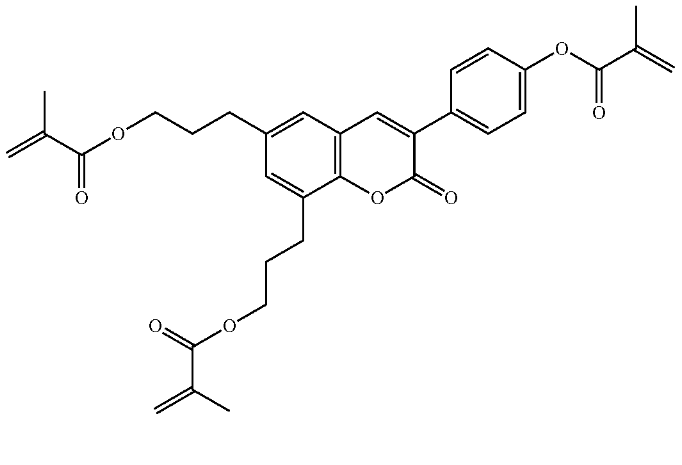 [SMILES: C=C(C)C(=O)OCCCc1cc(CCCOC(=O)C(=C)C)c2oc(=O)c(-c3ccc(OC(=O)C(=C)C)cc3)cc2c1]
RM-91

TABLE E-continued
| Table E shows illustrative reactive mesogenic compounds which can be used in the LC media in accordance with the present invention. |
|---|
RM-92
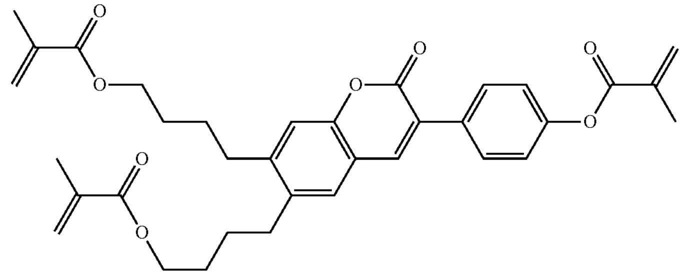 [SMILES: C=C(C)C(=O)OCCCCc1cc2cc(-c3ccc(OC(=O)C(=C)C)cc3)c(=O)oc2cc1CCCCOC(=O)C(=C)C]
RM-93
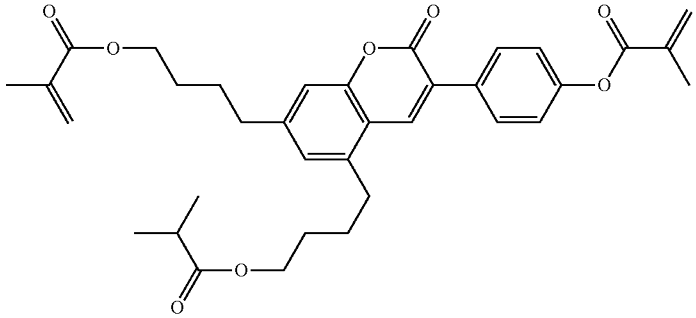 [SMILES: C=C(C)C(=O)OCCCCc1cc(CCCCOC(=O)C(C)C)c2cc(-c3ccc(OC(=O)C(=C)C)cc3)c(=O)oc2c1]
RM-94
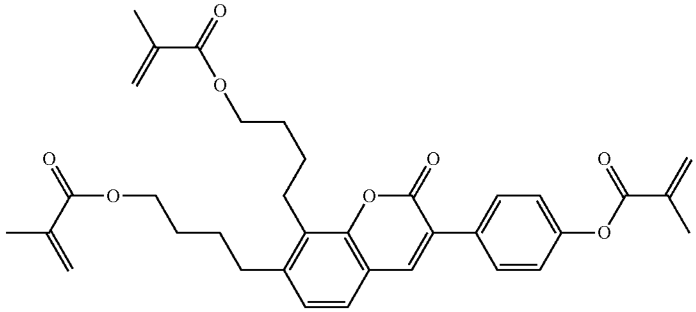 [SMILES: C=C(C)C(=O)OCCCCc1ccc2cc(-c3ccc(OC(=O)C(=C)C)cc3)c(=O)oc2c1CCCCOC(=O)C(=C)C]
RM-95
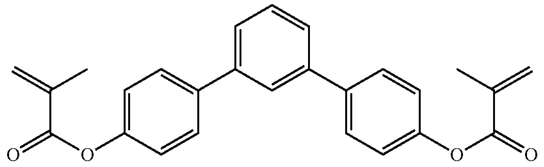 [SMILES: C=C(C)C(=O)Oc1ccc(-c2cccc(-c3ccc(OC(=O)C(=C)C)cc3)c2)cc1]
RM-96
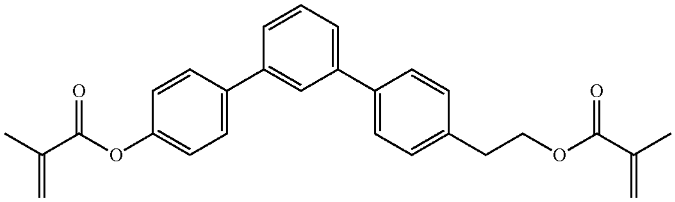 [SMILES: C=C(C)C(=O)OCCc1ccc(-c2cccc(-c3ccc(OC(=O)C(=C)C)cc3)c2)cc1]
RM-97
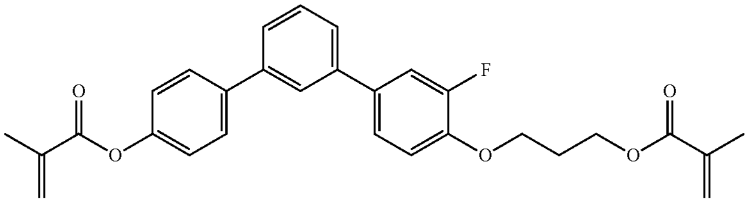 [SMILES: C=C(C)C(=O)OCCCOc1ccc(-c2cccc(-c3ccc(OC(=O)C(=C)C)cc3)c2)cc1F]

TABLE E-continued
| Table E shows illustrative reactive mesogenic compounds which can be used in the LC media in accordance with the present invention. |
|---|
RM-98
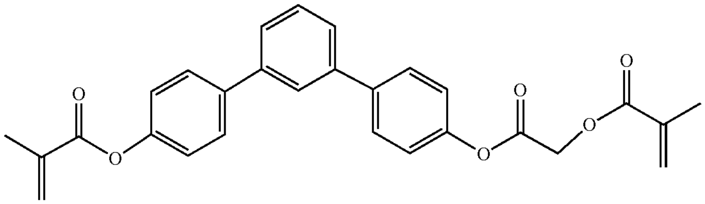 [SMILES: C=C(C)C(=O)OCC(=O)Oc1ccc(-c2cccc(-c3ccc(OC(=O)C(=C)C)cc3)c2)cc1]
RM-99
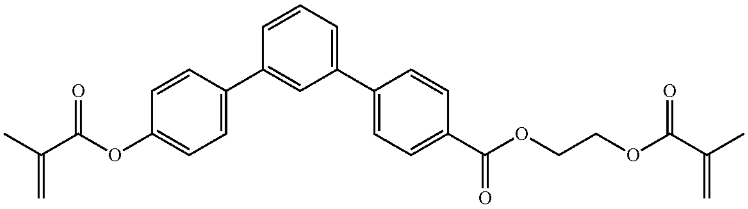 [SMILES: C=C(C)C(=O)OCCOC(=O)c1ccc(-c2cccc(-c3ccc(OC(=O)C(=C)C)cc3)c2)cc1]
RM-100
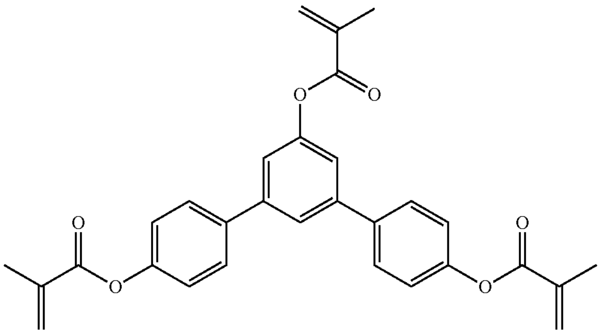 [SMILES: C=C(C)C(=O)Oc1ccc(-c2cc(OC(=O)C(=C)C)cc(-c3ccc(OC(=O)C(=C)C)cc3)c2)cc1]
RM-101
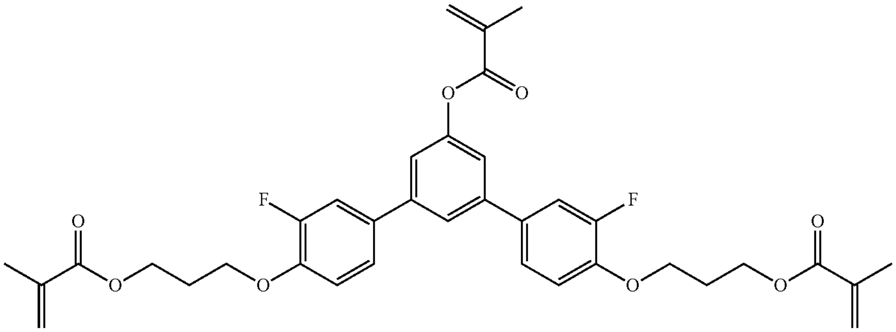 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-102
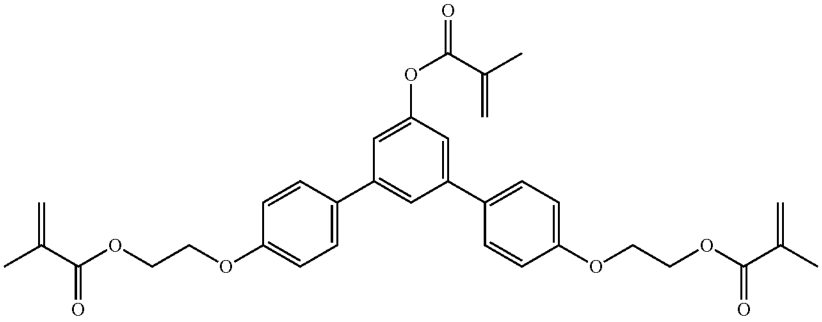 [SMILES: C=C(C)C(=O)OCCOc1ccc(-c2cc(OC(=O)C(=C)C)cc(-c3ccc(OCCOC(=O)C(=C)C)cc3)c2)cc1]

TABLE E-continued
Table E shows illustrative reactive mesogenic compounds which can be used in the LC media in accordance with the present invention.
RM-103
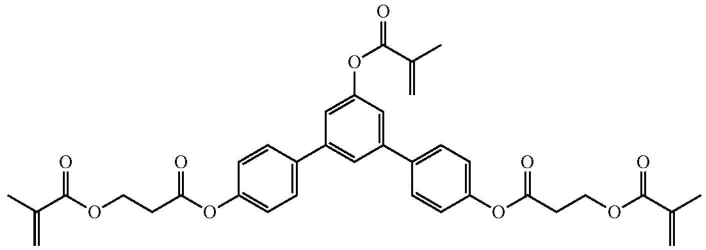 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
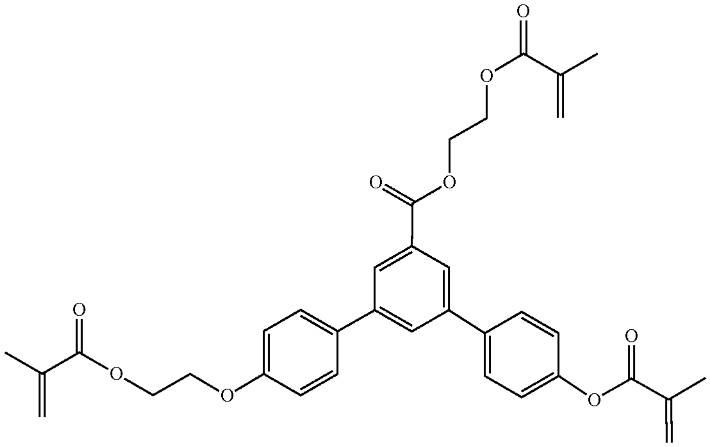 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
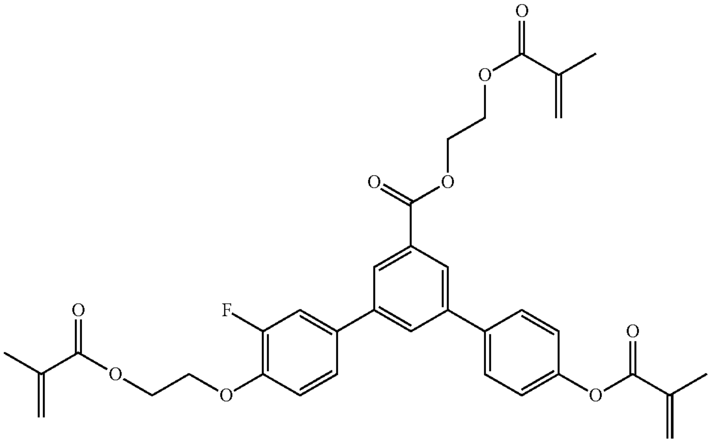 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
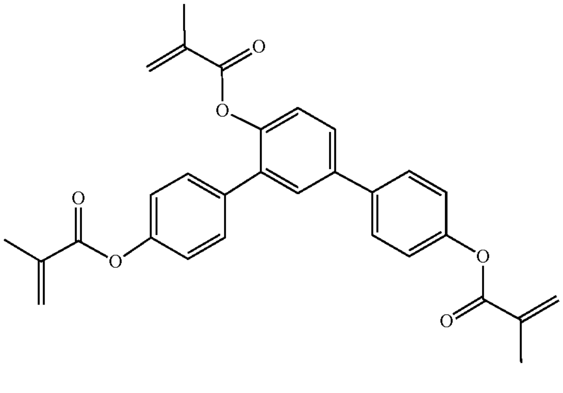 [SMILES: C=C(C)C(=O)Oc1ccc(-c2ccc(OC(=O)C(=C)C)c(-c3ccc(OC(=O)C(=C)C)cc3)c2)cc1]

TABLE E-continued
Table E shows illustrative reactive mesogenic compounds which can be used in the LC media in accordance with the present invention.
RM-107
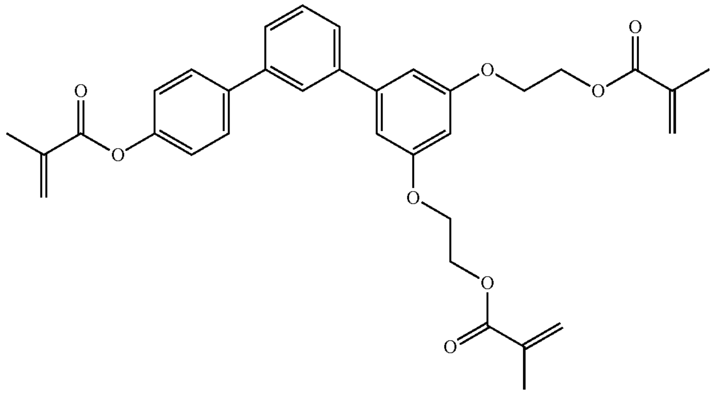 [SMILES: C=C(C)C(=O)OCCOc1cc(OCCOC(=O)C(=C)C)cc(-c2cccc(-c3ccc(OC(=O)C(=C)C)cc3)c2)c1]
RM-108
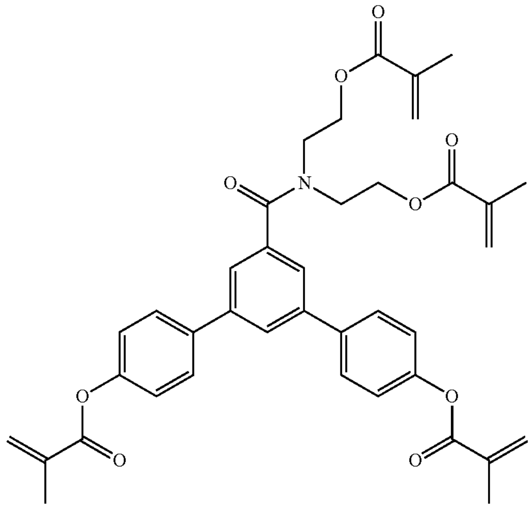 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
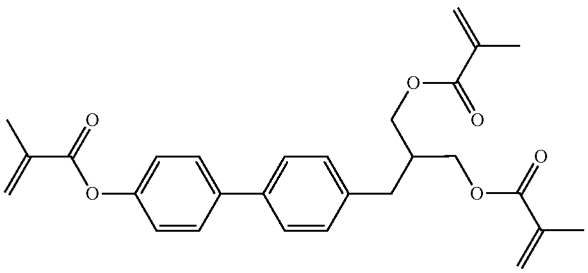 [SMILES: C=C(C)C(=O)OCC(COC(=O)C(=C)C)Cc1ccc(-c2ccc(OC(=O)C(=C)C)cc2)cc1]
RM-110
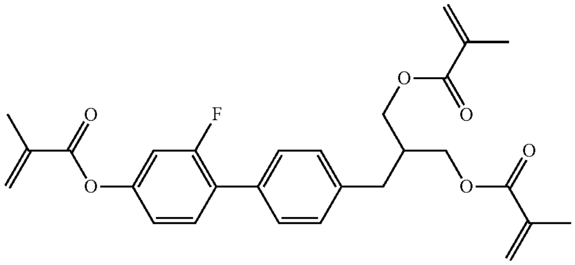 [SMILES: C=C(C)C(=O)OCC(COC(=O)C(=C)C)Cc1ccc(-c2ccc(OC(=O)C(=C)C)cc2F)cc1]

TABLE E-continued
Table E shows illustrative reactive mesogenic compounds which can be used in the LC media in accordance with the present invention.
RM-111
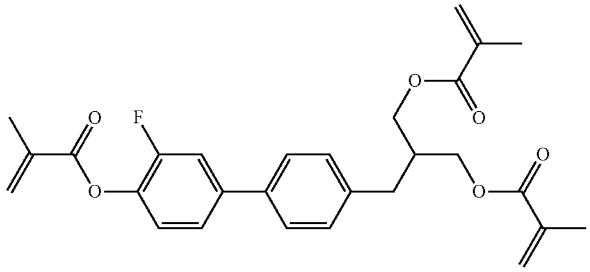 [SMILES: C=C(C)C(=O)OCC(COC(=O)C(=C)C)Cc1ccc(-c2ccc(OC(=O)C(=C)C)c(F)c2)cc1]
RM-112
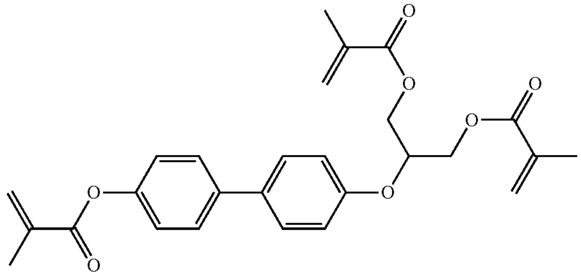 [SMILES: C=C(C)C(=O)OCC(COC(=O)C(=C)C)Oc1ccc(-c2ccc(OC(=O)C(=C)C)cc2)cc1]
RM-113
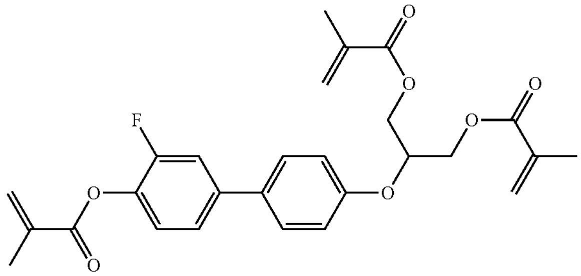 [SMILES: C=C(C)C(=O)OCC(COC(=O)C(=C)C)Oc1ccc(-c2ccc(OC(=O)C(=C)C)c(F)c2)cc1]
RM-114
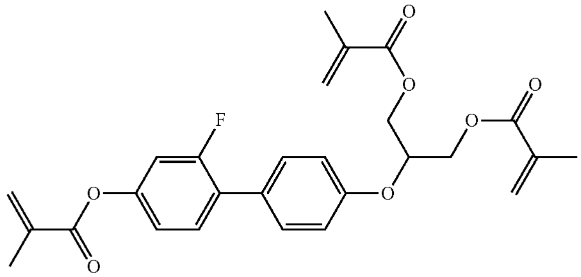 [SMILES: C=C(C)C(=O)OCC(COC(=O)C(=C)C)Oc1ccc(-c2ccc(OC(=O)C(=C)C)cc2F)cc1]
RM-115
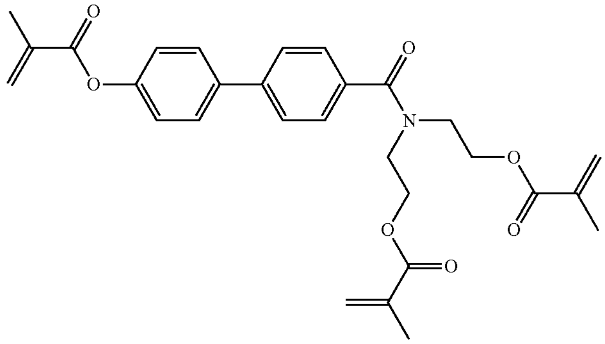 [SMILES: C=C(C)C(=O)OCCN(CCOC(=O)C(=C)C)C(=O)c1ccc(-c2ccc(OC(=O)C(=C)C)cc2)cc1]

TABLE E-continued
Table E shows illustrative reactive mesogenic compounds which can be used in the LC media in accordance with the present invention.
RM-116
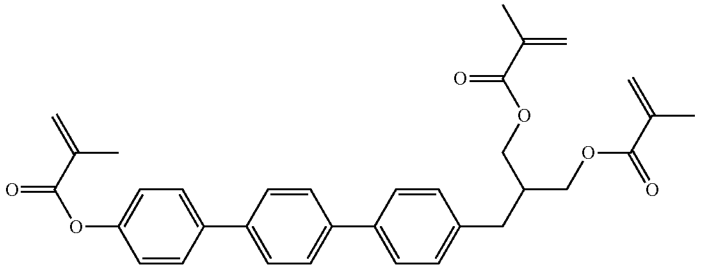 [SMILES: C=C(C)C(=O)OCC(COC(=O)C(=C)C)Cc1ccc(-c2ccc(-c3ccc(OC(=O)C(=C)C)cc3)cc2)cc1]
RM-117
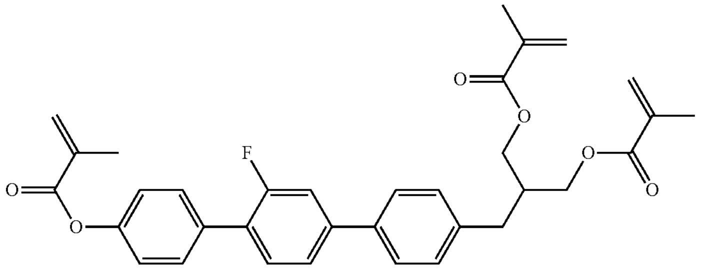 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
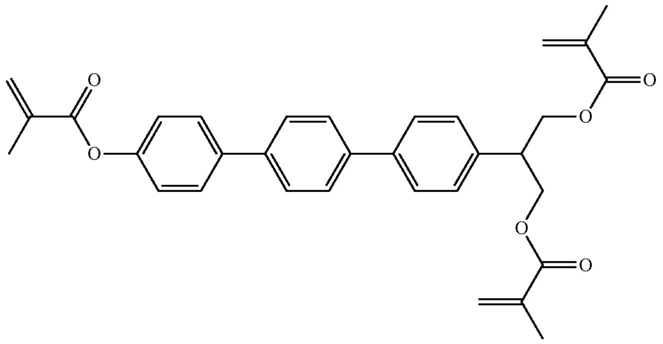 [SMILES: C=C(C)C(=O)OCC(COC(=O)C(=C)C)c1ccc(-c2ccc(-c3ccc(OC(=O)C(=C)C)cc3)cc2)cc1]
RM-119
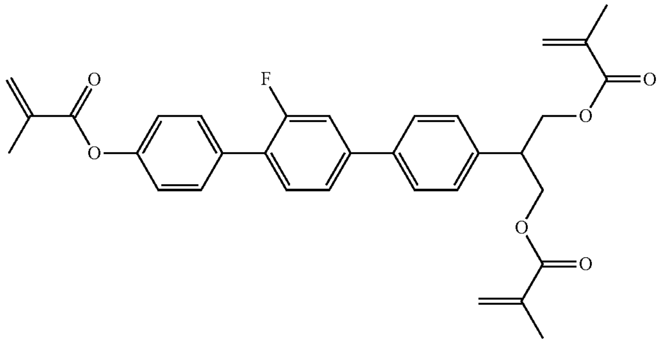 [SMILES: C=C(C)C(=O)OCC(COC(=O)C(=C)C)c1ccc(-c2ccc(-c3ccc(OC(=O)C(=C)C)cc3)c(F)c2)cc1]
RM-120
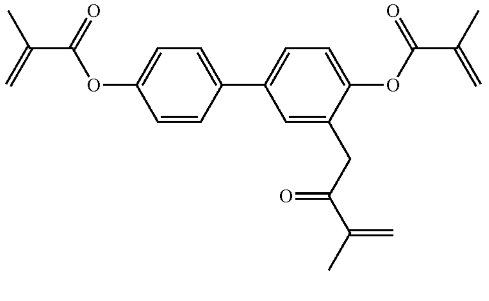 [SMILES: C=C(C)C(=O)Cc1cc(-c2ccc(OC(=O)C(=C)C)cc2)ccc1OC(=O)C(=C)C]

TABLE E-continued
Table E shows illustrative reactive mesogenic compounds which can be used in the LC media in accordance with the present invention.
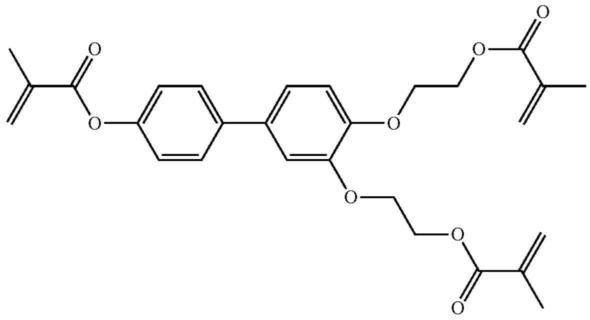 [SMILES: C=C(C)C(=O)OCCOc1ccc(-c2ccc(OC(=O)C(=C)C)cc2)cc1OCCOC(=O)C(=C)C]
RM-121
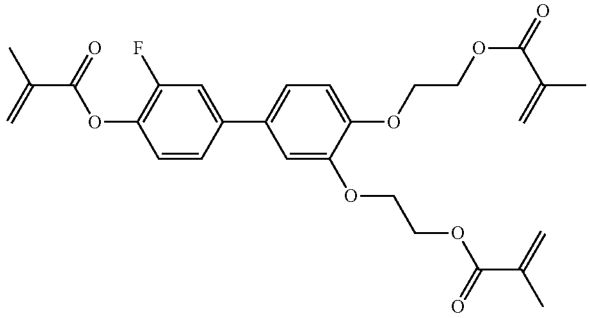 [SMILES: C=C(C)C(=O)OCCOc1ccc(-c2ccc(OC(=O)C(=C)C)c(F)c2)cc1OCCOC(=O)C(=C)C]
RM-122
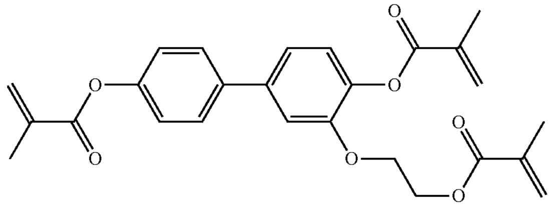 [SMILES: C=C(C)C(=O)OCCOc1cc(-c2ccc(OC(=O)C(=C)C)cc2)ccc1OC(=O)C(=C)C]
RM-123
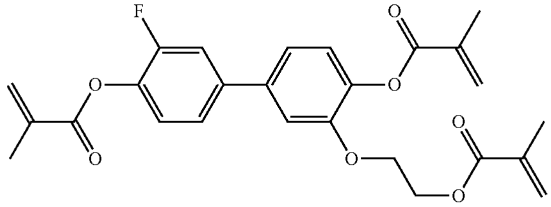 [SMILES: C=C(C)C(=O)OCCOc1cc(-c2ccc(OC(=O)C(=C)C)c(F)c2)ccc1OC(=O)C(=C)C]
RM-124
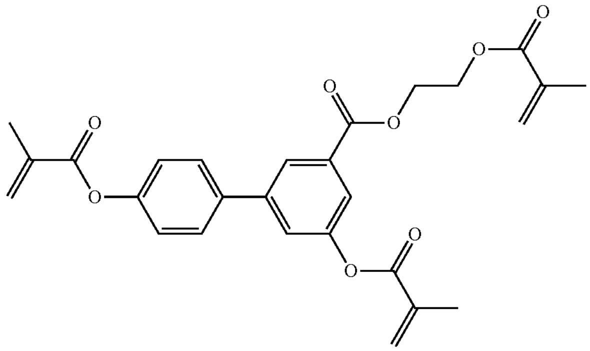 [SMILES: C=C(C)C(=O)OCCOC(=O)c1cc(OC(=O)C(=C)C)cc(-c2ccc(OC(=O)C(=C)C)cc2)c1]
RM-125

TABLE E-continued
Table E shows illustrative reactive mesogenic compounds which can be used in the LC media in accordance with the present invention.
RM-126
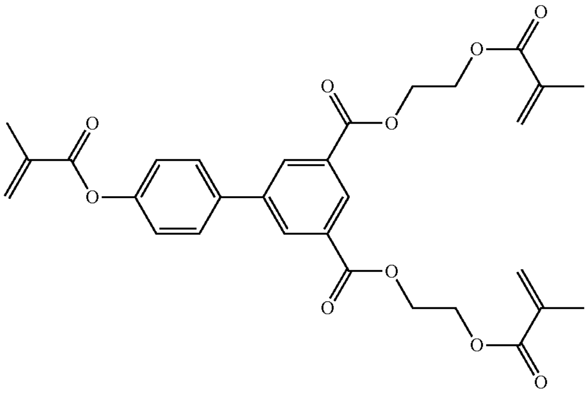 [SMILES: C=C(C)C(=O)OCCOC(=O)c1cc(C(=O)OCCOC(=O)C(=C)C)cc(-c2ccc(OC(=O)C(=C)C)cc2)c1]
RM-127
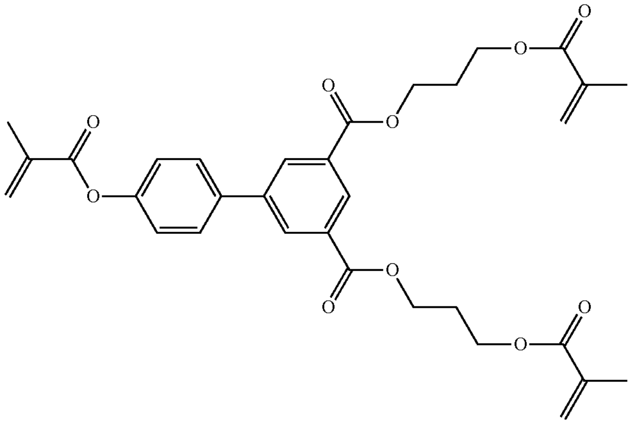 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
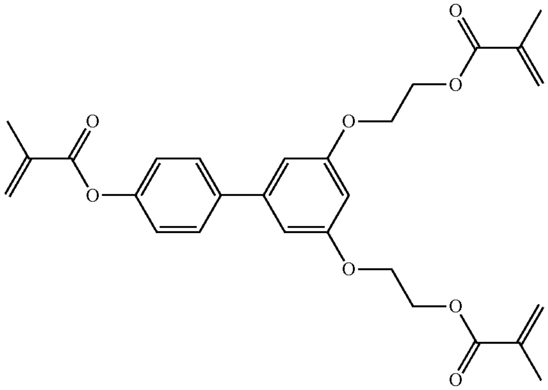 [SMILES: C=C(C)C(=O)OCCOc1cc(OCCOC(=O)C(=C)C)cc(-c2ccc(OC(=O)C(=C)C)cc2)c1]

TABLE E-continued
Table E shows illustrative reactive mesogenic compounds which can be used in the LC media in accordance with the present invention.
RM-129
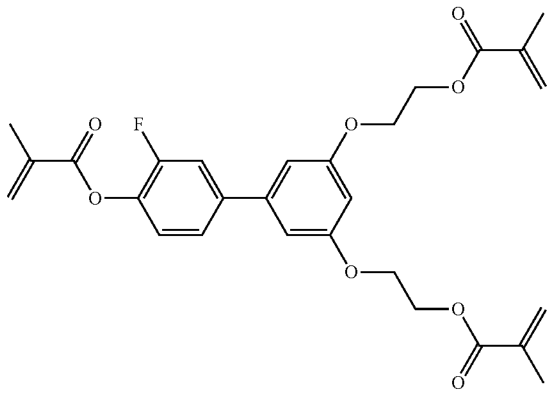 [SMILES: C=C(C)C(=O)OCCOc1cc(OCCOC(=O)C(=C)C)cc(-c2ccc(OC(=O)C(=C)C)c(F)c2)c1]
RM-130
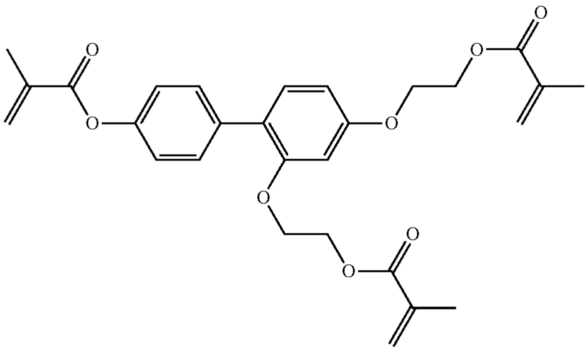 [SMILES: C=C(C)C(=O)OCCOc1ccc(-c2ccc(OC(=O)C(=C)C)cc2)c(OCCOC(=O)C(=C)C)c1]
RM-131
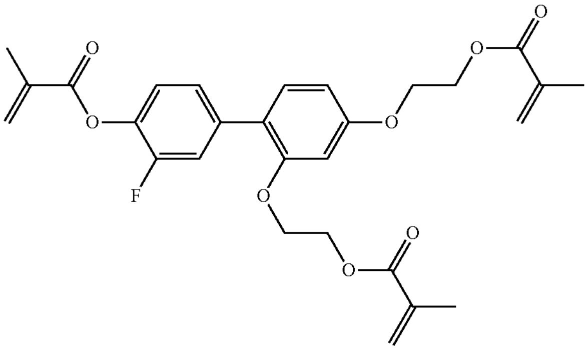 [SMILES: C=C(C)C(=O)OCCOc1ccc(-c2ccc(OC(=O)C(=C)C)c(F)c2)c(OCCOC(=O)C(=C)C)c1]
RM-132
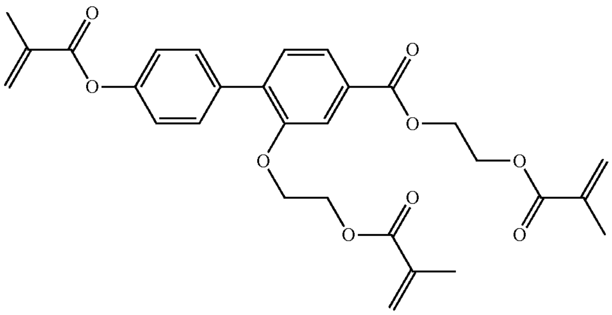 [SMILES: C=C(C)C(=O)OCCOC(=O)c1ccc(-c2ccc(OC(=O)C(=C)C)cc2)c(OCCOC(=O)C(=C)C)c1]

TABLE E-continued
| Table E shows illustrative reactive mesogenic compounds which can be used in the LC media in accordance with the present invention. |
|---|
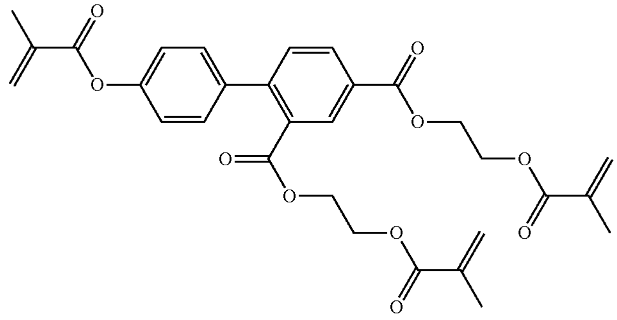 [SMILES: C=C(C)C(=O)OCCOC(=O)c1ccc(-c2ccc(OC(=O)C(=C)C)cc2)c(C(=O)OCCOC(=O)C(=C)C)c1]
RM-133
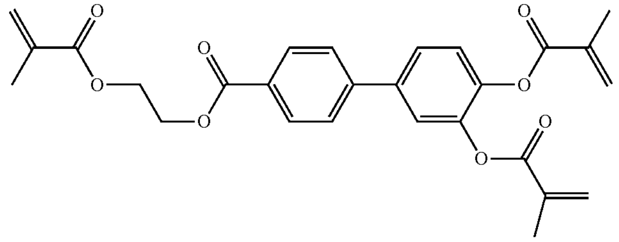 [SMILES: C=C(C)C(=O)OCCOC(=O)c1ccc(-c2ccc(OC(=O)C(=C)C)c(OC(=O)C(=C)C)c2)cc1]
RM-134
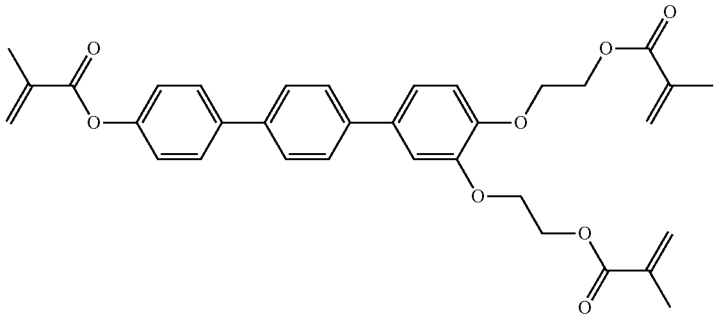 [SMILES: C=C(C)C(=O)OCCOc1ccc(-c2ccc(-c3ccc(OC(=O)C(=C)C)cc3)cc2)cc1OCCOC(=O)C(=C)C]
RM-135
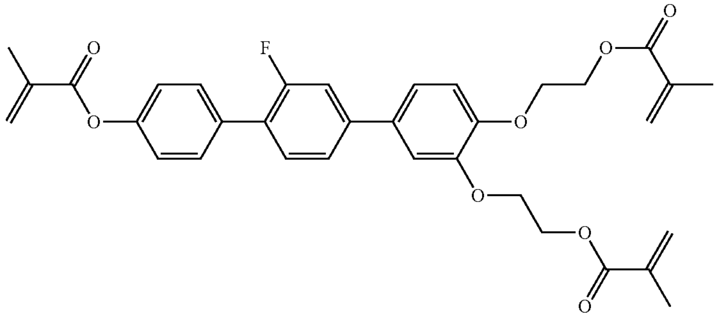 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136

TABLE E-continued
Table E shows illustrative reactive mesogenic compounds which can be used in the LC media in accordance with the present invention.
RM-137
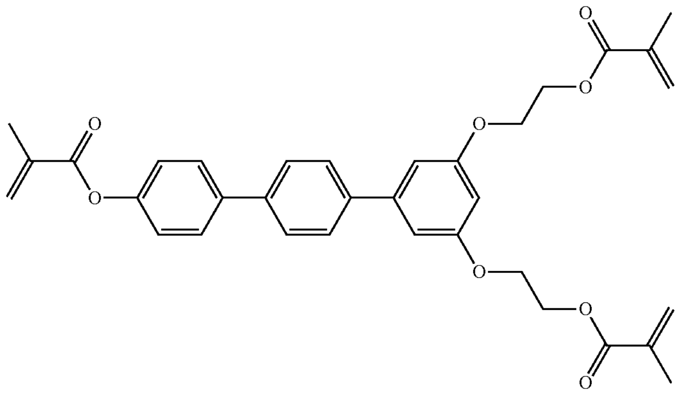 [SMILES: C=C(C)C(=O)OCCOc1cc(OCCOC(=O)C(=C)C)cc(-c2ccc(-c3ccc(OC(=O)C(=C)C)cc3)cc2)c1]
RM-138
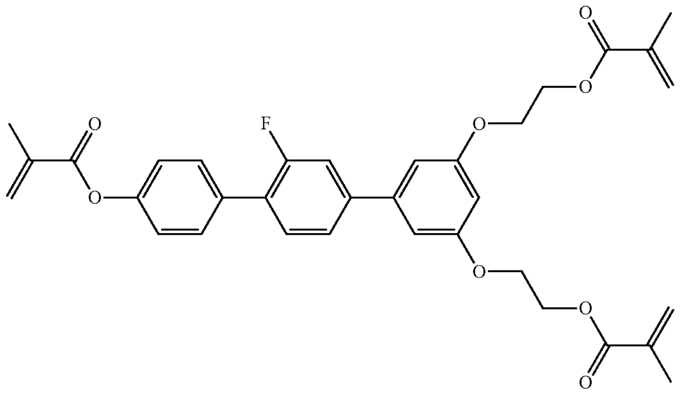 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-139
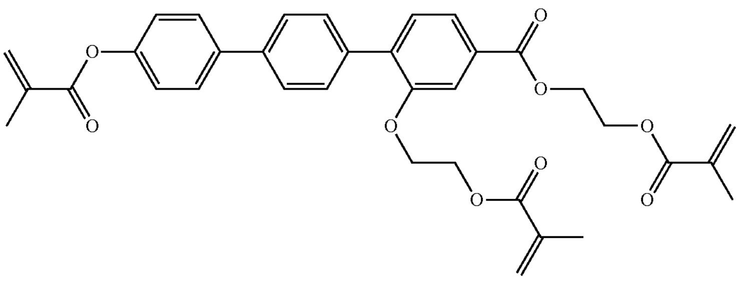 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
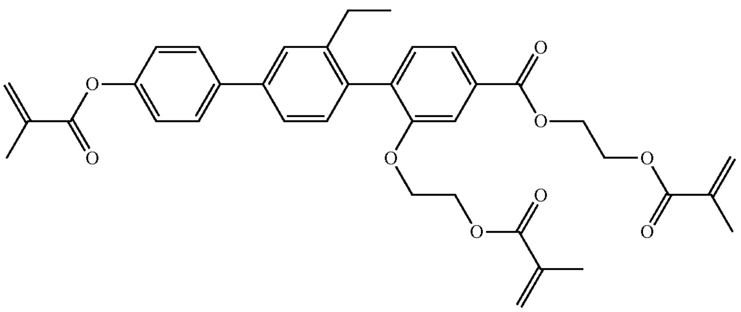 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

TABLE E-continued
Table E shows illustrative reactive mesogenic compounds which can be used in the LC media in accordance with the present invention.
RM-141
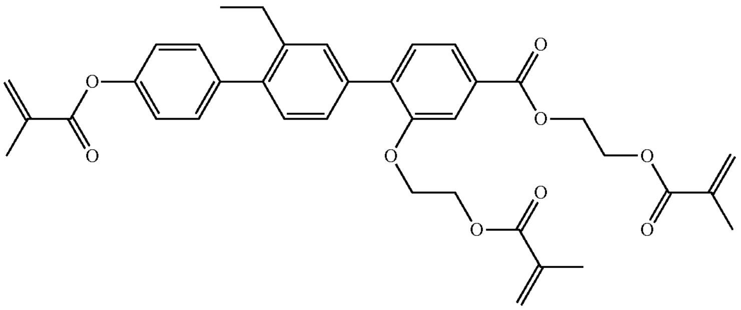 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-142
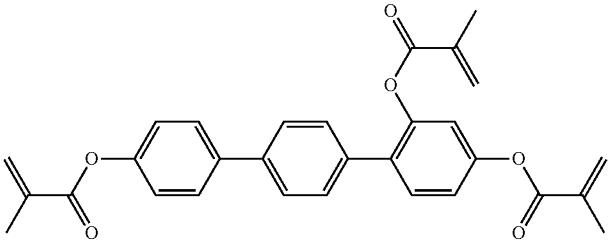 [SMILES: C=C(C)C(=O)Oc1ccc(-c2ccc(-c3ccc(OC(=O)C(=C)C)cc3OC(=O)C(=C)C)cc2)cc1]
RM-143
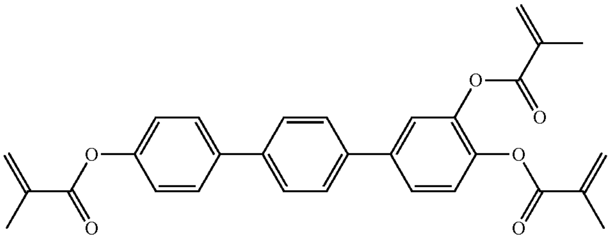 [SMILES: C=C(C)C(=O)Oc1ccc(-c2ccc(-c3ccc(OC(=O)C(=C)C)c(OC(=O)C(=C)C)c3)cc2)cc1]
RM-144
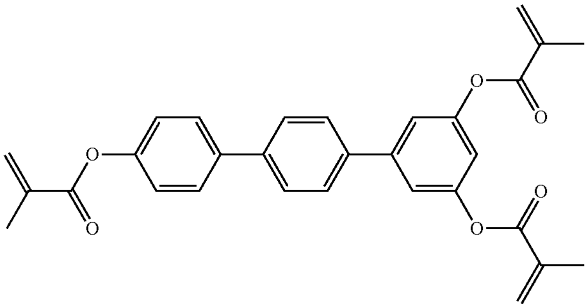 [SMILES: C=C(C)C(=O)Oc1ccc(-c2ccc(-c3cc(OC(=O)C(=C)C)cc(OC(=O)C(=C)C)c3)cc2)cc1]
RM-145
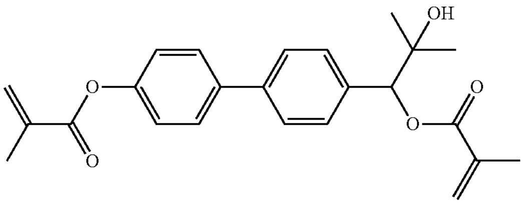 [SMILES: C=C(C)C(=O)Oc1ccc(-c2ccc(C(OC(=O)C(=C)C)C(C)(C)O)cc2)cc1]
RM-146
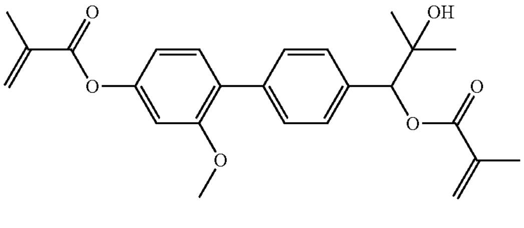 [SMILES: C=C(C)C(=O)Oc1ccc(-c2ccc(C(OC(=O)C(=C)C)C(C)(C)O)cc2)c(OC)c1]

TABLE E-continued
Table E shows illustrative reactive mesogenic compounds which can be used in the LC media in accordance with the present invention.
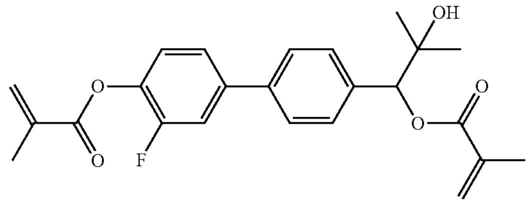
RM-147
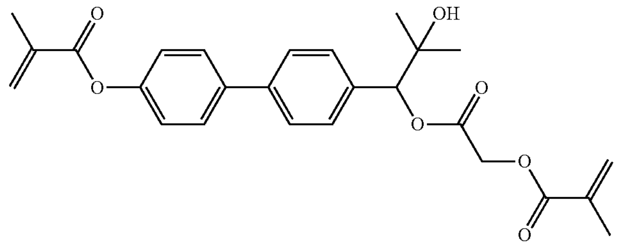 [SMILES: C=C(C)C(=O)OCC(=O)OC(c1ccc(-c2ccc(OC(=O)C(=C)C)cc2)cc1)C(C)(C)O]
RM-148
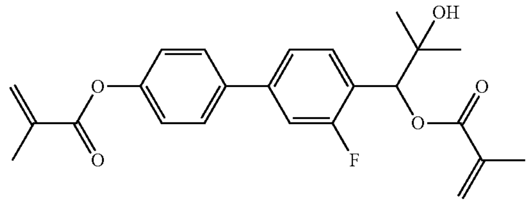
RM-149
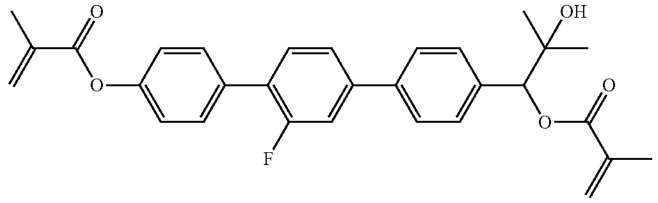 [SMILES: C=C(C)C(=O)Oc1ccc(-c2ccc(-c3ccc(C(OC(=O)C(=C)C)C(C)(C)O)cc3)cc2F)cc1]
RM-150
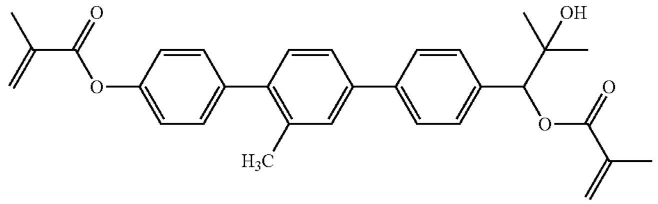 [SMILES: C=C(C)C(=O)Oc1ccc(-c2ccc(-c3ccc(C(OC(=O)C(=C)C)C(C)(C)O)cc3)cc2C)cc1]
RM-151
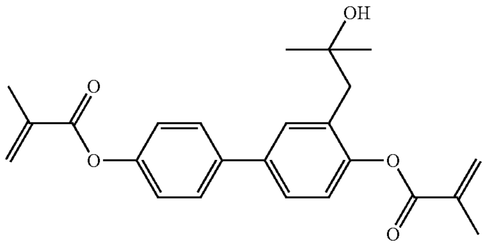 [SMILES: C=C(C)C(=O)Oc1ccc(-c2ccc(OC(=O)C(=C)C)c(CC(C)(C)O)c2)cc1]
RM-152
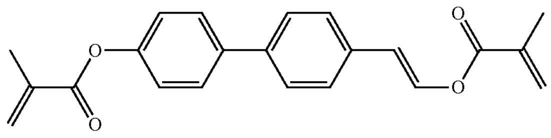 [SMILES: C=C(C)C(=O)O/C=C/c1ccc(-c2ccc(OC(=O)C(=C)C)cc2)cc1]
RM-153

TABLE E-continued
Table E shows illustrative reactive mesogenic compounds which can be used in the LC media in accordance with the present invention.
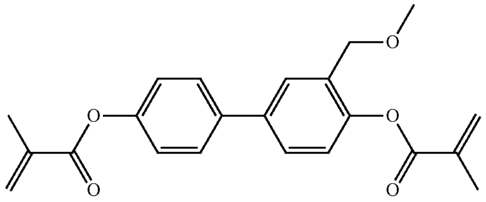 [SMILES: C=C(C)C(=O)Oc1ccc(-c2ccc(OC(=O)C(=C)C)c(COC)c2)cc1]
RM-154
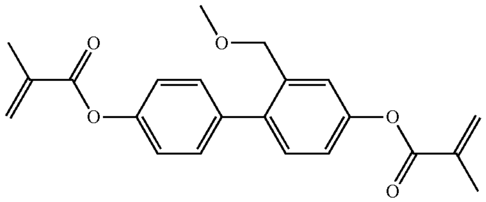 [SMILES: C=C(C)C(=O)Oc1ccc(-c2ccc(OC(=O)C(=C)C)cc2COC)cc1]
RM-155
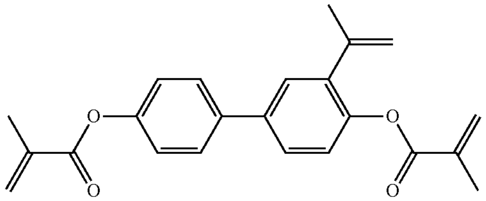 [SMILES: C=C(C)C(=O)Oc1ccc(-c2ccc(OC(=O)C(=C)C)c(C(=C)C)c2)cc1]
RM-156
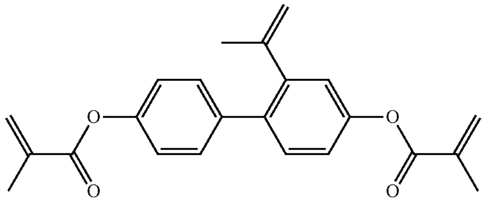 [SMILES: C=C(C)C(=O)Oc1ccc(-c2ccc(OC(=O)C(=C)C)cc2C(=C)C)cc1]
RM-157
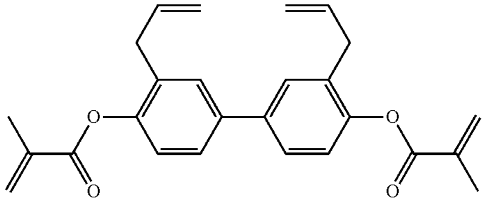 [SMILES: C=CCc1cc(-c2ccc(OC(=O)C(=C)C)c(CC=C)c2)ccc1OC(=O)C(=C)C]
RM-158
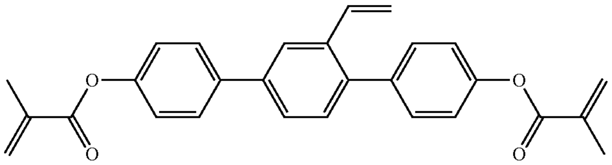 [SMILES: C=Cc1cc(-c2ccc(OC(=O)C(=C)C)cc2)ccc1-c1ccc(OC(=O)C(=C)C)cc1]
RM-159
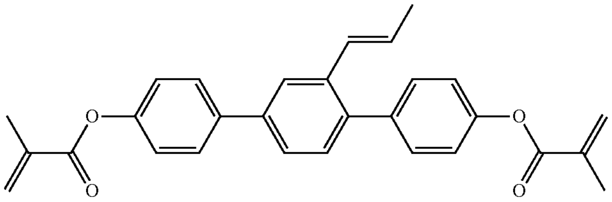 [SMILES: C=C(C)C(=O)Oc1ccc(-c2ccc(-c3ccc(OC(=O)C(=C)C)cc3)c(/C=C/C)c2)cc1]
RM-160

TABLE E-continued
| Table E shows illustrative reactive mesogenic compounds which can be used in the LC media in accordance with the present invention. |
| --- |
RM-161
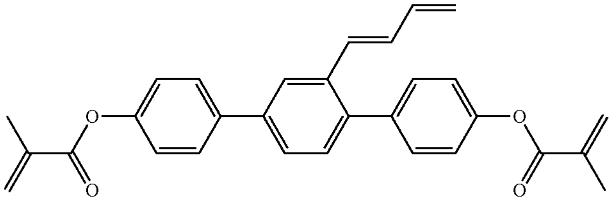 [SMILES: C=C/C=C/c1cc(-c2ccc(OC(=O)C(=C)C)cc2)ccc1-c1ccc(OC(=O)C(=C)C)cc1]
RM-162
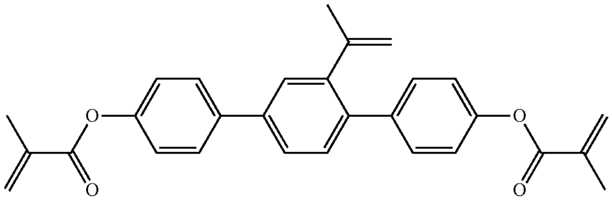 [SMILES: C=C(C)C(=O)Oc1ccc(-c2ccc(-c3ccc(OC(=O)C(=C)C)cc3)c(C(=C)C)c2)cc1]
RM-163
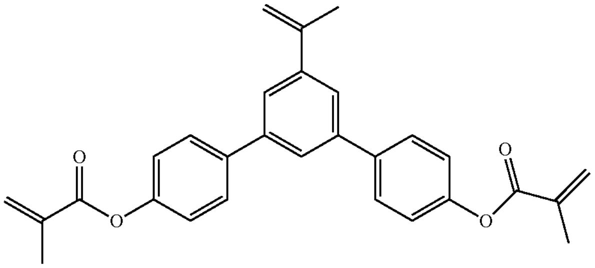 [SMILES: C=C(C)C(=O)Oc1ccc(-c2cc(C(=C)C)cc(-c3ccc(OC(=O)C(=C)C)cc3)c2)cc1]
RM-164
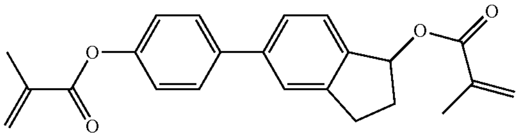 [SMILES: C=C(C)C(=O)Oc1ccc(-c2ccc3c(c2)CCC3OC(=O)C(=C)C)cc1]
RM-165
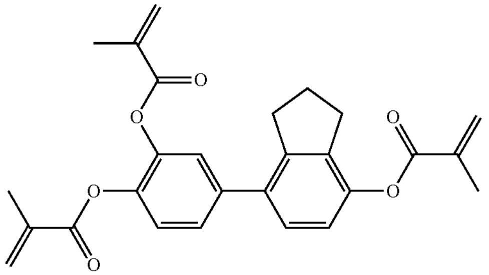 [SMILES: C=C(C)C(=O)Oc1ccc(-c2ccc(OC(=O)C(=C)C)c3c2CCC3)cc1OC(=O)C(=C)C]
RM-166
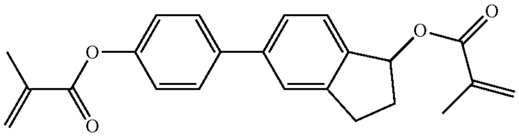 [SMILES: C=C(C)C(=O)Oc1ccc(-c2ccc3c(c2)CCC3OC(=O)C(=C)C)cc1]
RM-167
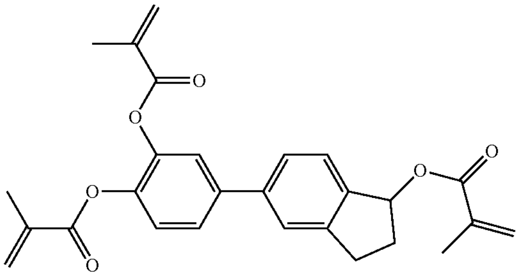 [SMILES: C=C(C)C(=O)Oc1ccc(-c2ccc3c(c2)CCC3OC(=O)C(=C)C)cc1OC(=O)C(=C)C]

TABLE E-continued
| Table E shows illustrative reactive mesogenic compounds which can be used in the LC media in accordance with the present invention. |
|---|
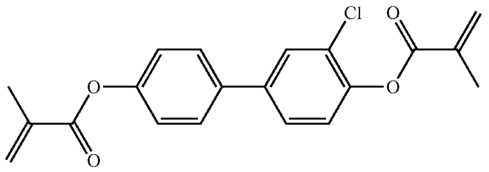 [SMILES: C=C(C)C(=O)Oc1ccc(-c2ccc(OC(=O)C(=C)C)c(Cl)c2)cc1]
RM-168
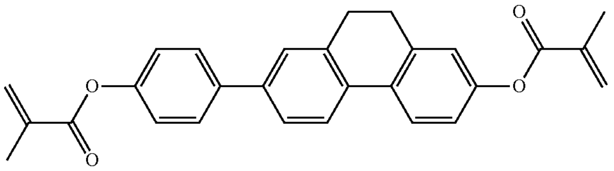 [SMILES: C=C(C)C(=O)Oc1ccc(-c2ccc3c(c2)CCc2cc(OC(=O)C(=C)C)ccc2-3)cc1]
RM-169
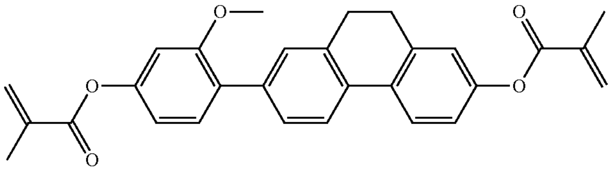 [SMILES: C=C(C)C(=O)Oc1ccc2c(c1)CCc1cc(-c3ccc(OC(=O)C(=C)C)cc3OC)ccc1-2]
RM-170
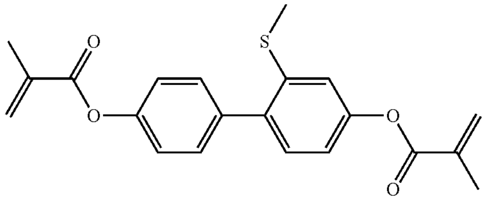 [SMILES: C=C(C)C(=O)Oc1ccc(-c2ccc(OC(=O)C(=C)C)cc2SC)cc1]
RM-171
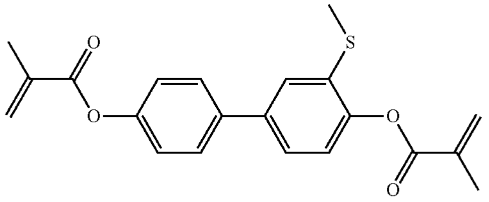
RM-172
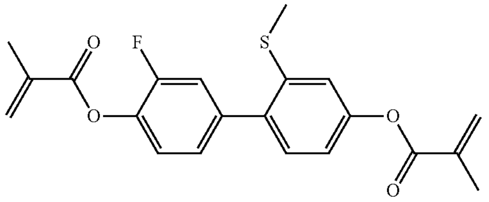 [SMILES: C=C(C)C(=O)Oc1ccc(-c2ccc(OC(=O)C(=C)C)c(F)c2)c(SC)c1]
RM-173
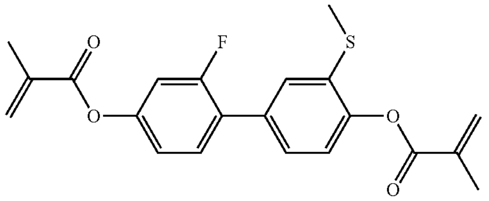 [SMILES: C=C(C)C(=O)Oc1ccc(-c2ccc(OC(=O)C(=C)C)c(SC)c2)c(F)c1]
RM-174

TABLE E-continued
| Table E shows illustrative reactive mesogenic compounds which can be used in the LC media in accordance with the present invention. |
| --- |
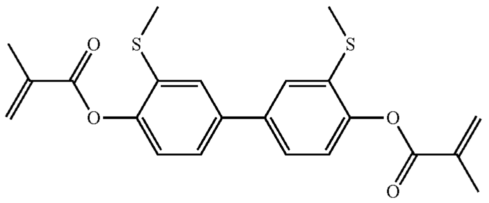 [SMILES: C=C(C)C(=O)Oc1ccc(-c2ccc(OC(=O)C(=C)C)c(SC)c2)cc1SC]
RM-175
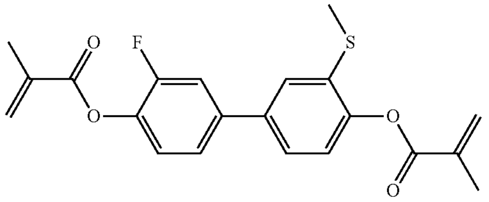 [SMILES: C=C(C)C(=O)Oc1ccc(-c2ccc(OC(=O)C(=C)C)c(SC)c2)cc1F]
RM-176
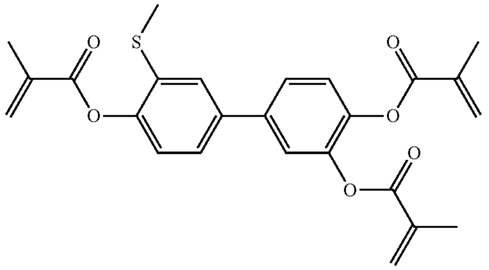 [SMILES: C=C(C)C(=O)Oc1ccc(-c2ccc(OC(=O)C(=C)C)c(SC)c2)cc1OC(=O)C(=C)C]
RM-177
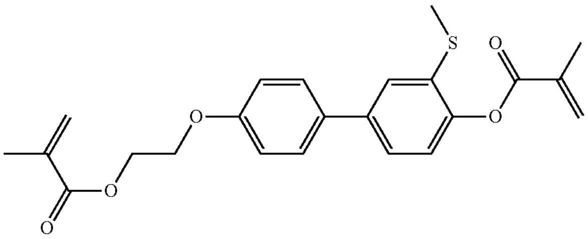
RM-178
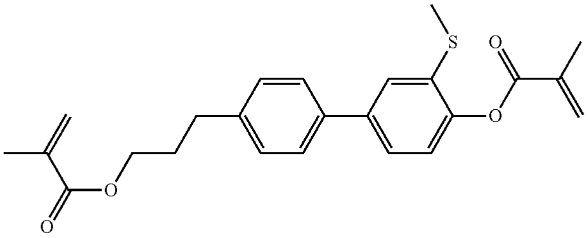 [SMILES: C=C(C)C(=O)OCCOc1ccc(-c2ccc(OC(=O)C(=C)C)c(SC)c2)cc1]
RM-179
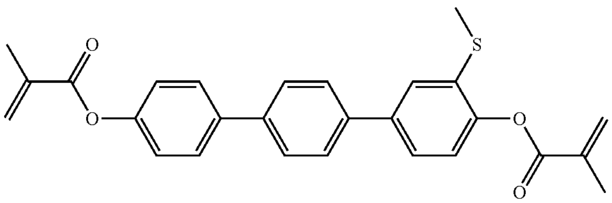 [SMILES: C=C(C)C(=O)Oc1ccc(-c2ccc(-c3ccc(OC(=O)C(=C)C)c(SC)c3)cc2)cc1]
RM-180

TABLE E-continued

Table E shows illustrative reactive mesogenic compounds which can be used in the LC media in accordance with the present invention.

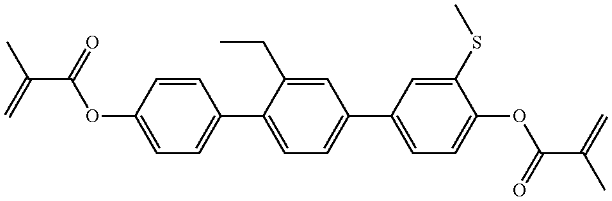 [SMILES: C=C(C)C(=O)Oc1ccc(-c2ccc(-c3ccc(OC(=O)C(=C)C)c(SC)c3)cc2CC)cc1]

RM-181

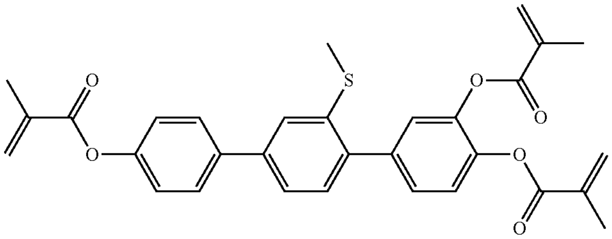 [SMILES: C=C(C)C(=O)Oc1ccc(-c2ccc(-c3ccc(OC(=O)C(=C)C)c(OC(=O)C(=C)C)c3)c(SC)c2)cc1]

RM-182

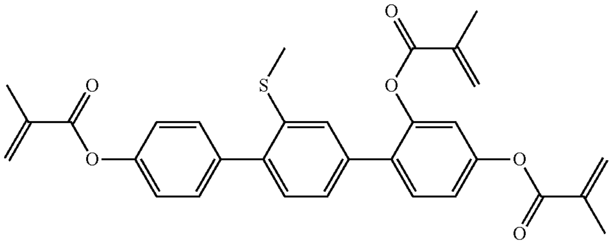 [SMILES: C=C(C)C(=O)Oc1ccc(-c2ccc(-c3ccc(OC(=O)C(=C)C)cc3OC(=O)C(=C)C)cc2SC)cc1]

RM-183

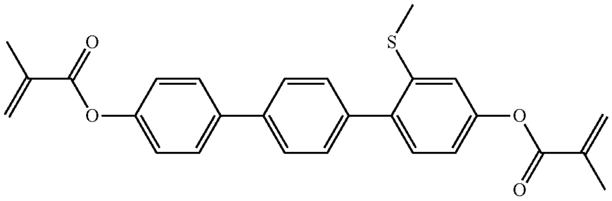 [SMILES: C=C(C)C(=O)Oc1ccc(-c2ccc(-c3ccc(OC(=O)C(=C)C)cc3SC)cc2)cc1]

RM-184

In a preferred embodiment, the mixtures according to the invention comprise one or more polymerizable compounds, preferably selected from the polymerizable compounds of the formulae RM-1 to RM-182. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-163, RM-169, RM-170 and RM-171 to RM-183 are particularly preferred.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C., $n_e$ extraordinary refractive index at 20° C. and 589 nm, $n_o$ ordinary refractive index at 20° C. and 589 nm, $\Delta n$ optical anisotropy at 20° C. and 589 nm, $\varepsilon_\perp$ dielectric permittivity perpendicular to the director at 20° C. and 1 kHz, $\varepsilon_\parallel$ dielectric permittivity parallel to the director at 20° C. and 1 kHz, $\Delta\varepsilon$ dielectric anisotropy at 20° C. and 1 kHz, cl.p., T(N,I) clearing point [° C.], $\gamma_1$ rotational viscosity at 20° C. [mPa·s], $K_1$ elastic constant, "splay" deformation at 20° C. [pN], $K_2$ elastic constant, "twist" deformation at 20° C. [pN], $K_3$ elastic constant, "bend" deformation at 20° C. [pN]

$K_{avg}$ average elastic constant at 20° C. [pN] defined here as $$K_{avg}=(3/2K_1+K_3)/3\approx(K_1+K_2+K_3)/3,$$

LTS low-temperature stability of the phase, determined in test cells,

VHR voltage holding ratio.

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

A PSVA display or PSVA test cell used for photopolymerization and measurement of the tilt angles etc. consists of two plane-parallel glass outer plates at a separation of 3-4 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell has the same structure but wherein one or both polyimide layers are omitted.

The polymerizable compounds are polymerized in the display or test cell by irradiation with UV light of defined intensity for a prespecified time, with a voltage simultaneously being applied to the display (usually 10 V to 30 V alternating current, 1 kHz).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Example 1

The nematic LC mixture N1 is formulated as follows.

| | | | |
|---|---|---|---|
| PUS-3-2 | 10.0% | Cl. p. [° C.]: | 82.5 |
| B(S)-2O-O4 | 4.5% | Δn [589 nm, 20° C.]: | 0.1240 |
| B(S)-2O-O5 | 4.5% | Δε [1 kHz, 20° C.]: | −5.1 |
| B(S)-2O-O6 | 3.6% | $K_1$ [pN, 20° C.]: | 14.0 |
| CC-3-V | 25.2% | $K_3$ [pN, 20° C.]: | 16.1 |
| CCP-3-1 | 2.25% | $\gamma_1$ [mPa s, 20° C.]: | 122 |
| CCY-3-O1 | 7.2% | | |
| CCY-3-O2 | 9.45% | | |
| CCY-4-O2 | 9.0% | | |
| CPY-3-O2 | 9.45% | | |
| CY-3-O2 | 4.95% | | |
| Y-4O-O4 | 8.1% | | |
| PGIY-2-O4 | 1.8% | | |
| Σ | 100.0% | | |

To the mixture N1 are added 150 ppm of the stabiliser ST-3a-1.

ST-3a-1

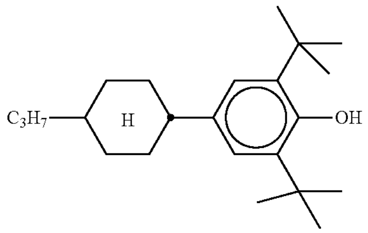

Example 2

The nematic LC mixture N2 is formulated as follows.

| | | | |
|---|---|---|---|
| PUS-3-2 | 10.0% | Cl. p. [° C.]: | 83.5 |
| B(S)-2O-O4 | 2.7% | Δn [589 nm, 20° C.]: | 0.1255 |
| B(S)-2O-O5 | 3.6% | Δε [1 kHz, 20° C.]: | −5.4 |
| B(S)-2O-O6 | 2.7% | $K_1$ [pN, 20° C.]: | 14.6 |
| CC-3-V | 19.8% | $K_3$ [pN, 20° C.]: | 16.5 |
| CCY-3-O2 | 6.3% | $\gamma_1$ [mPa s, 20° C.]: | 147 |
| CLY-2-O4 | 3.6% | | |
| CLY-3-O2 | 5.4% | | |
| CLY-3-O3 | 4.5% | | |
| CLY-4-O2 | 4.5% | | |
| CLY-5-O2 | 4.5% | | |
| CPY-3-O2 | 7.2% | | |
| CY-3-O2 | 13.95% | | |
| CY-3-O4 | 11.25% | | |
| Σ | 100.0% | | |

To the mixture N2 are added 100 ppm of the stabiliser H-1-1-1.

H-1-1-1

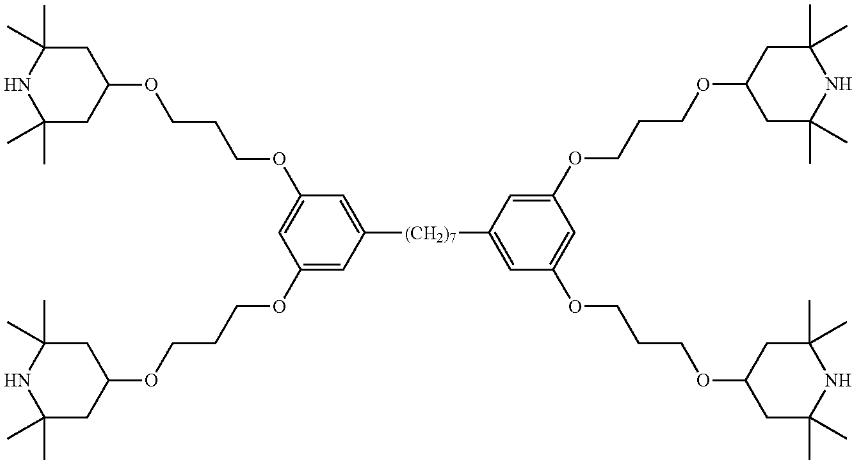

Example 3

The nematic LC mixture N3 is formulated as follows.

| | | | |
|---|---|---|---|
| PUS-3-2 | 10.0% | Cl. p. [° C.]: | 82.5 |
| B(S)-2O-O4 | 3.6% | Δn [589 nm, 20° C.]: | 0.1243 |
| B(S)-2O-O5 | 3.6% | Δε [1 kHz, 20° C.]: | −5.5 |
| B(S)-2O-O6 | 3.6% | $K_1$ [pN, 20° C.]: | 14.7 |
| B-2O-O5 | 2.7% | $K_3$ [pN, 20° C.]: | 15.9 |
| CC-3-V | 25.65% | $\gamma_1$ [mPa s, 20° C.]: | 122 |
| CCY-3-O1 | 3.6% | | |
| CCY-3-O2 | 9.0% | | |
| CLY-2-O4 | 3.6% | | |
| CLY-3-O2 | 5.4% | | |
| CLY-3-O3 | 4.5% | | |
| CLY-4-O2 | 4.5% | | |
| CLY-5-O2 | 3.6% | | |
| CPY-3-O2 | 4.5% | | |
| CY-3-O2 | 4.05% | | |
| Y-4O-O4 | 8.1% | | |
| Σ | 100.0% | | |

To the mixture N3 are added 100 ppm of the stabiliser ST-3b-1 and 50 ppm of the stabiliser ST-3a-1.

ST-3b-1

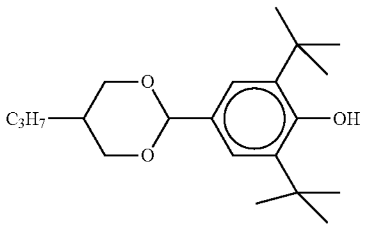

Example 4

The nematic LC mixture N4 is formulated as follows.

| | | | |
|---|---|---|---|
| PUS-3-2 | 10.0% | Cl. p. [° C.]: | 83.0 |
| B(S)-2O-O4 | 2.7% | Δn [589 nm, 20° C.]: | 0.1251 |
| B(S)-2O-O5 | 3.6% | Δε [1 kHz, 20° C.]: | −5.2 |
| B(S)-2O-O6 | 2.7% | $K_1$ [pN, 20° C.]: | 14.4 |

-continued

| | | | |
|---|---|---|---|
| B-2O-O5 | 2.7% | $K_3$ [pN, 20° C.]: | 16.7 |
| CC-3-V | 23.85% | $\gamma_1$ [mPa s, 20° C.]: | 137 |
| CCY-3-O2 | 4.95% | | |
| CLY-2-O4 | 3.6% | | |
| CLY-3-O2 | 5.4% | | |
| CLY-3-O3 | 4.5% | | |
| CLY-4-O2 | 4.5% | | |
| CLY-5-O2 | 4.5% | | |
| CPY-3-O2 | 6.3% | | |
| CY-3-O2 | 13.95% | | |
| CY-3-O4 | 6.75% | | |
| Σ | 100.0% | | |

To the mixture N4 are added 50 ppm of the stabiliser H-2-1-1 and 50 ppm of the stabiliser ST-3a-1.

H-2-1-1

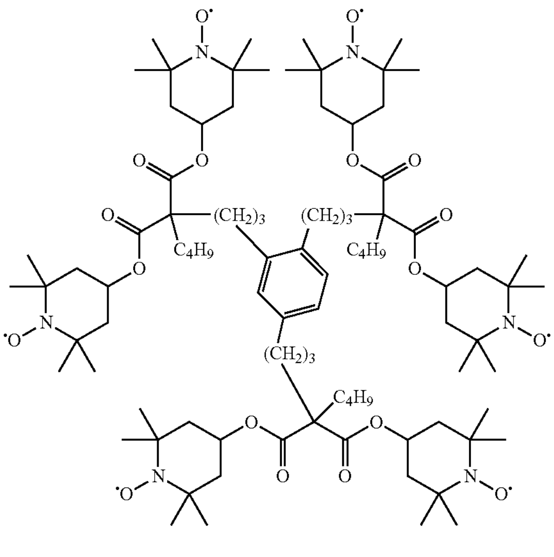

Example 5

The nematic LC mixture N5 is formulated as follows.

| | | | |
|---|---|---|---|
| PUS-3-2 | 10.0% | Cl. p. [° C.]: | 82.0 |
| B(S)-2O-O4 | 2.7% | Δn [589 nm, 20° C.]: | 0.1252 |
| B(S)-2O-O5 | 3.6% | Δε [1 kHz, 20° C.]: | −5.3 |
| B(S)-2O-O6 | 2.7% | $K_1$ [pN, 20° C.]: | 14.3 |
| COB(S)-2-O4 | 7.2% | $K_3$ [pN, 20° C.]: | 15.7 |
| CC-3-V | 24.75% | $\gamma_1$ [mPa s, 20° C.]: | 131 |
| CLY-2-O4 | 4.05% | | |
| CLY-3-O2 | 4.95% | | |
| CLY-3-O3 | 4.95% | | |
| CLY-4-O2 | 4.5% | | |
| CLY-5-O2 | 4.05% | | |
| CPY-3-O2 | 3.6% | | |
| CY-3-O2 | 13.95% | | |
| CY-3-O4 | 4.5% | | |
| CY-5-O2 | 4.5% | | |
| Σ | 100.0% | | |

To the mixture N5 are added 100 ppm of the stabiliser ST-8-1 and 50 ppm of the stabiliser ST-3a-1.

ST-8-1

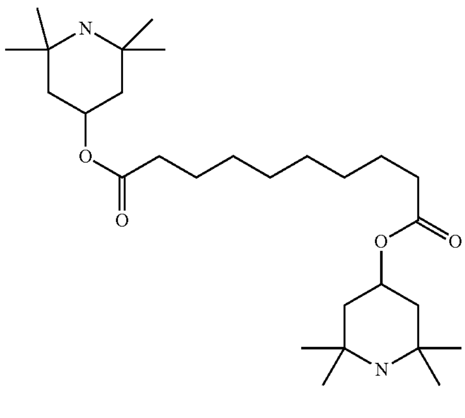

Example 6

The nematic LC mixture N6 is formulated as follows.

| | | | |
|---|---|---|---|
| PUS-3-2 | 10.0% | Cl. p. [° C.]: | 82.0 |
| B(S)-2O-O4 | 2.7% | Δn [589 nm, 20° C.]: | 0.1247 |
| B(S)-2O-O5 | 3.6% | Δε [1 kHz, 20° C.]: | −5.1 |
| B(S)-2O-O6 | 2.7% | $K_1$ [pN, 20° C.]: | 14.7 |
| B-2O-O5 | 3.6% | $K_3$ [pN, 20° C.]: | 16.2 |
| COB(S)-2-O4 | 7.2% | $\gamma_1$ [mPa s, 20° C.]: | 126 |
| CC-3-V | 20.7% | | |
| CC-3-V1 | 5.4% | | |
| CC-4-V1 | 3.15% | | |
| CCY-3-O1 | 5.4% | | |
| CCY-3-O2 | 9.0% | | |
| CCY-4-O2 | 1.8% | | |
| CPY-3-O2 | 6.3% | | |
| CY-3-O2 | 13.95% | | |
| CY-3-O4 | 4.5% | | |
| Σ | 100.0% | | |

To the mixture N6 are added 50 ppm of the stabiliser ST-9-1 and 50 ppm of the stabiliser ST-3a-1.

ST-9-1

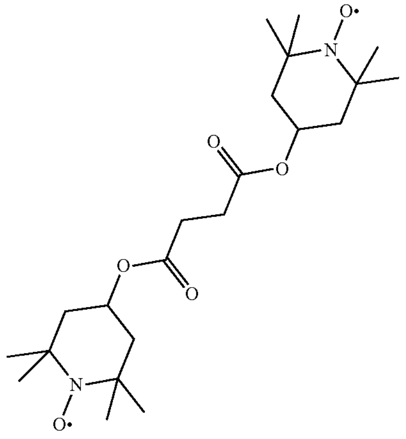

Example 7

The nematic LC mixture N7 is formulated as follows.

| | | | |
|---|---|---|---|
| PUS-3-2 | 10.0% | Cl. p. [° C.]: | 81.0 |
| B(S)-2O-O4 | 2.7% | Δn [589 nm, 20° C.]: | 0.1253 |
| B(S)-2O-O5 | 3.6% | Δε [1 kHz, 20° C.]: | −5.2 |
| B(S)-2O-O6 | 2.7% | $K_1$ [pN, 20° C.]: | 14.4 |
| B-2O-O5 | 3.6% | $K_3$ [pN, 20° C.]: | 15.4 |
| COB(S)-2-O4 | 7.2% | $\gamma_1$ [mPa s, 20° C.]: | 120 |
| CC-3-V | 29.25% | | |
| CLY-2-O4 | 4.5% | | |
| CLY-3-O2 | 5.4% | | |
| CLY-3-O3 | 4.05% | | |
| CLY-4-O2 | 4.05% | | |
| CLY-5-O2 | 4.5% | | |
| CPY-3-O2 | 1.8% | | |
| CY-3-O2 | 11.7% | | |
| CY-3-O4 | 4.95% | | |
| Σ | 100.0% | | |

To the mixture N7 are added 50 ppm of the stabiliser ST-12 and 50 ppm of the stabiliser ST-3a-1.

ST-12

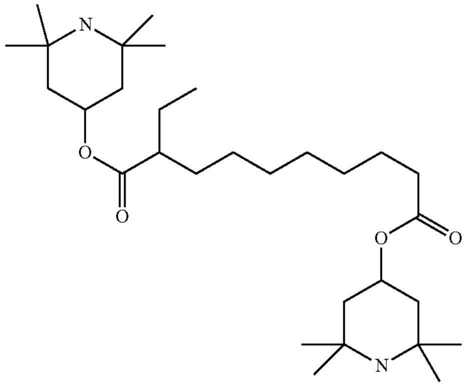

Example 8

The nematic LC mixture N8 is formulated as follows.

| | | | |
|---|---|---|---|
| PUS-3-2 | 10.0% | Cl. p. [° C.]: | 107.0 |
| B(S)-2O-O4 | 3.6% | Δn [589 nm, 20° C.]: | 0.1248 |
| B(S)-2O-O5 | 3.6% | Δε [1 kHz, 20° C.]: | −3.0 |
| CC-3-V | 13.5% | $K_1$ [pN, 20° C.]: | 18.9 |
| CC-4-V1 | 9% | $K_3$ [pN, 20° C.]: | 19.9 |
| CC-2-3 | 8.1% | $\gamma_1$ [mPa s, 20° C.]: | 138 |
| CCP-3-1 | 5.85% | | |
| CCP-V-1 | 6.3% | | |
| CCY-3-O2 | 5.85% | | |
| CLY-2-O4 | 3.6% | | |
| CLY-3-O2 | 5.4% | | |
| CLY-3-O3 | 4.5% | | |
| CLY-4-O2 | 3.6% | | |
| CLY-5-O2 | 3.6% | | |
| CPY-3-O2 | 3.6% | | |
| CY-3-O2 | 5.4% | | |
| PGIY-2-O4 | 4.5% | | |
| Σ | 100.0% | | |

To the mixture N8 are added 150 ppm of the stabiliser ST-3a-2.

ST-3a-2

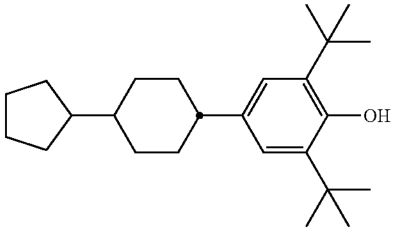

Example 9

The nematic LC mixture N9 is formulated as follows.

| | | | |
|---|---|---|---|
| PUS-3-2 | 10.0% | Cl. p. [° C.]: | 105.5 |
| B(S)-2O-O4 | 1.8% | Δn [589 nm, 20° C.]: | 0.1244 |
| B(S)-2O-O5 | 1.8% | Δε [1 kHz, 20° C.]: | −3.1 |
| COB(S)-2-O4 | 9% | $K_1$ [pN, 20° C.]: | 18.6 |
| CC-3-V | 28.8% | $K_3$ [pN, 20° C.]: | 19.8 |
| CC-3-V1 | 7.2% | $\gamma_1$ [mPa s, 20° C.]: | 134 |
| CCP-3-1 | 6.3% | | |
| CCY-3-O2 | 4.95% | | |
| CLY-2-O4 | 3.6% | | |
| CLY-3-O2 | 5.4% | | |
| CLY-3-O3 | 4.5% | | |
| CLY-4-O2 | 3.6% | | |
| CLY-5-O2 | 3.6% | | |
| CY-5-O2 | 4.5% | | |
| PGIY-2-O4 | 4.95% | | |
| Σ | 100.0% | | |

To the mixture N9 are added 100 ppm of the stabiliser ST-3b-2 and 50 ppm of the stabiliser ST-3a-1.

ST-3b-2

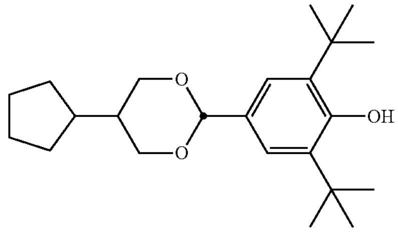

Example 10

The nematic LC mixture N10 is formulated as follows.

| | | | |
|---|---|---|---|
| PUS-3-2 | 10% | Cl. p. [° C.]: | 78.5 |
| B(S)-2O-O4 | 2.7% | Δn [589 nm, 20° C.]: | 0.1192 |
| B(S)-2O-O5 | 2.7% | Δε [1 kHz, 20° C.]: | −2.8 |
| B(S)-2O-O6 | 1.8% | $K_1$ [pN, 20° C.]: | 13.3 |
| CC-3-V | 40.95% | $K_3$ [pN, 20° C.]: | 15.6 |
| CCP-V-1 | 1.35% | $\gamma_1$ [mPa s, 20° C.]: | 79 |
| CLY-2-O4 | 3.6% | | |
| CLY-3-O2 | 4.5% | | |
| CLY-3-O3 | 3.6% | | |
| CLY-4-O2 | 1.35% | | |
| CPY-3-O2 | 9.45% | | |
| CY-3-O2 | 11.7% | | |
| PGIY-2-O4 | 6.3% | | |
| Σ | 100.0% | | |

To the mixture N10 are added 100 ppm of the stabiliser ST-7 and 50 ppm of the stabiliser ST-3a-2.

ST-7

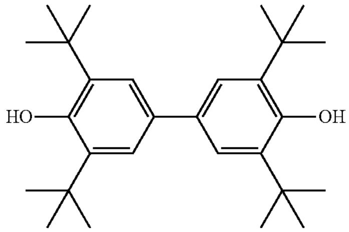

Example 11

The nematic LC mixture N11 is formulated as follows.

| | | | |
|---|---|---|---|
| PUS-3-2 | 10% | Cl. p. [° C.]: | 80.0 |
| COB(S)-2-O4 | 8.1% | Δn [589 nm, 20° C.]: | 0.1198 |
| CC-3-V | 41.4% | Δε [1 kHz, 20° C.]: | −2.8 |
| CLY-2-O4 | 3.6% | $K_1$ [pN, 20° C.]: | 13.8 |
| CLY-3-O2 | 5.4% | $K_3$ [pN, 20° C.]: | 15.0 |
| CLY-3-O3 | 4.5% | $\gamma_1$ [mPa s, 20° C.]: | 84 |
| CLY-4-O2 | 3.6% | | |
| CLY-5-O2 | 3.6% | | |
| CPY-3-O2 | 4.5% | | |
| PY-1-O4 | 5.4% | | |
| PY-3-O2 | 9.9% | | |
| Σ | 100.0% | | |

To the mixture N11 are added 100 ppm of the stabiliser H-1-1-1 and 50 ppm of the stabiliser ST-3a-2.

Example 12

The nematic LC mixture N12 is formulated as follows.

| | | | |
|---|---|---|---|
| PUS-3-2 | 10% | Cl. p. [° C.]: | 80.0 |
| B(S)-2O-O4 | 2.7% | Δn [589 nm, 20° C.]: | 0.1195 |
| B(S)-2O-O5 | 2.7% | Δε [1 kHz, 20° C.]: | −2.8 |
| COB(S)-2-O4 | 6.75% | $K_1$ [pN, 20° C.]: | 13.9 |
| CC-3-V | 44.1% | $K_3$ [pN, 20° C.]: | 15.4 |
| CLY-2-O4 | 3.6% | $\gamma_1$ [mPa s, 20° C.]: | 78 |
| CLY-3-O2 | 5.4% | | |
| CLY-3-O3 | 4.5% | | |
| CLY-4-O2 | 3.6% | | |
| CLY-5-O2 | 3.6% | | |
| CY-3-O2 | 2.25% | | |
| PY-1-O2 | 8.1% | | |
| PYP-2-3 | 2.7% | | |
| Σ | 100.0% | | |

To the mixture N12 are added 150 ppm of the stabiliser ST-3a-1.

Example 13

The nematic LC mixture N13 is formulated as follows.

| | | | |
|---|---|---|---|
| PUS-3-2 | 10% | Cl. p. [° C.]: | 81.5 |
| B(S)-2O-O4 | 2.7% | Δn [589 nm, 20° C.]: | 0.1401 |
| B(S)-2O-O5 | 2.7% | Δε [1 kHz, 20° C.]: | −2.9 |
| B(S)-2O-O6 | 2.7% | $K_1$ [pN, 20° C.]: | 13.2 |
| CC-3-V | 33.75% | $K_3$ [pN, 20° C.]: | 14.2 |
| CCY-3-O2 | 6.3% | $\gamma_1$ [mPa s, 20° C.]: | 99 |
| CPY-2-O2 | 9% | | |
| CPY-3-O2 | 9% | | |
| CY-3-O2 | 9% | | |
| PYP-2-3 | 9% | | |
| PYP-2-4 | 5.85% | | |
| Σ | 100.0% | | |

To the mixture N13 are added 100 ppm of the stabiliser ST-3b-1 and 50 ppm of the stabiliser ST-3a-2.

Example 14

The nematic LC mixture N14 is formulated as follows.

| | | | |
|---|---|---|---|
| PUS-3-2 | 10% | Cl. p. [° C.]: | 81.0 |
| COB(S)-2-O4 | 8.1% | Δn [589 nm, 20° C.]: | 0.1409 |
| CC-3-V | 36% | Δε [1 kHz, 20° C.]: | −2.9 |
| CLY-2-O4 | 3.6% | $K_1$ [pN, 20° C.]: | 13.6 |
| CLY-4-O2 | 4.05% | $K_3$ [pN, 20° C.]: | 15.3 |
| CPY-2-O2 | 7.2% | $\gamma_1$ [mPa s, 20° C.]: | 96 |
| CPY-3-O2 | 9% | | |
| PY-1-O2 | 7.2% | | |
| PY-3-O2 | 5.4% | | |
| PYP-2-3 | 9.45% | | |
| Σ | 100.0% | | |

To the mixture N14 are added 50 ppm of the stabiliser H-2-1-1 and 50 ppm of the stabiliser ST-3a-1.

Example 15

The nematic LC mixture N15 is formulated as follows.

-continued

| | | | |
|---|---|---|---|
| PUS-3-2 | 10% | Cl. p. [° C.]: | 82.0 |
| B(S)-2O-O4 | 2.7% | Δn [589 nm, 20° C.]: | 0.1406 |
| B(S)-2O-O5 | 2.7% | Δε [1 kHz, 20° C.]: | −2.9 |
| B(S)-2O-O6 | 2.7% | $K_1$ [pN, 20° C.]: | 13.8 |
| B-2O-O5 | 2.7% | $K_3$ [pN, 20° C.]: | 15.5 |
| CC-3-V | 38.7% | $\gamma_1$ [mPa s, 20° C.]: | 90 |
| CCY-3-O2 | 4.5% | | |
| CPY-2-O2 | 8.1% | | |
| CPY-3-O2 | 9% | | |
| CY-3-O2 | 3.6% | | |
| PYP-2-3 | 9% | | |
| PYP-2-4 | 1.8% | | |
| PGIY-2-O4 | 4.5% | | |
| Σ | 100.0% | | |

To the mixture N15 are added 100 ppm of the stabiliser ST-8-1 and 50 ppm of the stabiliser ST-3a-2.

Example 16

The nematic_LC_mixture N16 is formulated_as follows.

| | | | |
|---|---|---|---|
| PUS-3-2 | 10% | Cl. p. [° C.]: | 80.5 |
| B(S)-2O-O4 | 1.8% | Δn [589 nm, 20° C.]: | 0.1404 |
| B(S)-2O-O5 | 2.7% | Δε [1 kHz, 20° C.]: | −2.9 |
| B(S)-2O-O6 | 1.8% | $K_1$ [pN, 20° C.]: | 14.5 |
| COB(S)-2-O4 | 7.2% | $K_3$ [pN, 20° C.]: | 15.0 |
| CC-3-V | 40.5% | $\gamma_1$ [mPa s, 20° C.]: | 87 |
| CLY-2-O4 | 1.8% | | |
| CLY-3-O2 | 2.7% | | |
| CLY-3-O3 | 1.8% | | |
| CLY-4-O2 | 2.25% | | |
| CPY-3-O2 | 4.95% | | |
| PY-1-O2 | 6.75% | | |
| PYP-2-3 | 8.1% | | |
| PYP-2-4 | 2.25% | | |
| PGIY-2-O4 | 5.4% | | |
| Σ | 100.0% | | |

To the mixture N16 are added 50 ppm of the stabiliser ST-9-1 and 50 ppm of the stabiliser ST-3a-1.

Example 17

The nematic LC mixture N17 is formulated as follows.

| | | | |
|---|---|---|---|
| CCP-V-1 | 6.3% | Cl. p. [° C.]: | 107 |
| CCP-3-1 | 5.85% | Δn [589 nm, 20° C.]: | 0.1249 |
| CY-3-O2 | 5.4% | Δε [1 kHz, 20° C.]: | −2.8 |
| CPY-3-O2 | 3.6% | $\gamma_1$ [mPa s, 20° C.]: | 137 |
| CCY-3-O2 | 5.85% | $K_1$ [pN, 20° C.]: | 18.9 |
| CLY-2-O4 | 3.6% | $K_3$ [pN, 20° C.]: | 19.9 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(P)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N17 are added 50 ppm of the stabiliser ST-12.

Example 18

The nematic LC mixture N18 is formulated as follows.

| | | | |
|---|---|---|---|
| CCP-V-1 | 6.3% | Cl. p. [° C.]: | 107 |
| CCP-3-1 | 5.85% | Δn [589 nm, 20° C.]: | 0.1250 |
| CY-3-O2 | 5.4% | Δε [1 kHz, 20° C.]: | −2.8 |
| CPY-3-O2 | 3.6% | $\gamma_1$ [mPa s, 20° C.]: | 137 |
| CCY-3-O2 | 5.85% | $K_1$ [pN, 20° C.]: | 18.9 |
| CLY-2-O4 | 3.6% | $K_3$ [pN, 20° C.]: | 20.0 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(P)-2O-O3 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N18 are added 150 ppm of the stabiliser ST-3a-2.

Example 19

The nematic LC mixture N19 is formulated as follows.

| | | | |
|---|---|---|---|
| CCP-V-1 | 6.3% | Cl. p. [° C.]: | 106.5 |
| CCP-3-1 | 5.85% | Δn [589 nm, 20° C.]: | 0.1252 |
| CY-3-O2 | 5.4% | Δε [1 kHz, 20° C.]: | −3.1 |
| CPY-3-O2 | 3.6% | $\gamma_1$ [mPa s, 20° C.]: | 140 |
| CCY-3-O2 | 5.85% | $K_1$ [pN, 20° C.]: | 18.2 |
| CLY-2-O4 | 3.6% | $K_3$ [pN, 20° C.]: | 20.1 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(A)-2O-O2 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N19 are added 150 ppm of the stabiliser ST-3b-2.

Example 20

The nematic LC mixture N20 is formulated as follows.

| | | | |
|---|---|---|---|
| CCP-V-1 | 6.3% | Cl. p. [° C.]: | 107 |
| CCP-3-1 | 5.85% | Δn [589 nm, 20° C.]: | 0.1244 |
| CY-3-O2 | 5.4% | Δε [1 kHz, 20° C.]: | −3.0 |
| CPY-3-O2 | 3.6% | $\gamma_1$ [mPa s, 20° C.]: | 139 |
| CCY-3-O2 | 5.85% | $K_1$ [pN, 20° C.]: | 18.5 |
| CLY-2-O4 | 3.6% | $K_3$ [pN, 20° C.]: | 19.7 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-4O-O5 | 3.6% | | |
| CC-3-V | 13.5% | | |
| CC-4-V1 | 9.0% | | |

-continued

| | |
|---|---|
| CC-2-3 | 8.1% |
| PUS-3-2 | 10.0% |
| Σ | 100.0% |

To the mixture N20 are added 50 ppm of the stabiliser ST-7.

Example 21

The nematic LC mixture N21 is formulated as follows.

| | | | |
|---|---|---|---|
| CCP-V-1 | 6.3% | Cl. p. [° C.]: | 106.5 |
| CCP-3-1 | 5.85% | Δn [589 nm, 20° C.]: | 0.1242 |
| CY-3-O2 | 5.4% | Δε [1 kHz, 20° C.]: | −3.1 |
| CPY-3-O2 | 3.6% | $\gamma_1$ [mPa s, 20° C.]: | 142 |
| CCY-3-O2 | 5.85% | $K_1$ [pN, 20° C.]: | 18.8 |
| CLY-2-O4 | 3.6% | $K_3$ [pN, 20° C.]: | 19.7 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-4O-O1(c5) | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein B(S)-4O-O1(c5) is

B(S)-4O-O1(c5)

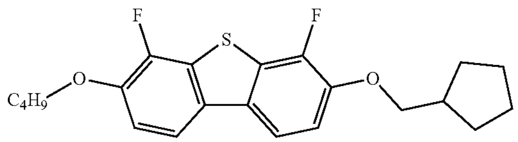

To the mixture N21 are added 100 ppm of the stabiliser H-1-1-1.

Example 22

The nematic LC mixture N22 is formulated as follows

| | | | |
|---|---|---|---|
| CCP-V-1 | 6.3% | Cl. p. [° C.]: | 107 |
| CCP-3-1 | 5.85% | Δn [589 nm, 20° C.]: | 0.1248 |
| CY-3-O2 | 5.4% | Δε [1 kHz, 20° C.]: | −3.1 |
| CPY-3-O2 | 3.6% | $\gamma_1$ [mPa s, 20° C.]: | 144 |
| CCY-3-O2 | 5.85% | $K_1$ [pN, 20° C.]: | 18.9 |
| CLY-2-O4 | 3.6% | $K_3$ [pN, 20° C.]: | 19.9 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-1V1O-O1(c5) | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein B(S)-1V1O-O1(c5) is

B(S)-1V1O-O1(c5)

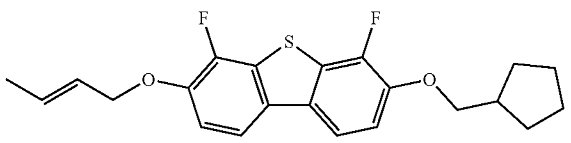

To the mixture N22 are added 150 ppm of the stabiliser ST-3a-1.

Example 23

The nematic LC mixture N23 is formulated as follows.

| | | | |
|---|---|---|---|
| CCP-V-1 | 6.3% | Cl. p. [° C.]: | 108 |
| CCP-1V2-1 | 5.85% | | |
| CY-3-O2 | 5.4% | | |
| CPY-3-O2 | 3.6% | | |
| CCY-3-O2 | 5.85% | | |
| CLY-2-O4 | 3.6% | | |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CCP-1V2-1 is

CCP-1V2-1

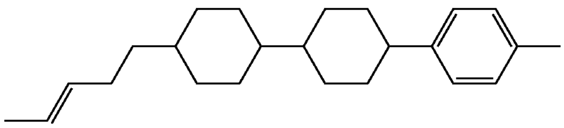

To the mixture N23 are added 150 ppm of the stabiliser ST-3b-1.

Example 24

The nematic LC mixture N24 is formulated as follows.

| | | | |
|---|---|---|---|
| CLP-V-1 | 6.3% | Cl. p. [° C.]: | 107.5 |
| CCP-3-1 | 5.85% | Δn [589 nm, 20° C.]: | 0.1277 |
| CY-3-O2 | 5.4% | Δε [1 kHz, 20° C.]: | −3.0 |
| CPY-3-O2 | 3.6% | $\gamma_1$ [mPa s, 20° C.]: | 144 |
| CCY-3-O2 | 5.85% | $K_1$ [pN, 20° C.]: | 19.8 |
| CLY-2-O4 | 3.6% | $K_3$ [pN, 20° C.]: | 20.3 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N24 are added 50 ppm of the stabiliser H-2-1-1.

Example 25

The nematic LC mixture N25 is formulated as follows.

| | | | |
|---|---|---|---|
| CCP-V-1 | 6.3% | Cl. p. [° C.]: | 100.5 |
| CCP-3-1 | 5.85% | Δn [589 nm, 20° C.]: | 0.1217 |
| CY-3-O2 | 5.4% | Δε [1 kHz, 20° C.]: | −2.6 |
| CPY-3-O2 | 3.6% | $\gamma_1$ [mPa s, 20° C.]: | 116 |
| CCY-3-O2 | 5.85% | $K_1$ [pN, 20° C.]: | 18.2 |
| CLY-2-O4 | 3.6% | $K_3$ [pN, 20° C.]: | 19.2 |
| CLY-3-O2 | 5.4% | | |
| CLY-3-O3 | 4.5% | | |
| CLY-4-O2 | 3.6% | | |
| CLY-5-O2 | 3.6% | | |
| PP-1-3 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N25 are added 100 ppm of the stabiliser ST-8-1.

Example 26

The nematic LC mixture N26 is formulated as follows.

| | | | |
|---|---|---|---|
| CCP-V-1 | 6.3% | Cl. p. [° C.]: | 100.5 |
| CCP-3-1 | 5.85% | Δn [589 nm, 20° C.]: | 0.1211 |
| CY-3-O2 | 5.4% | Δε [1 kHz, 20° C.]: | −2.6 |
| CPY-3-O2 | 3.6% | $\gamma_1$ [mPa s, 20° C.]: | 118 |
| CCY-3-O2 | 5.85% | $K_1$ [pN, 20° C.]: | 18.1 |
| CLY-2-O4 | 3.6% | $K_3$ [pN, 20° C.]: | 19.2 |
| CLY-3-O2 | 5.4% | | |
| CLY-3-O3 | 4.5% | | |
| CLY-4-O2 | 3.6% | | |
| CLY-5-O2 | 3.6% | | |
| PP-1-5 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N26 are added 50 ppm of the stabiliser ST-9-1.

Example 27

The nematic LC mixture N27 is formulated as follows.

| | | | |
|---|---|---|---|
| CCP-V-1 | 6.3% | Cl. p. [° C.]: | 106.5 |
| CCP-3-1 | 5.85% | Δn [589 nm, 20° C.]: | 0.1249 |
| CY-3-O2 | 5.4% | Δε [1 kHz, 20° C.]: | −2.8 |

-continued

| | | | |
|---|---|---|---|
| CPY-3-O2 | 3.6% | ε⊥ [1 kHz, 20° C.]: | |
| CCY-3-O2 | 5.85% | | |
| CLY-2-O4 | 3.6% | | |
| CLY-3-O2 | 5.4% | | |
| CLY-3-O3 | 4.5% | | |
| CLY-4-O2 | 3.6% | | |
| CLY-5-O2 | 3.6% | | |
| PYP-2-(c5) | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein PYP-2-(c5) is

PYP-2-(c5)

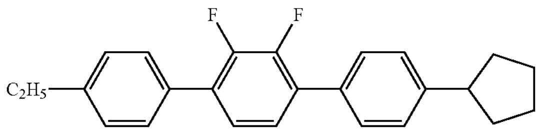

To the mixture N27 are added 50 ppm of the stabiliser ST-12.

Example 28

The nematic LC mixture N28 is formulated as follows.

| | | | |
|---|---|---|---|
| CCP-V-1 | 6.3% | Cl. p. [° C.]: | 106 |
| CCP-3-1 | 5.85% | Δn [589 nm, 20° C.]: | 0.1247 |
| CY-3-O2 | 5.4% | Δε [1 kHz, 20° C.]: | −2.8 |
| CPY-3-O2 | 3.6% | | |
| CCY-3-O2 | 5.85% | | |
| CLY-2-O4 | 3.6% | | |
| CLY-3-O2 | 5.4% | | |
| CLY-3-O3 | 4.5% | | |
| CLY-4-O2 | 3.6% | | |
| CLY-5-O2 | 3.6% | | |
| PYP-2-1(c3) | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein PYP-2-1(c3) is

PYP-2-1(c3)

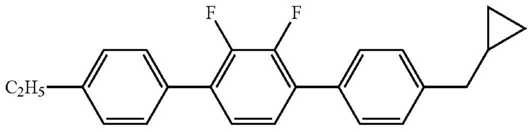

To the mixture N28 are added 150 ppm of the stabiliser ST-3a-2.

Example 29

The nematic LC mixture N29 is formulated as follows.

| | | | |
|---|---|---|---|
| CCP-V-1 | 6.3% | Cl. p. [° C.]: | 104 |
| CCP-3-1 | 5.85% | Δn [589 nm, 20° C.]: | 0.1227 |
| CY-3-O2 | 5.4% | Δε [1 kHz, 20° C.]: | −3.3 |
| CPY-3-O2 | 3.6% | $\gamma_1$ [mPa s, 20° C.]: | 142 |
| CAIY-3-O2 | 5.85% | $K_1$ [pN, 20° C.]: | 18.1 |
| CLY-2-O4 | 3.6% | $K_3$ [pN, 20° C.]: | 19.5 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N29 are added 150 ppm of the stabiliser ST-3b-2.

Example 30

The nematic LC mixture N30 is formulated as follows.

| | | | |
|---|---|---|---|
| CCP-V-1 | 6.3% | Cl. p. [° C.]: | 107 |
| CCP-3-1 | 5.85% | Δn [589 nm, 20° C.]: | 0.1264 |
| LY-3-O2 | 5.4% | Δε [1 kHz, 20° C.]: | −3.0 |
| CPY-3-O2 | 3.6% | $\gamma_1$ [mPa s, 20° C.]: | 139 |
| CCY-3-O2 | 5.85% | $K_1$ [pN, 20° C.]: | 19.4 |
| CLY-2-O4 | 3.6% | $K_3$ [pN, 20° C.]: | 20.1 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N30 are added 100 ppm of the stabiliser ST-7.

Example 31

The nematic LC mixture N31 is formulated as follows.

| | | | |
|---|---|---|---|
| CCP-V-1 | 6.3% | Cl. p. [° C.]: | 105.5 |
| CCP-3-1 | 5.85% | Δn [589 nm, 20° C.]: | 0.1242 |
| CY-3-O2 | 5.4% | Δε [1 kHz, 20° C.]: | −3.3 |
| CPY-3-O2 | 3.6% | $\gamma_1$ [mPa s, 20° C.]: | 142 |
| CCOY-3-O2 | 5.85% | $K_1$ [pN, 20° C.]: | 18.7 |
| CLY-2-O4 | 3.6% | $K_3$ [pN, 20° C.]: | 19.8 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |

-continued

| | | | |
|---|---|---|---|
| CC-2-3 | 8.1% | | |
| PUS-3-2 | 10.0% | | |
| Σ | 100.0% | | |

To the mixture N31 are added 100 ppm of the stabiliser H-1-1-1.

Example 32

The nematic LC mixture N32 is formulated as follows.

| | | | |
|---|---|---|---|
| CCP-V-1 | 6.3% | Cl. p. [° C.]: | 104.5 |
| CCP-3-1 | 5.85% | Δn [589 nm, 20° C.]: | 0.1246 |
| COY-3-O2 | 5.4% | Δε [1 kHz, 20° C.]: | −3.6 |
| CPY-3-O2 | 3.6% | $\gamma_1$ [mPa s, 20° C.]: | 139 |
| CCOY-2-O2 | 5.85% | $K_1$ [pN, 20° C.]: | 18.9 |
| CLY-2-O4 | 3.6% | $K_3$ [pN, 20° C.]: | 19.2 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N32 are added 150 ppm of the stabiliser ST-3a-1.

Example 33

The nematic LC mixture N33 is formulated as follows.

| | | | |
|---|---|---|---|
| CCP-V-1 | 6.3% | Cl. p. [° C.]: | 106 |
| CCP-3-1 | 5.85% | Δn [589 nm, 20° C.]: | 0.1248 |
| CEY-3-O2 | 5.4% | Δε [1 kHz, 20° C.]: | −3.1 |
| CPY-3-O2 | 3.6% | $\gamma_1$ [mPa s, 20° C.]: | 138 |
| CCY-3-O2 | 5.85% | $K_1$ [pN, 20° C.]: | 19.3 |
| CLY-2-O4 | 3.6% | $K_3$ [pN, 20° C.]: | 20.2 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N33 are added 150 ppm of the stabiliser ST-3b-1.

Example 34

The nematic LC mixture N34 is formulated as follows.

| | | | |
|---|---|---|---|
| CCP-V-1 | 6.3% | Cl. p. [° C.]: | 105 |
| CCP-3-1 | 5.85% | Δn [589 nm, 20° C.]: | 0.1246 |
| CY-3-O2 | 5.4% | Δε [1 kHz, 20° C.]: | −3.1 |
| CPY-3-O2 | 3.6% | $\gamma_1$ [mPa s, 20° C.]: | 140 |
| CCEY-3-O2 | 5.85% | $K_1$ [pN, 20° C.]: | 19.0 |
| CLY-2-O4 | 3.6% | $K_3$ [pN, 20° C.]: | 20.1 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

To the mixture N34 are added 50 ppm of the stabiliser H-2-1-1.

Example 35

A polymerizable mixture is prepared by adding 0.3% of the polymerizable compound RM-171 to the mixture of Example 1.

RM-171

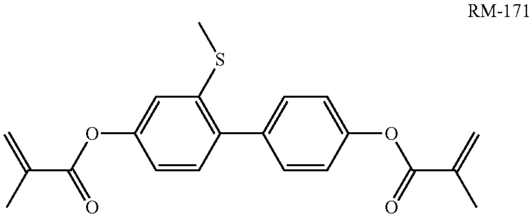 [SMILES: C=C(C)C(=O)Oc1ccc(-c2ccc(OC(=O)C(=C)C)cc2SC)cc1]

Example 36

A polymerizable mixture is prepared by adding 0.3% of the polymerizable compound RM-1 to the mixture of Example 2.

RM-1

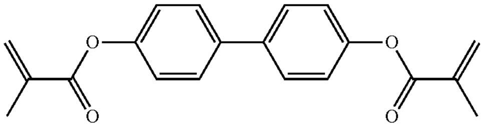

Example 37

A polymerizable mixture is prepared by adding 0.3% of the polymerizable compound RM-35 to the mixture of Example 3.

RM-35

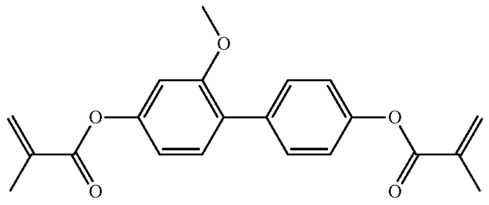

Example 38

A polymerizable mixture is prepared by adding 0.3% of the polymerizable compound RM-172 to the mixture of Example 4.

RM-172

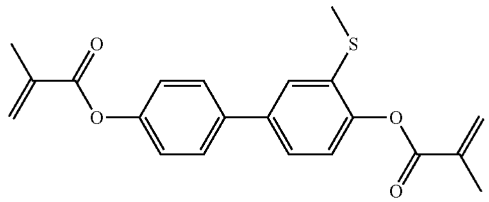

Example 39

A polymerizable mixture is prepared by adding 0.4% of the polymerizable compound RM-64 to the mixture of Example 5.

RM-64

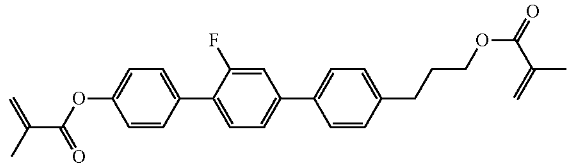

Example 40

A polymerizable mixture is prepared by adding 0.3% of the polymerizable compound RM-184 to the mixture of Example 6.

RM-184

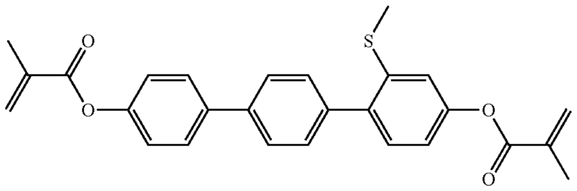

Example 41

The nematic LC mixture N41 is formulated as follows.

| | | | |
|---|---|---|---|
| CCP-V-1 | 6.3% | Cl. p. [° C.]: | 108 |
| CCP-3-1 | 5.85% | Δn [589 nm, 20° C.]: | 0.1273 |
| LY-(c5)-O2 | 5.4% | Δε [1 kHz, 20° C.]: | −3.1 |
| CPY-3-O2 | 3.6% | $\gamma_1$ [mPa s, 20° C.]: | 149 |
| CCY-3-O2 | 5.85% | $K_1$ [pN, 20° C.]: | 19.9 |
| CLY-2-O4 | 3.6% | $K_3$ [pN, 20° C.]: | 20.2 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein LY-(c5)-O2 is

LY-(c5)-O2

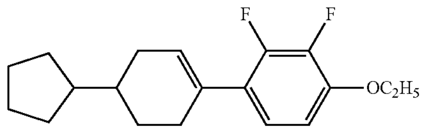

To the mixture N41 are added 100 ppm of the stabiliser H-1-1-1 and 50 ppm of the stabiliser ST-3a-2.

Example 42

The nematic LC mixture N42 is formulated as follows.

| | | | |
|---|---|---|---|
| CCP-V-1 | 6.3% | Cl. p. [° C.]: | 104.5 |
| CCP-3-1 | 5.85% | Δn [589 nm, 20° C.]: | 0.1220 |
| CY-3-O2 | 5.4% | Δε [1 kHz, 20° C.]: | −3.3 |
| CPY-3-O2 | 3.6% | $\gamma_1$ [mPa s, 20° C.]: | 144 |
| CCOY-3-O(c5) | 5.85% | $K_1$ [pN, 20° C.]: | 18.6 |
| CLY-2-O4 | 3.6% | $K_3$ [pN, 20° C.]: | 19.6 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CCOY-3-O(c5) is

CCOY-3-O(c5)

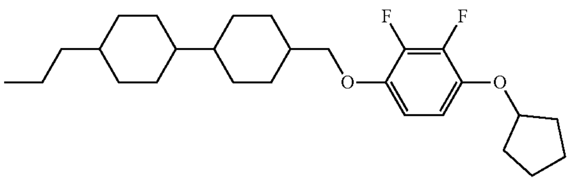

To the mixture N42 are added 150 ppm of the stabiliser ST-3a-1.

Example 43

The nematic LC mixture N43 is formulated as follows.

| | | | |
|---|---|---|---|
| CCP-V-1 | 6.3% | Cl. p. [° C.]: | 105 |
| CCP-3-1 | 5.85% | Δn [589 nm, 20° C.]: | 0.1242 |
| CY-3-O2 | 5.4% | Δε [1 kHz, 20° C.]: | −3.1 |
| CPY-3-O2 | 3.6% | $\gamma_1$ [mPa s, 20° C.]: | 148 |
| CCOY-3-O(c4) | 5.85% | $K_1$ [pN, 20° C.]: | 18.5 |
| CLY-2-O4 | 3.6% | $K_3$ [pN, 20° C.]: | 19.6 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CCOY-3-O(c4) is

CCOY-3-O(c4)

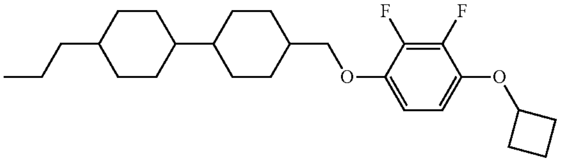

To the mixture N43 are added 150 ppm of the stabiliser ST-3b-1.

Example 44

The nematic LC mixture N44 is formulated as follows.

| | | | |
|---|---|---|---|
| CCP-V-1 | 6.3% | Cl. p. [° C.]: | 105.5 |
| CCP-3-1 | 5.85% | Δn [589 nm, 20° C.]: | 0.1240 |
| CY-3-O2 | 5.4% | Δε [1 kHz, 20° C.]: | −3.1 |
| CPY-3-O2 | 3.6% | $\gamma_1$ [mPa s, 20° C.]: | 148 |
| CCOY-3-O(c3) | 5.85% | $K_1$ [pN, 20° C.]: | 18.0 |
| CLY-2-O4 | 3.6% | $K_3$ [pN, 20° C.]: | 19.3 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |

-continued

| | |
|---|---|
| B(S)-2O-O4 | 3.6% |
| B(S)-2O-O5 | 3.6% |
| CC-3-V | 13.5% |
| CC-4-V1 | 9.0% |
| CC-2-3 | 8.1% |
| PUS-3-2 | 10.0% |
| Σ | 100.0% |

wherein CCOY-3-O (c3) is

CCOY-3-O(c3)

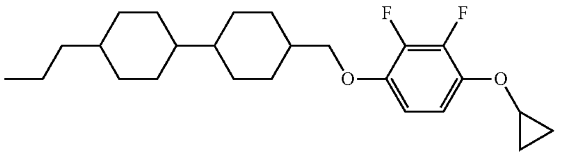

To the mixture N44 are added 50 ppm of the stabiliser H-2-1-1.

Example 45

The nematic LC mixture N45 is formulated as follows.

| | | | |
|---|---|---|---|
| CCP-V-1 | 6.3% | Cl. p. [° C.]: | 104.5 |
| CCP-3-1 | 5.85% | Δn [589 nm, 20° C.]: | 0.1214 |
| CY-3-O2 | 5.4% | Δε [1 kHz, 20° C.]: | −3.2 |
| CPY-3-O2 | 3.6% | $\gamma_1$ [mPa s, 20° C.]: | 147 |
| CCOY-3-O1(c5) | 5.85% | $K_1$ [pN, 20° C.]: | 18.6 |
| CLY-2-O4 | 3.6% | $K_3$ [pN, 20° C.]: | 19.6 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CCOY-3-O1(c5) is

CCOY-3-O1(c5)

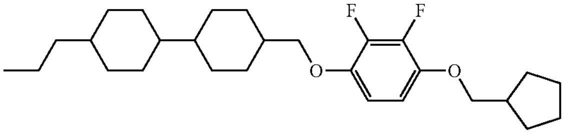

To the mixture N45 are added 100 ppm of the stabiliser ST-8-1.

Example 46

The nematic LC mixture N46 is formulated as follows.

| | | | |
|---|---|---|---|
| CCP-V-1 | 6.3% | Cl. p. [° C.]: | 105 |
| CCP-3-1 | 5.85% | Δn [589 nm, 20° C.]: | 0.1236 |
| CY-3-O2 | 5.4% | Δε [1 kHz, 20° C.]: | −3.1 |
| CPY-3-O2 | 3.6% | $\gamma_1$ [mPa s, 20° C.]: | 146 |
| CCOY-3-O1(c4) | 5.85% | $K_1$ [pN, 20° C.]: | 18.1 |
| CLY-2-O4 | 3.6% | $K_3$ [pN, 20° C.]: | 19.2 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CCOY-3-O1(c4) is

CCOY-3-O1(c4)

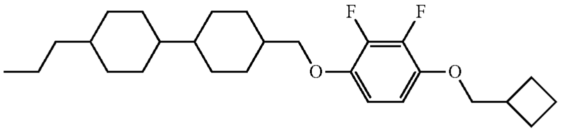

To the mixture N46 are added 50 ppm of the stabiliser ST-9-1.

Example 47

The nematic LC mixture N47 is formulated as follows.

| | | | |
|---|---|---|---|
| CCP-V-1 | 6.3% | Cl. p. [° C.]: | 105 |
| CCP-3-1 | 5.85% | Δn [589 nm, 20° C.]: | 0.1238 |
| CY-3-O2 | 5.4% | Δε [1 kHz, 20° C.]: | −3.1 |
| CPY-3-O2 | 3.6% | $\gamma_1$ [mPa s, 20° C.]: | 145 |
| CCOY-3-O1(c3) | 5.85% | $K_1$ [pN, 20° C.]: | 18.1 |
| CLY-2-O4 | 3.6% | $K_3$ [pN, 20° C.]: | 19.2 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CCOY-3-O1(c3) is

CCOY-3-O1(c3)

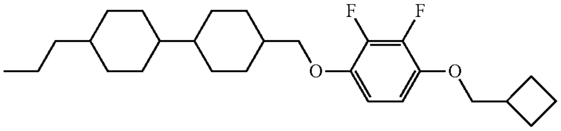

To the mixture N47 are added 50 ppm of the stabiliser ST-12.

Example 48

The nematic LC mixture N48 is formulated as follows.

| | | | |
|---|---|---|---|
| CCP-V-1 | 6.3% | Cl. p. [° C.]: | 107.5 |
| CCP-3-1 | 5.85% | Δn [589 nm, 20° C.]: | 0.1251 |
| CY-3-O2 | 5.4% | Δε [1 kHz, 20° C.]: | −3.0 |
| CPY-3-O2 | 3.6% | $\gamma_1$ [mPa s, 20° C.]: | 143 |
| CCY-3-O2 | 5.85% | $K_1$ [pN, 20° C.]: | 19.1 |
| CLY-2-O4 | 3.6% | $K_3$ [pN, 20° C.]: | 20.0 |
| CLY-(c5)-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein CLY-(c5)-O2 is

CLY-(c5)-02

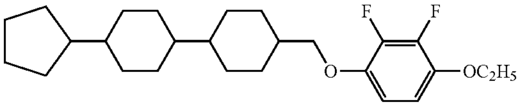

To the mixture N48 are added 150 ppm of the stabiliser ST-3a-2.

Example 49

The nematic LC mixture N49 is formulated as follows.

| | | | |
|---|---|---|---|
| CCP-V-1 | 6.3% | Cl. p. [° C.]: | 107 |
| CCP-3-1 | 5.85% | Δn [589 nm, 20° C.]: | 0.1231 |
| CY-3-O2 | 5.4% | Δε [1 kHz, 20° C.]: | −3.2 |
| CPY-3-O2 | 3.6% | $\gamma_1$ [mPa s, 20° C.]: | 150 |
| CCY-3-O2 | 5.85% | $K_1$ [pN, 20° C.]: | 19.3 |
| CLY-2-O4 | 3.6% | $K_3$ [pN, 20° C.]: | 20.0 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |

-continued

| | |
|---|---|
| CC-3-V | 13.5% |
| CC-4-V1 | 9.0% |
| CC-2-3 | 8.1% |
| PUS-3-(c5) | 10.0% |
| Σ | 100.0% |

wherein PUS-3-(c5) is

PUS-3-(c5)

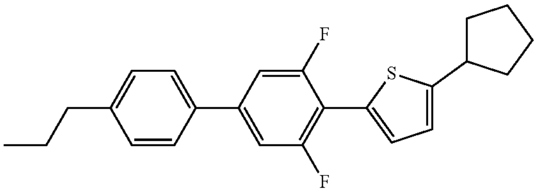

To the mixture N49 are added 150 ppm of the stabiliser ST-3b-2.

Example 50

The nematic LC mixture N50 is formulated as follows.

| | | | |
|---|---|---|---|
| CCP-V-1 | 6.3% | Cl. p. [° C.]: | 103.5 |
| CCP-3-1 | 5.85% | Δn [589 nm, 20° C.]: | 0.1202 |
| CY-3-O2 | 5.4% | Δε [1 kHz, 20° C.]: | −3.3 |
| CPY-3-O2 | 3.6% | $\gamma_1$ [mPa s, 20° C.]: | 149 |
| CCY-3-O2 | 5.85% | $K_1$ [pN, 20° C.]: | 18.2 |
| CLY-2-O4 | 3.6% | $K_3$ [pN, 20° C.]: | 19.1 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-1(c5) | 10.0% | | |
| Σ | 100.0% | | |

wherein PUS-3-1(c5) is

PUS-3-1(c5)

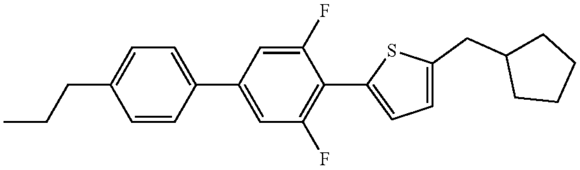

To the mixture N50 are added 100 ppm of the stabiliser ST-7.

Example 51

The nematic LC mixture N51 is formulated as follows.

| | | | |
|---|---|---|---|
| CCP-V-1 | 6.3% | Cl. p. [° C.]: | 106 |
| CCP-3-1 | 5.85% | Δn [589 nm, 20° C.]: | 0.1211 |
| CY-3-O2 | 5.4% | Δε [1 kHz, 20° C.]: | −3.3 |
| CPY-3-O2 | 3.6% | $\gamma_1$ [mPa s, 20° C.]: | 157 |
| CCY-3-O2 | 5.85% | $K_1$ [pN, 20° C.]: | 19.3 |
| CLY-2-O4 | 3.6% | $K_3$ [pN, 20° C.]: | 19.9 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2(c5) | 10.0% | | |
| Σ | 100.0% | | |

wherein PUS-3-2(c5) is

PUS-3-2(c5)

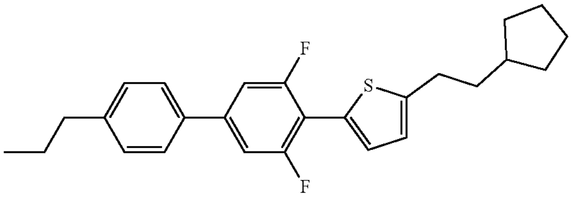

To the mixture N51 are added 100 ppm of the stabiliser H-1-1-1 and 50 ppm of the stabiliser ST-3a-2.

Example 52

The nematic LC mixture N52 is formulated as follows.

| | | | |
|---|---|---|---|
| CCP-V-1 | 6.3% | Cl. p. [° C.]: | 105.5 |
| CCP-3-1 | 5.85% | Δn [589 nm, 20° C.]: | 0.1232 |
| CY-3-O2 | 5.4% | Δε [1 kHz, 20° C.]: | −3.3 |
| CPY-3-O2 | 3.6% | $\gamma_1$ [mPa s, 20° C.]: | 154 |
| CCY-3-O2 | 5.85% | $K_1$ [pN, 20° C.]: | 18.8 |
| CLY-2-O4 | 3.6% | $K_3$ [pN, 20° C.]: | 19.4 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-O(c5) | 10.0% | | |
| Σ | 100.0% | | |

wherein PUS-3-O(c5) is

PUS-3-O(c5)

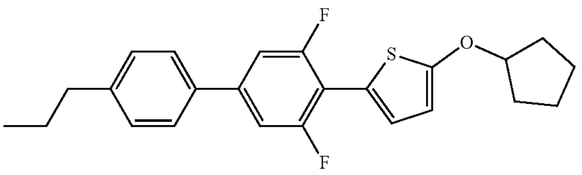

To the mixture N52 are added 150 ppm of the stabiliser ST-3a-1.

Example 53

The nematic LC mixture N53 is formulated as follows.

| | | | |
|---|---|---|---|
| CCP-V-1 | 6.3% | Cl. p. [° C.]: | 107 |
| CCP-3-1 | 5.85% | Δn [589 nm, 20° C.]: | 0.1232 |
| CY-3-O2 | 5.4% | Δε [1 kHz, 20° C.]: | −3.3 |
| CPY-3-O2 | 3.6% | $\gamma_1$ [mPa s, 20° C.]: | 162 |
| CCY-3-O2 | 5.85% | $K_1$ [pN, 20° C.]: | 19.3 |
| CLY-2-O4 | 3.6% | $K_3$ [pN, 20° C.]: | 20.1 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-O1(c5) | 10.0% | | |
| Σ | 100.0% | | |

wherein PUS-3-O1(c5) is

PUS-3-O1(c5)

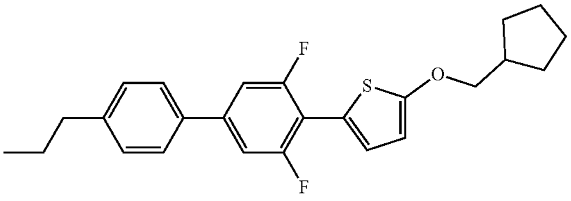

To the mixture N53 are added 150 ppm of the stabiliser ST-3b-1.

Example 54

The nematic LC mixture N54 is formulated as follows.

| | | | |
|---|---|---|---|
| CCP-V-1 | 6.3% | Cl. p. [° C.]: | 103 |
| CCP-3-1 | 5.85% | Δn [589 nm, 20° C.]: | 0.1246 |
| LOY-3-O2 | 5.4% | Δε [1 kHz, 20° C.]: | −3.2 |
| CPY-3-O2 | 3.6% | $\gamma_1$ [mPa s, 20° C.]: | 140 |
| CCY-3-O2 | 5.85% | $K_1$ [pN, 20° C.]: | 18.7 |
| CLY-2-O4 | 3.6% | $K_3$ [pN, 20° C.]: | 19.5 |
| CLY-3-O2 | 5.4% | | |
| CLY-3-O3 | 4.5% | | |
| CLY-4-O2 | 3.6% | | |
| CLY-5-O2 | 3.6% | | |

-continued

| | |
|---|---|
| PGIY-2-O4 | 4.5% |
| B(S)-2O-O4 | 3.6% |
| B(S)-2O-O5 | 3.6% |
| CC-3-V | 13.5% |
| CC-4-V1 | 9.0% |
| CC-2-3 | 8.1% |
| PUS-3-2 | 10.0% |
| Σ | 100.0% |

wherein LOY-3-O2 is

LOY-3-02

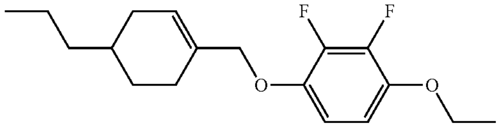

To the mixture N54 are added 50 ppm of the stabiliser H-2-1-1.

Example 55

The nematic LC mixture N55 is formulated as follows.

| | | | |
|---|---|---|---|
| CCP-V-1 | 6.3% | Cl. p. [° C.]: | 108.5 |
| CCP-3-1 | 5.85% | Δn [589 nm, 20° C.]: | 0.1296 |
| YG-2O-O4 | 5.4% | Δε [1 kHz, 20° C.]: | −3.1 |
| CPY-3-O2 | 3.6% | $\gamma_1$ [mPa s, 20° C.]: | 148 |
| CCY-3-O2 | 5.85% | $K_1$ [pN, 20° C.]: | 19.4 |
| CLY-2-O4 | 3.6% | $K_3$ [pN, 20° C.]: | 19.9 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein YG-2O-O4 is

YG-2O-O4

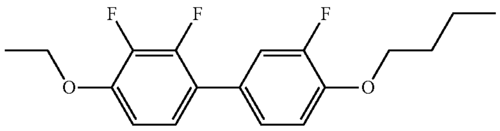

To the mixture N55 are added 100 ppm of the stabiliser ST-8-1.

Example 56

The nematic LC mixture N56 is formulated as follows.

| | | | |
|---|---|---|---|
| CCP-V-1 | 6.3% | Cl. p. [° C.]: | 109 |
| CCP-3-1 | 5.85% | Δn [589 nm, 20° C.]: | 0.1288 |
| YG-4O-O4 | 5.4% | Δε [1 kHz, 20° C.]: | −3.1 |
| CPY-3-O2 | 3.6% | $\gamma_1$ [mPa s, 20° C.]: | 146 |

-continued

| | | | |
|---|---|---|---|
| CCY-3-O2 | 5.85% | $K_1$ [pN, 20° C.]: | 19.4 |
| CLY-2-O4 | 3.6% | $K_3$ [pN, 20° C.]: | 19.6 |
| CLY-3-O2 | 5.4% | | |
| CLY-3-O3 | 4.5% | | |
| CLY-4-O2 | 3.6% | | |
| CLY-5-O2 | 3.6% | | |
| PGIY-2-O4 | 4.5% | | |
| B(S)-2O-O4 | 3.6% | | |
| B(S)-2O-O5 | 3.6% | | |
| CC-3-V | 13.5% | | |
| CC-4-V1 | 9.0% | | |
| CC-2-3 | 8.1% | | |
| PUS-3-2 | 10.0% | | |
| Σ | 100.0% | | |

wherein YG-4O-O4 is

YG-4O-O4

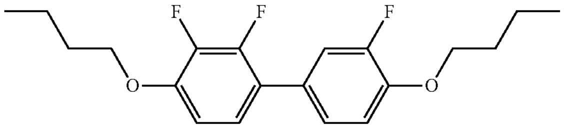

To the mixture N56 are added 50 ppm of the stabiliser ST-9-1.

The invention claimed is:

1. A liquid crystal medium comprising one or more compounds selected from compounds of formula III

III

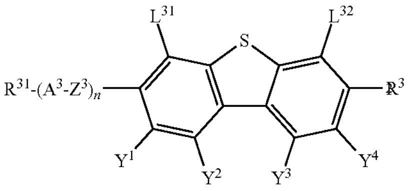

and/or formula IIIA

IIIA

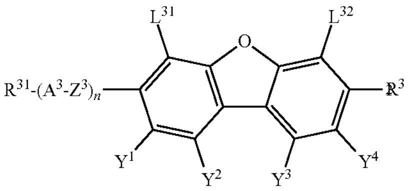

and/or formula BC

BC

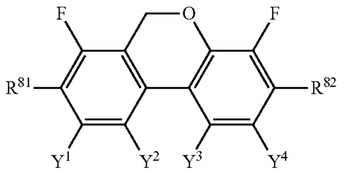

and/or formula PH-1

PH-1

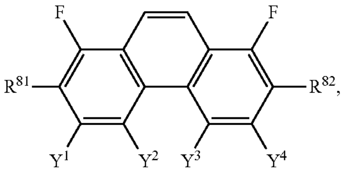

one or more compounds of formula I
I,
one or more compounds of formula IIA
IIA,
one or more compounds of formula IID
IID,
one or more compounds of formula IIE
IIE,
a compound PYP-n-(C5)

PYP-n-(C5)

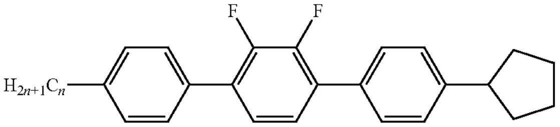

and
a compound YG-nO-Om

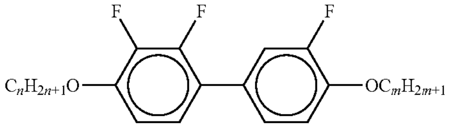

in which $R^{11}$, $R^{12}$, $R^{31}$, $R^{32}$, $R^{81}$, and $R^{82}$ each, independently of one another, denote H, an alkyl or alkoxy radical having 1 to 15 C atoms, where one or more $—CH_2—$ groups in these radicals may each be replaced, independently of one another, by

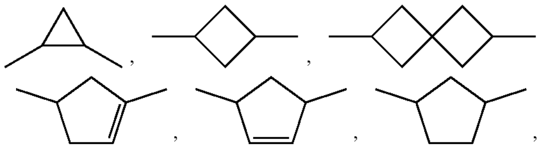

—C≡C—, $—CF_2O—$, $—OCF_2—$, —CH═CH—, by —O—, —CO—O— or —O—CO— in such a way that O atoms are not linked directly to one another, and in which one or more H atoms may be replaced by halogen, X denotes S or O, $A^3$ on each occurrence, independently of one another, denotes a) a 1,4-cyclohexylene or 1,4-cyclohexenylene radical, in which one or two non-adjacent $CH_2$ groups may be replaced by —O— or —S—, b) a 1,4-phenylene radical, in which one or two CH groups may be replaced by N, or c) a radical selected from the group consisting of spiro [3.3] heptane-2,6-diyl, piperidine-1,4-diyl, 1,4-bicyclo [2.2.2] octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) are optionally monosubstituted or polysubstituted by halogen atoms, n in formulae III and IIIA denotes 0, 1 or 2, and in formulae PYP-n-(C5) and YG-nO-Om denotes 1 to 6, m denotes 1 to 6, $Z^3$ on each occurrence independently of one another denotes —CO—O—, —O—CO—, —$CF_2O$—, —$OCF_2$-, —$CH_2O$-, —$OCH_2$-, —$CH_2$-, —$CH_2CH_2$-, -$(CH_2)_4$-, —CH═CH-$CH_2O$-, -$C_2F_4$-, —$CH_2CF_2$-, —$CF_2CH_2$-, —CF═CF-, —CH═CF-, —CF═CH-, —CH═CH-, —C≡C— or a single bond, $L^{11}$, $L^{12}$, $L^{31}$ and $L^{32}$, each, independently of one another, denote F, Cl, $CF_3$ or $CHF_2$, $Y^1$, $Y^2$, $Y^3$, $Y^4$, each, independently of one another, denote H, F, Cl, $CF_3$, $CHF_2$, $CH_3$ or $OCH_3$, $R^{21}$, $R^{22}$ denotes H, an alkyl, alkoxy or alkenyl radical having up to 15 C atoms which is unsubstituted or monosubstituted by F, Cl, CN or $CF_3$ and where, in addition, one or more $CH_2$ groups in these radicals may be replaced by —O—, —S—, —C≡C—, —$CF_2O$—, —$OCF_2$—, —OC—O—, —O—CO—

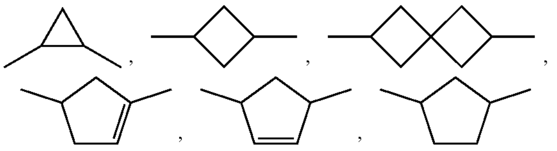

in such a way that O- and/or S-atoms are not linked directly to one another, $L^1$ to $L^4$ denotes F, Cl, $CF_3$ or $CHF_2$, Y denotes H, F, Cl, $CF_3$, $CHF_2$ or $CH_3$, $Z^1$, $Z^2$ denotes a single bond, —$CH_2CH_2$-, —CH═CH-, —$CF_2O$-, —$OCF_2$-, —$CH_2O$-, -$OCH_2$-, —COO-, —OCO—, —$C_2F_4$-, —CF═CF-, —CH═$CHCH_2O$, p denotes 0, 1 or 2, q denotes 0 or 1, and wherein in formula III, at least one of $R^{31}$ or $R^{32}$ is —CH═CH—, wherein in formula IIA, $Z^1$ is not a single bond.

2. The liquid crystal medium according to claim 1, wherein the one or more compounds of formula III and/or formula IIIA comprise one or more compounds selected from the compounds of formulae III-1, III-6, and/or IIIA-1

III-1

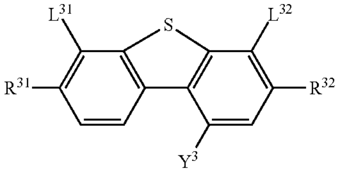

-continued

III-6

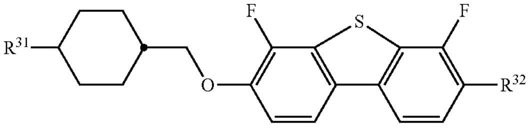

IIIA-1

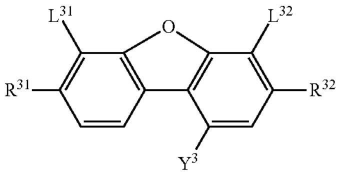

in which $L^{31}$ and $L^{32}$, each, independently of one another, denote F, Cl, $CF_3$ or $CHF_2$, $R^{31}$ and $R^{32}$ each, independently of one another, denote H, an alkyl or alkoxy radical having 1 to 15 C atoms, where one or more-$CH_2$-groups in these radicals may each be replaced, independently of one another, by

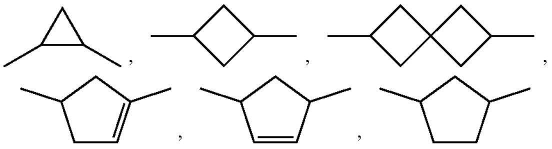

—C≡C—, —$CF_{20}$-, —$OCF_2$-, —CH═CH—, by —O—, —CO—O— or —O—CO— in such a way that O atoms are not linked directly to one another, and in which one or more H atoms may be replaced by halogen, and $Y^3$ each, independently of one another, denote H, F, Cl, $CF_3$, $CHF_2$, $CH_3$ or $OCH_3$.

3. The liquid crystal medium according to claim 1, wherein the medium further comprises one or more compounds selected from compounds of formulae IIB, IIC, and IIF,

IIB

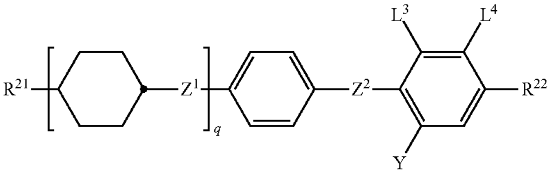

IIC

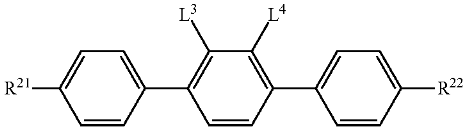

IIF

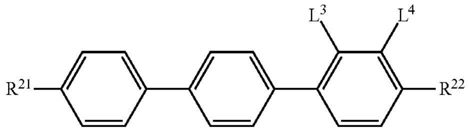

in which the individual radicals, on each occurrence identically or differently, and each, independently of one another, have the following meaning:

$R^{21}$, $R^{22}$ H, an alkyl, alkoxy or alkenyl radical having up to 15 C atoms which is unsubstituted or monosubstituted by F, Cl, CN or $CF_3$ and where, in addition, one or more $CH_2$ groups in these radicals may be replaced by —O—, —S—, —C≡C—, —$CF_2$O-, —O$CF_2$-, —OC—O—, —O-CO—

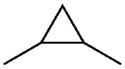, 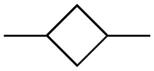, 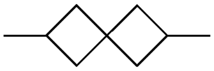,

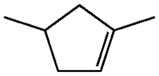, 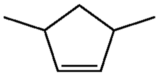, 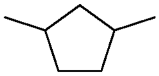

in such a way that O- and/or S-atoms are not linked directly to one another, $L^3$ to $L^4$ F, Cl, $CF_3$ or $CHF_2$, Y H, F, Cl, $CF_3$, $CHF_2$ or $CH_3$, $Z^1$, $Z^2$ a single bond, —$CH_2CH_2$-, —CH═CH-, —$CF_2$O-, —O$CF_2$-, —$CH_2$O-, —O$CH_2$-, —COO-, -OCO—, —$C_2F_4$-, —CF═CF-, —CH═CH$CH_2$O, p 0, 1 or 2, and q 0 or 1.

4. The liquid crystal medium according to claim 1, wherein the medium further comprises one or more compounds of formula IV

IV

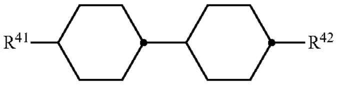

in which $R^{41}$ denotes an unsubstituted alkyl radical having 1 to 7 C atoms, or cyclic alkyl having 3 to 6 C atoms, or an unsubstituted alkenyl radical having 2 to 7 C atoms, and $R^{42}$ denotes an unsubstituted alkyl radical having 1 to 7 C atoms, or cyclic alkyl having 3 to 6 C atoms, or an unsubstituted alkoxy radical having 1 to 6 C atoms, or an unsubstituted alkenyl radical having 2 to 7 C atoms.

5. The liquid crystal medium according to claim 4, wherein the one or more compounds of formula IV comprise one or more compounds of formula IV-1 and formula IV-3,

IV-1

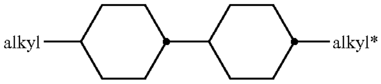

IV-3

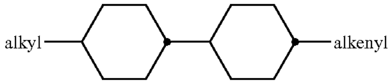

in which alkyl and alkyl*, independently of one another, denote an alkyl radical having 1 to 7 C atoms, or cyclic alkyl having 3 to 6 C atoms, and alkenyl denotes an alkenyl radical having 2 to 7 C atoms.

6. The liquid crystal medium according to claim 4, wherein the one or more compounds of formula IV comprise one or more compounds of formula IVa-2, IVa-2

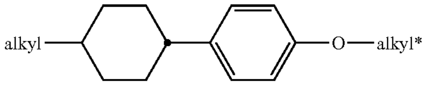

in which alkyl and alkyl*, independently of one another, denote a straight-chain alkyl radical having 1 to 6 C atoms, or cyclic alkyl having 3 to 6 C atoms.

7. The liquid crystal medium according to claim 1, wherein the medium further comprises one or more compounds of the formula V

V

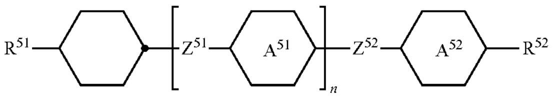

in which $R^{51}$, $R^{52}$ denote alkyl having 1 to 7 C atoms, or cyclic alkyl having 3 to 6 C atoms, alkoxy having 1 to 7 C atoms, or alkoxyalkyl, alkenyl or alkenyloxy having 2 to 7 C atoms,

 and 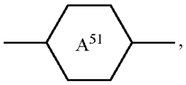, identically or differently, denote

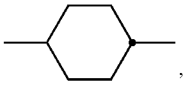, 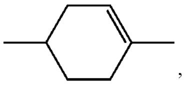, 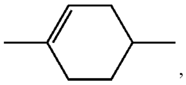,

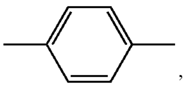, 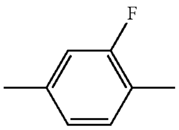 or

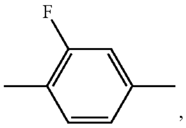, $Z^{51}$, $Z^{52}$ each, independently of one another, denote-$CH_2$-$CH_2$-, —$CH_2$-O-, —CH═CH—, —C≡C—, —COO— or a single bond, and n is 1 or 2;

wherein the one or more compounds of formula V are different from the one or more compounds of formula I.

8. The liquid crystal medium according to claim 1, wherein the medium further comprises one or more compounds of formulae VI-1 to VI-22:

VI-1
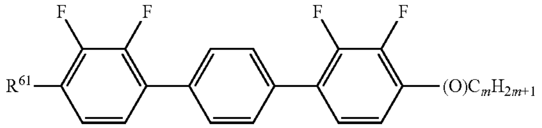
VI-2
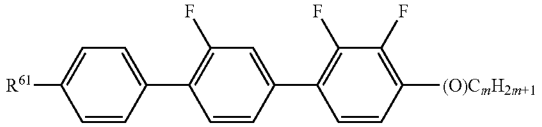
VI-3
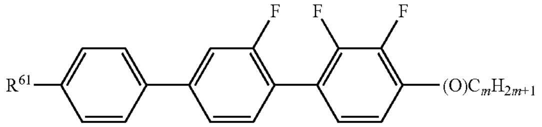
VI-4
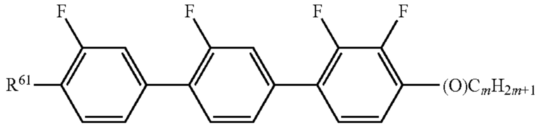
VI-5
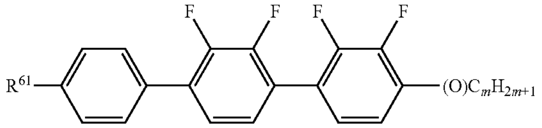
VI-6
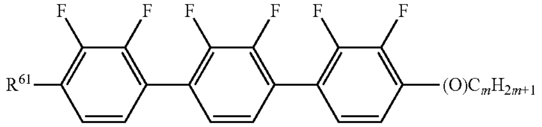
VI-7
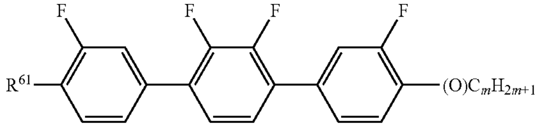
VI-8
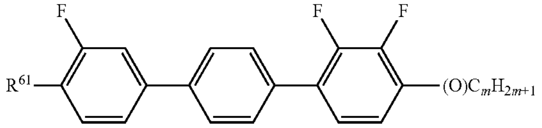
VI-9
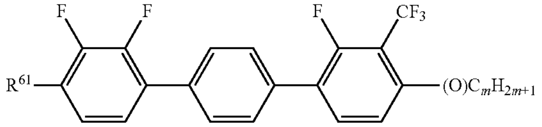
VI-10
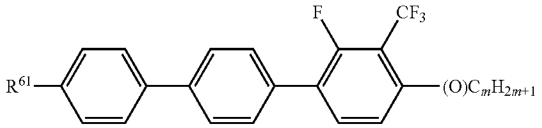
-continued
VI-11
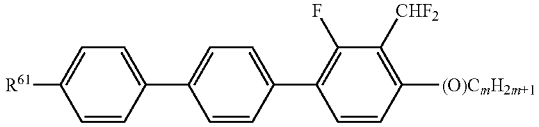
VI-12
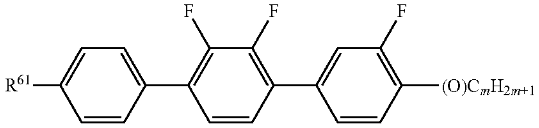
VI-13
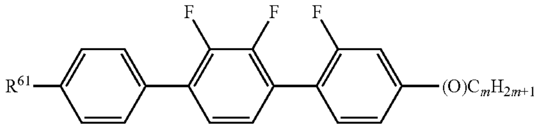
VI-14
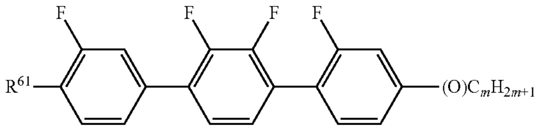
VI-15
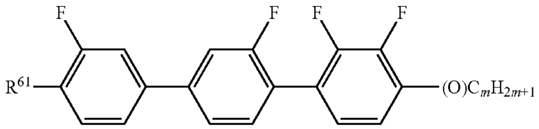
VI-16
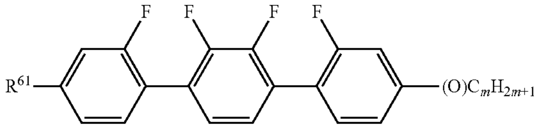
VI-17
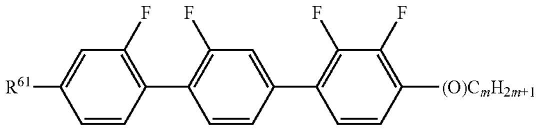
VI-18
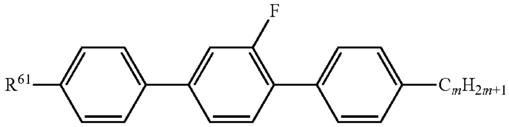
VI-19
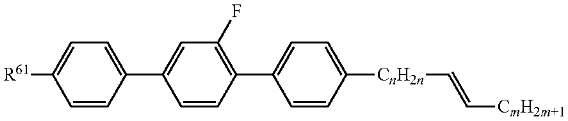
VI-20
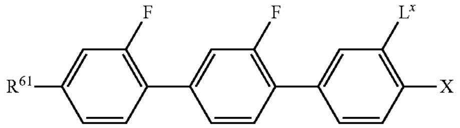

-continued

VI-21

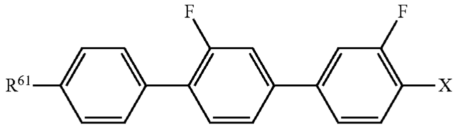

VI-22

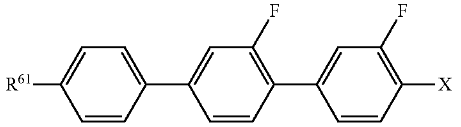

in which $R^{61}$ denotes a straight-chain alkyl or alkoxy radical having 1 to 6 C atoms, or cyclic alkyl having 3 to 6 C atoms, (O) denotes —O— or a single bond, X denotes F, Cl, $OCF_3$ or $OCHF_2$, $L^x$ denotes H or F, m is 0, 1, 2, 3, 4, 5 or 6, and n is 0, 1, 2, 3 or 4.

9. The liquid crystal medium according to claim 1, wherein the medium further comprises one or more compounds of formulae VII-1 to VII-9:

VII-1

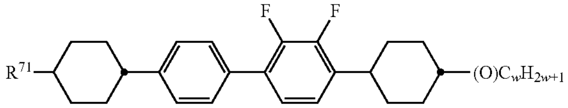

VII-2

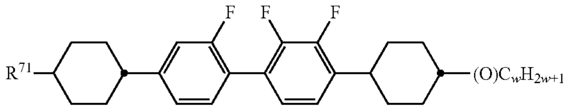

VII-3

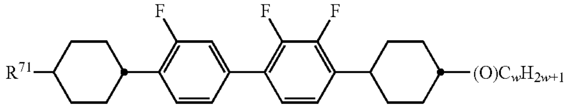

VII-4

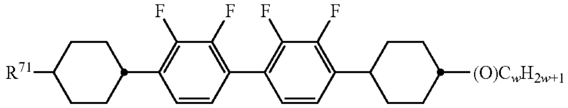

VII-5

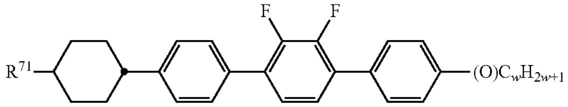

VII-6

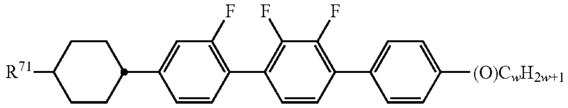

VII-7

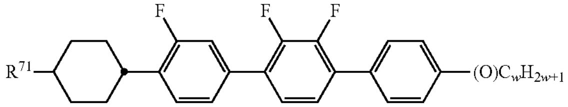

-continued

VII-8

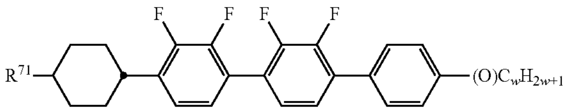

VII-9

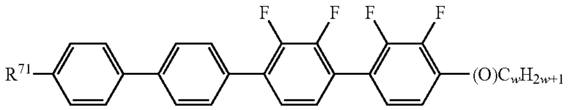

in which $R^{71}$ each, independently of one another, denotes H, an alkyl, alkoxy or alkenyl radical having up to 15 C atoms which is unsubstituted or monosubstituted by F, Cl, CN or $CF_3$ and where, in addition, one or more $CH_2$ groups in these radicals may be replaced by —O—, —S—, —C≡C—, —$CF_2O$-, —$OCF_2$-, —OC—O—, —O—CO—

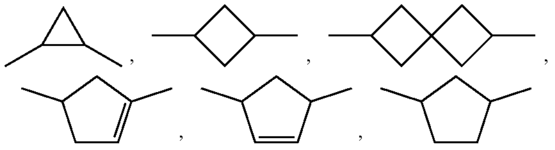

in such a way that O- and/or S-atoms are not linked directly to one another, (O) denotes-O— or a single bond, and w and x each, independently of one another, denote 1 to 6.

10. The liquid crystal medium according to claim 1, wherein the medium further comprises one or more compounds of formula CR and/or one or more compounds of formula PH-2:

CR

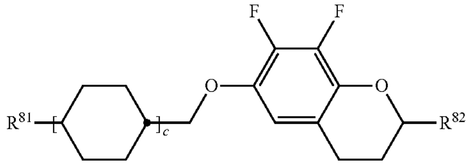

PH-2

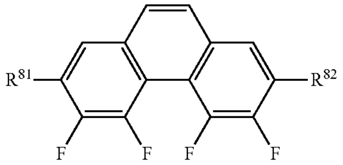

in which $R^{81}$ and $R^{82}$ each, independently of one another, denote H, an alkyl or alkoxy radical having 1 to 15 C atoms, where one or more —$CH_2$- groups in these radicals may each be replaced, independently of one another, by

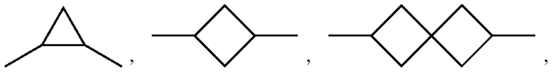

-continued

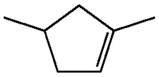,
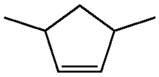,
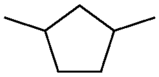,

—C≡C-, —$CF_2O$-, —$OCF_2$-, —CH=CH-, by —O—, —CO—O— or —O—CO— in such a way that O atoms are not linked directly to one another, and in which one or more H atoms may be replaced by halogen, (O) denotes —O— or a single bond, and c is 0, 1 or 2.

11. The liquid crystal medium according to claim 1, further comprising one or more additives selected from the group consisting of stabilisers, chiral dopants, polymerization initiators and self-alignment additives.

12. A liquid crystal display comprising the liquid crystal medium according to claim 1.

13. The liquid crystal display according to claim 12, wherein the display is a VA, PS-VA, FFS, PS-FFS, UB-FFS, UBplus, IPS, PS-IPS, or UV2A display.

14. An energy-saving LC display comprising the liquid crystal medium according to claim 1.

15. A process of preparing a liquid crystal medium according to claim 1, comprising the steps of mixing one or more compounds of formula I with one or more compounds selected from the group of compounds of formula III, and/or formula IIIA, and/or formula BC, and/or formula PH-1:

I

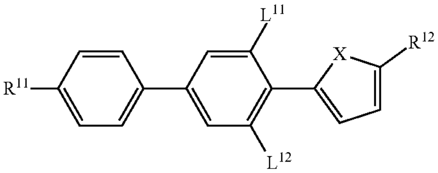

III

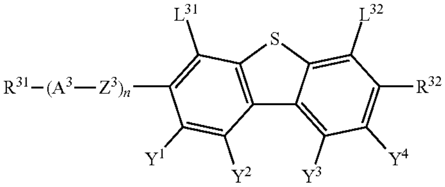

IIIA

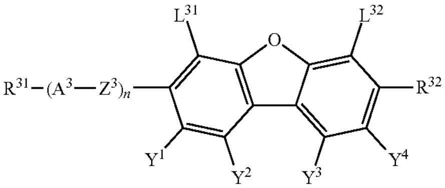

BC

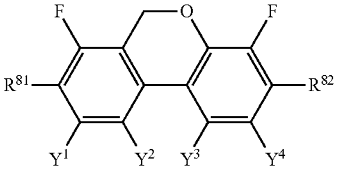

-continued

PH-1

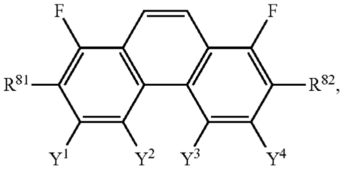

one or more compounds of formula IIA

IIA

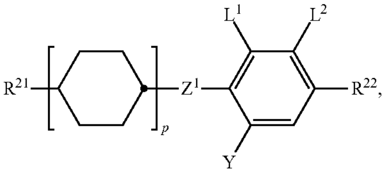

one or more compounds of formula IID

IID

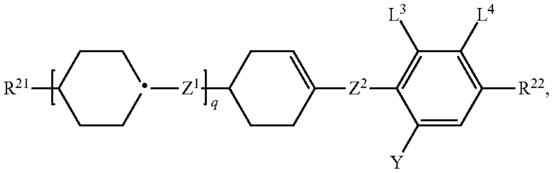

one or more compounds of formula IIE

IIE, a compound PYP-n-($C_5$)

PYP-n-(C5)

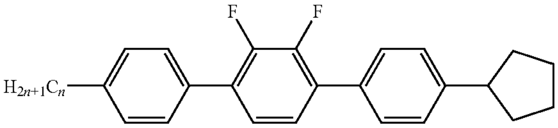

and a compound YG-nO-Om

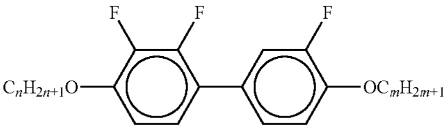

in which $R^{11}$, $R^{12}$, $R^{31}$, $R^{32}$, $R^{81}$, and $R^{82}$ each, independently of one another, denote H, an alkyl or alkoxy radical having 1 to 15 C atoms, where one or more —$CH_2$-groups in these radicals may each be replaced, independently of one another, by

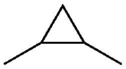, 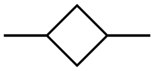, 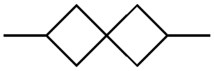, 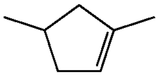, 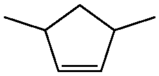, 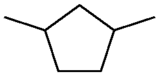, —C≡C—, —$CF_2O$-, —$OCF_2$-, —CH═CH-, by —O—, —CO—O— or —O—CO— in such a way that O atoms are not linked directly to one another, and in which one or more H atoms may be replaced by halogen, X denotes S or O, $A^3$ on each occurrence, independently of one another, denotes a) a 1,4-cyclohexylene or 1,4-cyclohexenylene radical, in which one or two non-adjacent $CH_2$ groups may be replaced by —O— or —S—, b) a 1,4-phenylene radical, in which one or two CH groups may be replaced by N, or c) a radical selected from the group consisting of spiro [3.3] heptane-2,6-diyl, piperidine-1,4-diyl, 1,4-bicyclo[2.2.2] octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) are optionally monosubstituted or polysubstituted by halogen atoms, n in formulae III and IIIA denotes 0, 1 or 2, and in formulae PYP-n-($C_5$) and YG-nO-Om denotes 1 to 6, m denotes 1 to 6, $Z^3$ on each occurrence independently of one another denotes-CO-O-, —O-CO-, -$CF_2O$-, —$OCF_2$-, —$CH_2O$-, —$OCH_2$-, —$CH_2$-, —$CH_2CH_2$-, -($CH_2$) 4-, —CH═CH—$CH_2O$—, —$C_2F_4$-, —$CH_2CF_2$-, —$CF_2CH_2$-, —CF═CF-, —CH═CF-, —CF═CH-, —CH═CH-, —C≡C— or a single bond, $L^{11}$, $L^{12}$, $L^{31}$ and $L^{32}$, each, independently of one another, denote F, Cl, $CF_3$ or $CHF_2$, and $Y^1$, $Y^2$, $Y^3$, $Y^4$, each, independently of one another, denote H, F, Cl, $CF_3$, $CHF_2$, $CH_3$ or $OCH_3$, $R^{21}$, $R^{22}$ denotes H, an alkyl, alkoxy or alkenyl radical having up to 15 C atoms which is unsubstituted or monosubstituted by F, Cl, CN or $CF_3$ and where, in addition, one or more $CH_2$ groups in these radicals may be replaced by —O—, —S—, —C≡C—, —$CF_2O$—, —$OCF_2$—, —OC—O—, —O—CO—

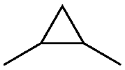, 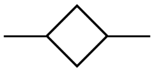, 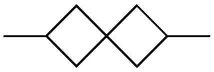, 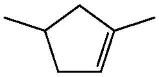, 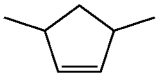, 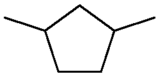

in such a way that O- and/or S-atoms are not linked directly to one another, $L^1$ to $L^4$ denotes F, Cl, $CF_3$ or $CHF_2$, Y denotes H, F, Cl, $CF_3$, $CHF_2$ or $CH_3$, $Z^1$, $Z^2$ denotes a single bond, —$CH_2CH_2$-, —CH═CH-, —$CF_2O$-, —$OCF_2$-, —$CH_2O$-, -$OCH_2$-, —COO-, —OCO—, —$C_2F_4$-, —CF═CF-, —CH═$CHCH_2O$, and p denotes 0, 1 or 2, and wherein in formula III, at least one of $R^{31}$ or $R^{32}$ is-CH═CH-, wherein in formula IIA, $Z^1$ is not a single bond, and optionally with one or more further liquid crystal compounds and/or additives.

* * * * *